(12) United States Patent
Xiong et al.

(10) Patent No.: US 12,150,213 B2
(45) Date of Patent: Nov. 19, 2024

(54) REFERENCE SIGNAL AND CONTROL INFORMATION PROCESSING IN 5G-NR WIRELESS SYSTEMS

(71) Applicant: Apple Inc., Cupertino, CA (US)

(72) Inventors: Gang Xiong, Beaverton, OR (US); Yushu Zhang, Beijing (CN); Dae Won Lee, Portland, OR (US); Alexei Vladimirovich Davydov, Nizhny Novgorod (RU); Seunghee Han, San Jose, CA (US); Jie Zhu, San Jose, CA (US); Dmitry Belov, Nizhny Novgorod (RU); Debdeep Chatterjee, San Jose, CA (US); Andrey Chervyakov, Nizhny Novgorod (RU); Fatemeh Hamidi-Sepehr, Santa Clara, CA (US); Hong He, Beijing (CN); Toufiqul Islam, Santa Clara, CA (US); Jeongho Jeon, San Jose, CA (US); Alexey Vladimirovich Khoryaev, Nizhny Novgorod (RU); Lopamudra Kundu, Sunnyvale, CA (US); Yongjun Kwak, Portland, OR (US); Jose Armando Oviedo, Santa Cruz, CA (US); Sergey Panteleev, Nizhny Novgorod (RU); Mikhail Shilov, Nizhny Novgorod (RU); Sergey Sosnin, Zavolzhie (RU); Salvatore Talarico, Sunnyvale, CA (US); Jan Zaleski, Altenberg bei Linz (AT)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/830,016

(22) Filed: Jun. 1, 2022

(65) Prior Publication Data
US 2022/0330381 A1    Oct. 13, 2022

Related U.S. Application Data

(63) Continuation of application No. 16/446,320, filed on Jun. 19, 2019, now Pat. No. 11,432,369.

(Continued)

(51) Int. Cl.
*H04W 88/06* (2009.01)
*H04J 13/00* (2011.01)
(Continued)

(52) U.S. Cl.
CPC ........ *H04W 88/06* (2013.01); *H04J 13/0062* (2013.01); *H04L 5/0005* (2013.01);
(Continued)

(58) Field of Classification Search
CPC .......... H04J 13/0062; H04J 2011/0006; H04L 27/2607; H04L 27/261; H04L 27/2636;
(Continued)

(56) References Cited

U.S. PATENT DOCUMENTS 9,374,833 B2   6/2016   Noh et al.
10,348,477 B2   7/2019   You et al.
(Continued)

FOREIGN PATENT DOCUMENTS

WO    2016204811 A1    12/2016

OTHER PUBLICATIONS

LG Electronics, "Discussion on HARQ-ACK feedback method for NR", 3GPP TSG RAN WG1 Meeting #88bis, R1-1704917, Spokane, USA Apr. 3-7, 2017, Total pp. 7 (Year: 2017).*
(Continued)

*Primary Examiner* — Shah M Rahman
(74) *Attorney, Agent, or Firm* — Kowert, Hood, Munyon, Rankin & Goetzel, P.C.

(57) ABSTRACT

A user equipment (UE) can include processing circuitry coupled to memory. To configure the UE for New Radio
(Continued)

(NR) communications above a 52.6 GHz carrier frequency, the processing circuitry is to decode radio resource control (RRC) signaling to obtain a cyclic shift value in time domain. The cyclic shift value is associated with a demodulation reference signal (DM-RS) antenna port (AP) of a plurality of available DM-RS APs. A single carrier based waveform DM-RS sequence corresponding to the DM-RS AP is generated using a base sequence and the cyclic shift value. The single carrier based waveform DM-RS sequence is encoded with uplink data for transmission to a base station using a physical uplink shared channel (PUSCH) using a carrier above the 52.6 GHz carrier frequency.

20 Claims, 60 Drawing Sheets

Related U.S. Application Data

(60) Provisional application No. 62/790,978, filed on Jan. 10, 2019, provisional application No. 62/711,325, filed on Jul. 27, 2018, provisional application No. 62/703,317, filed on Jul. 25, 2018, provisional application No. 62/701,368, filed on Jul. 20, 2018, provisional application No. 62/697,862, filed on Jul. 13, 2018, provisional application No. 62/697,317, filed on Jul. 12, 2018, provisional application No. 62/692,467, filed on Jun. 29, 2018, provisional application No. 62/688,943, filed on Jun. 22, 2018, provisional application No. 62/688,860, filed on Jun. 22, 2018, provisional application No. 62/687,097, filed on Jun. 19, 2018.

(51) Int. Cl.
*H04L 5/00* (2006.01)
*H04L 27/26* (2006.01)
*H04W 72/23* (2023.01)
*H04W 76/27* (2018.01)

(52) U.S. Cl.
CPC ........ *H04L 5/0051* (2013.01); *H04L 27/2607* (2013.01); *H04L 27/2636* (2013.01); *H04W 72/23* (2023.01); *H04W 76/27* (2018.02)

(58) Field of Classification Search
CPC ... H04L 5/0005; H04L 5/0051; H04L 5/0091; H04W 72/23; H04W 76/27; H04W 88/06
See application file for complete search history.

(56) References Cited

U.S. PATENT DOCUMENTS

| | | | | |
|---|---|---|---|---|
| 10,873,936 | B2* | 12/2020 | Huang | H04L 5/0098 |
| 11,438,965 | B2* | 9/2022 | Kakishima | H04L 5/0023 |
| 2009/0022253 | A1 | 1/2009 | Yoshida et al. | |
| 2011/0002412 | A1 | 1/2011 | Hou et al. | |
| 2012/0294272 | A1* | 11/2012 | Han | H04W 72/21 370/329 |
| 2013/0114523 | A1 | 5/2013 | Chatterjee et al. | |
| 2013/0301452 | A1 | 11/2013 | Yoon | |
| 2013/0343477 | A9 | 12/2013 | Jia et al. | |
| 2015/0312917 | A1 | 10/2015 | Farkas et al. | |
| 2017/0215201 | A1 | 7/2017 | Kim et al. | |
| 2017/0317794 | A1 | 11/2017 | You et al. | |
| 2017/0318565 | A1* | 11/2017 | Golitschek Edler von Elbwart | H04W 72/04 |
| 2018/0019843 | A1* | 1/2018 | Papasakellariou | H04L 1/1864 |
| 2018/0132264 | A1* | 5/2018 | Jung | H04L 1/1854 |
| 2018/0160443 | A1 | 6/2018 | Tang et al. | |
| 2018/0199367 | A1 | 7/2018 | Jung et al. | |
| 2018/0219642 | A1 | 8/2018 | Fakoorian et al. | |
| 2018/0278395 | A1 | 9/2018 | Yoon | |
| 2018/0287744 | A1* | 10/2018 | Sundararajan | H04L 1/1816 |
| 2018/0331870 | A1 | 11/2018 | Sun et al. | |
| 2018/0367362 | A1 | 12/2018 | Sun et al. | |
| 2018/0368157 | A1* | 12/2018 | Jeon | H04W 72/044 |
| 2019/0013917 | A1 | 1/2019 | Nam et al. | |
| 2019/0053229 | A1 | 2/2019 | Kim et al. | |
| 2019/0124688 | A1* | 4/2019 | Golitschek Edler von Elbwart | H04L 1/00 |
| 2019/0140801 | A1 | 5/2019 | Ko et al. | |
| 2019/0141730 | A1 | 5/2019 | Hosseini et al. | |
| 2019/0158331 | A1 | 5/2019 | Pawar et al. | |
| 2019/0230647 | A1* | 7/2019 | Yang | H04L 5/0051 |
| 2019/0230685 | A1* | 7/2019 | Park | H04W 72/12 |
| 2019/0261367 | A1 | 8/2019 | Wu et al. | |
| 2019/0280734 | A1 | 9/2019 | Park et al. | |
| 2019/0306878 | A1* | 10/2019 | Zhang | H04W 72/23 |
| 2019/0372720 | A1* | 12/2019 | Lee | H04W 72/23 |
| 2020/0007293 | A1 | 1/2020 | Wei et al. | |
| 2020/0022175 | A1* | 1/2020 | Xiong | H04L 5/0094 |
| 2020/0045722 | A1* | 2/2020 | Bae | H04W 72/569 |
| 2020/0106593 | A1 | 4/2020 | Wu | |
| 2020/0220698 | A1 | 7/2020 | Zhang et al. | |
| 2020/0267698 | A1* | 8/2020 | Xing | H04L 5/0053 |
| 2020/0359637 | A1* | 11/2020 | Su | H04W 72/23 |
| 2020/0374967 | A1* | 11/2020 | Nogami | H04W 72/0446 |
| 2021/0014003 | A1 | 1/2021 | Sundberg et al. | |
| 2021/0235482 | A1* | 7/2021 | Yoshioka | H04L 5/0055 |
| 2021/0259004 | A1* | 8/2021 | Takeda | H04L 1/08 |
| 2022/0386356 | A1* | 12/2022 | Kim | H04L 5/0092 |

OTHER PUBLICATIONS

Qualcomm, "Summary of Issues for PDSCH/PUSCH's DM-RS", Jan. 22-26, 2018, 3GPP TSG RAN WG1 Meeting AH 1801, R1-1801xxxx, pp. 1-19, Total pp. 19 (Year: 2018).

Choi et al., "Short Data Transmission with Least Resource in Machine Type Communications", May 18-21, 2014, 2014 IEEE 79th Vehicular Technology Conference (VTC Spring), Total pp. 5 (Year: 2014).

Pulimela, PK, "Receiver Design of Uplink Control and Shared Channel in 4G-L TE", 2015—Indian Institute of Technology, A Thesis w Submitted to Indian Institute of Technology Hyderabad in Partial Fulfillment of the Requirements for The Degree of Master of Technology in Electrical Department, pp. 1-88 (Year: 2015).

* cited by examiner

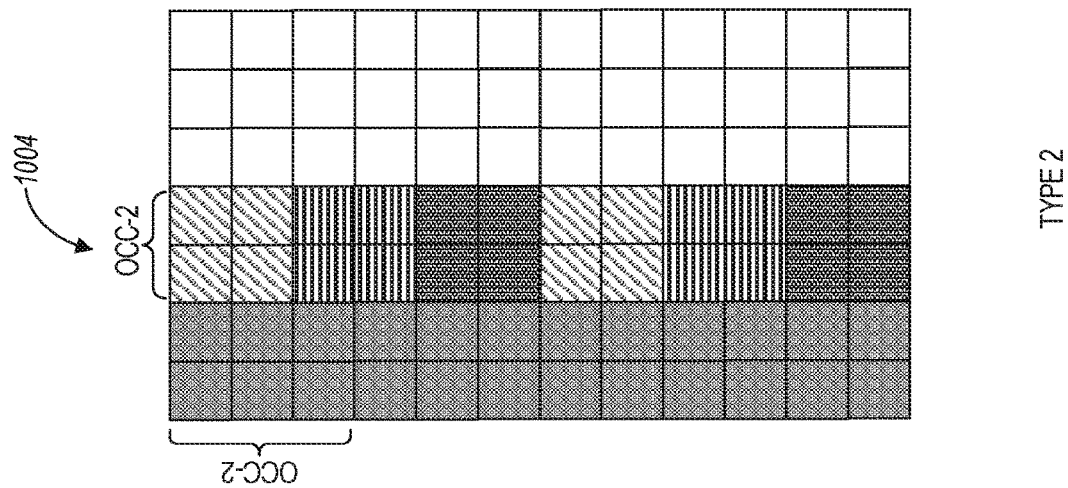
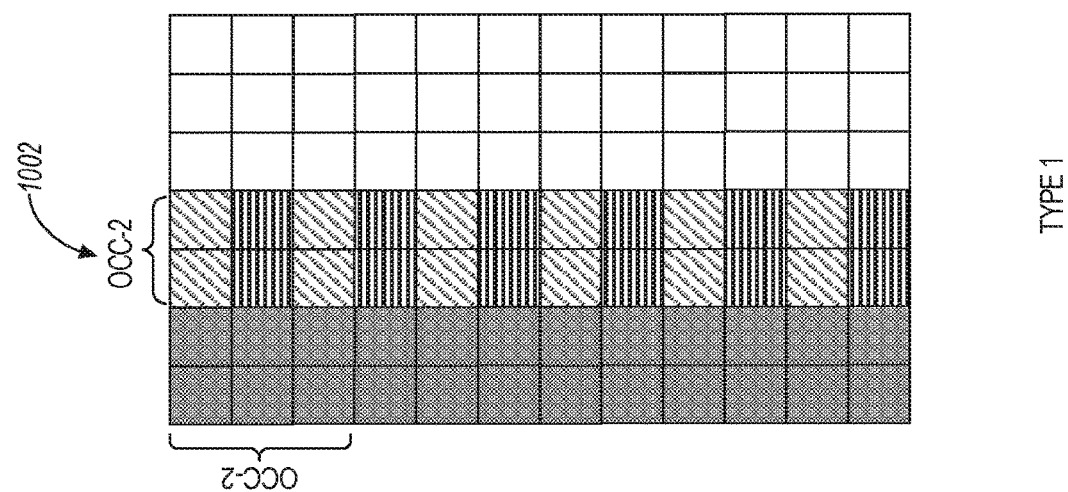
FIG. 10

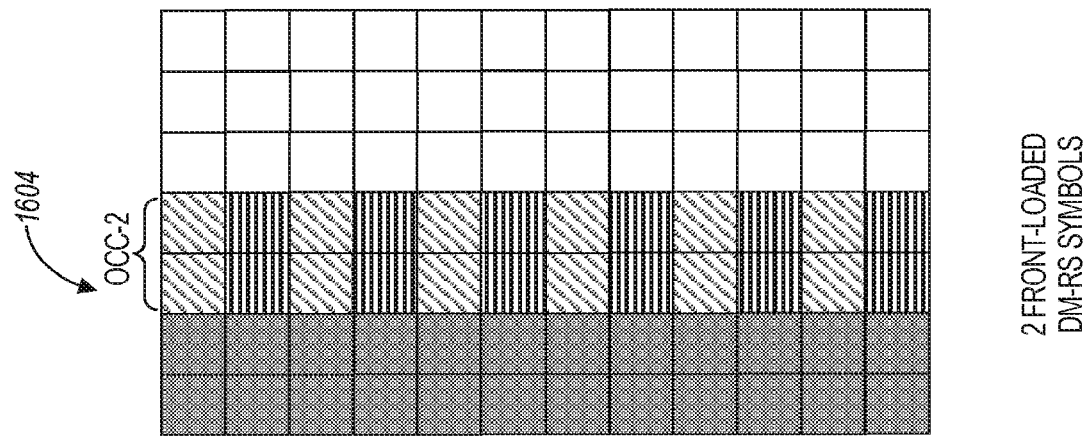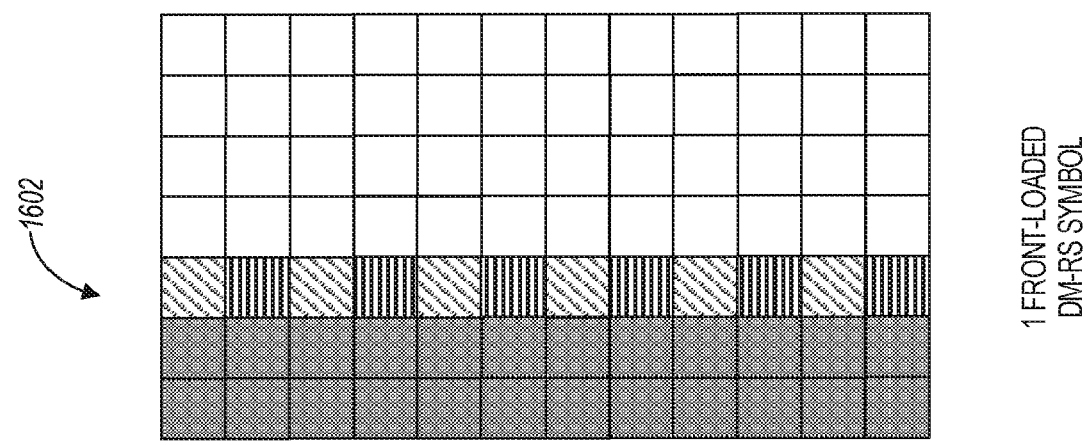
FIG. 16

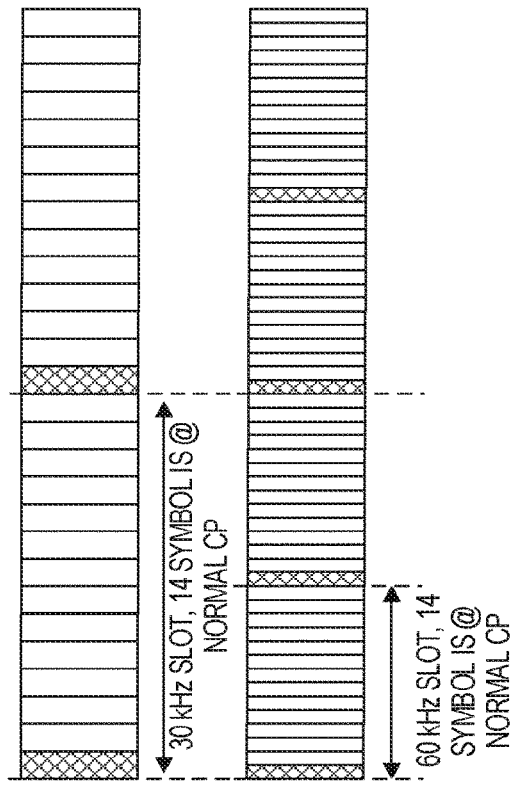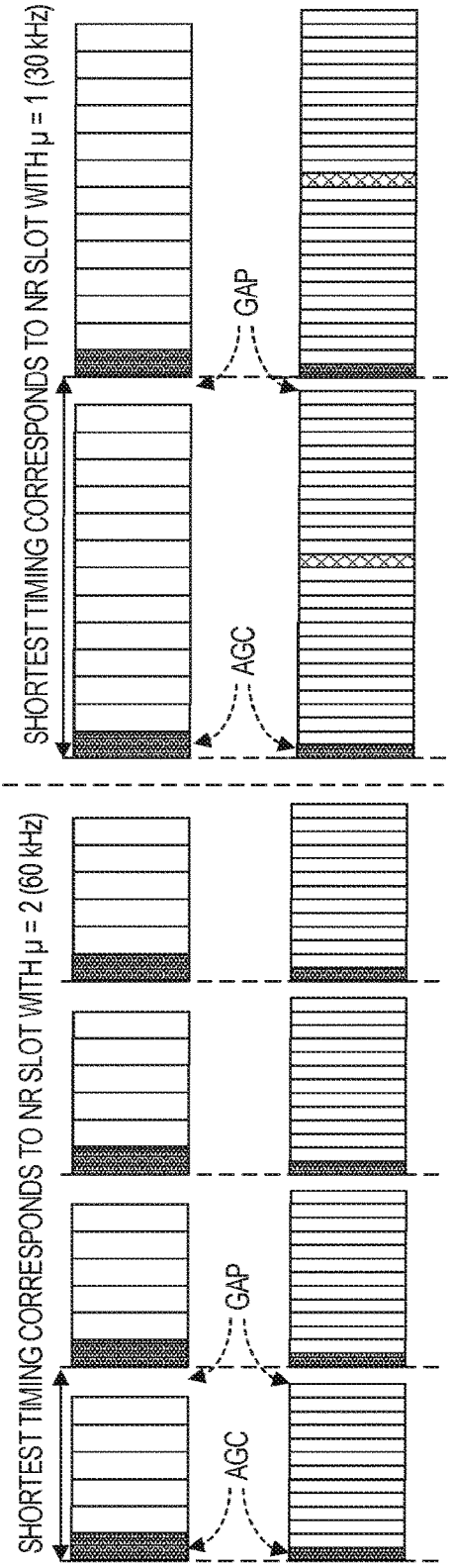
FIG. 17

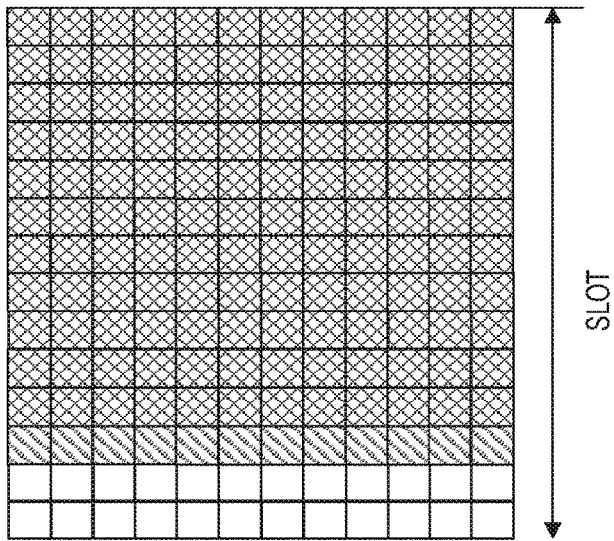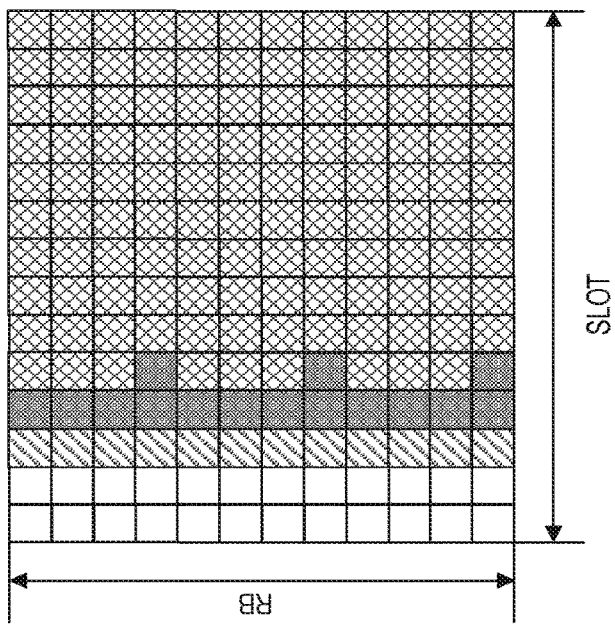
FIG. 38

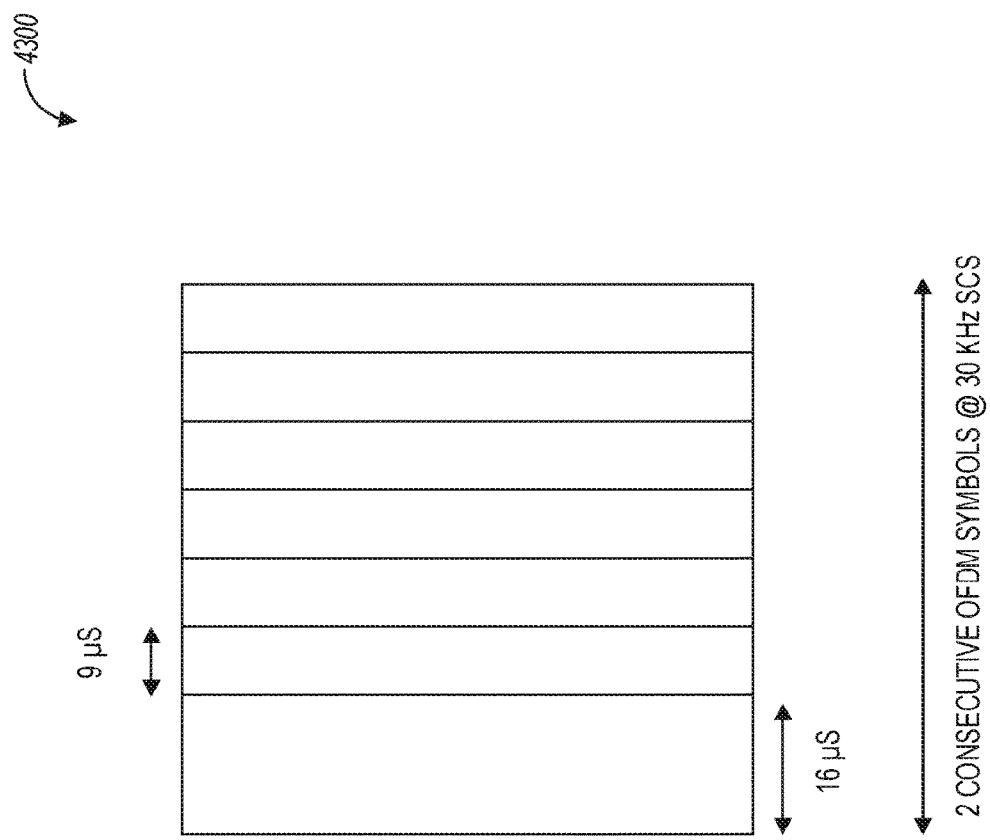
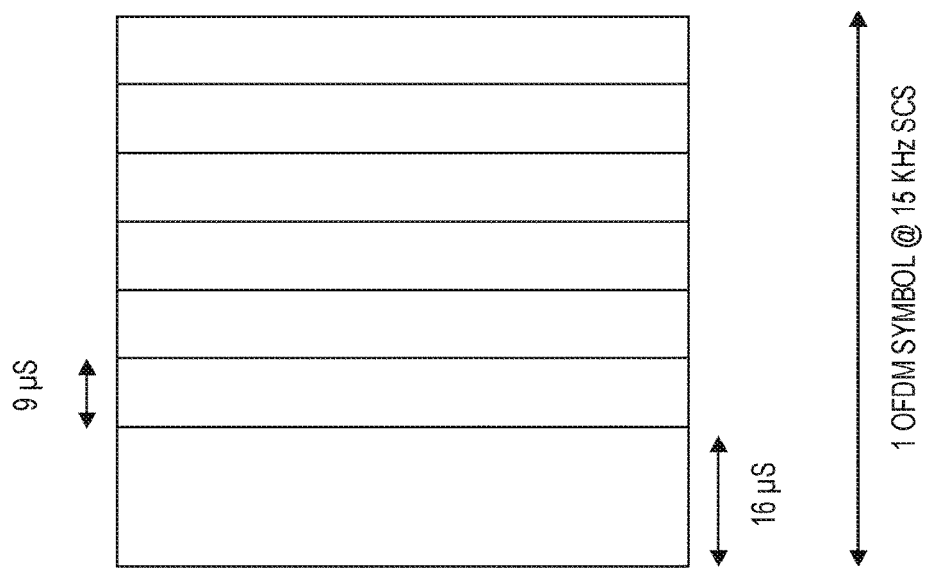
FIG. 43

REFERENCE SIGNAL AND CONTROL INFORMATION PROCESSING IN 5G-NR WIRELESS SYSTEMS

PRIORITY CLAIM

This application is a continuation of U.S. patent application Ser. No. 16/446,320, filed Jun. 19, 2019, which claims the benefit of priority to the following applications:

U.S. Provisional Patent Application Ser. No. 62/687,097, filed Jun. 19, 2018, and entitled "NOVEL REFERENCE SIGNAL DESIGN FOR SYSTEM OPERATING ABOVE 52.6 GHz CARRIER FREQUENCY;"

U.S. Provisional Patent Application Ser. No. 62/688,860, filed Jun. 22, 2018, and entitled "FORWARD COMPATIBILITY AND INTEGRATION OF NEW FEATURES FOR NEW RADIO (NR) VEHICLE-TO-VEHICLE COMMUNICATION;"

U.S. Provisional Patent Application Ser. No. 62/688,943, filed Jun. 22, 2018, and entitled "METHOD OF SIDELINK TRANSMISSION AND RECEPTION WITH RECONFIGURABLE BANDWIDTH AND CENTER FREQUENCY FOR EV2X COMMUNICATION;"

U.S. Provisional Patent Application Ser. No. 62/692,467, filed Jun. 29, 2018, and entitled "UPLINK CONTROL INFORMATION ON PUSCH WITH VERY SHORT DURATION;"

U.S. Provisional Patent Application Ser. No. 62/697,317, filed Jul. 12, 2018, and entitled "UCI PIGGYBACKING FOR GRANT-FREE AND GRANT BASED NOMA UPLINK TRANSMISSION;"

U.S. Provisional Patent Application Ser. No. 62/697,862, filed Jul. 13, 2018, and entitled "MECHANISMS TO MITIGATE INTER-CELL BLOCKING AND INTERFERENCE IN NR SYSTEMS OPERATING ON UNLICENSED SPECTRUM;"

U.S. Provisional Patent Application Ser. No. 62/701,368, filed Jul. 20, 2018, and entitled "CHANNEL ACCESS MECHANISMS FOR SIDELINK NR V2X COMMUNICATION;"

U.S. Provisional Patent Application Ser. No. 62/703,317, filed Jul. 25, 2018, and entitled "RELIABILITY ENHANCEMENT OF RESOURCE ALLOCATION FOR PHYSICAL UPLINK CONTROL CHANNEL IN NR-UNLICENSED SYSTEMS;"

U.S. Provisional Patent Application Ser. No. 62/711,325, filed Jul. 27, 2018, and entitled "TRIGGERING MULTIPLE HARQ-ACK TRANSMISSION IN A SLOT FOR NR SYSTEMS;" and U.S. Provisional Patent Application Ser. No. 62/790,978, filed Jan. 10, 2019, and entitled "REFERENCE SIGNAL DESIGN FOR A SYSTEM OPERATING ABOVE 52.6 GIGAHERTZ (GHZ) CARRIER FREQUENCY."

Each of the above-identified provisional patent applications is incorporated herein by reference in its entirety.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks and 5G-LTE networks. Other aspects are directed to novel reference signal design for systems operating above 52.6 GHz carrier frequency. Some aspects relate to forward compatibility and integration of new features for NR vehicle-to-vehicle (V2V) communications. Yet other aspects relate to systems and methods for sidelink transmission and reception with reconfigurable bandwidth and center frequency for enhanced vehicle-to-everything (EV2X) communication. Other aspects relate to uplink control information (UCI) on PUSCH with very short duration. Additional aspects relate to UCI piggybacking for grant-free and grant-based non-orthogonal multiple access (NOMA) uplink transmission. Additional aspects relate to mechanisms to mitigate intercell blocking and interference in NR systems operating on unlicensed spectrum. Further aspects relate to channel access mechanisms for sidelink NR V2X communications. Yet additional aspects relate to reliability enhancement of resource allocation for a physical uplink control channel in NR-unlicensed systems. Further aspects relate to triggering multiple HARQ-ACK transmission in a slot for NR systems. Additional aspects relate to reference signal design for a system operating above 52.6 GHz carrier frequency.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in a number of disparate environments. Fifth generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in unlicensed spectrum without requiring an "anchor" in the licensed spectrum, called MulteFire. MulteFire combines the performance benefits of LTE technology with the simplicity of Wi-Fi-like deployments. Additional operations in the unlicensed spectrum include NR-U type communications in the unlicensed band.

Further enhanced operation of LTE systems in the licensed as well as unlicensed spectrum is expected in future releases and 5G systems. Such enhanced operations can include techniques to address the following: forward compatibility and integration of new features for NR V2V communications, sidelink transmission and reception with reconfigurable bandwidth and center frequency for EV2X communication, uplink control information on PUSCH with very short duration, UCI piggybacking for grant-free and grant-based to NOMA uplink transmission, mitigate inter-cell blocking and interference in NR systems operating on unlicensed spectrum, channel access mechanisms for sidelink NR V2X communications, reliability enhancement of resource allocation for physical uplink control channel in NR-unlicensed systems, triggering multiple HARQ-ACK transmission in a slot for NR systems, and reference signal design for a system operating above 52.6 GHz carrier frequency.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

FIG. 10 illustrates type 1 and type 2 DM-RS structures for NR communications, in accordance with some aspects.

FIG. 16 illustrates DM-RS structures for discrete Fourier transform spread orthogonal frequency division multiplexing (DFT-s-OFDM) waveform for downlink communications, in accordance with some aspects.

FIG. 17 illustrates the configuration of the shortest transmission duration by NR slot numerology, in accordance with some aspects.

FIG. 38 illustrates a grant free PUSCH transmission with and without UCI piggybacking, in accordance with some aspects.

FIG. 43 illustrates granularity for offset values, in accordance with some aspects.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects set forth in the claims encompass all available equivalents of those claims.

Figure 1A:
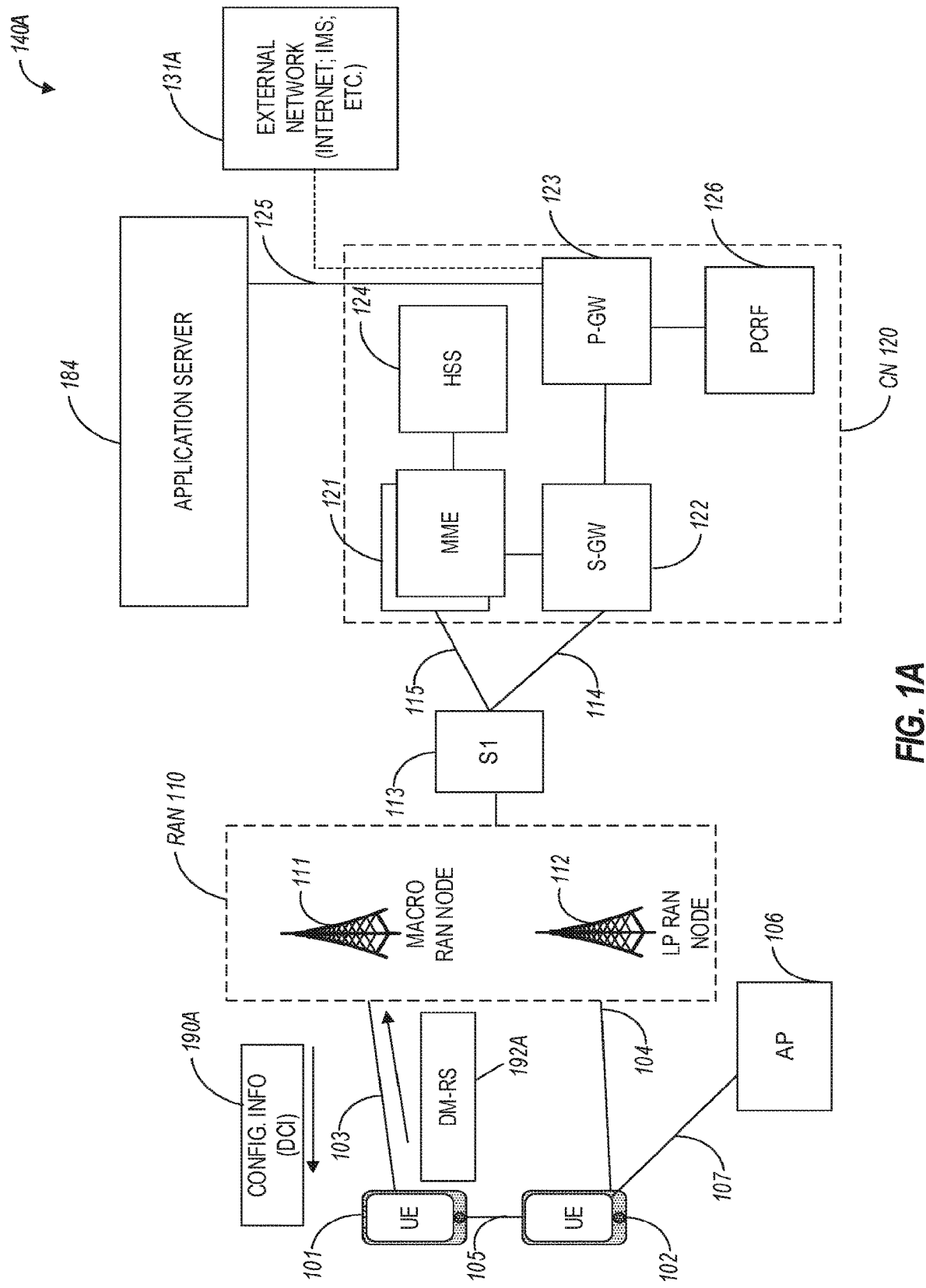
FIG. 1A illustrates an architecture of a network in accordance with some aspects.

FIG. 1A illustrates an architecture of a network in accordance with some aspects. The network 140A is shown to include user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, drones, or any other computing device including a wired and/or wireless communications interface.

Any of the radio links described herein (e.g., as used in the network 140A or any other illustrated network) may operate according to any one or more of the following exemplary radio communication technologies and/or standards including, but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (ISDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G or 5G-NR, 3GPP LTE Extra, LTE-Advanced Pro, LTE Licensed-Assisted Access (LAA), MulteFire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handyphone System (PHS), Wideband Integrated Digital Enhanced Network (WiDEN), iBurst, Unlicensed Mobile Access (UMA), also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.1 lad, IEEE 802.1 lay, and the like), technologies operating above 300 GHz and THz bands, (3GPP/LTE based or IEEE 802.11p and other), Vehicle-to-Vehicle (V2V), Vehicle-to-X (V2X), Vehicle-to-Infrastructure (V2I), and Infrastructure-to-Vehicle (I2V) communication technologies, 3GPP cellular V2X, DSRC (Dedicated Short Range Communications) communication systems such as Intelligent-Transport-Systems and others.

LTE and LTE-Advanced are standards for wireless communications of high-speed data for user equipment (UE) such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

There are emerging interests in the operation of LTE systems in the unlicensed spectrum. As a result, an important enhancement for LTE in 3GPP Release 13 has been to enable its operation in the unlicensed spectrum via Licensed-Assisted Access (LAA), which expands the system bandwidth by utilizing the flexible carrier aggregation (CA) framework introduced by the LTE-Advanced system. Rel-13 LAA system focuses on the design of downlink operation on unlicensed spectrum via CA, while Rel-14 enhanced LAA (eLAA) system focuses on the design of uplink operation on unlicensed spectrum via CA.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies). Applicable exemplary spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, to name a few), IMT-advanced spectrum, IMT-2020 spectrum (expected to include 3600-3800 MHz, 3.5 GHz bands, 700 MHz bands, bands within the 24.25-86 GHz range, for example), spectrum made available under the Federal Communications Commission's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz), WiGig Band 3 (61.56-63.72 GHz), and WiGig Band 4 (63.72-65.88 GHz); the 70.2 GHz-71 GHz band; any band between 65.88 GHz and 71 GHz; bands currently allocated to automotive radar applications such as 76-81 GHz; and future bands including 94-300 GHz and above. Furthermore, the scheme can be used on a secondary basis on bands such as the TV White Space bands (typically below 790 MHz) where, in particular, the 400 MHz and 700 MHz bands can be employed. Besides cellular applications, specific applications for vertical markets may be addressed, such as PMSE (Program Making and Special Events), medical, health, surgery, automotive, low-latency, drones, and the like.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, NB-IoT devices can be configured to operate in a single physical resource block (PRB) and may be instructed to retune two different PRBs within the system bandwidth. In some aspects, an eNB-IoT UE can be configured to acquire system information in one PRB, and then it can retune to a different PRB to receive or transmit data.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In some aspects, the network 140A can include a core network (CN) 120. Various aspects of NG RAN and NG Core are discussed herein in reference to, e.g., FIG. 1B, FIG. 1C, FIG. 1D, FIG. 1E, FIG. 1F, and FIG. 1G.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation node-B (gNB), an evolved node-B (eNB), or another type of RAN node.

In accordance with some aspects, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe for sidelink communications), although such aspects are not required. The OFDM signals can comprise a plurality of orthogonal subcarriers.

In some aspects, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation may be used for OFDM systems, which makes it applicable for radio resource allocation. Each column and each row of the resource grid may correspond to one OFDM symbol and one OFDM subcarrier, respectively. The duration of the resource grid in the time domain may correspond to one slot in a radio frame. The smallest time-frequency unit in a resource grid may be denoted as a resource element. Each resource grid may comprise a number of resource blocks, which describe the mapping of certain physical channels to resource elements. Each resource block may comprise a collection of resource elements; in the frequency domain, this may, in some aspects, represent the smallest quantity of resources that currently can be allocated. There may be several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some aspects may use concepts for resource allocation for control channel information that are an extension of the above-described concepts. For example, some aspects may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs according to some arrangements.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1I). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123. The application server 184 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 184.

In an example, any of the nodes 111 or 112 can be configured to communicate to the UEs 101, 102 (e.g., dynamically) an antenna panel selection and a receive (Rx) beam selection that can be used by the UE for data reception on a physical downlink shared channel (PDSCH) as well as for channel state information reference signal (CSI-RS) measurements and channel state information (CSI) calculation.

In an example, any of the nodes 111 or 112 can be configured to communicate to the UEs 101, 102 (e.g., dynamically) an antenna panel selection and a transmit (Tx) beam selection that can be used by the UE for data transmission on a physical uplink shared channel (PUSCH) as well as for sounding reference signal (SRS) transmission.

In some aspects, the communication network 140A can be an IoT network. One of the current enablers of IoT is the narrowband-IoT (NB-IoT). NB-IoT has objectives such as coverage extension, UE complexity reduction, long battery lifetime, and backward compatibility with the LTE network. In addition, NB-IoT aims to offer deployment flexibility allowing an operator to introduce NB-IoT using a small portion of its existing available spectrum, and operate in one of the following three modalities: (a) standalone deployment (the network operates in re-farmed GSM spectrum); (b) in-band deployment (the network operates within the LTE channel); and (c) guard-band deployment (the network operates in the guard band of legacy LTE channels). In some aspects, such as with further enhanced NB-IoT (FeNB-IoT), support for NB-IoT in small cells can be provided (e.g., in microcell, picocell or femtocell deployments). One of the challenges NB-IoT systems face for small cell support is the UL/DL link imbalance, where for small cells the base stations have lower power available compared to macrocells, and, consequently, the DL coverage can be affected and/or reduced. In addition, some NB-IoT UEs can be configured to transmit at maximum power if repetitions are used for UL transmission. This may result in large inter-cell interference in dense small cell deployments.

In some aspects, the UE 101 can receive configuration information 190A associated with demodulation reference signal (DM-RS) generation for systems operating above 52.6 GHz carrier frequency. The configuration information 190A can include downlink control information (DCI). In some aspects, the DCI 190A can include information, such as one or more cyclic shift values, which can be used to generate the DM-RS sequence for uplink data transmission (e.g., DM-RS 192A) as well as DM-RS for decoding received downlink data.

Figure 1B:
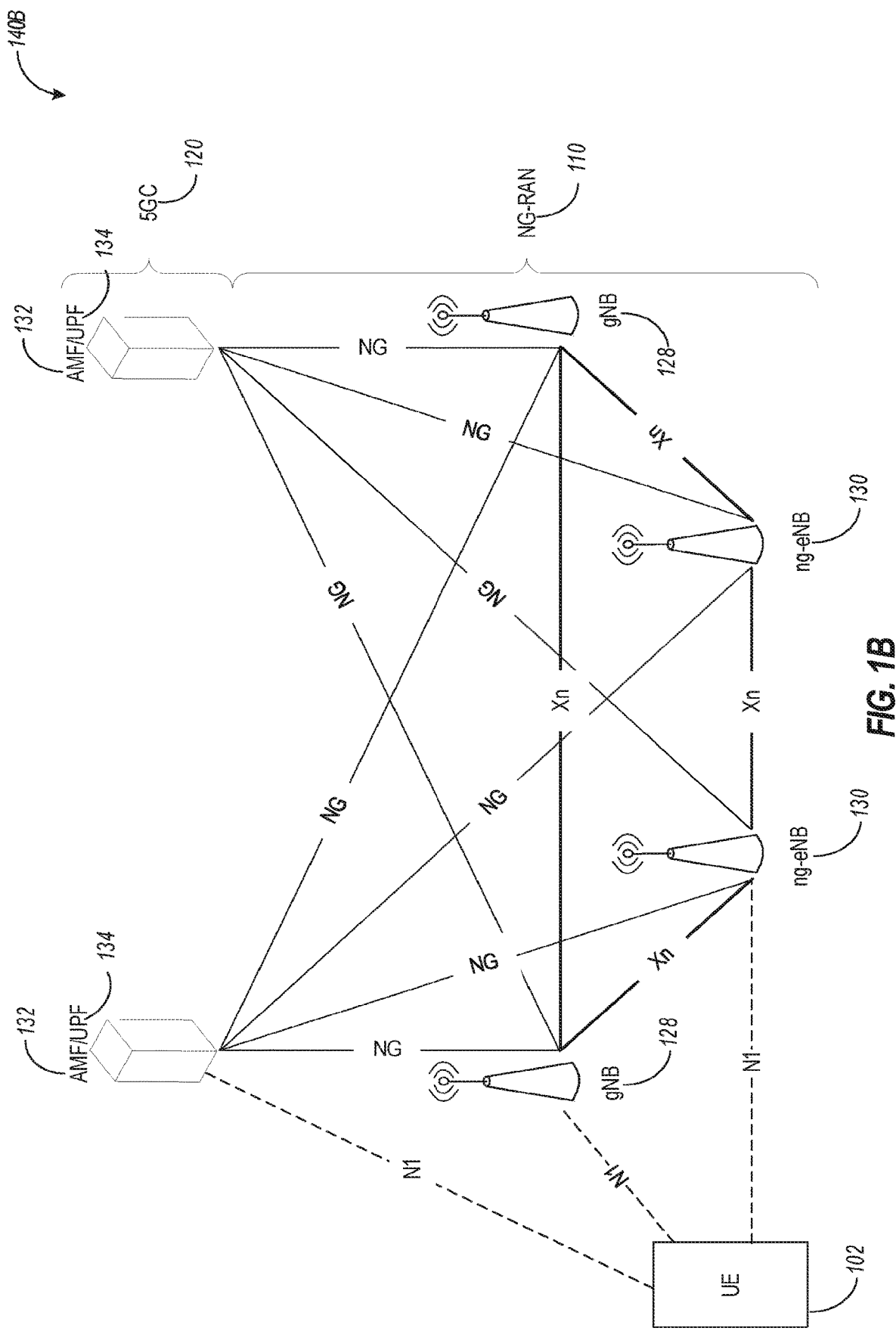
FIG. 1B is a simplified diagram of an overall next generation (NG) system architecture in accordance with some aspects.

FIG. 1B is a simplified diagram of a next generation (NG) system architecture 140B in accordance with some aspects. Referring to FIG. 1B, the NG system architecture 140B includes RAN 110 and a 5G network core (5GC) 120. The NG-RAN 110 can include a plurality of nodes, such as gNBs 128 and NG-eNBs 130. The gNBs 128 and the NG-eNBs 130 can be communicatively coupled to the UE 102 via, e.g., an N1 interface.

The core network 120 (e.g., a 5G core network or 5GC) can include an access and mobility management function (AMF) 132 and/or a user plane function (UPF) 134. The AMF 132 and the UPF 134 can be communicatively coupled to the gNBs 128 and the NG-eNBs 130 via NG interfaces. More specifically, in some aspects, the gNBs 128 and the NG-eNBs 130 can be connected to the AMF 132 by NG-C interfaces, and to the UPF 134 by NG-U interfaces. The gNBs 128 and the NG-eNBs 130 can be coupled to each other via Xn interfaces.

In some aspects, a gNB 128 can include a node providing new radio (NR) user plane and control plane protocol termination towards the UE and is connected via the NG interface to the 5GC 120. In some aspects, an NG-eNB 130 can include a node providing evolved universal terrestrial radio access (E-UTRA) user plane and control plane protocol terminations towards the UE and is connected via the NG interface to the 5GC 120.

In some aspects, each of the gNBs 128 and the NG-eNBs 130 can be implemented as a base station, a mobile edge server, a small cell, a home eNB, and so forth.

Figure 1C:
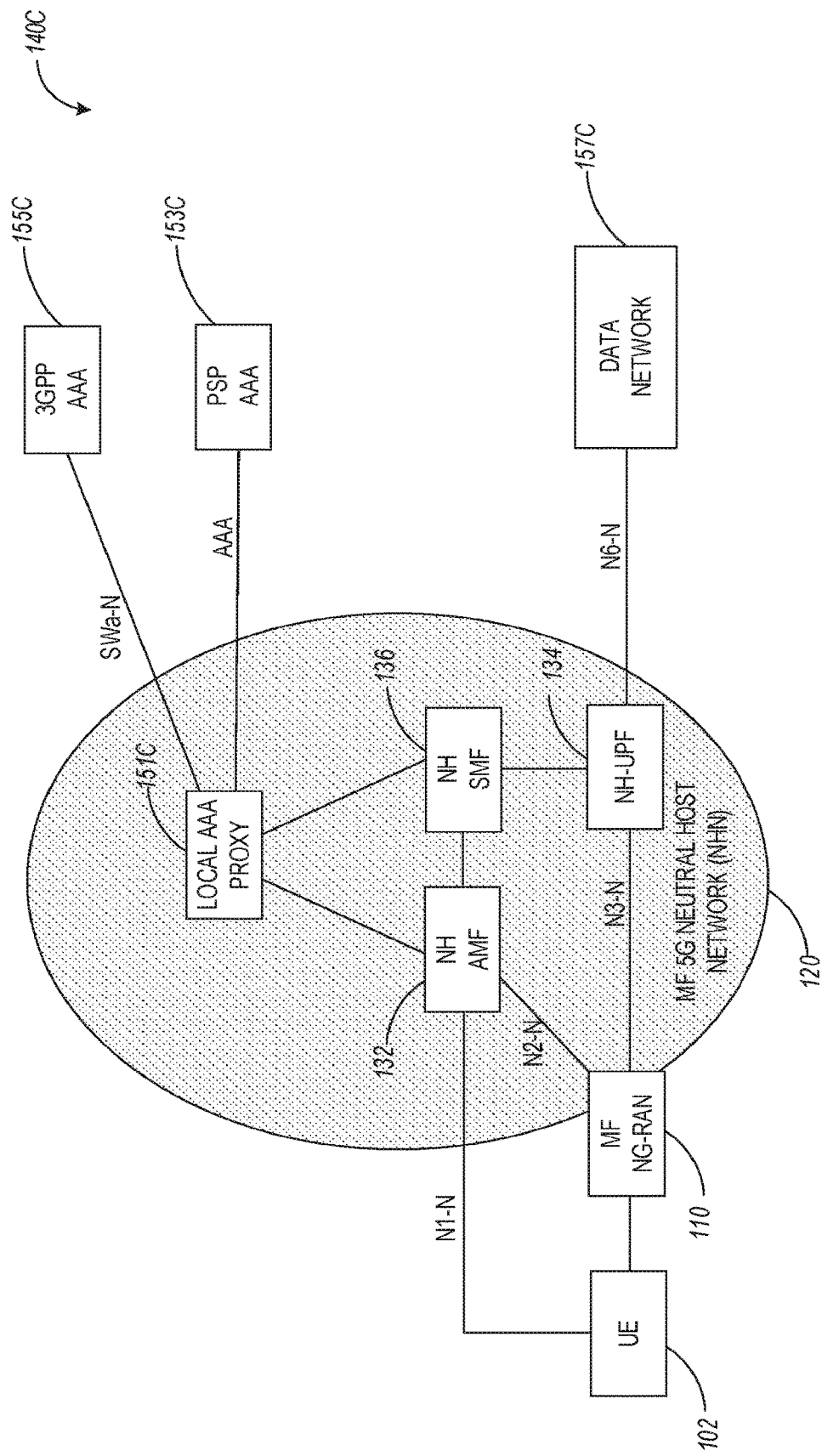
FIG. 1C illustrates an example MulteFire Neutral Host Network (NHN) 5G architecture in accordance with some aspects.

FIG. 1C illustrates an example MulteFire Neutral Host Network (NHN) 5G architecture 140C in accordance with some aspects. Referring to FIG. 1C, the MulteFire 5G architecture 140C can include the UE 102, NG-RAN 110, and the core network 120. The NG-RAN 110 can be a MulteFire NG-RAN (MF NG-RAN), and the core network 120 can be a MulteFire 5G neutral host network (NHN).

In some aspects, the MF NHN 120 can include a neutral host AMF (NH AMF) 132, an NH SMF 136, an NH UPF 134, and a local AAA proxy 151C. The AAA proxy 151C can provide a connection to a 3GPP AAA server 155C and a participating service provider AAA (PSP AAA) server 153C. The NH-UPF 134 can provide a connection to a data network 157C.

The MF NG-RAN 120 can provide similar functionalities as an NG-RAN operating under a 3GPP specification. The NH-AMF 132 can be configured to provide similar functionality as an AMF in a 3GPP 5G core network (e.g., as described in reference to FIG. 1D). The NH-SMF 136 can be configured to provide similar functionality as an SMF in a 3GPP 5G core network (e.g., as described in reference to FIG. 1D). The NH-UPF 134 can be configured to provide similar functionality as a UPF in a 3GPP 5G core network (e.g., as described in reference to FIG. 1D).

Figure 1D:
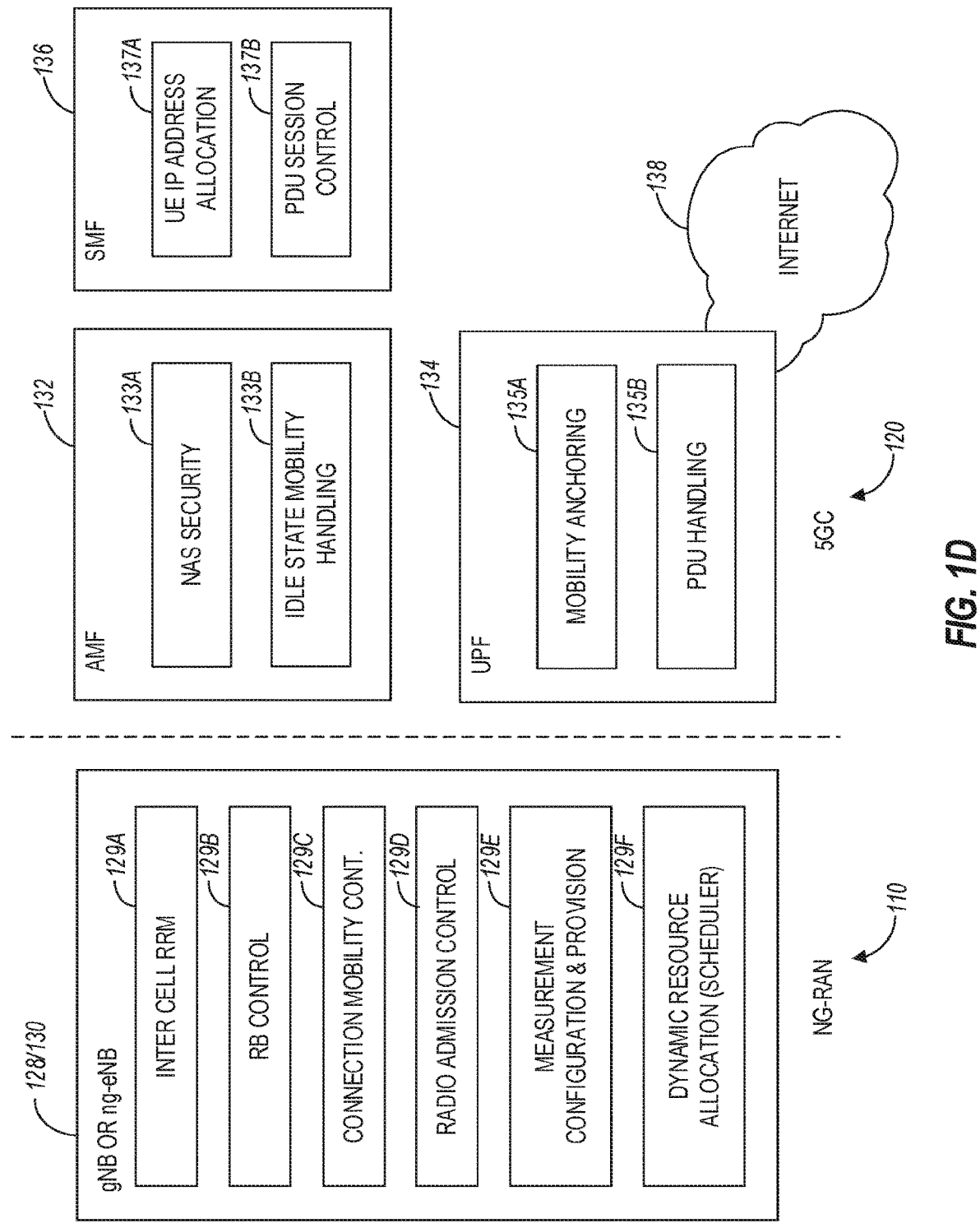
FIG. 1D illustrates a functional split between next generation radio access network (NG-RAN) and the 5G Core network (5GC) in accordance with some aspects.

FIG. 1D illustrates a functional split between NG-RAN and the 5G Core (5GC) in accordance with some aspects. Referring to FIG. 1D, there is illustrated a more detailed diagram of the functionalities that can be performed by the gNBs 128 and the NG-eNBs 130 within the NG-RAN 110, as well as the AMF 132, the UPF 134, and the SMF 136 within the 5GC 120. In some aspects, the 5GC 120 can provide access to the Internet 138 to one or more devices via the NG-RAN 110.

In some aspects, the gNBs 128 and the NG-eNBs 130 can be configured to host the following functions: functions for Radio Resource Management (e.g., inter-cell radio resource management 129A, radio bearer control 129B, connection mobility control 129C, radio admission control 129D, dynamic allocation of resources to UEs in both uplink and downlink (scheduling) 129F); IP header compression, encryption and integrity protection of data; selection of an AMF at UE attachment when no routing to an AMF can be determined from the information provided by the UE; routing of User Plane data towards UPF(s); routing of Control Plane information towards AMF; connection setup and release; scheduling and transmission of paging messages (originated from the AMF); scheduling and transmission of system broadcast information (originated from the AMF or Operation and Maintenance); measurement and measurement reporting configuration for mobility and scheduling 129E; transport level packet marking in the uplink; session management; support of network slicing; QoS flow management and mapping to data radio bearers; support of UEs in RRC_INACTIVE state; distribution function for non-access stratum (NAS) messages; radio access network sharing; dual connectivity; and tight interworking between NR and E-UTRA, to name a few.

In some aspects, the AMF 132 can be configured to host the following functions, for example: NAS signaling termination; NAS signaling security 133A; access stratum (AS) security control; inter-core network (CN) node signaling for mobility between 3GPP access networks; idle state/mode mobility handling 133B, including mobile device, such as a UE reachability (e.g., control and execution of paging retransmission); registration area management; support of intra-system and inter-system mobility; access authentication; access authorization including check of roaming rights; mobility management control (subscription and policies); support of network slicing; and/or SMF selection, among other functions.

The UPF 134 can be configured to host the following functions, for example: mobility anchoring 135A (e.g., anchor point for Intra-/Inter-RAT mobility); packet data unit (PDU) handling 135B (e.g., external PDU session point of interconnect to data network); packet routing and forwarding; packet inspection and user plane part of policy rule enforcement; traffic usage reporting; uplink classifier to support routing traffic flows to a data network; branching point to support multi-homed PDU session; QoS handling for user plane, e.g., packet filtering, gating, UL/DL rate enforcement; uplink traffic verification (SDF to QoS flow mapping); and/or downlink packet buffering and downlink data notification triggering, among other functions.

The Session Management function (SMF) 136 can be configured to host the following functions, for example: session management; UE IP address allocation and management 137A; selection and control of user plane function (UPF); PDU session control 137B, including configuring traffic steering at UPF 134 to route traffic to proper destination; control part of policy enforcement and QoS; and/or downlink data notification, among other functions.

Figure 1E:
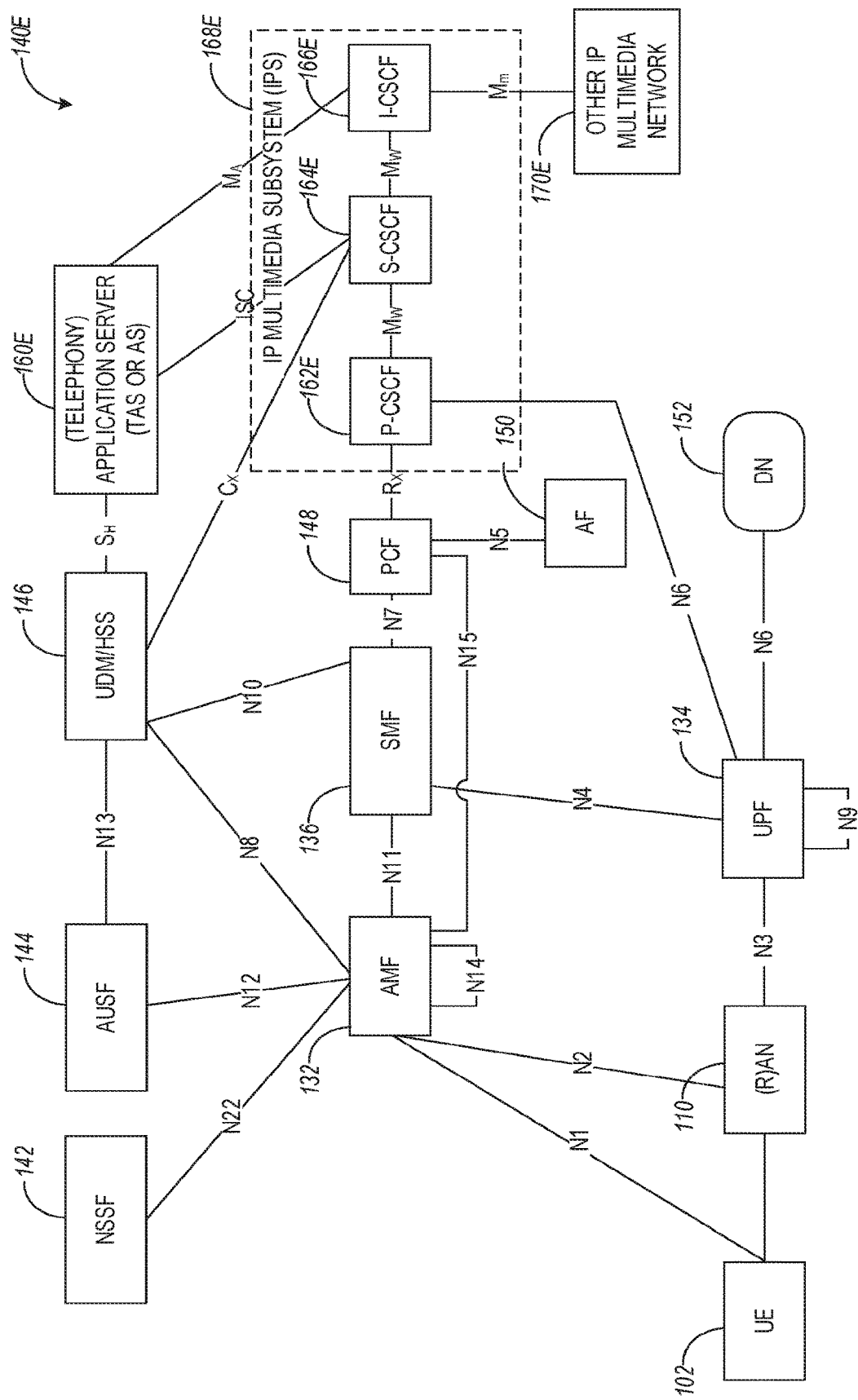
FIG. 1E and FIG. 1F illustrate a non-roaming 5G system architecture in accordance with some aspects.
Figure 1F:
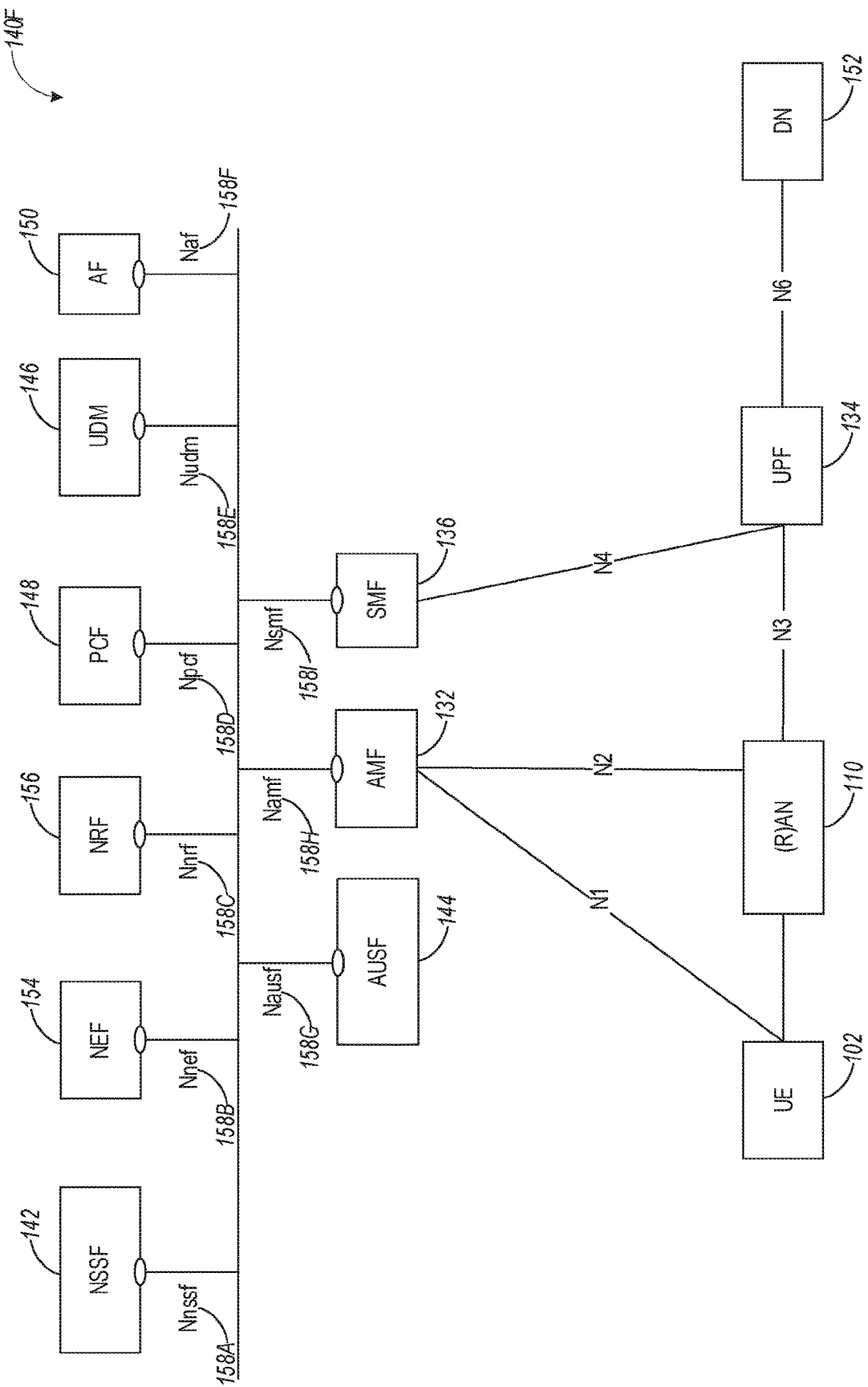

FIG. 1E and FIG. 1F illustrate a non-roaming 5G system architecture in accordance with some aspects. Referring to FIG. 1E, there is illustrated a 5G system architecture 140E in a reference point representation. More specifically, UE 102 can be in communication with RAN 110 as well as one or more other 5G core (5GC) network entities. The 5G system architecture 140E includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/ home subscriber server (HSS) 146. The UPF 134 can provide a connection to a data network (DN) 152, which can include, for example, operator services, Internet access, or third-party services. The AMF can be used to manage access control and mobility, and can also include network slice selection functionality. The SMF can be configured to set up and manage various sessions according to network policy. The UPF can be deployed in one or more configurations according to the desired service type. The PCF can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 140E includes an IP multimedia subsystem (IMS) 168E as well as a plurality of IP multimedia core network subsystem entities, such as call session control functions (CSCFs). More specifically, the IMS 168E includes a CSCF, which can act as a proxy CSCF (P-CSCF) 162E, a serving CSCF (S-CSCF) 164E, an emergency CSCF (E-CSCF) (not illustrated in FIG. 1E), and/or interrogating CSCF (I-CSCF) 166E. The P-CSCF 162E can be configured to be the first contact point for the UE 102 within the IM subsystem (IMS) 168E. The S-CSCF 164E can be configured to handle the session states in the network, and the E-CSCF can be configured to handle certain aspects of emergency sessions such as routing an emergency request to the correct emergency center or PSAP. The I-CSCF 166E can be configured to function as the contact point within an operator's network for all IMS connections destined to a subscriber of that network operator, or a roaming subscriber currently located within that network operator's service area. In some aspects, the I-CSCF 166E can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160E can be coupled to the IMS 168E via the S-CSCF 164E and/or the I-CSCF 166E.

In some aspects, the 5G system architecture 140E can use unified access barring mechanism using one or more of the techniques described herein, which access barring mechanism can be applicable for all RRC states of the UE 102, such as RRC_IDLE, RRC_CONNECTED, and RRC_INACTIVE states.

In some aspects, the 5G system architecture 140E can be configured to use 5G access control mechanism techniques described herein, based on access categories that can be categorized by a minimum default set of access categories, which are common across all networks. This functionality can allow the public land mobile network PLMN, such as a visited PLMN (VPLMN) to protect the network against different types of registration attempts, enable acceptable service for the roaming subscriber and enable the VPLMN to control access attempts aiming at receiving certain basic services. It also provides more options and flexibility to individual operators by providing a set of access categories, which can be configured and used in operator-specific ways.

Referring to FIG. 1F, there is illustrated a 5G system architecture 140F and a service-based representation. System architecture 140F can be substantially similar to (or the same as) system architecture 140E. In addition to the network entities illustrated in FIG. 1E, system architecture 140F can also include a network exposure function (NEF) 154 and a network repository function (NRF) 156.

In some aspects, 5G system architectures can be service-based and interaction between network functions can be represented by corresponding point-to-point reference points Ni (as illustrated in FIG. 1E) or as service-based interfaces (as illustrated in FIG. 1F).

A reference point representation shows that interaction can exist between corresponding NF services. For example, FIG. 1E illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150), N6 (between the UPF 134 and the DN 152), N7 (between the SMF 136 and the PCF 148), N8 (between the UDM 146 and the AMF 132), N9 (between two UPFs 134), N10 (between the UDM 146 and the SMF 136), N11 (between the AMF 132 and the SMF 136), N12 (between the AUSF 144 and the AMF 132), N13 (between the AUSF 144 and the UDM 146), N14 (between two AMFs 132), N15 (between the PCF 148 and the AMF 132 in case of a non-roaming scenario, or between the PCF 148 and a visited network and AMF 132 in case of a roaming scenario), N16 (between two SMFs; not illustrated in FIG. 1E), and N22 (between AMF 132 and NSSF 142). Other reference point representations not shown in FIG. 1E can also be used.

In some aspects, as illustrated in FIG. 1F, service-based representations can be used to represent network functions within the control plane that enable other authorized network functions to access their services. In this regard, 5G system architecture 140F can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1F can also be used.

Figure 1G:
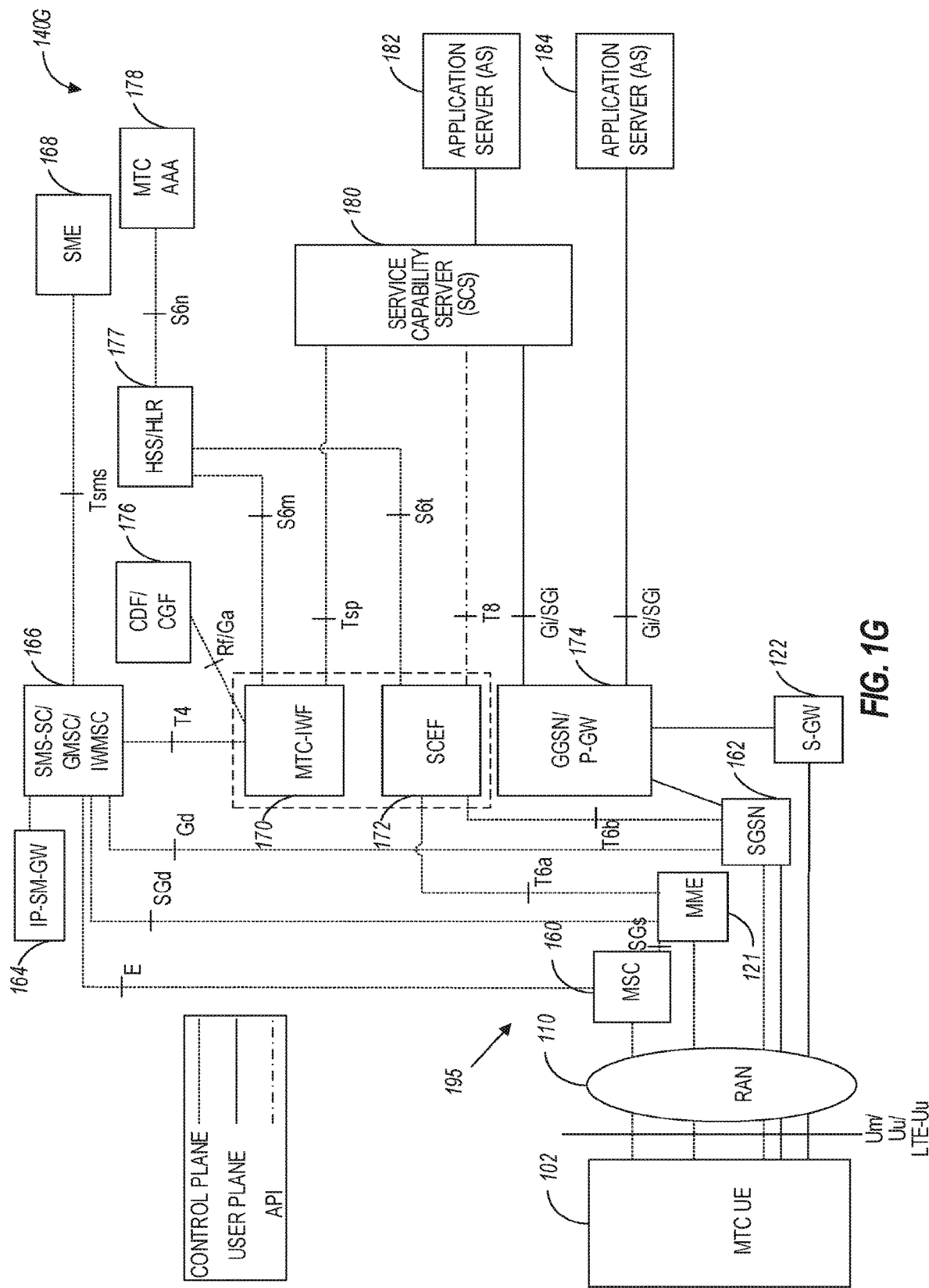
FIG. 1G illustrates an example Cellular Internet-of-Things (CIoT) network architecture in accordance with some aspects.

FIG. 1G illustrates an example of CIoT network architecture in accordance with some aspects. Referring to FIG. 1G, the CIoT architecture 140G can include the UE 102 and the RAN 110 coupled to a plurality of core network entities. In some aspects, the UE 102 can be machine-type communication (MTC) UE. The CIoT network architecture 140G can further include a mobile services switching center (MSC) 160, MME 121, a serving GPRS support node (SGSN) 162, a S-GW 122, an IP-Short-Message-Gateway (IP-SM-GW) 164, a Short Message Service Service Center (SMS-SC)/gateway mobile service center (GMSC)/Interworking MSC (IWMSC) 166, MTC interworking function (MTC-IWF) 170, a Service Capability Exposure Function (SCEF) 172, a gateway GPRS support node (GGSN)/Packet-GW (P-GW) 174, a charging data function (CDF)/charging gateway function (CGF) 176, a home subscriber server (HSS)/a home location register (HLR) 177, short message entities (SME) 168, MTC authorization, authentication, and accounting (MTC AAA) server 178, a service capability server (SCS) 180, and application servers (AS) 182 and 184.

In some aspects, the SCEF 172 can be configured to securely expose services and capabilities provided by various 3GPP network interfaces. The SCEF 172 can also provide means for the discovery of the exposed services and capabilities, as well as access to network capabilities through various network application programming interfaces (e.g., API interfaces to the SCS 180).

FIG. 1G further illustrates various reference points between different servers, functions, or communication nodes of the CIoT network architecture 140G. Some example reference points related to MTC-IWF 170 and SCEF 172 include the following: Tsms (a reference point used by an entity outside the 3GPP network to communicate with LEs used for MTC via SMS), Tsp (a reference point used by a SCS to communicate with the MTC-IWF related control plane signaling), T4 (a reference point used between MTC-IWF 170 and the SMS-SC 166 in the HPLMN), T6a (a reference point used between SCEF 172 and serving MME 121), T6b (a reference point used between SCEF 172 and serving SGSN 162), T8 (a reference point used between the SCEF 172 and the SCS/AS 180/182), S6m (a reference point used by MTC-IWF 170 to interrogate HSS/HLR 177), S6n (a reference point used by MTC-AAA server 178 to interrogate HSS/HLR 177), and S6t (a reference point used between SCEF 172 and HSS/HLR 177).

In some aspects, the CIoT UE 102 can be configured to communicate with one or more entities within the CIoT architecture 140G via the RAN 110 according to a Non-Access Stratum (NAS) protocol, and using one or more reference points, such as a narrowband air interface, for example, based on one or more communication technologies, such as Orthogonal Frequency-Division Multiplexing (OFDM) technology. As used herein, the term "CIoT UE" refers to a UE capable of CIoT optimizations, as part of a CIoT communications architecture.

In some aspects, the NAS protocol can support a set of NAS messages for communication between the CIoT LIE 102 and an Evolved Packet System (EPS) Mobile Management Entity (MME) 121 and SGSN 162.

In some aspects, the CIoT network architecture 140F can include a packet data network, an operator network, or a cloud service network, having, for example, among other things, a Service Capability Server (SCS) 180, an Application Server (AS) 182, or one or more other external servers or network components.

The RAN 110 can be coupled to the HSS/HLR servers 177 and the AAA servers 178 using one or more reference points including, for example, an air interface based on an S6a reference point, and configured to authenticate/authorize CIoT UE 102 to access the CIoT network. The RAN 110 can be coupled to the CIoT network architecture 140G using one or more other reference points including, for example, an air interface corresponding to an SGi/Gi interface for 3GPP accesses. The RAN 110 can be coupled to the SCEF 172 using, for example, an air interface based on a T6a/T6b reference point, for service capability exposure. In some aspects, the SCEF 172 may act as an API GW towards a third-party application server such as AS 182. The SCEF 172 can be coupled to the HSS/HLR 177 and MTC AAA 178 servers using an S6t reference point, and can further expose an Application Programming Interface to network capabilities.

In certain examples, one or more of the CIoT devices disclosed herein, such as the CIoT UE 102, the CIoT RAN 110, etc., can include one or more other non-CIoT devices, or non-CIoT devices acting as CIoT devices, or having functions of a CIoT device. For example, the CIoT UE 102 can include a smartphone, a tablet computer, or one or more other electronic device acting as a CIoT device for a specific function, while having other additional functionality.

In some aspects, the RAN 110 can include a CIoT enhanced Node B (CIoT eNB) 111 communicatively coupled to the CIoT Access Network Gateway (CIoT GW) 195. In certain examples, the RAN 110 can include multiple base stations (e.g., CIoT eNBs) connected to the CIoT GW 195, which can include MSC 160, MME 121, SGSN 162, and/or S-GW 122. In certain examples, the internal architecture of RAN 110 and CIoT GW 195 may be left to the implementation and need not be standardized.

As used herein, the term "circuitry" may refer to, be part of, or include an Application Specific Integrated Circuit (ASIC) or other special purpose circuit, an electronic circuit, a processor (shared, dedicated, or group), or memory (shared, dedicated, or group) executing one or more software or firmware programs, a combinational logic circuit, or other suitable hardware components that provide the described functionality. In some aspects, the circuitry may be implemented in, or functions associated with the circuitry may be implemented by, one or more software or firmware modules. In some aspects, the circuitry may include logic, at least partially operable in hardware. In some aspects, circuitry, as well as modules disclosed herein, may be implemented in combinations of hardware, software and/or firmware. In some aspects, functionality associated with a circuitry can be distributed across more than one piece of hardware or software/firmware module. In some aspects, modules (as disclosed herein) may include logic, at least partially operable in hardware. Aspects described herein may be implemented into a system using any suitably configured hardware or software.

Figure 1H:
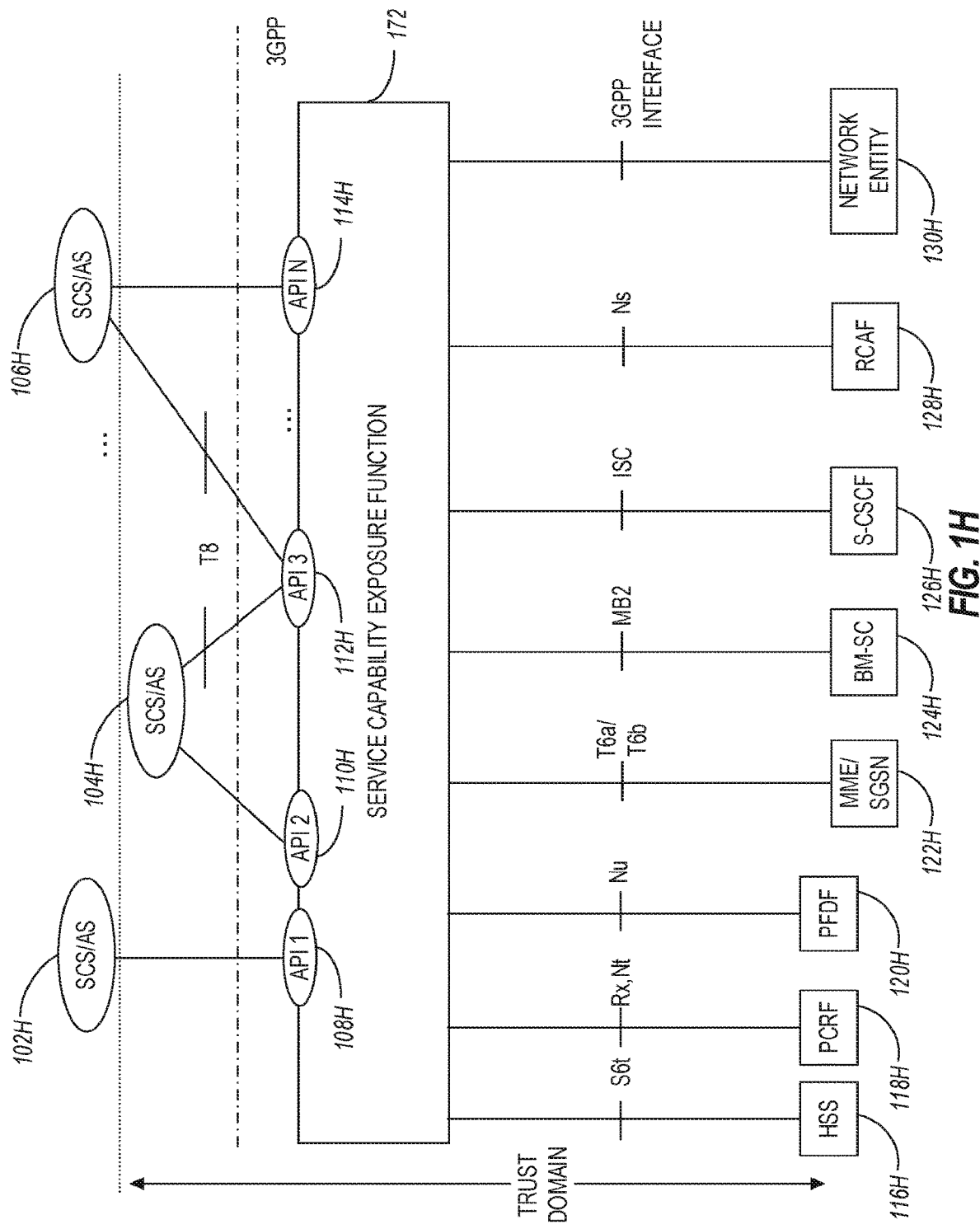
FIG. 1H illustrates an example of a Service Capability Exposure Function (SCEF) in accordance with some aspects.
Figure 1L:
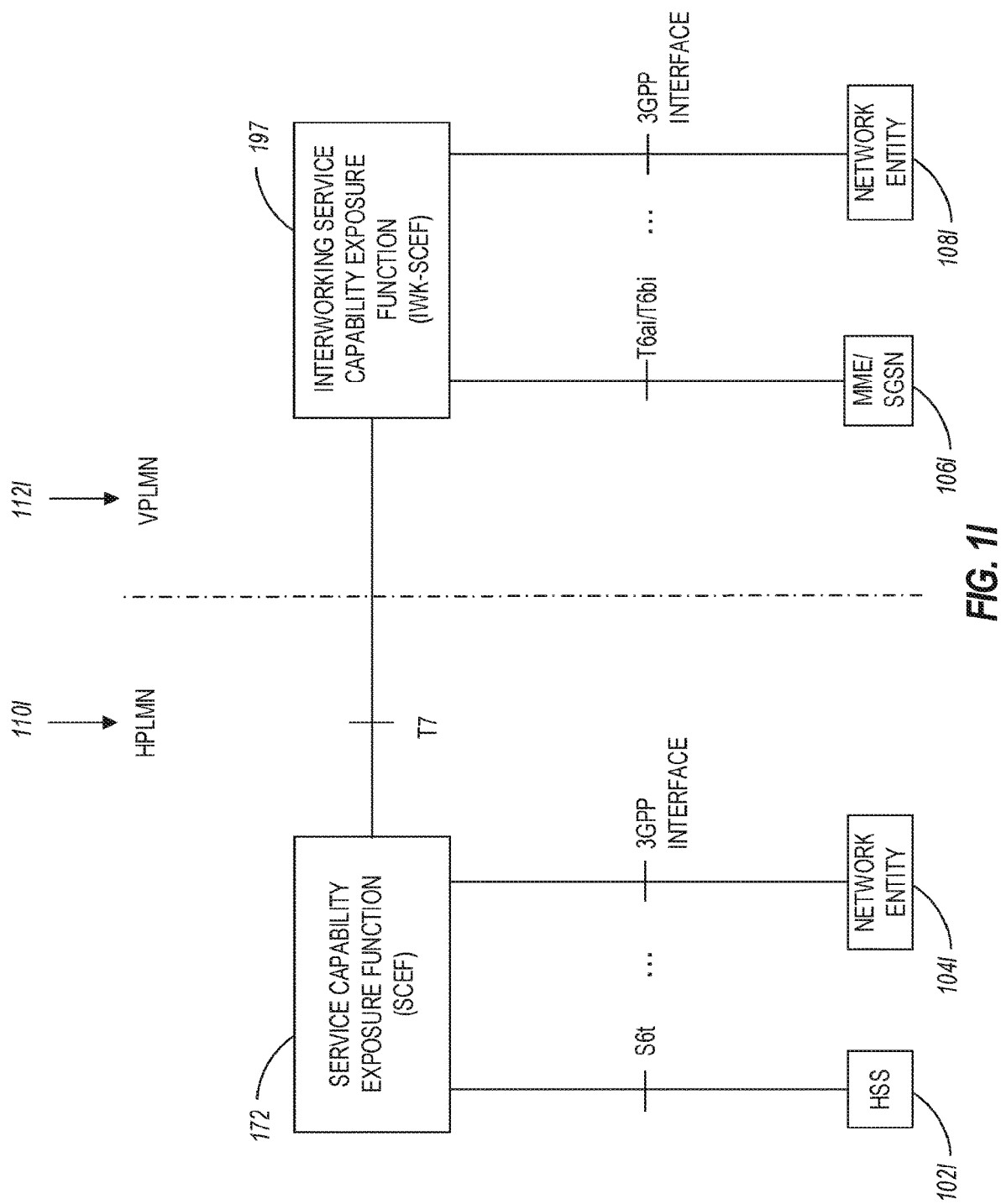
FIG. 1I illustrates an example of roaming architecture for SCEF in accordance with some aspects.
FIG. 1J illustrates an example Evolved Universal Terrestrial Radio Access (E-UTRA) New Radio Dual Connectivity (EN-DC) architecture in accordance with some aspects.

FIG. 1H illustrates an example of a Service Capability Exposure Function (SCEF) in accordance with some aspects. Referring to FIG. 1H, the SCEF 172 can be configured to expose services and capabilities provided by 3GPP network interfaces to external third-party service provider servers hosting various applications. In some aspects, a 3GPP network such as the CIoT architecture 140G, can expose the following services and capabilities: a home subscriber server (HSS) 116H, a policy and charging rules function (PCRF) 118H, a packet flow description function (PFDF) 120H, a MME/SGSN 122H, a broadcast multicast service center (BM-SC) 124H, a serving call server control function (S-CSCF) 126H, a RAN congestion awareness function (RCAF) 128H, and one or more other network entities 130H. The above-mentioned services and capabilities of a 3GPP network can communicate with the SCEF 172 via one or more interfaces as illustrated in FIG. 1H.

The SCEF 172 can be configured to expose the 3GPP network services and capabilities to one or more applications running on one or more service capability server (SCS)/application server (AS), such as SCS/AS 102H, 10411, . . . , 10611. Each of the SCS/AG 102H-106H can communicate with the SCEF 172 via application programming interfaces (APIs) 108H, 110H, 112H, . . . , 114H, as seen in FIG. 1H.

FIG. 1I illustrates an example of roaming architecture for SCEF in accordance with some aspects. Referring to FIG. 1I, the SCEF 172 can be located in HPLMN 110I and can be configured to expose 3GPP network services and capabilities, such as 102I, . . . , 104I. In some aspects, 3GPP network services and capabilities, such as 106I, . . . , 108I, can be located within VPLMN 112I. In this case, the 3GPP network services and capabilities within the VPLMN 112I can be exposed to the SCEF 172 via an interworking SCEF (IWK-SCEF) 197 within the VPLMN 112I.

Figure 1J:
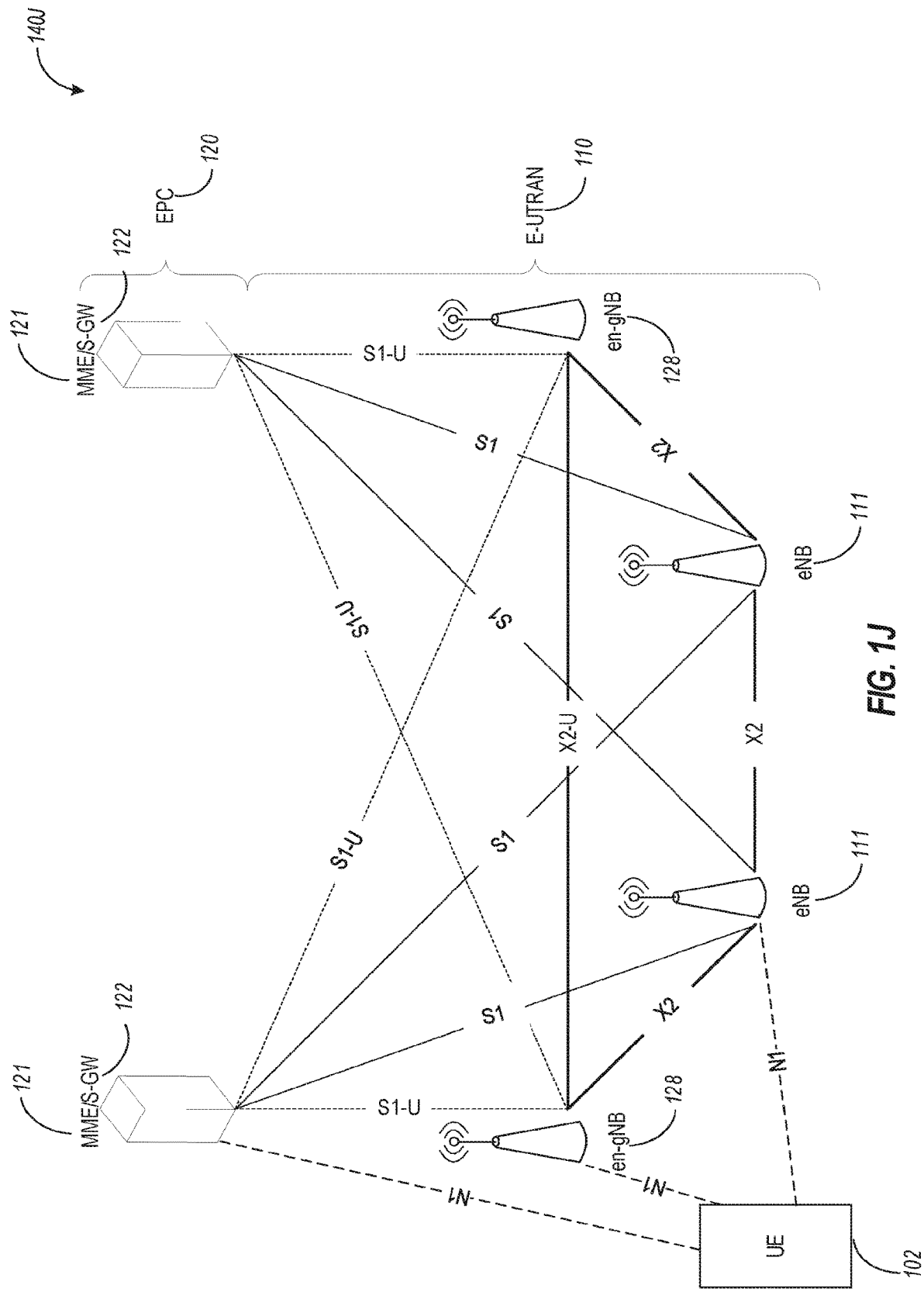

FIG. 1J illustrates an example Evolved Universal Terrestrial Radio Access (E-UTRA) New Radio Dual Connectivity (EN-DC) architecture in accordance with some aspects. Referring to FIG. 1G, the EN-DC architecture 140J includes radio access network (or E-TRA network, or E-TRAN) 110 and EPC 120. The EPC 120 can include MMEs 121 and S-GWs 122. The E-UTRAN 110 can include nodes 111 (e.g., eNBs) as well as Evolved Universal Terrestrial Radio Access New Radio (EN) next generation evolved Node-Bs (en-gNBs) 128.

In some aspects, en-gNBs 128 can be configured to provide NR user plane and control plane protocol terminations towards the UE 102 and acting as Secondary Nodes (or SgNBs) in the EN-DC communication architecture 140J. The eNBs 111 can be configured as master nodes (or MeNBs) in the EN-DC communication architecture 140J. as illustrated in FIG. 1J, the eNBs 111 are connected to the EPC 120 via the S1 interface and to the EN-gNBs 128 via the X2 interface. The EN-gNBs 128 may be connected to the EPC 120 via the S1-U interface, and to other EN-gNBs via the X2-U interface.

Figure 2:
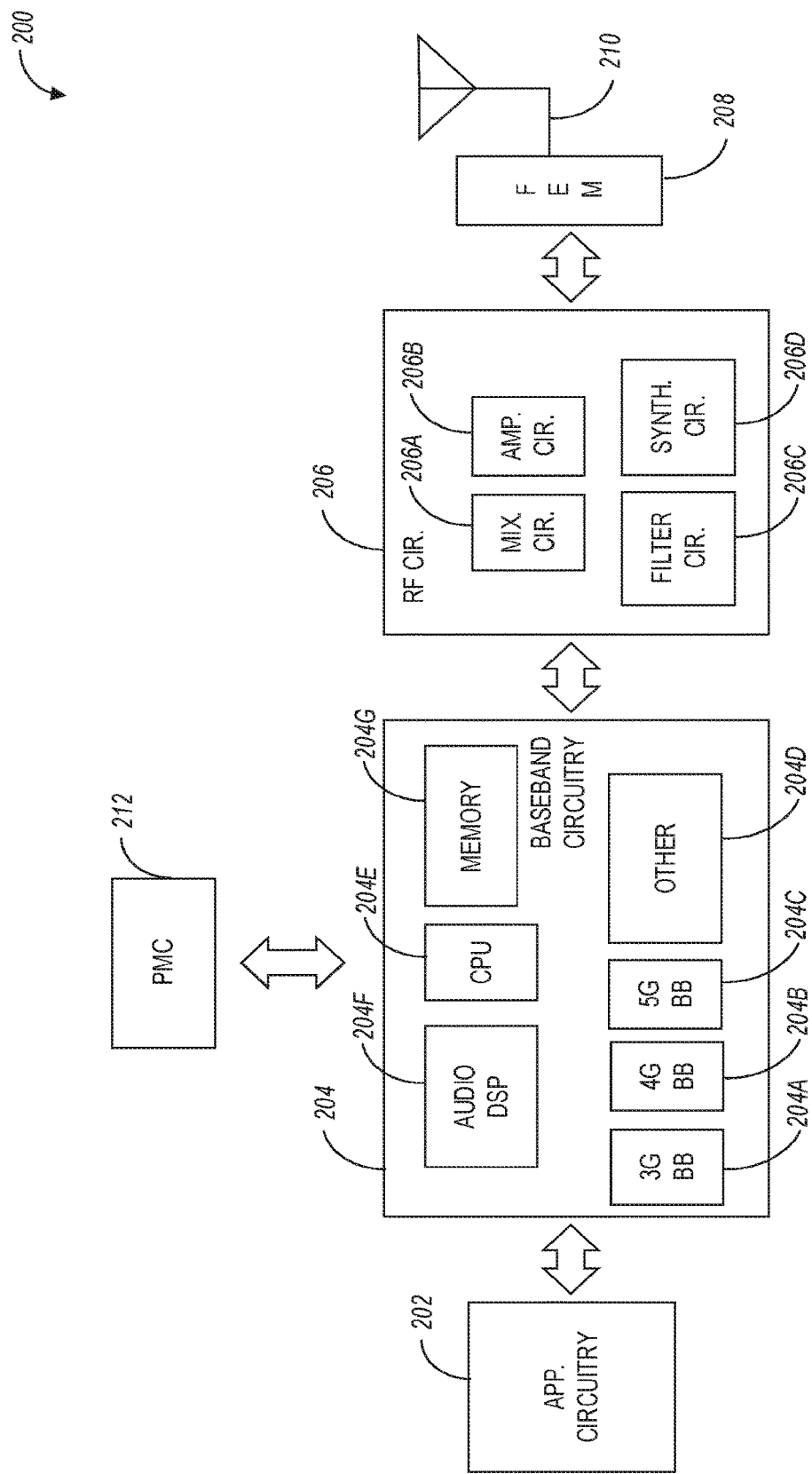
FIG. 2 illustrates example components of a device 200 in accordance with some aspects.

FIG. 2 illustrates example components of a device 200 in accordance with some aspects. In some aspects, the device 200 may include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 may be included in a UE or a RAN node. In some aspects, the device 200 may include fewer elements (e.g., a RAN node may not utilize application circuitry 202, and instead include a processor/controller to process IP data received from an EPC). In some aspects, the device 200 may include additional elements such as, for example, memory/storage, display, camera, sensor, and/or input/output (I/O) interface elements. In other aspects, the components described below may be included in more than one device (e.g., said circuitries may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors, special-purpose processors, and dedicated processors (e.g., graphics processors, application processors, etc.). The processors may be coupled with, and/or may include, memory/storage and may be configured to execute instructions stored in the memory/storage to enable various applications or operating systems to run on the device 200. In some aspects, processors of application circuitry 202 may process IP data packets received from an EPC.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some aspects, the baseband circuitry 204 may include a third-generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth-generation (6G), etc.). The baseband circuitry 204 (e.g., one or more of baseband processors 204A-D) may handle various radio control functions that enable communication with one or more radio networks via the RF circuitry 206. In other aspects, some or all of the functionality of baseband processors 204A-D may be included in modules stored in the memory 204G and executed via a Central Processing Unit (CPU) 204E. The radio control functions may include but are not limited to, signal modulation/demodulation, encoding/decoding, radio frequency shifting, etc. In some aspects, modulation/demodulation circuitry of the baseband circuitry 204 may include Fast-Fourier Transform (FFT), precoding, or constellation mapping/de-mapping functionality. In some aspects, encoding/decoding circuitry of the baseband circuitry 204 may include convolution, tail-biting convolution, turbo, Viterbi, or Low-Density Parity Check (LDPC) encoder/decoder functionality. Aspects of modulation/demodulation and encoder/decoder functionality are not limited to these examples and may include other suitable functionality in other aspects.

In some aspects, the baseband circuitry 204 may include one or more audio digital signal processor(s) (DSP) 204F. The audio DSP(s) 204F may include elements for compression/decompression and echo cancellation and may include other suitable processing elements in other aspects. Components of the baseband circuitry 204 may be suitably combined in a single chip, a single chipset, or disposed on the same circuit board in some aspects. In some aspects, some or all of the constituent components of the baseband circuitry 204 and the application circuitry 202 may be implemented together such as, for example, on a system on a chip (SOC).

In some aspects, the baseband circuitry 204 may provide for communication compatible with one or more radio technologies. For example, in some aspects, the baseband circuitry 204 may support communication with an evolved universal terrestrial radio access network (EUTRAN) or other wireless metropolitan area networks (WMAN), a wireless local area network (WLAN), and/or a wireless personal area network (WPAN). Baseband circuitry 204 configured to support radio communications of more than one wireless protocol may be referred to as multi-mode baseband circuitry, in some aspects.

RF circuitry 206 may enable communication with wireless networks using modulated electromagnetic radiation through a non-solid medium. In various aspects, the RF circuitry 206 may include switches, filters, amplifiers, etc. to facilitate communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some aspects, the receive signal path of the RF circuitry 206 may include a mixer 206A, an amplifier 206B, and a filter 206C. In some aspects, the transmit signal path of the RF circuitry 206 may include a filter 206C and a mixer 206A. RF circuitry 206 may also include a synthesizer 206D for synthesizing a frequency for use by the mixer 206A of the receive signal path and the transmit signal path. In some aspects, the mixer 206A of the receive signal path may be configured to down-convert RF signals received from the FEM circuitry 208 based on the synthesized frequency provided by synthesizer 206D. The amplifier 206B may be configured to amplify the down-converted signals and the filter 206C may be a low-pass filter (LPF) or band-pass filter (BPF) configured to remove unwanted signals from the down-converted signals to generate output baseband signals. Output baseband signals may be provided to the baseband circuitry 204 for further processing. In some aspects, the output baseband signals may optionally be zero-frequency baseband signals. In some aspects, mixer 206A of the receive signal path may comprise passive mixers.

In some aspects, the mixer 206A of the transmit signal path may be configured to up-convert input baseband signals based on the synthesized frequency provided by the synthesizer 206D to generate RF output signals for the FEM circuitry 208. The baseband signals may be provided by the baseband circuitry 204 and may be filtered by filter 206C.

In some aspects, the mixer 206A of the receive signal path and the mixer 206A of the transmit signal path may include two or more mixers and may be arranged for quadrature down conversion and upconversion, respectively. In some aspects, the mixer 206A of the receive signal path and the mixer 206A of the transmit signal path may include two or more mixers and may be arranged for image rejection (e.g., Hartley image rejection). In some aspects, the mixer 206A of the receive signal path and the mixer 206A may be arranged for direct down conversion and direct upconversion, respectively. In some aspects, the mixer 206A of the receive signal path and the mixer 206A of the transmit signal path may be configured for super-heterodyne operation.

In some aspects, the output baseband signals and the input baseband signals may optionally be analog baseband signals. According to some alternate aspects, the output baseband signals and the input baseband signals may be digital baseband signals. In these alternate aspects, the RF circuitry 206 may include an analog-to-digital converter (ADC) and digital-to-analog converter (DAC) circuitry and the baseband circuitry 204 may include a digital baseband interface to communicate with the RF circuitry 206.

In some dual-mode aspects, a separate radio IC circuitry may optionally be provided for processing signals for each spectrum.

In some aspects, the synthesizer 206D may optionally be a fractional-N synthesizer or a fractional N/N+1 synthesizer, although other types of frequency synthesizers may be suitable. For example, the synthesizer 206D may be a delta-sigma synthesizer, a frequency multiplier, or a synthesizer comprising a phase-locked loop with a frequency divider.

The synthesizer 206D may be configured to synthesize an output frequency for use by the mixer 206A of the RF circuitry 206 based on a frequency input and a divider control input. In some aspects, the synthesizer 206D may be a fractional N/N+1 synthesizer.

In some aspects, frequency input may be provided by a voltage controlled oscillator (VCO), although that is not a requirement. The divider control input may be provided, for example, by either the baseband circuitry 204 or the applications circuitry 202 depending on the desired output frequency. In some aspects, a divider control input (e.g., N) may be determined from a look-up table based on a channel indicated by the applications circuitry 202.

Synthesizer circuitry 206D of the RF circuitry 206 may include a divider, a delay-locked loop (DLL), a multiplexer and a phase accumulator. In some aspects, the divider may be a dual modulus divider (DMD) and the phase accumulator may be a digital phase accumulator (DPA). In some aspects, the DMD may be configured to divide the input signal by either N or N+1 (e.g., based on a carry out) to provide a fractional division ratio. In some example aspects, the DLL may include a set of cascaded, tunable, delay elements, a phase detector, a charge pump, and a D-type flip-flop. In these aspects, the delay elements may be configured to break a VCO period up into Nd equal packets of phase, where Nd is the number of delay elements in the delay line. In this way, the DLL provides negative feedback to assist in keeping the total delay through the delay line to one VCO cycle.

In some aspects, synthesizer circuitry 206D may be configured to generate a carrier frequency as the output frequency, while in other aspects, the output frequency may be a multiple of the carrier frequency (e.g., twice the carrier frequency, or four times the carrier frequency) and may be used in conjunction with quadrature generator and divider circuitry to generate multiple signals at the carrier frequency with multiple different phases with respect to each other. In some aspects, the output frequency may be a LO frequency (fLO). In some aspects, the RF circuitry 206 may include an IQ/polar converter.

FEM circuitry 208 may include a receive signal path which may include circuitry configured to operate on RF signals received from one or more antennas 210, and/or to amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various aspects, the amplification through the transmit signal paths or the receive signal paths may be done in part or solely in the RF circuitry 206, in part or solely in the FEM circuitry 208, or in both the RF circuitry 206 and the FEM circuitry 208.

In some aspects, the FEM circuitry 208 may include a TX/RX switch to switch between transmit mode and receive mode operation. The FEM circuitry 208 may include a receive signal path and a transmit signal path. The receive signal path of the FEM circuitry 208 may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some aspects, the PMC 212 may manage power provided to the baseband circuitry 204. The PMC 212 may control power-source selection, voltage scaling, battery charging, and/or DC-to-DC conversion. The PMC 212 may, in some aspects, be included when the device 200 is capable of being powered by a battery, for example, when the device is included in a UE. The PMC 212 may increase the power conversion efficiency while providing beneficial implementation size and heat dissipation characteristics.

FIG. 2 shows the PMC 212 coupled with the baseband circuitry 204. In other aspects, the PMC 212 may be additionally or alternatively coupled with, and perform similar power management operations for, other components such as, but not limited to, application circuitry 202, RF circuitry 206, or FEM circuitry 208.

In some aspects, the PMC 212 may control, or otherwise be part of, various power saving mechanisms of the device 200. For example, if the device 200 is in an RRC_Connected state, in which it is still connected to the RAN node as it expects to receive traffic shortly, then it may enter a state known as Discontinuous Reception Mode (DRX) after a period of inactivity. During this state, the device 200 may power down for brief intervals of time and thus save power.

According to some aspects, if there is no data traffic activity for an extended period of time, then the device 200 may transition off to an RRC_Idle state, in which it disconnects from the network and does not perform operations such as channel quality feedback, handover, etc. The device 200 goes into a very low power state and it performs paging during which it periodically wakes up to listen to the network and then powers down again. The device 200 may transition back to RRC_Connected state to receive data.

An additional power saving mode may allow a device to be unavailable to the network for periods longer than a paging interval (ranging from seconds to a few hours). During this time, the device 200 in some aspects may be unreachable to the network and may power down. Any data sent during this time incurs a delay, which may be large, and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 202 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 3:
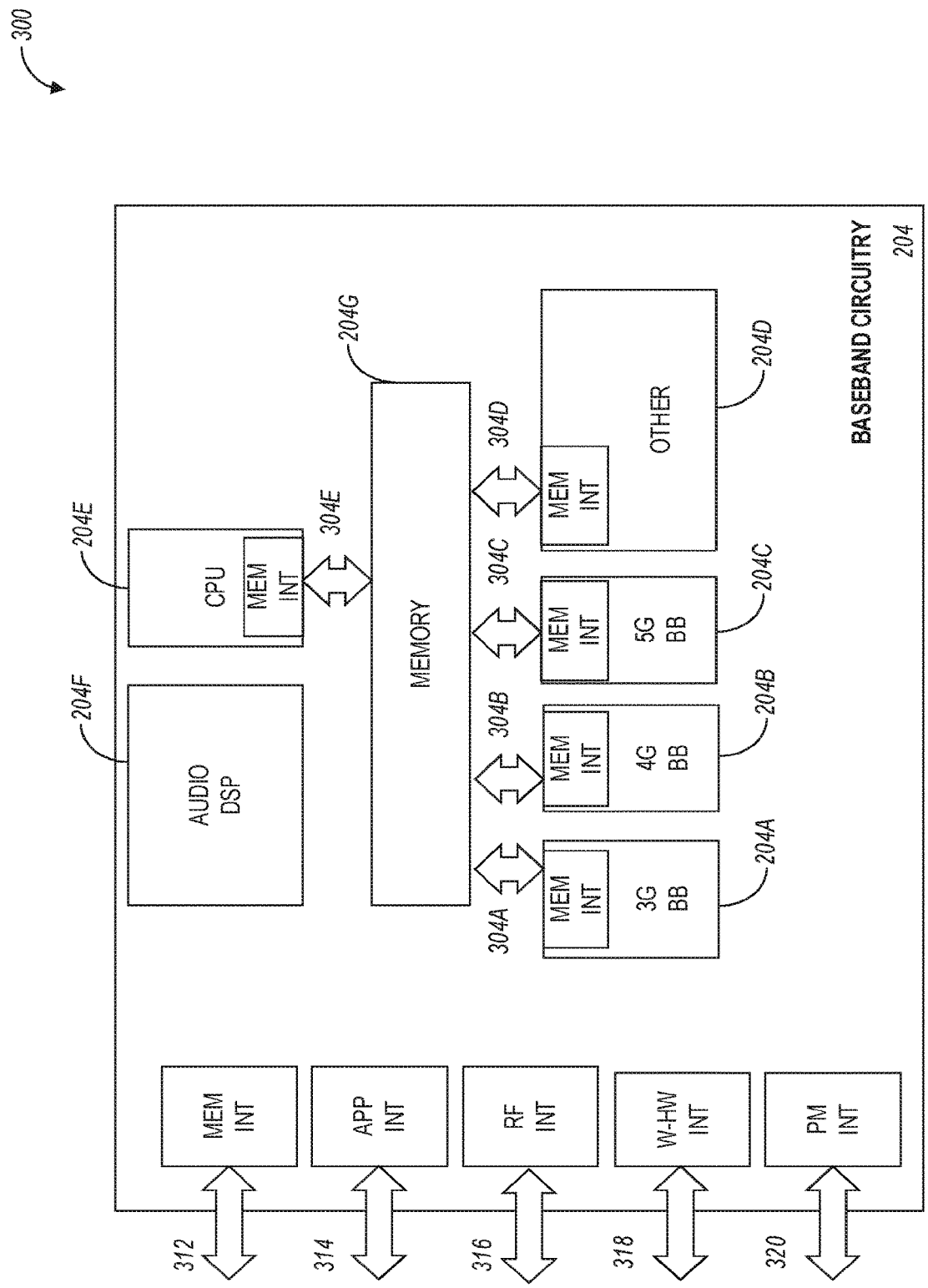
FIG. 3 illustrates example interfaces of baseband circuitry in accordance with some aspects.

FIG. 3 illustrates example interfaces of baseband circuitry 204, in accordance with some aspects. As discussed above, the baseband circuitry 204 of FIG. 2 may comprise processors 204A-204E and a memory 204G utilized by said processors. Each of the processors 204A-204E may include a memory interface, 304A-304E, respectively, to send/receive data to/from the memory 204G.

The baseband circuitry 204 may further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
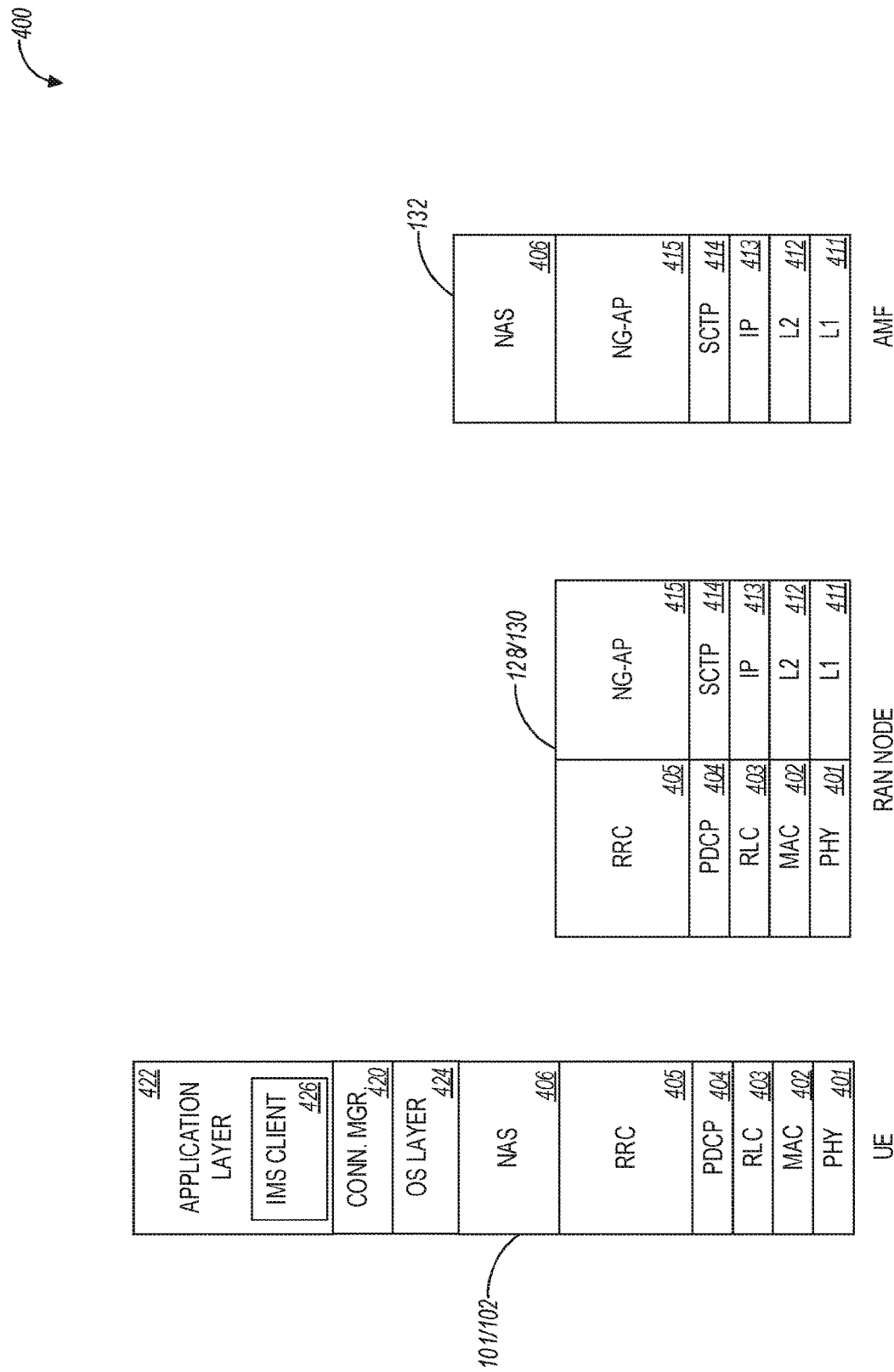
FIG. 4 is an illustration of a control plane protocol stack in accordance with some aspects.

FIG. 4 is an illustration of a control plane protocol stack in accordance with some aspects. In one aspect, a control plane 400 is shown as a communications protocol stack between the UE 102, the RAN node 128 (or alternatively, the RAN node 130), and the AMF 132.

The PHY layer 401 may in some aspects transmit or receive information used by the MAC layer 402 over one or more air interfaces. The PHY layer 401 may further perform link adaptation or adaptive modulation and coding (AMC), power control, cell search (e.g., for initial synchronization and handover purposes), and other measurements used by higher layers, such as the RRC layer 405. The PHY layer 401 may in some aspects still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 402 may in some aspects perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 403 may in some aspects operate in a plurality of modes of operation, including Transparent Mode (TM), Unacknowledged Mode (UM), and Acknowledged Mode (AM). The RLC layer 403 may execute the transfer of upper layer protocol data units (PDUs), error correction through automatic repeat request (ARQ) for AM data transfers, and segmentation and reassembly of RLC SDUs for UM and AM data transfers. The RLC layer 403 may also maintain sequence numbers independent of the ones in PDCP for UM and AM data transfers. The RLC layer 403 may also in some aspects execute re-segmentation of RLC data PDUs for AM data transfers, detect duplicate data for AM data transfers, discard RLC SDUs for UM and AM data transfers, detect protocol errors for AM data transfers, and perform RLC re-establishment.

The PDCP layer 404 may in some aspects execute header compression and decompression of IP data, maintain PDCP Sequence Numbers (SNs), perform in-sequence delivery of upper layer PDUs at re-establishment of lower layers, perform reordering and eliminate duplicates of lower layer SDUs, execute PDCP PDU routing for the case of split bearers, execute retransmission of lower layer SDUs, cipher and decipher control plane and user plane data, perform integrity protection and integrity verification of control plane and user plane data, control timer-based discard of data, and perform security operations (e.g., ciphering, deciphering, integrity protection, integrity verification, etc.).

In some aspects, primary services and functions of the RRC layer 405 may include broadcast of system information (e.g., included in Master Information Blocks (MIBs) or System Information Blocks (SIBs) related to the non-access stratum (NAS)); broadcast of system information related to the access stratum (AS); paging initiated by 5GC 120 or NG-RAN 110, establishment, maintenance, and release of an RRC connection between the UE and NG-RAN (e.g., RRC connection paging, RRC connection establishment, RRC connection addition, RRC connection modification, and an RRC connection release, also for carrier aggregation and Dual Connectivity in NR or between E-UTRA and NR); establishment, configuration, maintenance, and release of Signalling Radio Bearers (SRBs) and Data Radio Bearers (DRBs); security functions including key management, mobility functions including handover and context transfer, UE cell selection and reselection and control of cell selection and reselection, and inter-radio access technology (RAT) mobility; and measurement configuration for UE measurement reporting. Said MIBs and SIBs may comprise one or more information elements (IEs), which may each comprise individual data fields or data structures. The RRC layer 405 may also, in some aspects, execute QoS management functions, detection of and recovery from radio link failure, and NAS message transfer between the NAS layer 406 in the UE and the NAS layer 406 in the AMF 132.

In some aspects, the following NAS messages can be communicated during the corresponding NAS procedure, as illustrated in Table 1 below:

TABLE 1

| 5G NAS Message | 5G NAS Procedure | 4G NAS Message name | 4G NAS Procedure |
|---|---|---|---|
| Registration Request | Initial registration procedure | Attach Request | Attach procedure |
| Registration Request | Mobility registration update procedure | Tracking Area Update (TAU) Request | Tracking area updating procedure |
| Registration Request | Periodic registration update procedure | TAU Request | Periodic tracking area updating procedure |
| Deregistration Request | Deregistration procedure | Detach Request | Detach procedure |
| Service Request | Service request procedure | Service Request or Extended Service Request | Service request procedure |
| PDU Session Establishment Request | PDU session establishment procedure | PDN Connectivity Request | PDN connectivity procedure |

In some aspects, when the same message is used for more than one procedure, then a parameter can be used (e.g., registration type or TAU type) which indicates the specific purpose of the procedure, e.g. registration type="initial registration", "mobility registration update" or "periodic registration update".

The UE 101 and the RAN node 128/130 may utilize an NG radio interface (e.g., an LTE-Uu interface or an NR radio interface) to exchange control plane data via a protocol stack comprising the PHY layer 401, the MAC layer 402, the RLC layer 403, the PDCP layer 404, and the RRC layer 405.

The non-access stratum (NAS) protocol layers 406 forms the highest stratum of the control plane between the UE 101 and the AMF 132 as illustrated in FIG. 4. In aspects, the NAS protocol layers 406 support the mobility of the UE 101 and the session management procedures to establish and maintain IP connectivity between the UE 101 and the UPF 134. In some aspects, the UE protocol stack can include one or more upper layers, above the NAS layer 406. For example, the upper layers can include an operating system layer 424, a connection manager 420, and an application layer 422. In some aspects, the application layer 422 can include one or more clients which can be used to perform various application functionalities, including providing an interface for and communicating with one or more outside networks. In some aspects, the application layer 422 can include an IP multimedia subsystem (IMS) client 426.

The NG Application Protocol (NG-AP) layer 415 may support the functions of the N2 and N3 interface and comprise Elementary Procedures (EPs). An EP is a unit of interaction between the RAN node 128/130 and the 5GC 120. In certain aspects, the NG-AP layer 415 services may comprise two groups: UE-associated services and non-UE-associated services. These services perform functions including, but not limited to UE context management, PDU session management and management of corresponding NG-RAN resources (e.g. Data Radio Bearers [DRBs]), UE capability indication, mobility, NAS signaling transport, and configuration transfer (e.g. for the transfer of SON information).

The Stream Control Transmission Protocol (SCTP) layer (which may alternatively be referred to as the SCTP/IP layer) 414 may ensure reliable delivery of signaling messages between the RAN node 128/130 and the AMF 132 based, in part, on the IP protocol, supported by the IP layer 413. The L2 layer 412 and the L1 layer 411 may refer to communication links (e.g., wired or wireless) used by the RAN node 128/130 and the AMF 132 to exchange information.

The RAN node 128/130 and the AMF 132 may utilize an N2 interface to exchange control plane data via a protocol stack comprising the L1 layer 411, the L2 layer 412, the IP layer 413, the SCTP layer 414, and the S I-AP layer 415.

Figure 5:
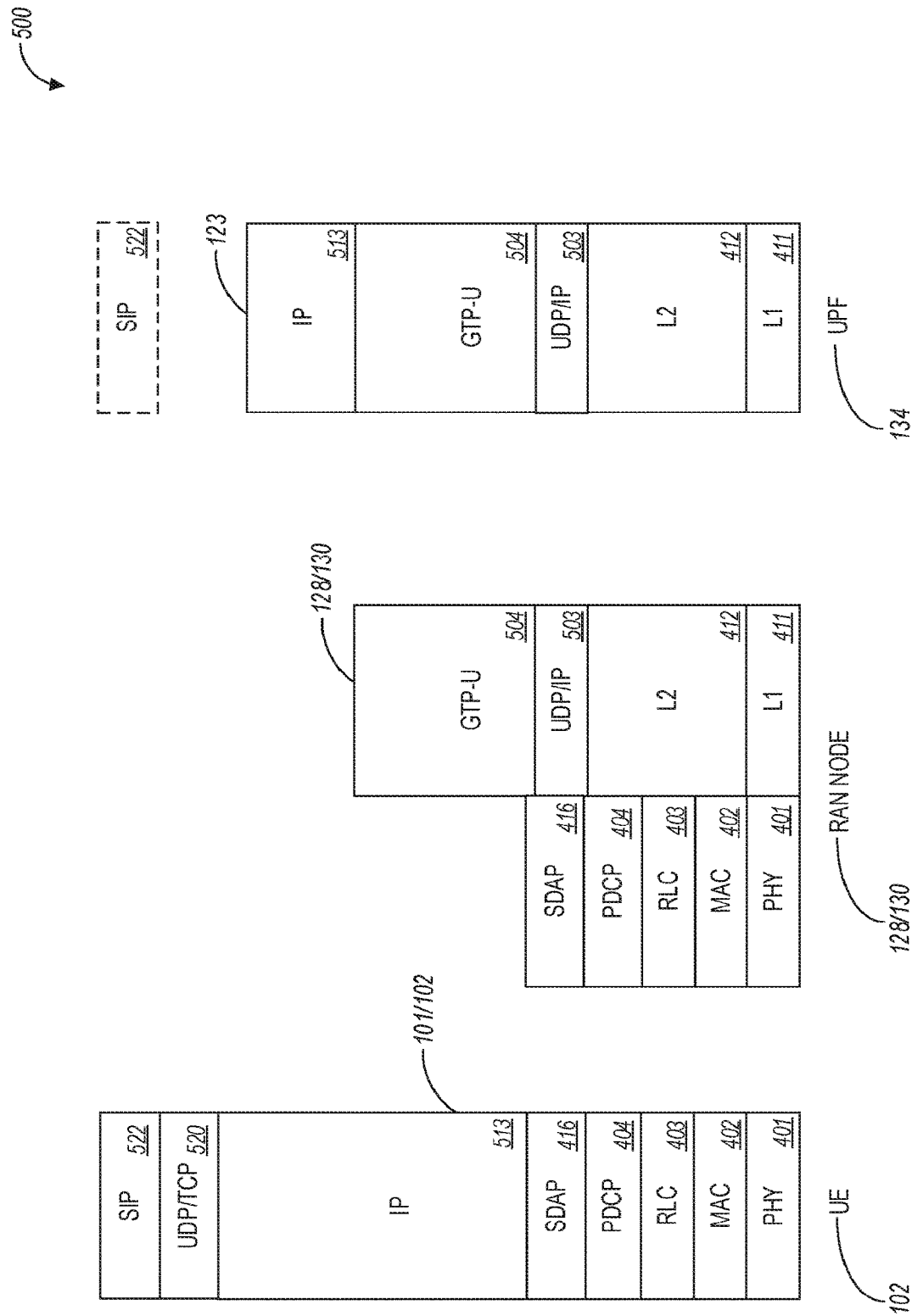
FIG. 5 is an illustration of a user plane protocol stack in accordance with some aspects.

FIG. 5 is an illustration of a user plane protocol stack in accordance with some aspects. In this aspect, a user plane 500 is shown as a communications protocol stack between the UE 102, the RAN node 128 (or alternatively, the RAN node 130), and the UPF 134. The user plane 500 may utilize at least some of the same protocol layers as the control plane 400. For example, the UE 102 and the RAN node 128 may utilize an NR radio interface to exchange user plane data via a protocol stack comprising the PHY layer 401, the MAC layer 402, the RLC layer 403, the PDCP layer 404, and the Service Data Adaptation Protocol (SDAP) layer 416. The SDAP layer 416 may, in some aspects, execute a mapping between a Quality of Service (QoS) flow and a data radio bearer (DRB), and a marking of both DL and UL packets with a QoS flow ID (QFI). In some aspects, an IP protocol stack 513 can be located above the SDAP 416. A user datagram protocol (UDP)/transmission control protocol (TCP) stack 520 can be located above the IP stack 513. A session initiation protocol (SIP) stack 522 can be located above the UDP/TCP stack 520 and can be used by the UE 102 and the UPF 134.

The General Packet Radio Service (GPRS) Tunneling Protocol for the user plane (GTP-U) layer 504 may be used for carrying user data within the 5G core network 120 and between the radio access network 110 and the 5G core network 120. The user data transported can be packets in IPv4, IPv6, or PPP formats, for example. The UDP and LP security (UDP/IP) layer 503 may provide checksums for data integrity, port numbers for addressing different functions at the source and destination, and encryption and authentication on the selected data flows. The RAN node 128/130 and the UPF 134 may utilize an N3 interface to exchange user plane data via a protocol stack comprising the L1 layer 411, the L2 layer 412, the UDP/IP layer 503, and the GTP-U layer 504. As discussed above with respect to FIG. 4, NAS protocols support the mobility of the UE 101 and the session management procedures to establish and maintain IP connectivity between the UE 101 and the UPF 134.

Figure 6:
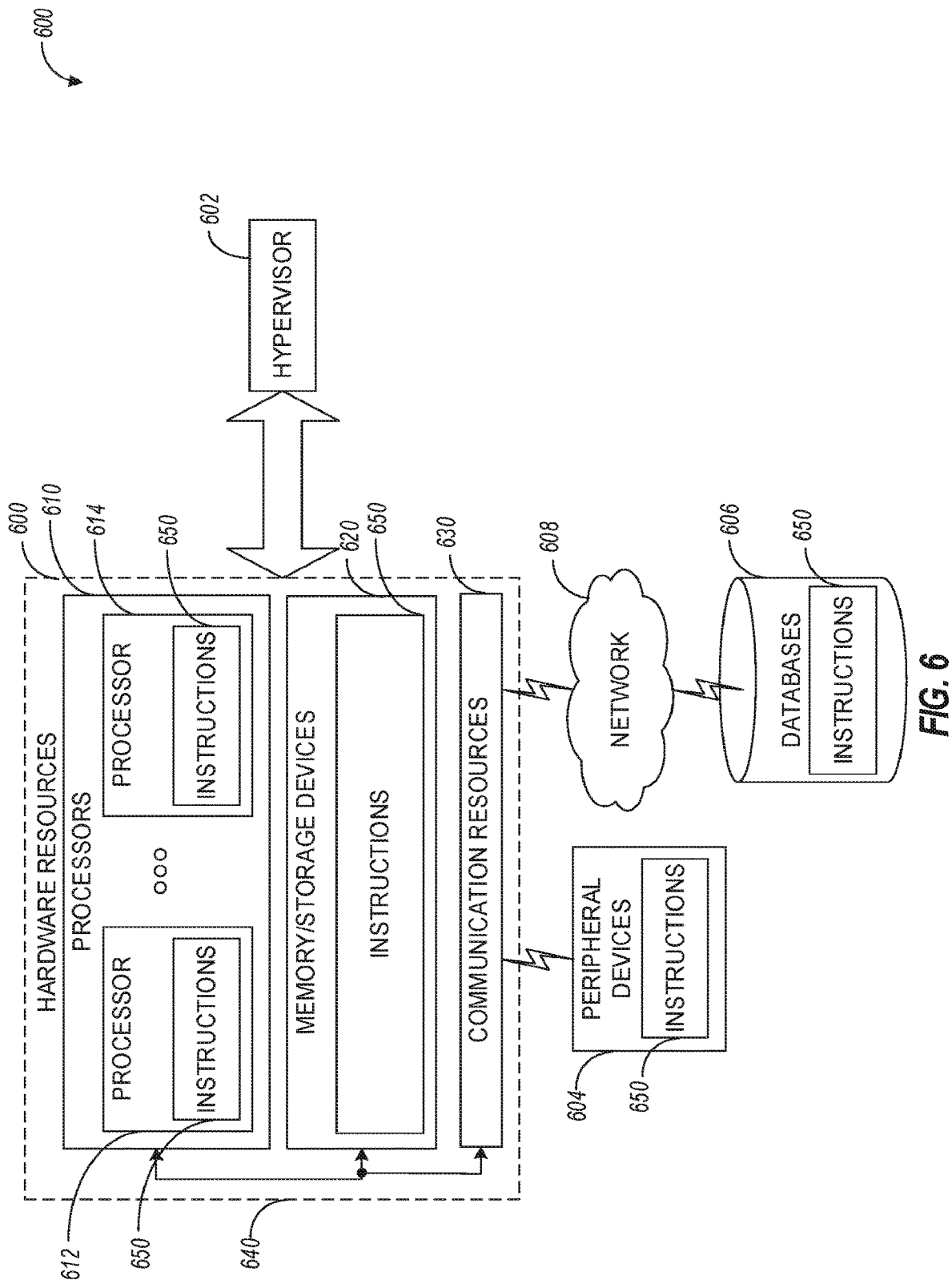
FIG. 6 is a block diagram illustrating components, according to some example aspects, able to read instructions from a machine-readable or computer-readable medium (e.g., a non-transitory machine-readable storage medium) and perform any one or more of the methodologies discussed herein.

FIG. 6 is a block diagram illustrating components, according to some example aspects, able to read instructions from a machine-readable or computer-readable medium (e.g., a non-transitory machine-readable storage medium) and perform any one or more of the methodologies discussed herein. Specifically, FIG. 6 shows a diagrammatic representation of hardware resources 600 including one or more processors (or processor cores) 610, one or more memory/storage devices 620, and one or more communication resources 630, each of which may be communicatively coupled via a bus 640. For aspects in which node virtualization (e.g., NFV) is utilized, a hypervisor 602 may be executed to provide an execution environment for one or more network slices and/or sub-slices to utilize the hardware resources 600

The processors 610 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 612 and a processor 614.

The memory/storage devices 620 may include a main memory, disk storage, or any suitable combination thereof. The memory/storage devices 620 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 630 may include interconnection or network interface components or other suitable devices to communicate with one or more peripheral devices 604 or one or more databases 606 via a network 608. For example, the communication resources 630 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 650 may comprise software, a program, an application, an applet, an app, or other executable code for causing at least any of the processors 610 to perform any one or more of the methodologies discussed herein. The instructions 650 may reside, completely or partially, within at least one of the processors 610 (e.g., within the processor's cache memory), the memory/storage devices 620, or any suitable combination thereof. Furthermore, any portion of the instructions 650 may be transferred to the hardware resources 600 from any combination of the peripheral devices 604 or the databases 606. Accordingly, the memory of processors 610, the memory/storage devices 620, the peripheral devices 604, and the databases 606 are examples of computer-readable and machine-readable media.

Figure 7:
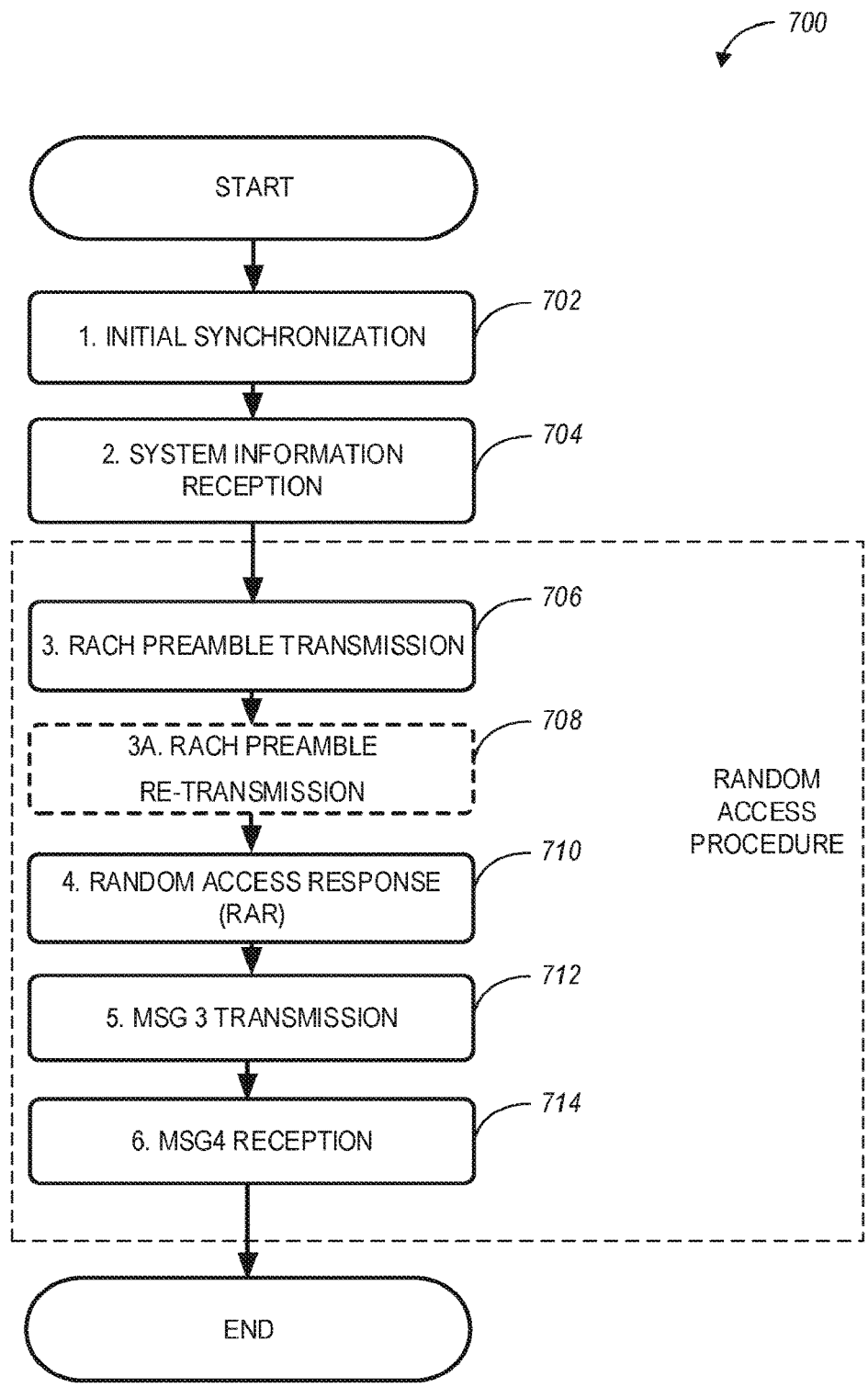
FIG. 7 is an illustration of an initial access procedure including PRACH preamble retransmission in accordance with some aspects.

FIG. 7 is an illustration of an initial access procedure 700 including PRACH preamble retransmission which can be performed by the UE 101, in accordance with some aspects. Referring to FIG. 7, the initial access procedure 700 can start with operation 702, when initial synchronization can take place. For example, the UE 101 can receive a primary synchronization signal and a secondary synchronization signal to achieve the initial synchronization. In some aspects, the initial synchronization at operation 702 can be performed using one or more SS blocks received within an SS burst set. At operation 704, the UE 101 can receive system information, such as one or more system information blocks (SIBs) and/or master information blocks (MIBs).

At operation 706 through 714, a random access procedure can take place. More specifically, at operation 706, a PRACH preamble transmission can take place as message 1 (Msg1). At operation 710, UE 101 can receive a random access response (RAR) message, which can be random access procedure message 2 (Msg2). In Msg2, the node (e.g., gNB) 111 can respond with random access radio network temporary identifier (RA-RNTI), which can be calculated from the preamble resource (e.g., time and frequency allocation).

In some aspects, UE 101 can be configured to perform one or more retransmissions of the PRACH preamble at operation 708, when the RAR is not received or detected within a preconfigured or predefined time window. The PRACH preamble retransmission can take place with power ramping, as explained hereinbelow so that the transmission power is increased until the random-access response is received.

At operation 712, UE 101 can transmit a random access procedure message 3 (Msg3), which can include a radio resource control (RRC) connection request message. At operation 714, a random access procedure message 4 (Msg4) can be received by the UE 101, which can include an RRC connection setup message, carrying the cell radio network temporary identifier (CRNTI) used for subsequent communication between the UE 101 and the node 111.

In NR Release 15, system design is based on carrier frequencies up to 52.6 GHz with a waveform choice of the cyclic prefix—orthogonal frequency-division multiplexing (CP-OFDM) for downlink (DL) and uplink (UL), and additionally, Discrete Fourier Transform-spread-OFDM (DFT-s-OFDM) for UL. In some aspects, for carrier frequencies above 52.6 GHz, a single carrier based waveform can be used in order to handle issues including low power amplifier (PA) efficiency and large phase noise.

Figure 8:
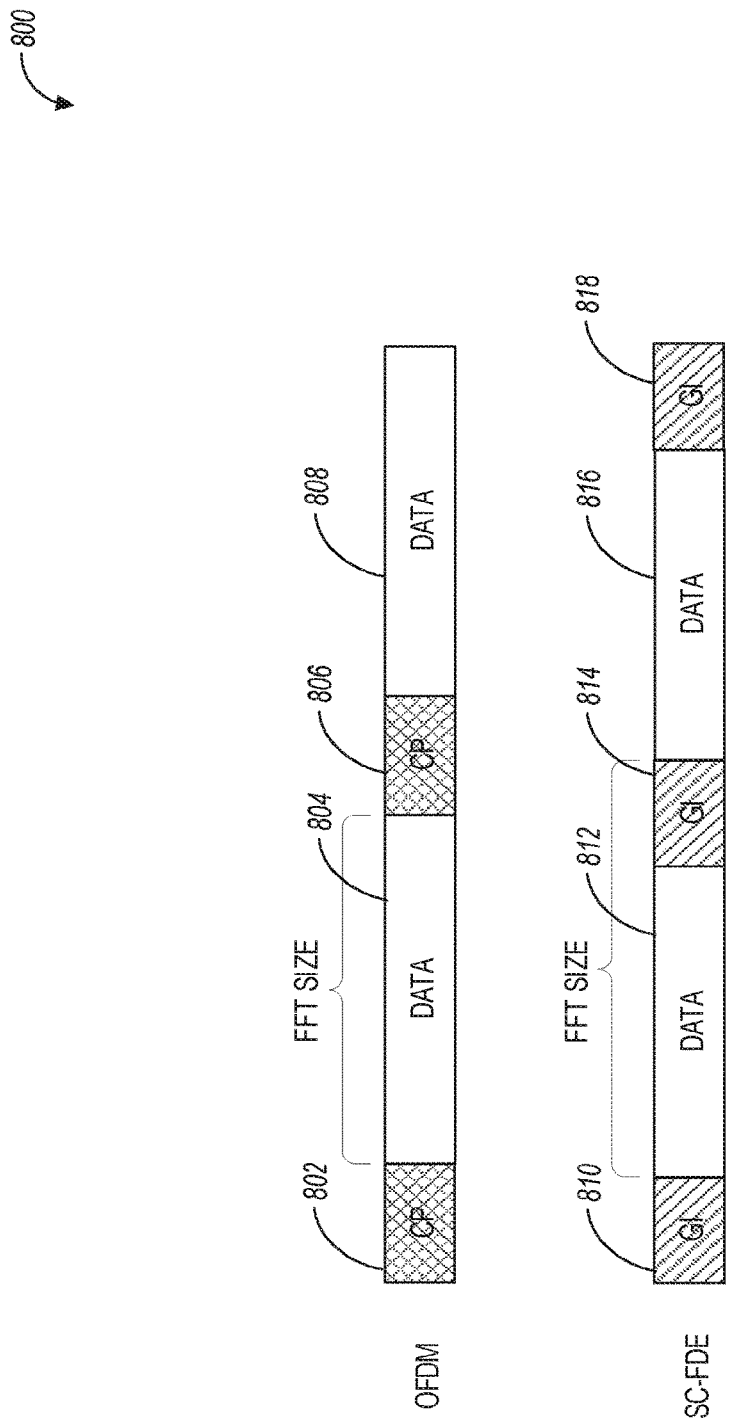
FIG. 8 illustrates a comparison between orthogonal frequency division multiplexing (OFDM) and single carrier with frequency domain equalizer (SC-FDM) transmission schemes, in accordance with some aspects.

In some aspects, for single carrier based waveform, DFT-s-OFDM and single carrier with frequency domain equalizer (SC-FDE) can be considered for both DL and UL communication. FIG. 8 illustrates a comparison 800 between OFDM and SC-FDM transmission schemes, in accordance with some aspects. For OFDM based transmission scheme, including DFT-s-OFDM, a cyclic prefix (CP) (e.g., 802 and 806) is inserted at the beginning of each data block (e.g., 804 and 808), where the last data symbols in a block are repeated as the CP. Typically, the length of the CP exceeds the maximum expected delay spread in order to overcome the inter-symbol interference (ISI).

For the SC-FDE transmission scheme, a known sequence (guard interval (GI), unique word (UW), etc.) (e.g., GIs 810, 814, 818) or cyclic prefix (CP) can be inserted at both the beginning and/or the end of one block (e.g., data blocks 812, 816). In some aspects, a linear equalizer in the frequency domain can be employed to reduce the receiver complexity. Compared to OFDM, the SC-FDE transmission scheme can reduce the Peak to Average Power Ratio (PAPR) and thus allow the use of less costly power amplifiers.

Figure 9:
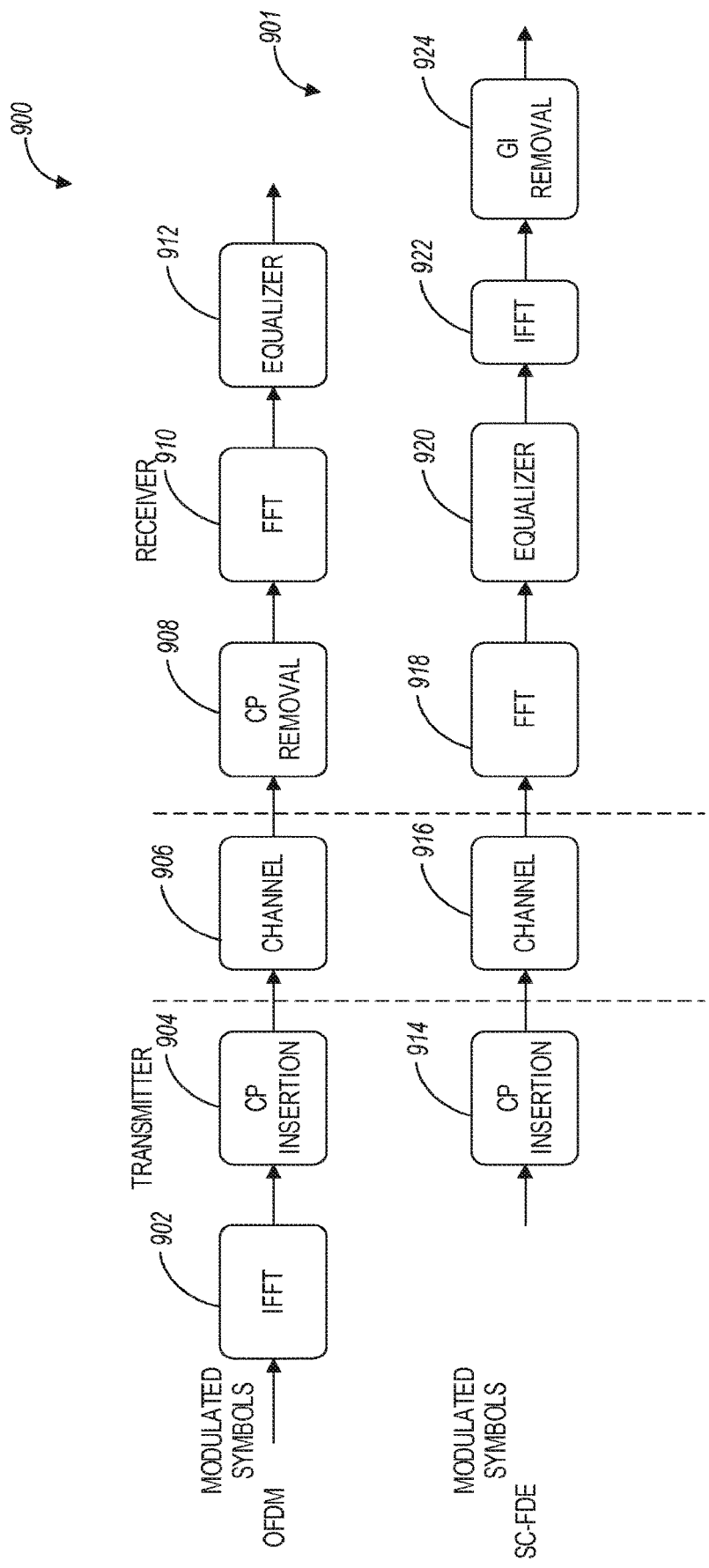
FIG. 9 illustrates transmitter and receiver structures for OFDM and SC-FDE communications, in accordance with some aspects.

FIG. 9 illustrates transmitter and receiver structures for OFDM and SC-FDE communications, in accordance with some aspects. Referring to FIG. 9, the OFDM transceiver 900 includes transmitter circuitry with an inverse fast Fourier transform (IFFT) block 902 and a cyclic prefix insertion block 904 for generating transmit data for transmission via channel 906. The OFDM transceiver 900 further includes a cyclic prefix removal block 908 to remove the cyclic prefix from data received via the channel 906, an FFT block 910, and an equalizer block 912.

The SC-FDE transceiver 901 includes transmitter circuitry with a cyclic prefix insertion block 914 for generating transmit data for transmission via channel 916. The SC-FDE transceiver 901 further includes an FFT block 918 four processing data received via the channel 906, an equalizer block 920, an IFFT block 922, and a GI removal block 924. The transceivers 900 and 901 can further include a demodulation block and a decoding block. In some aspects, transceivers 909 and 901 further include a channel estimator block for generating a channel estimate for the equalizer block. The channel estimator can generate the channel estimate using the received signal as well as a DM-RS associated with the received signal. Techniques disclosed herein can be used for DM-RS design in connection with communication systems operating above 52.6 GHz carrier frequency.

For transceiver 901 operating in connection with an SC-FDE transmission scheme, at the receiver, the FFT (e.g., block 918) is applied to convert the received signal from a time domain to a frequency domain. Subsequently, a linear equalizer (e.g., block 920) is performed in the frequency domain and followed by IFFT (e.g., block 922) to covert the signal from the frequency domain back to the time domain.

In some aspects, two types of DM-RS patterns are supported for CP-OFDM based waveform: Type 1 DM-RS and Type 2 DM-RS structures. In some aspects, Pseudo-Noise (PN) can be employed for DM-RS sequence generation for CP-OFDM waveform. In some aspects, for DFT-s-OFDM based waveform, only Type 1 DM-RS structure is supported, and a computer-generated sequence (CGS) or a Zadoff-Chu sequence is used for DM-RS sequence generation.

In aspects when DFT-s-OFDM waveform is applied for DL and SC-FDM is applied for both DL and UL for communication systems operating above 52.6 GHz, to support single user multiple-input and multiple-output (SU-MIMO) and Multi-user multiple-input and multiple-output (MU-MIMO), multiple DM-RS antenna ports (APs) may be defined for systems operating above 52.6 GHz.

Techniques disclosed herein can be used for reference signal design for SC-FDE based waveforms and reference signal design for DFT-s-OFDM based waveforms in connection with communication systems operating above 52.6 GHz carrier frequency.

FIG. 10 illustrates type 1 and type 2 DM-RS structures (1002 and 1004 respectively) for NR communications, in accordance with some aspects. Referring to FIG. 10, the 2-symbol front-loaded DM-RS pattern is shown where data is transmitted after the 2-symbol front-loaded DM-RS. In some aspects, for the Type 1 DM-RS pattern 1002, the total number of orthogonal DM-RS antenna ports (AP) is 8, which is realized by a length 2 orthogonal cover code (OCC) in both time and frequency domain and frequency division multiplexing (FDM) of 2 APs (2 different patterns are used for the FDM APs of DMRS 1002). In some aspects, for the Type 2 DM-RS pattern 1004, the total number of orthogonal DM-RS APs is 12, which is realized by a length 2 OCC in both time and frequency domain and frequency division multiplexing (FDM) of 3 APs (3 different patterns are used for the FDM APs of DMRS 1004).

In some aspects, additional 1-symbol or 2-symbol DM-RS can be configured in the later part of a slot to provide better channel estimation performance for certain scenarios including high-speed use cases in connection with NR communications.

Reference signal design for SC-FDE based waveform for system operating above 52.6 GHz.

In some aspects, to support MU-MIMO and SU-MIMO for system operating above 52.6 GHz carrier frequency, multiple DM-RS APs may be defined. DM-RS design as disclosed herein can be applied for both DL and UL.

In some aspects, CGS and/or Zadoff-Chu sequence can be used for DM-RS sequence generation. In some aspects, the CSG and/or Zadoff-Chu sequence may be generated in the frequency domain or in the time domain.

In some aspects, a base sequence hopping can be applied to randomize inter-cell interference. In particular, based sequence hopping can be initialized as a function of one or more of the following parameters: a slot index or an SC-FDE block index within one slot and/or a configurable ID. For the configurable ID, its default value can be equal to a physical cell ID. Additionally, the configurable ID may be configured in a cell-specific manner, a UE specific manner, or a DMRS antenna port group-specific manner.

In some aspects, cyclic shift hopping can be applied for the DM-RS sequence generation. The cyclic shift hopping pattern can be defined as a function of symbol/block/sub-block index and/or a configurable ID.

In some aspects, the same base sequence but different cyclic shift values can be employed for different DM-RS APs. In this case, multiple orthogonal DM-RS APs can be multiplexed in the code domain.

In some aspects, a Zadoff-Chu based DM-RS sequence with different cyclic shifts in the time domain can be generated as follows: $y(n) = \bar{r}_{u,v}((n+L) \mod N_{ZC})$, $n=0, 1, \ldots, N$, where $\bar{r}_{u,v}(n)$ is the Zadoff-Chu base sequence (which in some aspects can be defined as in Section 5.2.2.1 in 3GPP TS 38.211), $N_{ZC}$ is its length, L is the cyclic shift in time domain, N is the sequence length, u is the group number, and v is the base sequence number within the group. In some aspects, L can be predefined in the specification or configured by higher layers via, e.g., NR minimum system information (MSI), NR remaining minimum system information (RMSI), NR other system information (OSI), or radio resource control (RRC) signalling. In one aspect, $L = \lfloor N/K \rfloor$, where K is a constant and can be predefined (e.g., in a 3GPP specification). For instance, K=2, 4, 8 or 12.

Figure 11:
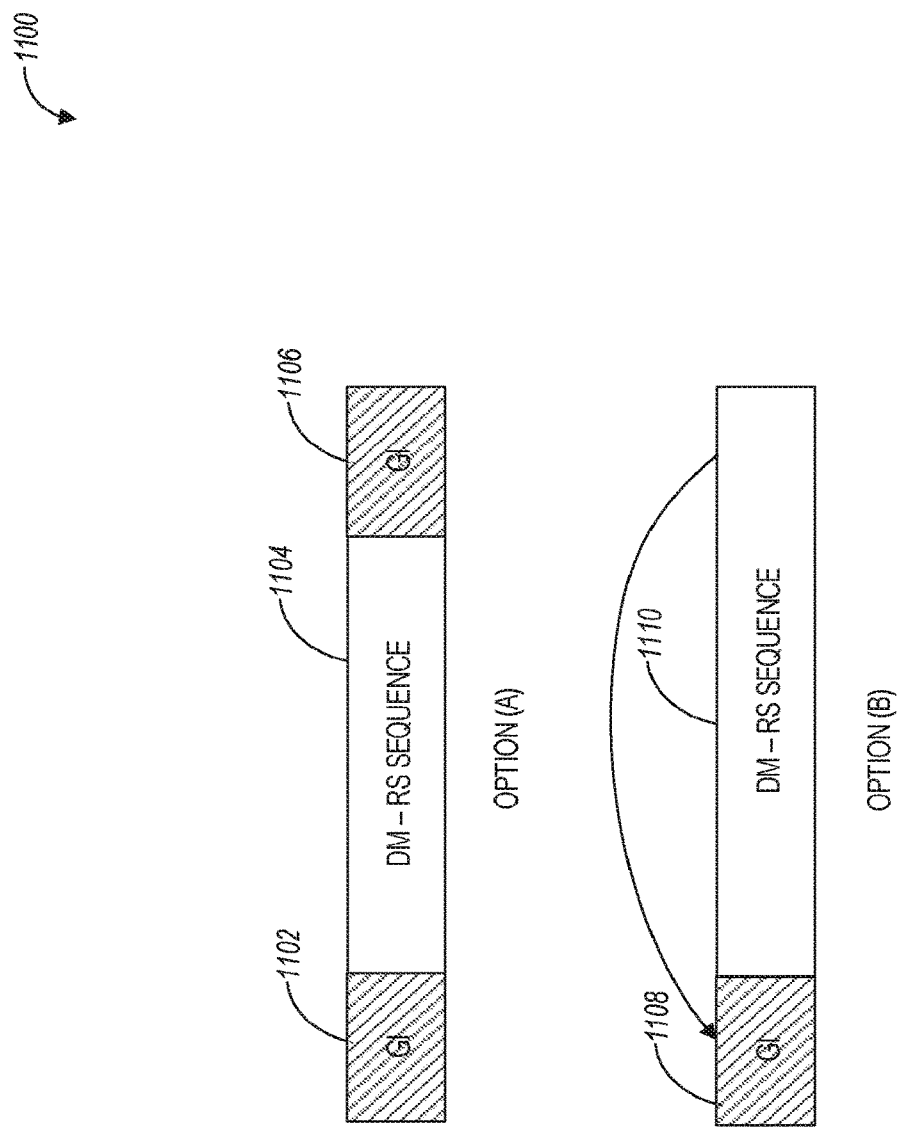
FIG. 11 illustrates a DM-RS and guard interval (GI) generation for SC-FDE based waveform, in accordance with some aspects.

FIG. 11 illustrates a DM-RS and guard interval (GI) generation options 1100 for SC-FDE based waveform, in accordance with some aspects. Referring to FIG. 11, two options can be considered for DM-RS sequence mapping within one SC-FDE block. In one option (Option (A) in FIG. 11), the GI sequence is inserted before (1102) and after (1106) the DM-RS sequence 1104 within one SC-FDE block. In some aspects, the GI sequence can be independently generated and may be different from the DM-RS sequence 1104. In another option (Option (B) in FIG. 11), a length of the DM-RS sequence 1110 is equal to the FFT size. Further, within one SC-FDE block, a portion (e.g., the last part) of the DM-RS sequence 1110 is repeated as the GI sequence 1108, which is mapped at the beginning of one block.

In some aspects, a block-wised orthogonal cover code (OCC) can be applied for a DM-RS sequence in the time domain. It is noted that in the frequency domain, different DM-RS antenna ports (AP) can be allocated with different comb offsets. In other words, DM-RS APs in the frequency domain are multiplexed in a frequency division multiplexing (FDM) manner.

Assuming the DM-RS sequence before applying a block-wised OCC as $r(0), \ldots, r(M-1)$, where M is the number of symbols for DM-RS sequence; then the output after block-wised spreading operation can be given as $y(k) = w_n(k) \cdot r(k \mod M)$, where k is the symbol index within one block, and $k=0, 1, \ldots, N-1$. $w_n(k)$ is the block-wised OCC code in time domain for $n^{th}$ DM-RS AP. Depending on the number of comb offsets in the frequency domain or the number of DM-RS APs, which is multiplexed in a FDM manner in the frequency domain, the block-wised OCC can be different. Assuming the number of comb offsets for DM-RS APs as $N_{comb}$, e.g., $N_{comb}=2, 4, 8$, etc. In some aspects, $N=M \cdot N_{comb}$. In some aspects, $N_{comb}$ may be predefined in the specification or configured by higher layers via NR minimum system information (MSI), NR remaining minimum system information (RMSI), NR other system information (OSI), or radio resource control (RRC) signalling.

In some aspects, the DM-RS can be generated as $y(k) = \beta_{DMRS}^{PDSCH} w_n(k) \cdot r(k \mod M)$, where $\beta_{DMRS}^{PDSCH}$ is based on the energy per symbol ratio between PDSCH and DMRS, which can be determined by $N_{comb}$ and/or configured by higher layer signaling.

In some aspects, when $N_{comb}=2$, the block-wised OCC can be given as $$w = \begin{bmatrix} 1 & 1 \\ 1 & -1 \end{bmatrix} \otimes w_0.$$

In some aspects, when $N_{comb}=4$, the block-wised OCC can be given as $$w = \begin{bmatrix} 1 & 1 & 1 & 1 \\ 1 & -j & -1 & j \\ 1 & -1 & 1 & -1 \\ 1 & j & -1 & -j \end{bmatrix} \otimes w_0.$$

In some aspects, the block-wised OCC can be as follows:

$$w = \begin{bmatrix} \exp\left(\frac{0 \cdot 0 \cdot j2\pi}{N_{comb}}\right) & \exp\left(\frac{1 \cdot 0 \cdot j2\pi}{N_{comb}}\right) & \cdots & \exp\left(\frac{(N_{comb}-1) \cdot 0 \cdot j2\pi}{N_{comb}}\right) \\ \exp\left(\frac{0 \cdot 1 \cdot j2\pi}{N_{comb}}\right) & \exp\left(\frac{1 \cdot 1 \cdot j2\pi}{N_{comb}}\right) & \cdots & \exp\left(\frac{(N_{comb}-1) \cdot 1 \cdot j2\pi}{N_{comb}}\right) \\ \vdots & \vdots & \ddots & \vdots \\ \exp\left(\frac{0 \cdot (N_{comb}-1) \cdot j2\pi}{N_{comb}}\right) & \exp\left(\frac{1 \cdot (N_{comb}-1) \cdot j2\pi}{N_{comb}}\right) & \cdots & \exp\left(\frac{(N_{comb}-1) \cdot (N_{comb}-1) \cdot j2\pi}{N_{comb}}\right) \end{bmatrix} \otimes w_0.$$

where $w_0$ is a vector with length M.

In some aspects, $w_0(m)=1$, where $m=0, 1, \ldots M-1$. In some aspects, $w_0(m)=\exp(-j \cdot \Delta\phi \cdot m)$, where $m=0, 1, \ldots M-1$, and $\Delta\phi$ is a phase shift, which can be predefined in the specification. For instance, $$\Delta\phi = \frac{2\pi}{M}.$$

Figure 12:
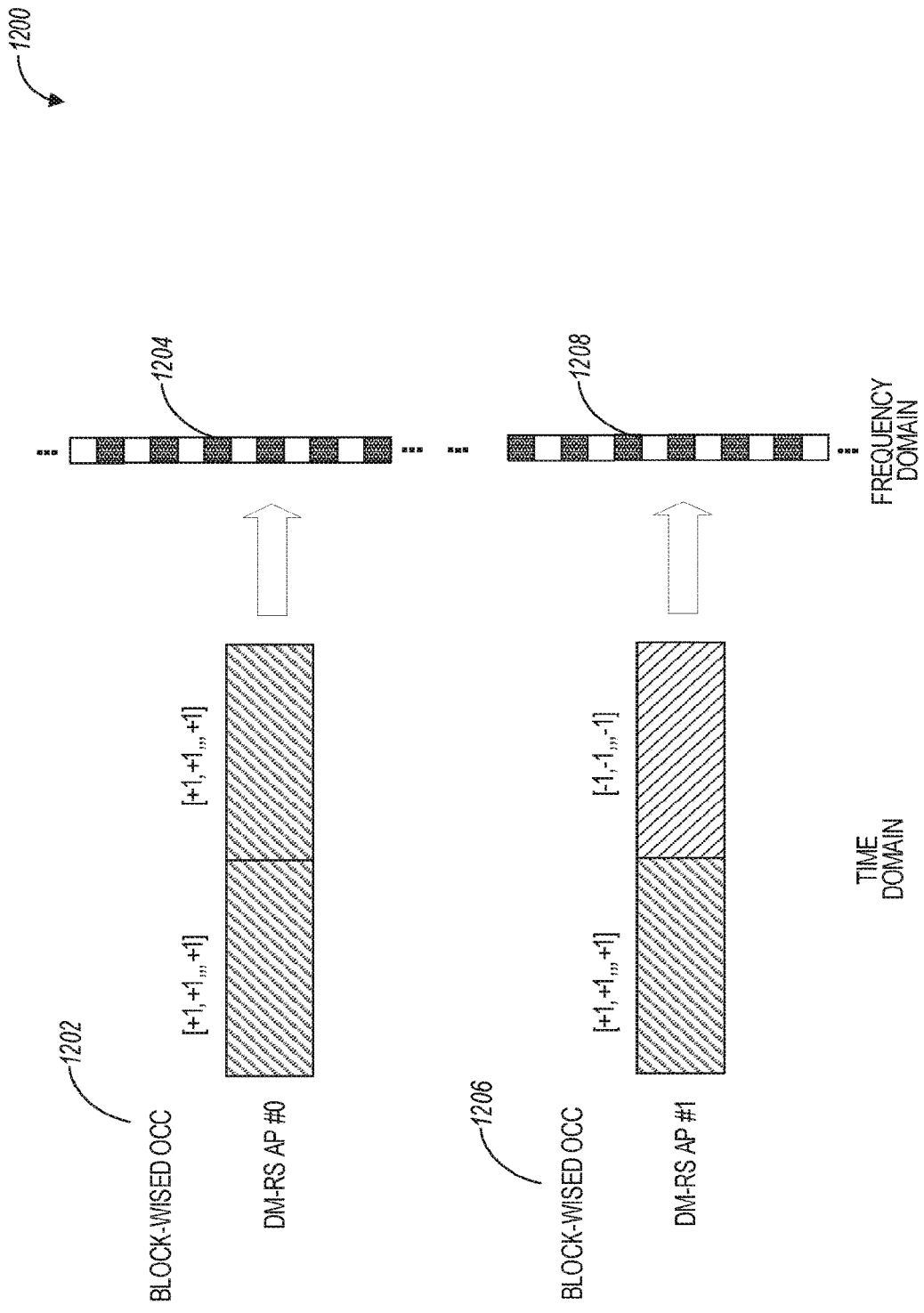
FIG. 12 illustrates a block-wised OCC for DM-RS generation for SC-FDE based waveform, in accordance with some aspects.

FIG. 12 illustrates a block-wised OCC for DM-RS generation for SC-FDE based waveform, in accordance with some aspects. More specifically, FIG. 12 illustrates an example 1200 of block-wised OCC for DM-RS generation for SC-FDE based waveform when $N_{comb}=2$. In the example 1200, two groups of block-wised OCC 1202 and 1206 is applied for DM-RS sequence in the time domain to generate the DM-RS sequences 1204 and 1208 in the frequency domain. In some aspects, the first group of block-wised OCC=[1, 1, . . . , 1], [1, 1, . . . , 1], and the second group of block-wised OCC=[1, 1, . . . , 1], [−1, −1, . . . , −1]. Based on this, the DM-RS for these two groups (1204 and 1208), or antenna ports can be located in different resource elements (RE) with different comb offsets. More specifically, the DM-RS 1204 for the first group or AP #0 is located in the REs with comb offset=0, while the DM-RS 1208 for the second group or AP #1 is located in the REs with comb offset=1.

In another aspect, one block of SC symbols can be divided into multiple sub-blocks, wherein each sub-block includes both a GI and DM-RS sequence. Note that the length of GI within the sub-block may be shorter than that of GI within the block.

Figure 13:
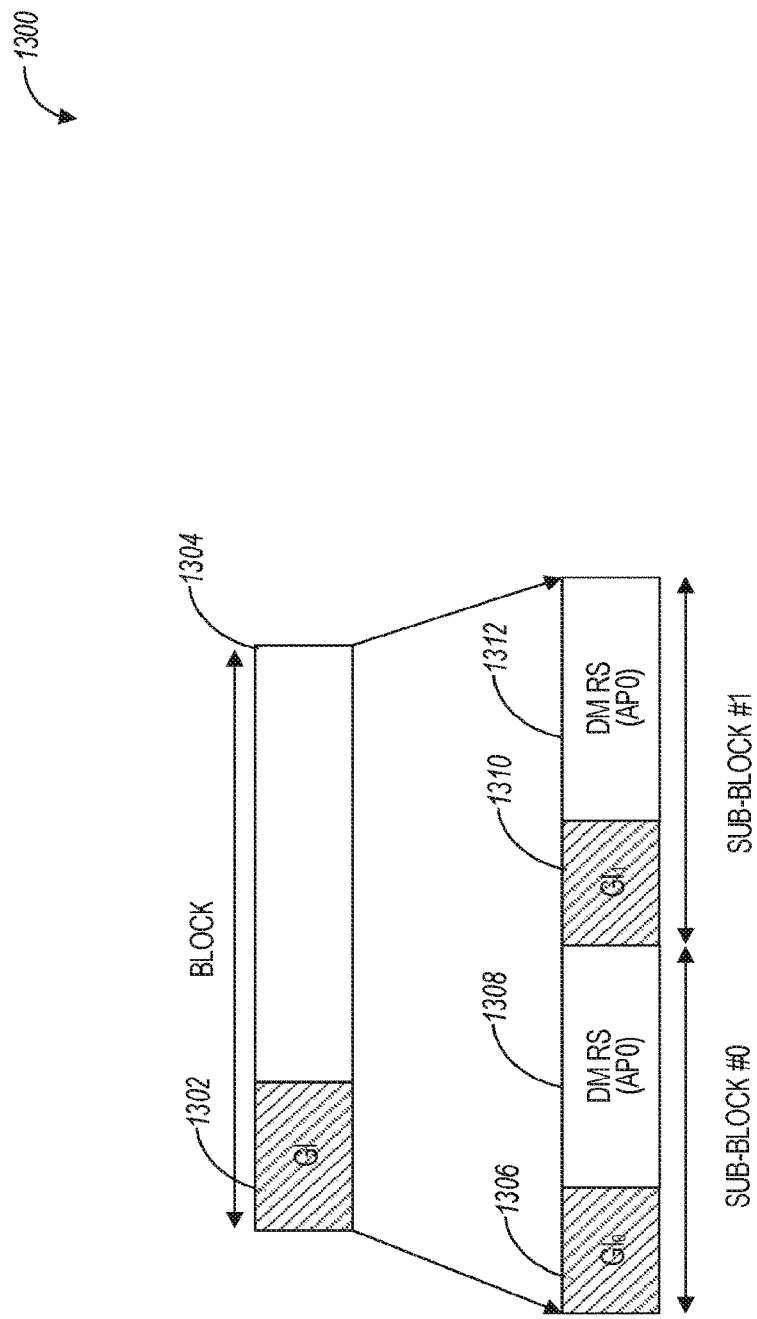
FIG. 13 illustrates a sub-block based DM-RS design, in accordance with some aspects.

FIG. 13 illustrates a sub-block based DM-RS design 1300, in accordance with some aspects. Referring to FIG. 13, in some aspects, one block 1304 of sub-carrier (SC) symbols with a GI 1302 is divided into two sub-blocks 1308 and 1312 having corresponding GIs 1306 and 1310. In some aspects, the DM-RS AP is transmitted within one sub-block, and two DM-RS APs are multiplexed in a time division multiplexing (TDM) manner.

In some aspects, for sub-block based DM-RS design for system operating above 52.6 GHz, a DM-RS sequence may be initialized as a function of one or more following parameters: sub-block/block index within one slot, a slot index, and/or a configurable ID. For the configurable ID, the default value is equal to a physical cell ID. Furthermore, the configurable ID may be configured in a cell-specific or UE specific manner.

In some aspects, an OCC can be applied on DMRS sequence in the time domain to create multiple DMRS APs. In particular, the OCC can be applied on a sub-block or a block level. In some aspects, the length-2 and length-4 OCC can be generated as follows:

$$w = \begin{bmatrix} 1 & 1 \\ 1 & -1 \end{bmatrix} \text{ and } w = \begin{bmatrix} 1 & 1 & 1 & 1 \\ 1 & -1 & -1 & -1 \\ 1 & 1 & -1 & -1 \\ 1 & -1 & -1 & 1 \end{bmatrix}.$$

Figure 14:
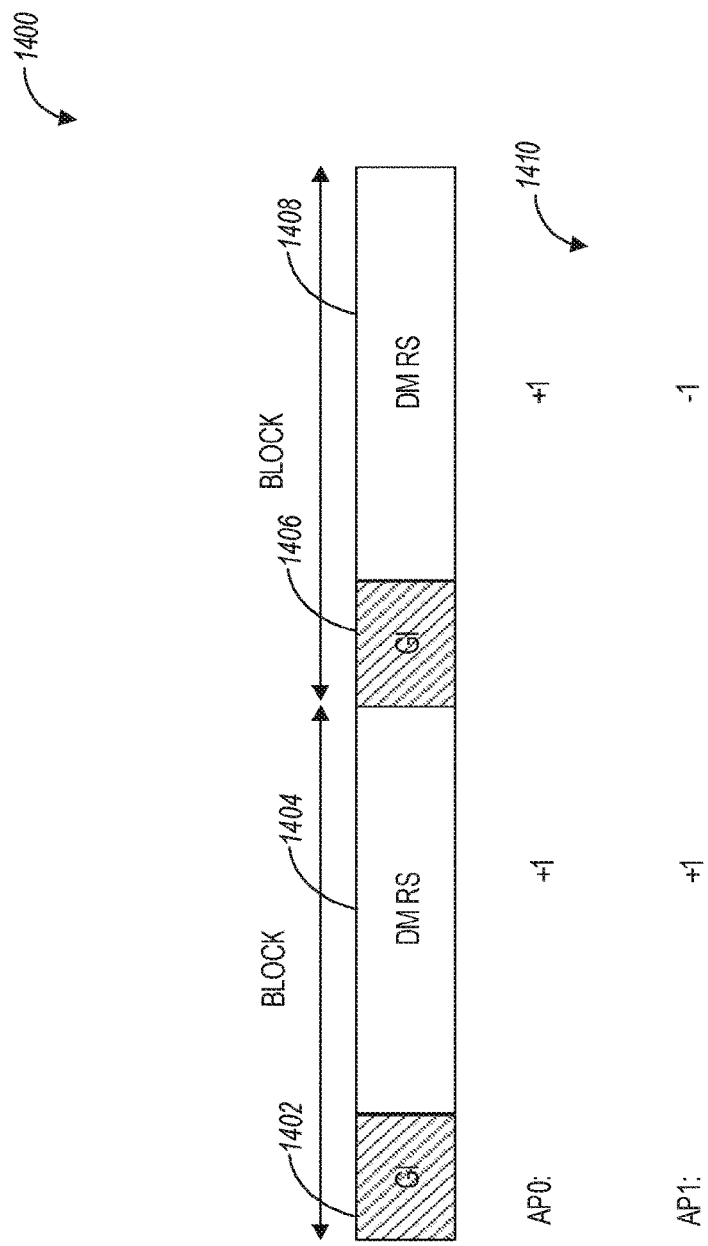
FIG. 14 illustrates OCC for DM-RS generation on a block level, in accordance with some aspects.

FIG. 14 illustrates OCC for DM-RS generation on a block level, in accordance with some aspects. Referring to FIG. 14, diagram 1400 illustrates blocks 1404 and 1408 including corresponding GIs 1402 and 1406. As illustrated in FIG. 14, OCC 1410 are applied (for AP #0 and AP #1) on a block level, to blocks 1404 and 1408.

Figure 15:
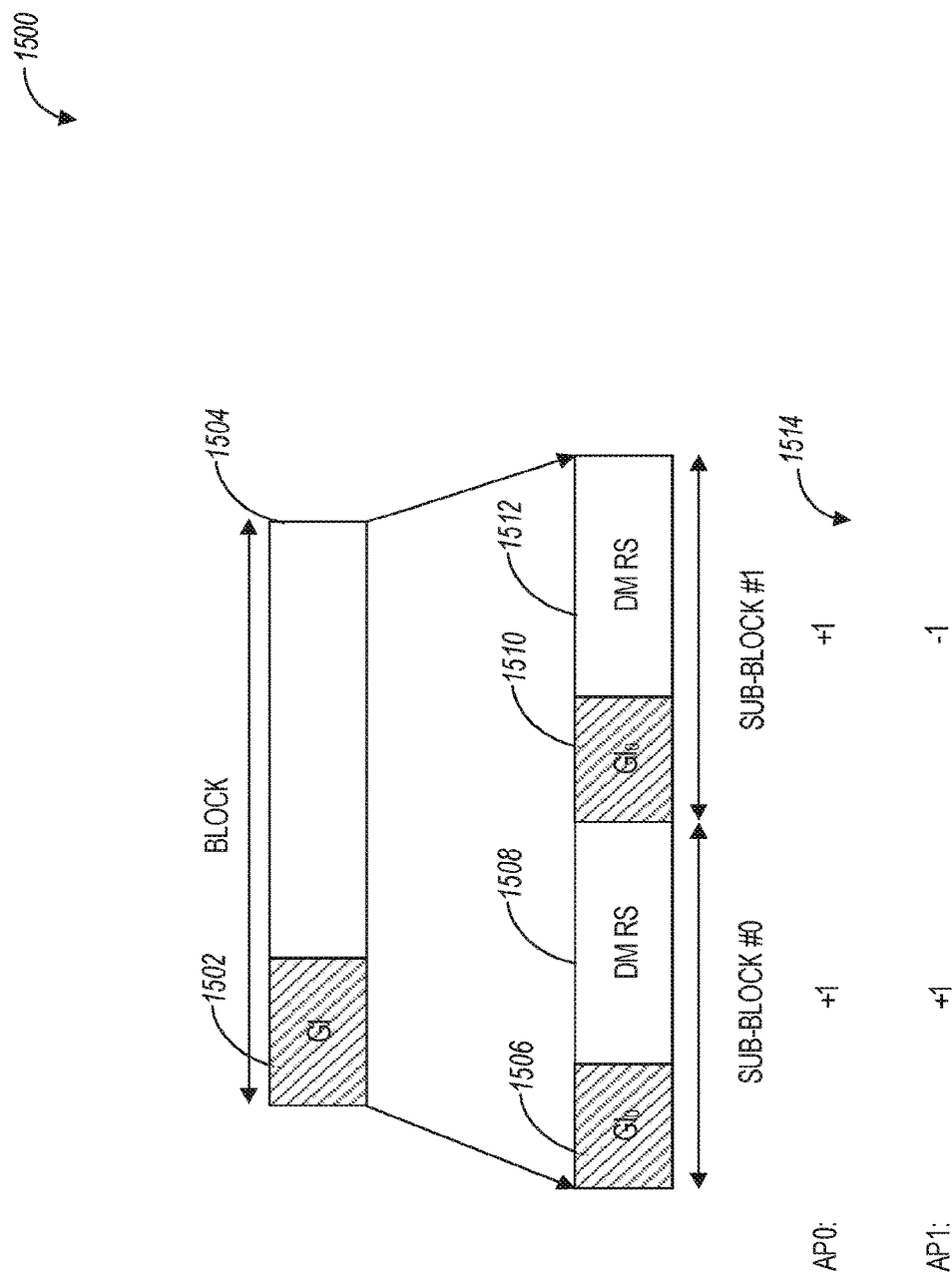
FIG. 15 illustrates OCC for DM-RS generation on a sub-block level, in accordance with some aspects.

FIG. 15 illustrates OCC for DM-RS generation on a sub-block level, in accordance with some aspects. Referring to FIG. 15, diagram 1500 illustrates a block 1504 with GI 1502. In some aspects, the block 1504 can be sub-divided to sub-blocks 1508 and 1512, including corresponding GIs 1506 and 1510. In some aspects, the GIs 1506 and 1510 can be the same, and can be based on the GI 1502 (e.g., a subset of the GI 1502). As illustrated in FIG. 15, OCC 1514 are applied (for AP #0 and AP #1) on a sub-block level, to sub-blocks 1508 and 1512.

In some aspects, a combination of the above techniques can be used for DM-RS generation for system operating above 52.6 GHz.

In some aspects, CSG and/or Zadoff-Chu sequences can be used to generate a DM-RS sequence. In some aspects, the block-wised orthogonal cover code can be applied for DM-RS sequence in the time domain. In one aspect, to create 8 DM-RS APs, 4 cyclic shifts can be applied for DM-RS sequences, and 2 DM-RS APs based on block-wised OCC with $N_{comb}=2$ can be used to generate two orthogonal DM-RS APs. In this case, a total of 8 DM-RS APs can be multiplexed in a FDM and CDM manner.

In some aspects, CSG and/or Zadoff-Chu sequence can be used to generate DM-RS sequences. In some aspects, the sub-block based DM-RS design can be applied. In one aspect, to create 8 DM-RS APs, 4 cyclic shifts can be applied for DM-RS sequences and 2 sub-blocks can be used wherein one group of DM-RS APs is included in one sub-block. In this case, a total of 8 DM-RS APs can be multiplexed in a TDM and CDM manner.

In some aspects, as phase noise may result in discontinuous phase in consecutive symbols, the size of a block or sub-block for DM-RS can be determined by the phase noise level as well as subcarrier spacing (SCS). In some aspects, the UE can report its preferred block/sub-block size for DM-RS per SCS or across all SCS. In some aspects, the gNB can configure the block/sub-block size for DMRS based on this information by RRC and/or DCI per sub-carrier spacing (SCS) or across all SCS.

Reference signal design for DFT-s-OFDM waveform for system operating above 52.6 GHz.

As discussed herein, to reduce PAPR for system operating above 52.6 GHz carrier frequency, DFT-s-OFDM based waveform can be applied for DL transmission.

In some aspects, Type 1 DM-RS structure and corresponding DM-RS sequences (based on CGS and Zadoff-Chu (ZC) sequence as defined for NR PUSCH can be reused for DM-RS for DFT-s-OFDM based waveform for above 52.6 GHz carrier frequency. More specifically, for 1-symbol DM-RS, 2 combs can be assigned to differentiate two DM-RS APs, and 2 cyclic shifts are applied for CGS and ZC sequences. In this case, a total of 4 DM-RS APs are defined for 1-symbol DM-RS. Similarly, for 2-symbol DM-RS, on top of 1-symbol DM-RS, time domain length-2 OCC is applied. In this case, a total of 8 DM-RS APs can be defined for a 2-symbol DM-RS.

Additionally, since the subcarrier spacing (SCS) for communications operating above 52.6 GHz carrier frequency could be larger than that for below 52.6 GHz case, the repetition factor for DM-RS may be smaller, e.g. 1 or configurable. In some aspects, the repetition factor for DM-RS can be determined by SCS, or be configured by RRC signaling, and/or DCI.

FIG. 16 illustrates DM-RS structures 1602 and 1604 for a DFT-s-OFDM waveform for downlink communications for systems operating above 52.6 GHz carrier frequency, in accordance with some aspects. In FIG. 16, 4 and 8 DM-RS APs are defined for 1 and 2 front-loaded DM-RS symbols, respectively.

In some aspects, a system and method of wireless communication for a 5G or NR system provides transmission, by a gNB, of a DM-RS associated with a PDSCH for system operating above 52.6 GHz carrier frequency. The system further provides transmission, by a UE, of a DM-RS associated with PUSCH for system operating above 52.6 GHz carrier frequency. In some aspects, CGS and/or a Zadoff-Chu sequence in time and/or frequency domain can be used for DM-RS sequence generation for SC-FDE based waveform. In some aspects, base sequence hopping can be initialized as a function of one or more following parameters: slot index or SC-FDE block index within one slot, and/or a configurable ID. In some aspects, different cyclic shift values can be employed for different DM-RS antenna ports (AP), where cyclic shift hopping pattern can be defined as a function of symbol/block/sub-block index and/or a configurable ID. In some aspects, a GI sequence is inserted before and after the DM-RS sequence within one SC-FDE block. In some aspects, a length of the DM-RS sequence is equal to the FFT size. In some aspects, within one SC-FDE block, the last part of a DM-RS sequence is repeated as a GI sequence and is mapped at the beginning of one block. In some aspects, the block-wised orthogonal cover code can be applied for DM-RS sequence in the time domain. In some aspects, the number of combs may be predefined in the specification or configured by higher layers via NR minimum system information (MSI), NR remaining minimum system information (RMSI), NR other system information (OSI), or radio resource control (RRC) signaling. In some aspects, one block of SC symbols can be divided into multiple sub-blocks, where each sub-block includes both a GI and DM-RS sequence. In some aspects, an OCC can be applied on a DM-RS sequence in the time domain to create multiple DM-RS APs, where the OCC can be applied on a sub-block or a block level. In some aspects, a combination of the above techniques can be used for DM-RS generation for system operating above 52.6 GHz carrier frequency. In some aspects, CSG and/or Zadoff-Chu sequences can be used to generate DM-RS sequences, where block-wised orthogonal cover code can be applied for DM-RS sequence in the time domain. In some aspects, CSG and/or Zadoff-Chu sequences can be used to generate DM-RS sequences, where sub-block based DM-RS design can be applied. In some aspects, the size of a block or sub-block for DM-RS can be determined by the phase noise level as well as subcarrier spacing (SCS). In some aspects, Type 1 DM-RS structure and corresponding DM-RS sequences (based on CGS and ZC sequence) as defined for NR PUSCH can be reused for DM-RS for DFT-s-OFDM based waveform for above 52.6 GHz carrier frequency.

Techniques disclosed herein include methods to support forward compatibility and integration of new features for NR vehicle-to-vehicle (V2V) communications, as described below.

Future NR-vehicle-to-everything (V2X) releases can have seamless coexistence with the previous NR-V2X releases. Therefore, early provisions of forwarding compatibility aspects to simplify overall system evolution are of high importance. In some aspects, it is expected that a basic set of technology components to enable sidelink communication in application to V2V communication will be specified in NR V2X standardization. Any other enhancements targeting evolved use cases, scenarios, and requirements may be specified subsequently. Therefore, forward compatibility aspects in the first phase of the NR V2X standardization may be important.

In the UE-to-UE communication environment, i.e. sidelink communications, there may be no built-in forward compatibility mechanism as in cellular communication which is based on centralized eNB/gNB scheduling implementation, UE capabilities, and categories, etc. Ensuring forward compatibility or coexistence is one of the major issues for a distributed mode of communication in application to V2X services.

The forward compatibility issues may at least include the following:

(1) Coexistence of different transmission time intervals (TTIs)/numerologies/RATs. Potential operation with different time scales, different TTI duration using the same or different numerology within single or multiple RATs. It is well studied during the Rel.14-15 V2X (so-called V2X phase 2) work that integration of sidelink short TTI operation in the same spectrum using sidelink long TTI (1 ms) as a legacy physical structure may cause issues for the UEs, which assume only long TTI operation, i.e. legacy UEs.

(2) Seamless integration of new features. Introduction of any new physical channels and procedures may negatively affect channel access and overall performance of legacy UEs. For example, if some resources are allocated for a new physical channel, e.g. positioning signal or discovery signal, but the legacy UE assumes them to have the legacy physical structure of shared or control channel, it may provide mismatched measurements for sensing procedure and channel access if supported.

(3) Compatible and extensible control signaling. As a more concrete example, in some cases, the new feature may require new control signaling to indicate additional parameters and assist new procedures. Such new signaling may not be properly decoded by legacy UEs that may impact channel access procedures.

Techniques to preserve forward compatibility in NR V2X systems are discussed herein. In particular, the following novel techniques are described herein:

(1) Mechanisms of the configuration of shortest/reference transmission duration and/or reference physical structure/format in a V2X communication system and alignment of boundaries for channel access.

(2) Mechanisms of preserving operation for legacy channel access schemes by utilizing physical structure-aware and physical structure unaware components of channel access procedures; configuration of reserved resources.

(3) The mechanism to enable forward compatible sidelink control channel design.

In some aspects, forward compatibility in cellular systems can be resolved by keeping most of the configurations to be UE-specific and be configurable, so that gNB maintains a desired and applicable configuration based on UE specific indication/scheduling approaches. Additionally, a mechanism of reserved resources was introduced to exclude particular spectrum resources which may be used by future technologies or other existing technologies for other purposes/new functionality. A similar mechanism was also used in LTE, where MBSFN subframe patterns were provisioned and utilized for different purposes at later stages. In Rel.14-15 V2V, except a mechanism of resource pool configurations and availability of a few reserved bits in SCI format, there were no dedicated mechanisms specified based on forwarding compatibility considerations.

In V2V communication systems, forward compatibility becomes critical, since UEs communicate in the distributed mode so that each UE may be interested in receiving signals from other UEs. Moreover, the distributed mode may also employ a channel access scheme based on sensing which may involve control channel decoding, that further complicates the introduction of any new signaling being undecodable by legacy UEs.

Multiplexing of Transmissions with Different Durations/Numerologies.

In some aspects, NR V2X can be configured to support shorter minimum transmission durations than 1 ms LTE V2X in order to facilitate lower latency communications, robustness in high-speed channel conditions, reduced sensitivity to the half-duplex problem and in-band emissions, etc. At the same time, the need for transmissions with a longer duration is still there since it provides reduced overhead, increased link budget (long-range transmissions) and can be also used in case of potential co-existence with LTE V2X which operates using 1 ms TTIs (subframes).

In this section, the following techniques for multiplexing of sidelink transmissions with different durations are described: introduction of configurable reference time-scale for sidelink communication; configuration of gap/AGC occasions or channel access time occasions; and flexible transmission format (or slot format).

Introduction of Configurable Reference Time-Scale for Sidelink Communication.

In some aspects, the shortest time-scale (reference time-scale) for all UEs may be defined with respect to NR slot duration in given numerology configured by parameter $\mu=0$, 1, 2, 3, where $15 \cdot 2^\mu$ kHz is the subcarrier spacing, wherein the slot is composed of 14 symbols in case of normal CP, or 12 symbols in case of extended CP. As an example, $\mu=2$ (i.e. 60 kHz SCS) may be specified to define the shortest transmission duration (reference time scale) for NR V2X, which is around ~0.25 ms (exact duration depends on slot position within 1 ms scale because of different CP duration in symbols every 0.5 ms).

In some aspects, the shortest time-scale (reference time scale) for UEs operating in the same part of the spectrum, i.e. in the same resource pool may be configurable by UE-group specific semi-static signaling. The semi-static signaling may be performed by RRC configuration or sidelink MIB or pre-configuration signaling.

In some aspects, the gap duration and AGC settling time are not dependent on numerology (subcarrier spacing and respective symbol duration), however, the minimum granularity of gaps and AGC duration may be expressed by symbols of given numerology. For example, when absolute retuning time taking into account possible timing advance is around one 60 kHz symbol duration (~17 us), the possible granularities of the retuning/switching gap are as follows:

TABLE 2

Minimum gap duration for a given numerology

| Subcarrier spacing | Gap duration |
|---|---|
| 15 kHz ($\mu = 0$) | 1 symbol |
| 30 kHz ($\mu = 1$) | 1 symbol |
| 60 kHz ($\mu = 2$) | 1 or 2 symbols |
| 120 kHz ($\mu = 3$) | 2 symbols |

In some aspects, when a UE is configured with multiple possible transmission durations longer than or equal to the shortest time scale (reference time scale), it is expected to follow the shortest time scale for performing automatic gain control (AGC) at the receiver side and channel estimation related receiver procedures as well as insert AGC-related symbols/signals when performing transmission. This is illustrated in FIG. 17, where two different numerologies with subcarrier spacing 30 kHz (p=1) and 60 kHz (p=2) are shown.

FIG. 17 illustrates configuration 1700 of the shortest transmission duration by NR slot numerology, in accordance with some aspects. Referring to FIG. 17, in case the shortest time scale is associated with p=1, then the AGC symbols are inserted in the beginning of every 0.5 ms while the gap symbol is inserted in the end of every 0.5 ms. That may also imply that the minimum AGC duration corresponds to the symbol in 30 kHz, therefore 2 symbols in 60 kHz are assumed for AGC in such an example. Note, that gap symbol may still be one depending on UE capabilities. In case the shortest time scale is associated with p=2, then the AGC symbols are inserted in the beginning of every 0.25 ms while the gaps symbol is inserted in the end of every 0.25 ms as it is shown in the bottom left hand side part of the figure.

In some aspects, similar behavior can be expected when single numerology is used but the transmission duration is less than 14 symbols. For instance, if a single transmission can occupy 2, 4, 7 symbols then every 2, 4 or 7 symbols there is an AGC symbol and AGC update rate is equal to every 2, 4, or 7 symbols.

Configuration of Gap/AGC Occasions/Channel Access Time Occasions.

In some aspects, a system-wide resource pool-specific and/or carrier specific pattern with AGC symbols and retuning/turn-around gaps may be defined. The configuration of such a pattern may comprise a periodicity of AGC/gaps, offset relative to a known reference point (e.g. System Frame Number zero or UTC timer modulo maximum system frame number plus an offset), and an AGC/gap duration.

Figure 18:
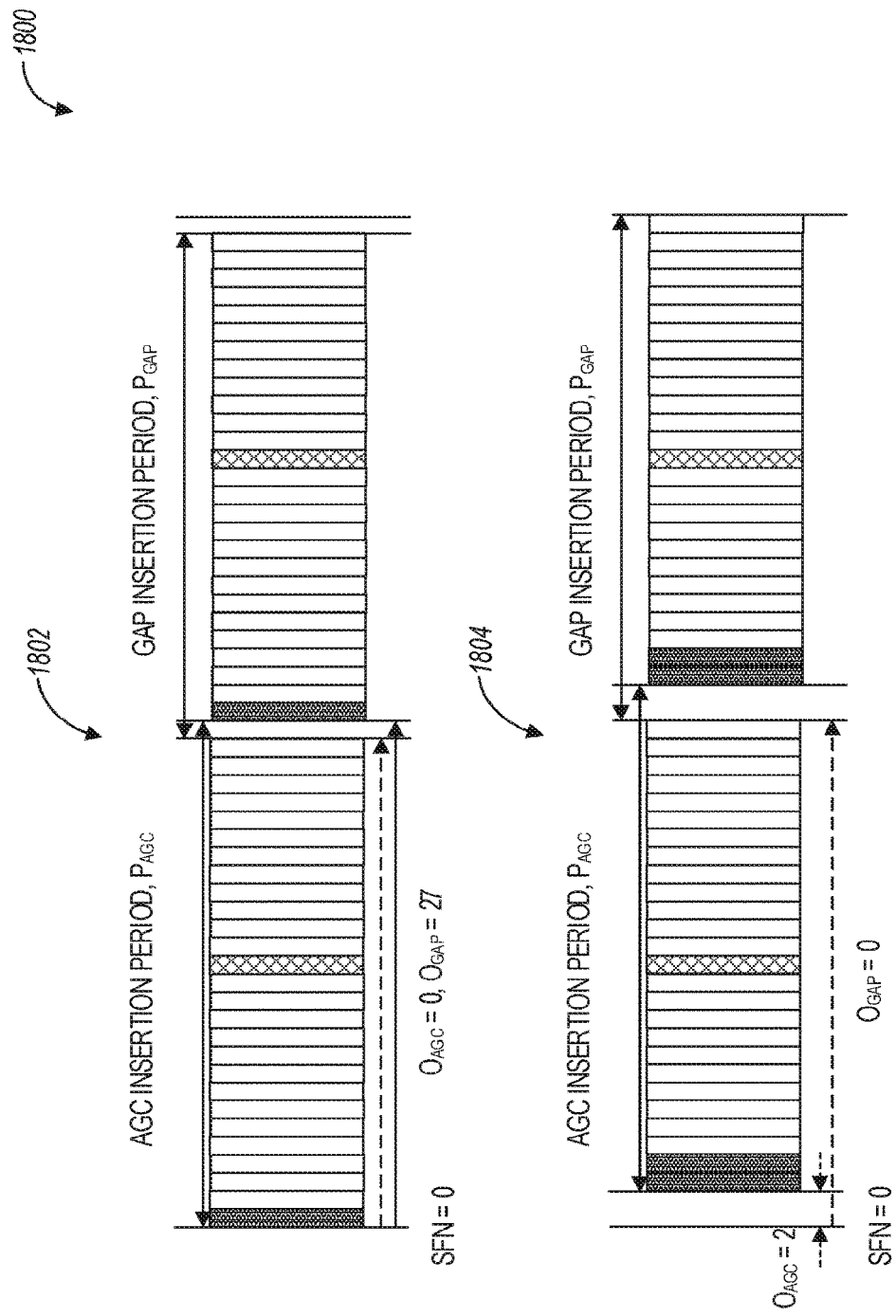
FIG. 18 illustrates the configuration of explicit AGC and gap patterns, in accordance with some aspects.

FIG. 18 illustrates configuration 1800 of explicit AGC and gap patterns, in accordance with some aspects. As a further advancement, multiple such patterns may be defined to form a more sophisticated overall pattern if needed. That concept is illustrated in FIG. 18, where the AGC insertion period denoted as $P_{ACC}$ is equal to 28 symbols, gap insertion period denoted as $P_{GAP}$ is equal to 28 symbols. In the top example, the duration of both AGC and gaps occasions is one symbol, the offset of AGC occasions relative to SFN #0 is 0, the offset of gap occasions relative to SFN #0 is 27 symbols. In the bottom example duration of both AGC and retuning occasions is two symbols, while AGC offset is 2 and gap offset is 0. The benefit of this approach is that it can be defined in numerology independent manner and can be viewed as a configuration of periodical sidelink channel access time instances, so that any UE is expected to transmit at AGC occasions if it wants to utilize resources in between channel access time instances. In this case, the shared AGC time instances can be used independently of starting point for transmission.

Flexible Transmission Format (or Slot Format).

In some aspects, the structure of channel access time instances, gaps, and AGC symbols may be derived from a slot format. The slot format may either be predefined or semi-statically configured or dynamically signaled or a combination thereof, and be a function of numerology which is characterized by subcarrier spacing (and CP type in case of 60 kHz SCS). Similar to NR slot formats in DL and UL, the symbols in a slot may be marked as 'S' (sidelink), 'X' (unknown), and 'G' (gap). In that case, the 'S' symbols are assumed to be always used for sidelink transmission by UEs in a given radio access technology (RAT) during channel access attempts/events, the 'X' symbols may or may not contain signals including signals of current RAT or other RATs, and the 'G' symbols are assumed to be unused by current RAT. Alternatively, there may be no 'G' indication assuming all potential gaps are conveyed in 'X' symbols.

In that context, the channel access time instances may be implicitly derived as any first 'S' symbol after any 'G' or 'X' symbol. Alternatively, an explicit symbol type, for example, 'A' may be defined to denote the channel access time instances. It may have the same associated functionality and procedures as 'S' but may also be associated with the starting position of transmissions between neighboring 'A' symbols.

An example of such a slot format may be illustrated via a sequence of 14 or 12 characters depending on CP length, where each of the characters may take a value from the set {S, X, G}. The resulting configuration is assumed to be repeated across all slots or symbols within a V2V resource pool. Using this notation, the LTE V2V subframe structure may be mimicked as follows: |S|S|S|S|S|S|S|S|S|S|S|S|S|G|. Other examples may include the following:

- |G|S|S|S|S|S|S|S|S|S|S|S|S|G|—a slot format with a 1-symbol gap in the beginning and a 1-symbol gap in the end. Here, channel access time instances are symbols #1 in every slot of 14 symbols;
- |S|S|S|S|S|S|S|S|S|S|S|S|S|X|—a slot format with 1 flexible symbol in the end allowing UE to transmit in this symbol in case no RF retuning or RX/TX switching is expected due to e.g. UE capability or due to transmission in consecutive slots. Here, channel access time instances are symbols #0 in every slot of 14 symbols;
- |S|S|S|S|S|S|S|G|S|S|S|S|S|S|S|G|—a slot format with 7 symbol reference time scale where retuning, RX/TX switching is allowed at 7-symbol granularity. Here, channel access time instances are symbols #0 and #7 in every slot of 14 symbols, or in other words, every first symbol with a periodicity of 7 symbols;
- |S|S|S|S|S|S|S|X|X|X|X|X|X|G|—a slot format with 7 symbols guaranteed to be transmitted by UEs in case of access to channel and with 6 symbols which may not be present depending on particular UE transmission scheduling decision, e.g. to perform a shorter transmission. Here, channel access time instances are symbols #0 in every slot of 14 symbols although it is allowed to stop or resume transmission in 'X' symbols if UE accessed the slot from the first 'S' symbol; and
- S|X|X|X|X|X|X|X|X|X|X|X|X|G—a slot format with 1 symbol guaranteed to be transmitted by UEs in case of access to channel and with 12 symbols which may not be present depending on particular UE transmission scheduling decision. This option may be also seen as so-called "shared AGC symbol" configuration, where UE is always required to transmit in the first symbol for AGC settling purposes while may or may not transmit in any other 'X' symbols.

In some aspects, depending on the configured slot format and/or AGC and gap instances, the UE may be expected to follow the resulting physical structure during transmission, reception, and channel access procedures. An important condition to accessing resources in accordance to the configured channel access time is that UE should not attempt to transmit within the channel access time window if not transmit anything at the beginning of the window (this processing may be needed for UEs to perform basic procedures such as AGC settling and/or LBT).

Assuming the retuning/switching gap is only needed for RX/TX turn-around or RF retuning to another combination of center frequency and channel bandwidth, the UE may not be required to insert gap symbols in every TTI if transmitting in consecutive-in-time channel access opportunities. Such behavior may be controlled in different ways and may be a function of UE capabilities. In one aspect, explicit semi-static configuration signaling may be defined to indicate the possibility of skipping gap instances in those cases. Alternatively, in case of a slot format indication mechanism, if the channel access time instance is preceded by 'X' symbol, it may also be used for sidelink transmission in those cases.

In some aspects, the above-introduced slot format is configured to a UE semi-statically e.g. as part of sidelink resource pool configuration. There may be a limited set of different slot formats supported by the specification, and an index of particular slot format may be signaled to the UE. Additionally, a sophisticated pattern may be composed by repeating and concatenating two or more slot formats.

In some aspects, the slot format for V2V communication may need to take into account also the cellular operation of a UE. In that case, the slot format for cellular communication (UL and DL) expressed by 'D', 'U', and 'X' may need to be aligned with the configured sidelink slot format in case of, e.g., co-existence of SL and UL in the same spectrum. In some aspects, in that case, UE may not be expected to be configured with UL-DL and sidelink slot formats with conflicting transmission directions, in other words, the UE should not be configured with symbol 'S' conflicting with symbols 'D' or 'U' in the cellular slot format. Furthermore, in some cases, it may be beneficial to configure different slot formats for transmission and reception at sidelink in V2V communication.

Channel Access Design for Seamless Integration of New Features and Physical Channels.

In some aspects, the initial version of NR V2X specification may support basic physical channel design and UE procedures with channel access schemes suitable for a variety of use cases such as extended sensors sharing and advanced driving. Further enhancements such as support of positioning/ranging, relaying, etc. are expected to be introduced in later releases. However, the introduction of new physical channels and features, in general, should not degrade performance in case of the mix of legacy UEs and new UEs. Having this in mind, it can be concluded that the new services/features may need to follow the channel access procedures designed for the legacy version of NR V2X or to follow separate channel access procedure if the resources are confined for these new services only.

In some aspects, resources may be defined in the way to be properly interpreted and used in both legacy systems and future systems. For that, it is natural to use the definitions from NR specification such as subcarrier and symbol for a given sub-carrier spacing and CP type. A given subcarrier within a given symbol composes the smallest resource unit referred to as a resource element (RE). Furthermore, the basic schedulable unit composed of 12 consecutive REs in frequency comprises a physical resource block (PRB) in frequency and a slot in the time domain. The slot is composed of 14 symbols for the case of normal CP and 12 symbols for the case of extended CP.

In some aspects, a channel selection procedure for NR V2X may be defined such as it takes into account both signals with the known physical structure and with an unknown or uncertain physical structure that can be potentially introduced in later releases. That is, the channel access procedure based on sensing and resource selection may be composed of two sub-procedures (or UE behaviors):

In some aspects, Procedure 1 (P1) which is physical signal structure-aware (e.g. sensing and resource selection for channel access is performed assuming known physical structure). The P1 may employ control channel detection and decoding, and shared channel demodulation algorithms. As an example, in Rel.14 LTE V2V design P1 is represented by resource exclusion procedure based on PSCCH decoding, PSSCH RSRP measurements, and detected PSCCH sidelink priority. A similar approach may be used in NR V2V design. Additionally, depending on NR V2X design details, this procedure may also include any listen-before-talk and back-off steps involving specific NR preamble detection known to UEs. Moreover, any congestion control steps involving knowledge of the decoded control channel may also be considered as part of P1.

In some aspects, Procedure 2 (P2) is transparent to physical structure (i.e. unaware about the physical structure of signals sharing the same channel). The P2 may only use energy and/or power measurements. As an example, in Rel.14 LTE V2V design the P2 is represented by RSSI measurements over certain resources in a certain window and forming a candidate resource set by sorting them according to RSSI measurements. The same basic step may also be included in NR V2V channel access procedure P2. Besides that, the P2 in NR V2V may also include any listen-before-talk and back-off steps involving energy detection without knowledge of specific preamble.

In some aspects, a set of reserved spectrum resources may be configured to a UE where it may perform channel access procedure P2 while does not perform P1 and does not attempt to process control and shared channels. Alternatively, for each group of resources for V2V communications, whether to perform {P1} or {P2} or both {P1 and P2} or {none} of them may be indicated as part of a resource pool configuration.

In some aspects, when both procedures are performed by a UE in a given resource set, it may be beneficial to configure the order of P1 and P2. In that context, a UE may be configured to follow either P1 first and P2 second or P2 first and P1 second.

In some aspects, a set of reserved spectrum resources may be configured to a UE where it does not assume any type of transmission and does not account these resources in channel access procedure. The same could also be achieved by excluding these resources from resource pools for control and data channels.

Mechanisms of Forwarding Compatible Control Channel Design.

In some aspects, forward compatible control channel design techniques are presented. It is assumed that legacy UEs and future forward-compatible UEs perform the same basic channel access procedure which may be based on channel sensing methods. The channel access procedure may exploit control information conveyed with a part or all data transmissions or transmitted separately from data. In that case, it is important to allow legacy UEs to decode at least a part of control information transmitted by future UEs to maintain the basic sensing steps.

In some aspects, an SCI format includes the following at least two parts:
(1) The first part, L-SCI, carries information/fields that may be used for channel access procedure, i.e. legacy SCI information; and
(2) The second part, X-SCI, carries information which is not used for the purpose of channel access procedures.

In some aspects, future UEs may still need to provide L-SCI information as legacy UEs but may have more flexibility in setting/defining content of X-SCI fields. Potential SCI content for the two introduced parts is summarized in Table 3 and Table 4 below:

TABLE 3

Example L-SCI content

| Field | Description |
| --- | --- |
| L-SCI format/version indicator | L-SCI format indicator, e.g. different channel access schemes like TX-based sensing, RX based sensing, or a combination thereof |
| RB assignment | Frequency domain resource assignment for shared channel transmission |
| Symbol assignment and repetitions | Time domain resource assignment for shared channel transmission |
| Transmission power, if applicable | If applicable, quantized transmission power level |
| Transmission mode | DM-RS parameters and/or transmission mode implying DM-RS structure |
| Priority | Priority level used for channel access procedures |
| Location-information | Geographical information that may be used in channel access procedures, for example for distributed location-based resource allocation |

TABLE 3-continued

Example L-SCI content

| Field | Description |
|---|---|
| L1 identity | Identity of the link may be either TX id, RX id, or link id. Relates to different communication modes, such as broadcast, groupcast, unicast |
| X-SCI format/version indicator | X-SCI format indicator, which is associated with current total SCI transmission. Needs to be included in L-SCI in case it is not possible to decode X-SCI without format knowledge due to one or a combination of different physical structure, different size, different scrambling. |
| X-SCI resource indication | RB assignment and symbol/slot assignment for X-SCI, if applicable. That field may present if L-SCI points to X-SCI resources |
| Reserved Bits | Reserved bits may need to be added for future extension of L-SCI functionality keeping the overall SCI decodable for legacy UEs. In that case, if configured with reserved bits, a UE does not assume them to take any value. |

TABLE 4

Example X-SCI content

| Field | Description |
|---|---|
| X-SCI format/version indicator | Potentially may be included to distinguish between different formats of the same size |
| MCS | MCS/TBS indication |
| MCS table | In case multiple different tables are adopted, e.g. with maximum supported modulation of 16 QAM, 64 QAM, 256 QAM, 1024 QAM, an indicator of the particular table may be needed |
| DFT-s-OFDM or OFDM waveform selector | In case both OFDM and DFT-s-OFDM (i.e. SC-OFDM) waveforms are supported for sidelink NR communication, a flag in SCI may be needed to switch between waveforms, i.e. to disable or enable transform pre-coder application |
| HARQ feedback | Feedback information for acknowledgments or negative acknowledgment in response to shared channel or control channel reception, i.e. ACK or NACK |
| NDI | New data indicator, in the case of TX-based scheduling |
| Feedback timing | HARQ feedback timing, i.e. slot and symbol offset for HARQ feedback transmission with respect to the instance of SCI reception with this field |
| Channel quality information | Channel quality information and/or measurement information including both request and response |
| Positioning or ranging procedure related information | The positioning or sidelink ranging procedure related information |
| Reserved Bits | Reserved bits may need to be added for future extension of X-SCI functionality keeping the overall X-SCI decodable for legacy UEs. In that case, if configured with reserved bits, UE does not assume them to take any value. |

In some aspects, the following two general approaches on how to convey the two SCI parts in physical sidelink control channel (PSCCH) can be used:

Alternative 1:

In some aspects, the two parts of SCI, L-SCI, and X-SCI, as indicated above may be transmitted inside the same physical channel, for example, the physical sidelink control channel (PSCCH) and encoded together so that there is a single CRC, single scrambling, and single DFT pre-coder if applicable. In that case, all UEs may need to be able to decode the whole PSCCH in order to extract at least L-SCI part for channel access procedures. In other words, in this case, L-SCI and X-SCI are just parts of the same total SCI.

That implies that the size of the total SCI content, scrambling, and the size of L-SCI needs to be known to a UE. Hence, the total size either needs to be fixed in the specification or be a function of some other system-wide parameters such as carrier bandwidth. Alternatively, the total size of SCI may be configured in a known range [min_SCI_size . . . max_SCI_size] semi-statically by RRC, or by sidelink MIB, or by pre-configuration.

Figure 19:
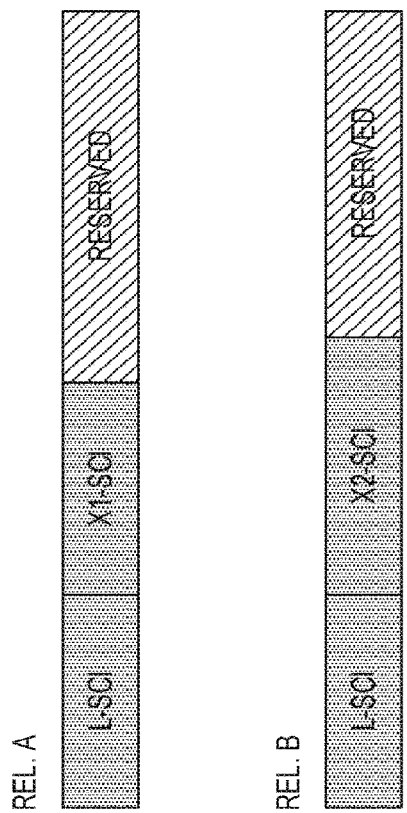
FIG. 19 illustrates legacy sidelink control information (L-SCI) and SCI information not used for channel access procedure (X-SCI) encoded as part of the same total SCI, in accordance with some aspects.

In that aspect, the X-SCI may be encoded as part of reserved bits of the total SCI format. The reserved bits may not be assumed to be set to any value during decoding by a UE. In the same time, the L-SCI part may be viewed as all mandatory present fields in current system environment (e.g. carrier bandwidth, TDD or FDD, shared or dedicated spectrum, etc.) while the X-SCI are configurable and conditionally present fields. This approach is sketched in FIG. 19, where the X-SCI part may vary from release to release while L-SCI and the total SCI size are kept unchanged. FIG. 19 illustrates a diagram 1900 with legacy sidelink control information (L-SCI) and SCI information not used for channel access procedure (X-SCI) encoded as part of the same total SCI, in accordance with some aspects. As it is also mentioned in Table 4, a header field for X-SCI may be included in L-SCI in order to distinguish different versions/releases of X-SCI.

Figure 20:
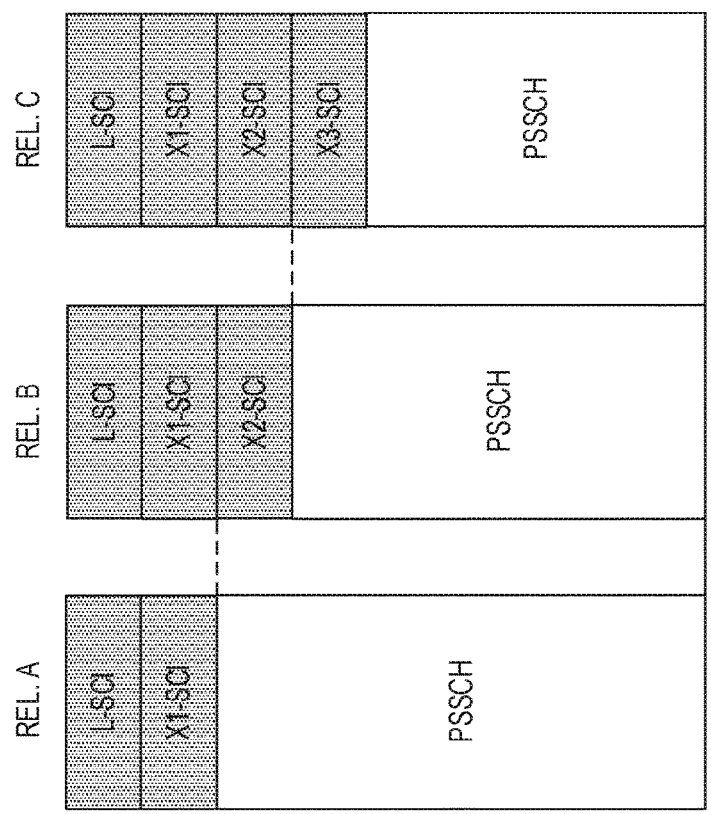
FIG. 20 illustrates L-SCI and X-SCI encoded separately in a nested manner, in accordance with some aspects.

Alternative 2:

In some aspects, L-SCI and X-SCI may be transmitted in different physical channels, e.g. PSCCH, encoded, scrambled separately. In that case, the L-SCI may carry a pointer to resources where X-SCI or X-SCI plus data are transmitted. In the same time, first X-SCI may carry a pointer to other SCI and/or data so that such nested structure is understood by UEs supporting this X-SCI format, e.g. future introduced UEs. In FIG. 20, an example transmission structure of PSCCH and PSSCH for different releases is illustrated. More specifically, FIG. 20 illustrates a diagram 2000 with L-SCI and X-SCI encoded separately in a nested manner, in accordance with some aspects.

Figure 21:
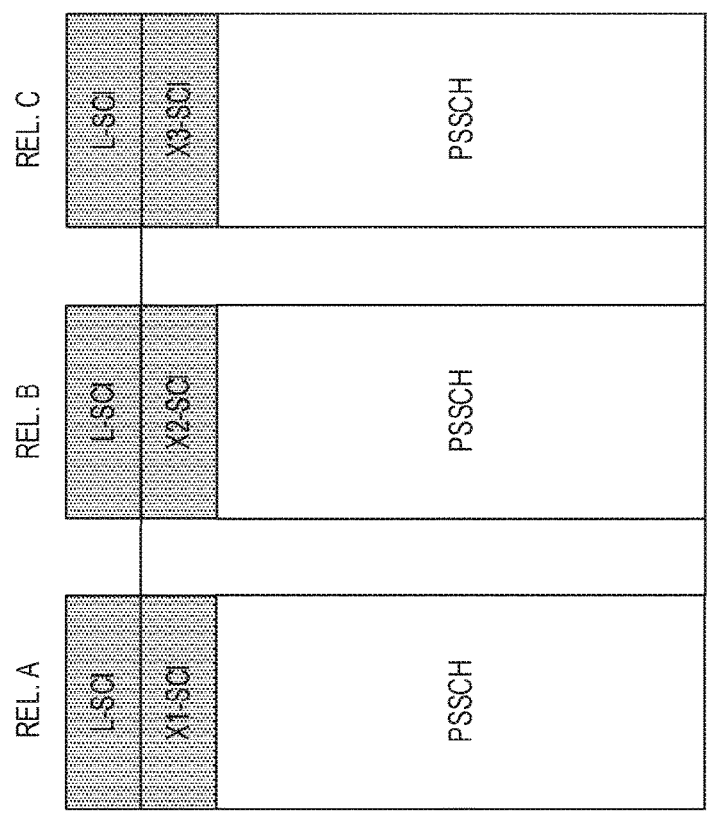
FIG. 21 illustrates L-SCI and X-SCI that are encoded separately, in accordance with some aspects.

In FIG. 21, another option of forwarding compatible control signaling structure is illustrated where each X-SCI is release specific, while L-SCI has a pointer to the X-SCI. More specifically, FIG. 21 illustrates a diagram 2100 where L-SCI and X-SCI are encoded separately, in accordance with some aspects.

In some aspects, L-SCI may point to spectrum resources where a legacy UE may only expect shared channel transmission as it is currently done for Rel.14-15 V2V communication.

In some aspects, the X-SCI may be carried at the MAC layer as a MAC control element (CE) within PSSCH and be identified by a dedicated logical channel ID. This processing may need the UE to perform PSSCH demodulation and decoding first to extract X-SCI. Such behavior may still be acceptable for the types of X-SCI carrying control information not directly involved into PSSCH demodulation and channel access procedures, such as HARQ-ACK feedback, measurements for channel quality, and/or positioning/ranging, etc.

In some aspects, a system and method of forwarding compatible V2V communication in a 5G or NR system includes configuring, by a network, of channel access time instances and AGC/retuning time instances explicitly or implicitly; performing, by a UE, physical structure-aware and physical structure unaware channel access procedures; and transmitting and receiving, by a UE, legacy sidelink control information (SCI) part and non-legacy SCI part.

Aspects for multiplexing of transmissions with different durations/numerologies/RATS are disclosed as follows. In some aspects, the channel access time instances are derived from the shortest time-scale (reference time-scale) for all UEs. In some aspects, the shortest time scale may be defined with respect to NR slot duration in given numerology configured by parameter $\mu$=0, 1, 2, 3, where $15 \cdot 2^\mu$ kHz is the subcarrier spacing. In some aspects, the shortest time scale for UEs operating in the same part of the spectrum may be configured by UE-specific semi-static signaling which may be either RRC configuration or sidelink MIB or a pre-configuration. In some aspects, the channel access time instances and respective AGC and gap insertion instances are configured explicitly by semi-static signaling. In some aspects, the channel access time instances are configured as and offset to known time reference (e.g., SFN=0, UTC, etc.) and a period between channel access instances. In some aspects, the gap insertion instances are configured as and offset to known time reference (e.g. SFN=0, UTC, etc.) and a period between gap insertion instances. In some aspects, a sidelink slot format for V2V communication may be defined to derive the structure of channel access time instances, gaps, and AGC symbols. In some aspects, the slot format may either be predefined or semi-statically configured or dynamically signaled or a combination thereof, and be a function of numerology which is characterized by subcarrier spacing (and CP type in case of 60 kHz SCS). In some aspects, the symbols in a slot may be marked as 'S' (sidelink), 'X' (unknown), and 'G' (gap), where the 'S' symbols are assumed to be always used for sidelink transmission by UEs in a given radio access technology (RAT) during channel access attempts/events, 'X' symbols may or may not contain signals including signals of current RAT or other RATs, and 'G' are assumed to be unused by current RAT. In some aspects, the channel access time instances may be implicitly derived as any first 'S' symbol after any 'G' or 'X' symbol. In some aspects, an explicit symbol type, for example, 'A' may be defined to denote the channel access time instances. It may have the same associated functionality and procedures as 'S' but may also be associated with the starting position of transmissions between neighboring 'A' symbols. In some aspects, the sidelink slot format may be configured separately for transmission and for reception. In some aspects, a UE may not be expected to be configured with UL-DL and sidelink slot formats with conflicting transmission directions.

Aspects for channel access design for forwarding compatibility are disclosed as follows. In some aspects, channel access procedure is based on medium sensing in a signal physical structure-aware manner using procedure 1 (P1) and on medium sensing in signal physical structure unaware manner using procedure 2 (P2). In some aspects, P1 may employ control channel detection and decoding, and shared channel demodulation algorithms including as an example resource exclusion procedure based on PSCCH decoding, PSSCH RSRP measurements and detected PSCCH sidelink priority. In some aspects, P2 may only use energy and/or power measurements including as an example RSSI measurements over certain resources in a certain window and forming a candidate resource set by sorting them according to RSSI measurements. In some aspects, a particular set of resources (e.g. a sidelink resource pool) may be configured to be associated with procedure {P1} or (P2) or both {P1 and P2} or {none} of them. In some aspects, in case both procedures are configured to be associated with particular resources, an order of performing these procedures may be configured as {P1 first, P2 second} or {P2 first, P1 second}.

Aspects of forwarding compatible control signaling design are disclosed as follows. In some aspects, an SCI format for V2V communication consists of at least two parts: the first part, denoted here L-SCI, carries information/fields that may be used for channel access procedure, i.e. legacy SCI info; the second part, denoted here X-SCI, carries information which is not used for the purpose of channel access procedures. In some aspects, the potential content of L-SCI is the following: L-SCI format/version indicator, RB assignment, symbol assignment and repetitions, transmission power, if applicable, transmission mode, priority, location-information, L1 identity, X-SCI format/version indicator, X-SCI resource indication, and reserved bits. In some aspects, the potential content of X-SCI is the following: X-SCI format/version indicator, MCS, MCS table, DFT-s-OFDM or OFDM waveform selector, HARQ feedback, NDI, feedback timing, channel quality information, positioning or ranging procedure related information, and reserved bits. In some aspects, the two parts of SCI may be transmitted inside the same physical channel, e.g. physical sidelink control channel (PSCCH) and encoded together so that there is a single CRC, single scrambling, and single DFT pre-coder if applicable. In some aspects, the total size of SCI is either fixed in the specification or is a function of some other system-wide parameters such as carrier bandwidth or configured in a known range [min_SCI_size . . . max_SCI_size] semi-statically by RRC, or by sidelink MIB, or by pre-configuration. In some aspects, L-SCI and X-SCI may be transmitted in different physical channels, e.g. PSCCH, and encoded, scrambled separately. In some aspects, X-SCI may be carried at the MAC layer as a MAC control element (CE) within PSSCH and be identified by a dedicated logical channel ID.

Techniques disclosed herein can be used for sidelink transmission and reception with reconfigurable bandwidth and center frequency for enhanced V2X (eV2X) communication.

Performance analysis of sidelink based vehicular-to-vehicular (V2V) communication in LTE R14 and R15 has shown that in-band emission (IBE) is one of the key factors limiting the performance of sidelink vehicular communication. The presence of IBE may create significant near-far problems for the reception of signals from distant transmitters in case if a nearby transmitter occupies adjacent frequency resources (i.e., frequency division multiplexing (FDM) in the same subframe). The presence of IBE may lead to system performance saturation even if the amount of sidelink system bandwidth is increased under the same vehicle density and traffic intensity. This is due to the fact that the near-far problem becomes a bottleneck for the overall system performance. If IBE issues are not addressed, then increase of the system bandwidth may not give a desirable effect of the improved system performance. Additionally, overall system performance may be saturated. The similar issue may persist in case of using multicarrier operation or carrier aggregation approach if the leakage among different component carriers (CCs) is relatively large.

Techniques disclosed herein can be used for improving sidelink V2V communication performance in case of wide system bandwidth allocation, so that impact from IBE emission and/or cross CC leakage is reduced. The proposed techniques can be applicable to the NR and LTE V2V/V2X communication systems. Furthermore, similar concepts can be extended for the generic UE transmission mechanisms.

The existing solution LTE V2V system employs sensing and resource selection procedure that helps to improve the sidelink performance at the relatively low/medium system loading levels. Once system loading is increased, the emission and associated near-far problems become the main limiting factors for system performance. One of the potential implementation solutions is to divide the available spectrum into multiple CCs each served by the dedicated TX/RX RF chains using analog/digital filters to suppress out-of-band emission (OOBE) so that the overall level of emission is reduced. This approach is not flexible enough and puts a significant burden on the system design, UE complexity, and implementation since the UE needs to support multiple RF chains. In order to address these issues, techniques disclosed herein can be used to keep the higher levels of spectrum management capabilities, reduce the complexity of UE implementation with a minimum number of TX/RX RF chains capable to process the whole system bandwidth (BW), and reduce the impact of IBE.

Figure 22:
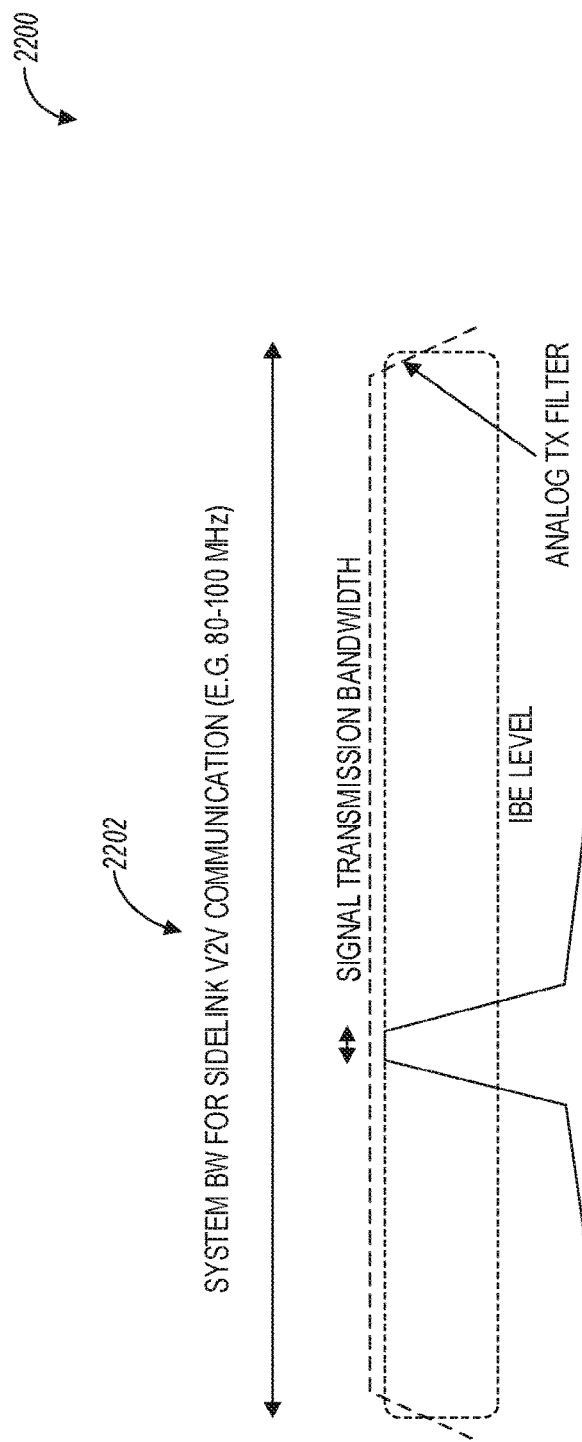
FIG. 22 illustrates sidelink TX/RX bandwidth that is the same as the system bandwidth, in accordance with some aspects.
Figure 23:
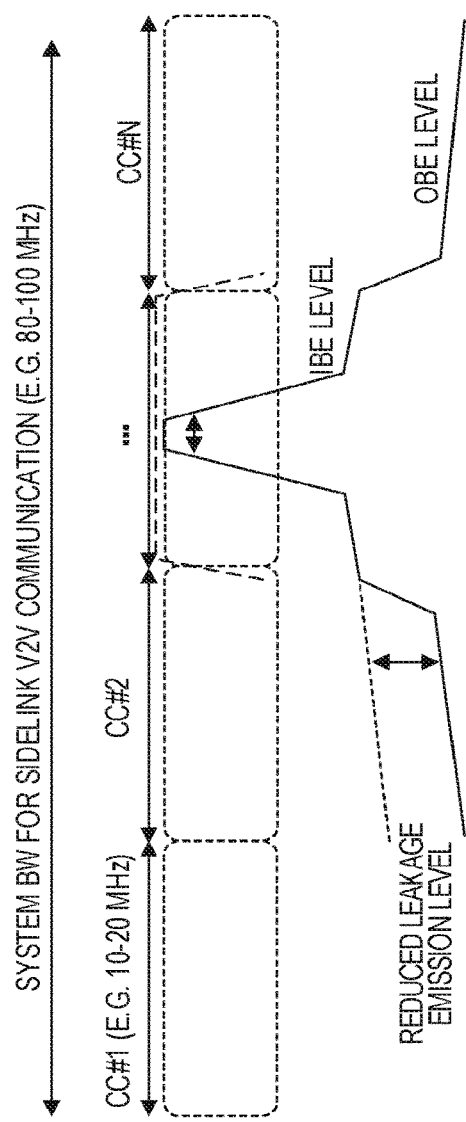
FIG. 23 illustrates multicarrier sidelink communications, in accordance with some aspects.

In general, there are two legacy solutions that can be used for V2X sidelink communication, as illustrated by FIG. 22 and FIG. 23.

Solution #1 (single RF chain) is illustrated in FIG. 22. FIG. 22 illustrates sidelink TX/RX bandwidth 2200 that is the same as the system bandwidth, in accordance with some aspects. In some aspects and as illustrated in FIG. 22, an option for sidelink V2V communication is to align the RF processing bandwidth from the TX and RX perspective with the whole system bandwidth allocated for sidelink V2V communication. In this case, the RF bandwidth of the transceiver is open to cover the entire sidelink system bandwidth. While this option is simple from UE implementation perspective (given that it requires a minimum number of TX/RX chains) its main technical drawbacks are as follows:

(1) From TX perspective, most of the time this option is likely to produce the highest level of IBE injected into the sidelink system BW, assuming that UE does not occupy the whole spectrum for transmission.

(2) From RX perspective, this option may suffer from the increased sensitivity to the in-channel selectivity, given that UE may experience different levels of the received power from different transmitters. The scale of this problem is growing with an increase of the bandwidth since more transmitters are expected to be frequency division multiplexed (FDMed) in the same slot/subframe.

Solution #2 (multiple RF chains) is illustrated in FIG. 23. FIG. 23 illustrates multicarrier sidelink communications 2300, in accordance with some aspects. An alternative approach is to (semi-) statically divide available system bandwidth into the multiple CCs (as illustrated in FIG. 23), each served by a dedicated TX/RX RF chain. Each TX/RX chain may have its own analog/digital filters to suppress the transmitter unwanted emission and reduce the receiver selectivity out of the RF chain bandwidth.

In such a scenario, the UE can reduce the in-band emission and in-channel selectivity. However, such improvement comes at the cost of high UE implementation complexity requiring multiple TX/RX RF chains to be implemented to reduce the level of IBE down to the level of OBE. In addition, it results in inefficient spectrum utilization and fixed partitioning of the spectrum on independent CCs each characterized by its own bandwidth and center frequency.

The main principle behind the proposed techniques is opposite to the traditional approach where available ITS spectrum is partitioned on multiple independent component carriers, each having its own center frequency and BW corresponding to the RF BW of the multiple TX/RX chains. The suggested approach is to use one carrier with a wide sidelink system bandwidth, so that UE can serve it from TX and RX perspective using a single or few TX/RX RF chains (i.e. operate in the aggregated spectrum). The proposed method can significantly reduce the amount/level of the IBE observed in the traditional systems. In order to achieve this, techniques disclosed herein are based on the UE to dynamically or semi-statically control the RF BW and center frequency for its transmission and to adjust it with respect to 1) the actual sidelink resource allocation/scheduling within allocated sidelink system bandwidth, which is determined either based on the outcome of UE autonomous sensing and resource selection procedure or as a result of eNB/gNB allocation of resource for sidelink transmission, or 2) to the bandwidth part or bandwidth of resource pool being processed by UE. This approach, if applied, can significantly reduce the level of in-band emissions (e.g., down to the level of out-of-band emission or below) that can significantly benefit the overall system performance.

Advantages for the techniques disclosed herein for sidelink transmission and reception with reconfigurable bandwidth and center frequency for eV2X communication includes improving the utilization and efficiency of spectrum resources for future V2V wireless communication systems, reducing UE implementation complexity and cost, and facilitating more flexible spectrum management and resource allocation.

As used herein, the term "Sidelink System Bandwidth" includes the total amount of the sidelink spectrum allocated for communication. As used herein, the term "Sidelink Bandwidth Part" (or BWP) includes a logical chunk of contiguous in frequency spectrum resources, where sidelink system bandwidth includes one or multiple bandwidth parts. As used herein, the term "Sidelink Resource Pool Bandwidth" (or RPBW) includes bandwidth allocated to the sidelink resource pool (can be aligned with a sidelink BWP or designate a subset of sidelink BWP resources). As used herein, the term "Sidelink Transmission Bandwidth" includes a bandwidth of the transmitted sidelink signal within a given sidelink system bandwidth. As used herein, the term "Sidelink UE TX/RX RF Bandwidth" includes a bandwidth of the TX/RX RF (e.g. filter BW) processing chains.

Vehicular deployment scenarios are often characterized by a high density of the nodes (transmitters/receivers) that need to regularly update each other by sharing their telematics information or data (pre-processed or raw) from the embedded sensors to facilitate improved perception of the environment. In order to enable reliable communication with a low level of collisions, it is desirable to allocate a sufficient amount of spectrum. Both TDM and FDM of V2V transmissions can be applied to optimize system performance in terms of coverage and overall system spectrum efficiency/capacity. If UEs transmit in FDM manner, the level of IBE/OBE on adjacent frequencies (non-occupied by given transmission) needs to be minimized. In order to reduce the level of IBE (e.g. down to the level of OBE) additional filtering may be used at the TX side. This can be done using a combination of baseband and analog/RF filtering. Otherwise, the overall system bandwidth may be polluted by the high level of in-band emissions, even if the UE utilizes an only small portion of the allocated sidelink spectrum resources (i.e., system BW) in a given time slot/subframe.

For the majority of V2V use cases and applications, a UE may not need to use the whole sidelink system bandwidth for its own sidelink transmission. Therefore, in some aspects, the UE RF BW for sidelink transmission can be intelligently controlled/adjusted to reduce emission level in overall sidelink system BW. From the RX perspective, a UE may also need to process the overall sidelink system bandwidth by applying independent processing for the predefined bandwidth parts (BWPs). In some aspects, BWPs from TX and RX perspective may or may not be the same. In some aspects, multiple sidelink operation options may utilize the allocated sidelink system bandwidth for V2V communication. In some aspects, the UE may be capable to process the whole sidelink system bandwidth, however, it utilizes TX RF processing with minimum possible BW that is needed for given sidelink transmission (e.g. actual BW of the transmitted signal or the closest value from the set of supported BWs).

In some aspects, the following three sidelink operations options may be used, as illustrated in connection with FIGS. 24-26.

Figure 24:
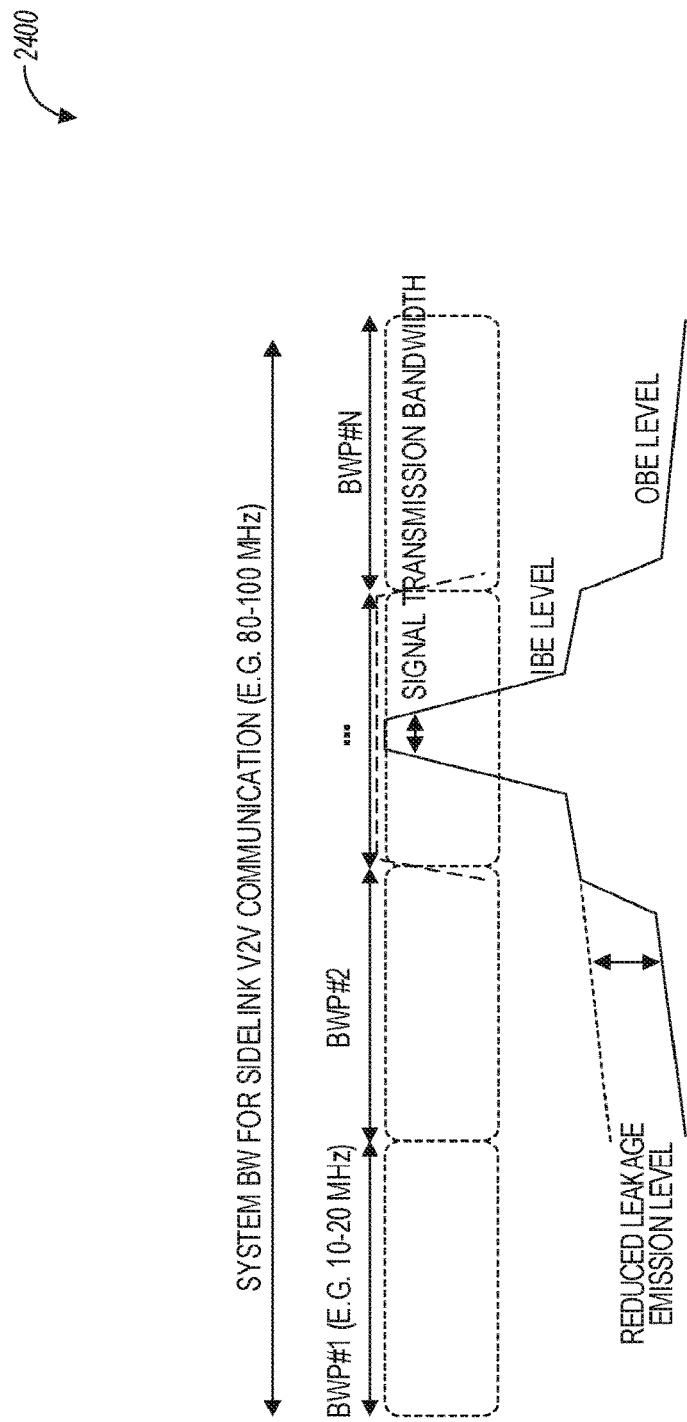
FIG. 24 illustrates partitioning of a sidelink system bandwidth into sidelink bandwidth parts or sidelink resource pools with fixed preconfigured bandwidth and center frequencies, in accordance with some aspects.

Option 1 is illustrated in FIG. 24 and is related to partitioning into bandwidth parts with fixed bandwidth and fixed center frequencies. FIG. 24 illustrates partitioning 2400 of a sidelink system bandwidth into sidelink bandwidth parts or sidelink resource pools with fixed preconfigured bandwidth and center frequencies, in accordance with some aspects. Referring to FIG. 24, in Option 1, it is assumed that the full sidelink system BW is partitioned into multiple logical bandwidth parts (BWPs) or sidelink resource pools. In some aspects, the BWP is mapped to consecutive chunks of frequency resources each of which is characterized by the reduced BW and different center frequency. The sidelink resource pool can be defined within BWP to enable non-consecutive frequency resources. Alternatively, the sidelink resource pool can be allocated to a portion of the sidelink system bandwidth. The partitioning into BWPs/resource pools can be done semi-statically by pre-configuration. In some aspects, the configuration may include BWP or sidelink resource pool BW and center frequency or a set of available resources (PRBs) in the full system BW.

In some aspects, different BWPs or sidelink resource pools may or may not overlap in frequency (i.e. may share some of the physical resources). In application to sidelink V2V communication, each BWP may be associated with sidelink resource pool(s) for PSCCH/PSSCH. The resource pool concept where sidelink pools are allocated to different parts of the available spectrum is a somewhat similar concept to the principle of BWPs introduced for NR but is a more flexible mechanism of the resource configuration. In some aspects, the BW of the BWP/resource pool may be selected to match one of the BWs supported from a system perspective. For instance, in case of operation in frequency range 1 (FR1), it can be selected from the set: 5, 10, 15, 20, 25, 30, 40, 50, 60, 80, 90, 100 MHz, while in case of frequency range 2 (FR2) it can be selected from 50, 100, 200, 400 MHz.

The following operation model can be used:

In some aspects, full sidelink system bandwidth (BW) is partitioned into logical TX and RX BWPs (i.e., BWPs assigned for TX and RX operation) or sidelink resource pools. In some aspects, a UE may have 1 or more TX/RX RF chains (the number of TX/RX RF chains may be different). In some aspects, each TX/RX RF chain is assigned to operate in one BWP (TX/RX), and the RF chain bandwidth and the center frequency can be tuned according to the BWP parameters. In some aspects, the RF chain can be semi-statically reconfigured to operate in a different BWP (i.e., the RF chain center frequency and the BW can be adjusted accordingly).

In some aspects, the UE may be constrained to select resources for TX and/or RX from one (or multiple) of the preconfigured BWPs or sidelink resource pools within the sidelink system BW. In some aspects, the UE may select the resources from the set of active BWPs (i.e., the set of BWPs for which the UE RF chains are assigned in a given moment of time) or sidelink resource pools. In some aspects, the UE is not expected to select resources overlapping multiple BWPs in order to avoid reconfiguration of the center frequency of BWP and its BW. In some aspects, if the UE has multiple TX/RX RF chains, it can also perform simultaneous TX or RX using multiple active BWPs/sidelink resource pools. In the latter case, the set of resources to be used for TX or RX can be selected from the set of active BWPs.

In some aspects, the set of active BWPs/sidelink resource pools can be reconfigured and the following types of reconfiguration of the UE TX/RX operation are possible in case of Option 1 (dynamic rather than semi-static (re)-configuration may be assumed): change of the center frequency of the BWP/resource pool without changing its BW (the reconfiguration may or may not involve changing the subcarrier spacing (SCS)/numerology); change of the BW of the BWP/resource pool without changing its center frequency (the reconfiguration may or may not involve changing the SCS); change of the both the BW and the center frequency of the BWP/resource pool (the reconfiguration may or may not involve changing the SCS); and change only the SCS, where the center frequency and BW of the BWP/resource pool remain unchanged.

In some aspects, the reconfiguration of the TX/RX RF chains (i.e., the change of operating BWP) may need RF reconfiguration delay and may cause interruption of the TX/RX operation. In some aspects, a single RX BWP may span the full channel BW, while from the TX perspective the channel BW may be divided into multiple BWPs. In some aspects, since the TX/RX RF chain bandwidth can be tuned according to the BWP/resource pool where UE performs actual sidelink transmission/reception, the leakage to the adjacent BWPs/resource pools can be reduced while the impact of IBE within BWP carrying actual transmission is the same.

In some aspects, the drawback of option 1 may reduce the flexibility of spectrum resource management due to semi-static partitioning of the sidelink system BW on the pre-defined BWPs with fixed BWs and center frequencies.

Figure 25:
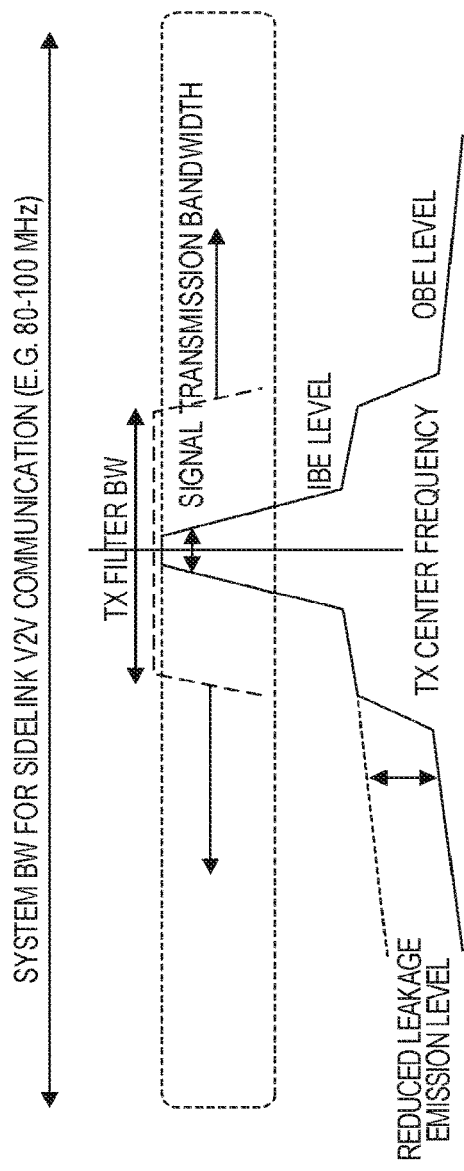
FIG. 25 illustrates a fixed bandwidth and reconfigurable center frequency, in accordance with some aspects.

Option 2 is illustrated in FIG. 25 and is related to fixed bandwidth and reconfigurable center frequency. More specifically, FIG. 25 illustrates a diagram 2500 of a fixed bandwidth and a reconfigurable center frequency, in accordance with some aspects.

As it was briefly discussed in the previous section, when sidelink system BW is divided into fixed BWPs the efficiency of spectrum utilization may degrade. In order to avoid this penalty, in some aspects, it can be considered to operate using fixed TX RF filter bandwidth while supporting variable/flexible center frequency which is adjusted within sidelink system BW. A drawback of this option may include that the UE may be restricted in terms of BW of the actual sidelink transmission signal if the BW is not expected to be dynamically reconfigurable.

In some aspects, the following operation model illustrated in FIG. 25 can be used: the UE has fixed TX RF chain BW which can be configured to be smaller than the full system BW (the actual V2V signal transmission BW does not exceed the TX RF chain BW); the UE adjusts the TX RF chain center frequency in accordance with the actual V2V signal transmission (the TX RF chain center frequency can be adjusted within the full sidelink system BW); the retuning of TX RF chain center frequency may take certain time and may lead to interruption of the TX (and RX) chain operation for certain amount of time which shall be taken into account in the scheduling process (e.g., the consecutive V2V transmission with different frequency allocations should allow certain time gap sufficient for RF chain retuning); and in order to facilitate the support of this solution, the UE may be configured with a certain max TX BW for the signal transmission (the UE can also inform the network on the set of supported BWs for the signal transmission).

Figure 26:
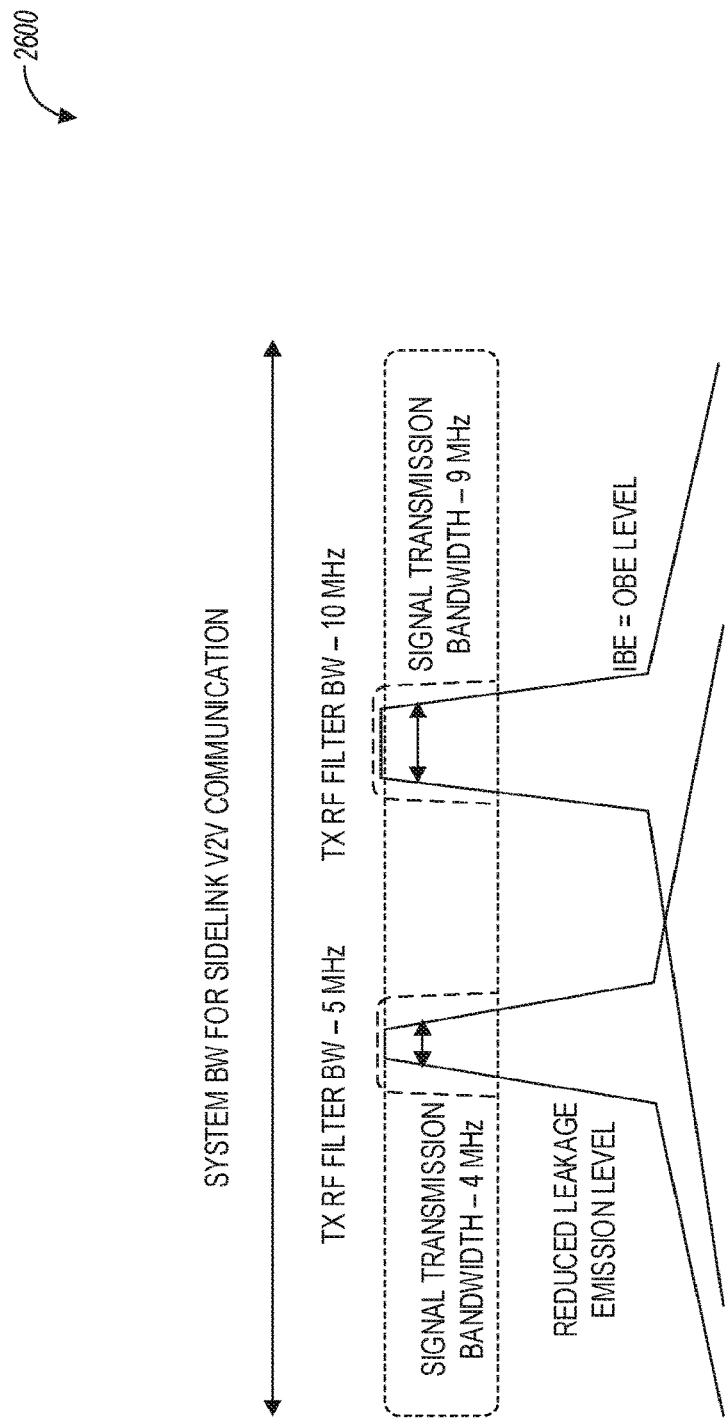
FIG. 26 illustrates a reconfigurable bandwidth and center frequency, in accordance with some aspects.

Option 3 is illustrated in FIG. 26, which illustrates a diagram 2600 of a reconfigurable bandwidth and center frequency, in accordance with some aspects. In some aspects, the TX RF filter bandwidth and the center frequency can be adjusted to the actual sidelink transmission and its allocation within sidelink system BW. In some aspects, the UE may tune the TX RF filter so that the center frequency of the actual transmission is aligned with the center frequency of the TX RF filter. In this option, the BW of the TX RF filter can be always minimized to fit the BW of the actual transmitted signal. Depending on the BW of the sidelink signal, the UE can reconfigure the BW of the TX RF filter to one of the following values: 5, 10, 15, 20, 25, 30, 40, 50, 60, 80, 90, 100, 200, or 400 MHz and shift center frequency to align with the center frequency of the actual signal transmission. In some aspects, there may be no need to configure any BWPs/resource pools solely for the purpose of the TX RF filtering, although BWPs/resource pools can be easily supported if needed from a system design consideration.

In some aspects, the UE may tune the TX RF filter bandwidth to align it with the actual BW of the transmitted sidelink signal. However, it may results in a significantly higher UE complexity in terms of TX RF filtering capabilities while having relatively small additional gain in terms of overall system performance.

In some aspects, the following operation model illustrated in connection with FIG. 26 may be used: the UE has reconfigurable TX RF chain BW and center frequency; the UE can reconfigure the BW of the TX RF filter to a set of pre-defined values (e.g., 5, 10, 15, 20, 25, 30, 40, 50, 60, 80, 90, 100 MHz for FR1; 50, 100, 200, 400 MHz for FR2); the UE may adjust the TX RF chain center frequency and BW in accordance with the actual V2V sidelink signal transmission; the TX RF chain center frequency can be adjusted within the full sidelink system BW; the TX RF chain BW is adjusted to fit the actual V2V signal transmission BW; and the retuning of TX RF chain center frequency and BW adjustment may take certain time and may lead to interruption of the TX (and RX) chain operation for certain amount of time, which may be taken into account in the scheduling process (e.g., the consecutive V2V transmission with different frequency allocations should allow certain time gap sufficient for RF chain retuning).

In some aspects, the following baseband filtering techniques may also be used. In addition to the described above options, baseband processing with reconfigurable bandwidth can be applied. One of the mechanisms to reduce in-band and out of band emission is to apply windowing across transmit and/or receive OFDMA signals to reduce spectrum leakage due to discontinuity at symbol transition boundaries. Alternatively, the UE may apply digital filtering of transmitting and/or receive signals (possibly with up/downsampling) according to the actual signal transmission bandwidth.

A method of sidelink signal transmission in a wide sidelink system bandwidth with significantly lower levels of in-band and out-of-band emissions is described. In some aspects, sidelink system bandwidth is partitioned into sidelink bandwidth parts or sidelink resource pools with reduced bandwidth. In some aspects, transceiver architecture with re-tunable TX/RX bandwidth and center frequency for transmission or reception may be used. In some aspects, partitioning of sidelink system bandwidth on sidelink bandwidth parts includes sidelink bandwidth parts characterized by predefined attributes such as bandwidth, allocation in spectrum described by start/end or center frequency, and numerology or subcarrier spacing; sidelink bandwidth parts that may or may not overlap in frequency subject to configuration settings; the UE may transmit in one or multiple bandwidth parts and may adjust its TX RF chain (filter) settings to match the parameters of BWP, as well as switch for transmission across different BWPs; the UE may receive in one or multiple bandwidth parts and may adjust its RX RF chain (filter) settings to match the parameters of BWP, as well as switch for reception across different BWPs or use single or multiple RX chains to process all configured BWPs. In some aspects, partitioning of sidelink system bandwidth on sidelink resource pools includes sidelink resources characterized by predefined attributes such as bandwidth, allocation in spectrum described by start/end or center frequency, and numerology or subcarrier spacing; sidelink resource pools that may or may not overlap in frequency subject to configuration settings; sidelink resource pools that can be defined within subset of sidelink BWPs resources; sidelink resource pool that can comprise one or multiple sidelink BWPs; a UE that can transmit in one or multiple sidelink resource pools and capable to adjust it TX RF chain (filter) settings to match the parameters of sidelink resource pool, as well as switch for transmission across different sidelink resource pool; the UE may receive in one or multiple bandwidth parts and may adjust its RX RF chain (filter) settings to match the parameters of sidelink resource pool, as well as switch for reception across different sidelink resource pools or use single or multiple RX chains to process all configured sidelink resource pools. In some aspects, transceiver architecture with (re)-tunable TX/RX bandwidth and center frequency for transmission or reception include a UE that can dynamically or semi-statically adjust the center frequency for transmission/reception within the sidelink BWP/sidelink resource pool or sidelink system BW without changing its TX/RX RF BW. In some aspects, the reconfiguration may or may not involve changing the subcarrier spacing (SCS)/numerology. In some aspects, the UE can dynamically or semi-statically change the TX/RX BW for transmission/reception within the sidelink BWP/sidelink resource pool/sidelink system BW without changing its center frequency. In some aspects, the reconfiguration may or may not involve changing the SCS. In some aspects, the UE may dynamically or semi-statically change both the BW and the center frequency for transmission/reception within the sidelink BWP/sidelink resource pool/sidelink system BW. The reconfiguration may or may not involve changing the SCS. In some aspects, the UE may dynamically or semi-statically change only the SCS, where the center frequency and BW for transmission within the sidelink BWP/sidelink resource pool/sidelink system BW remain unchanged. In some aspects, a transceiver architecture with (re)-tunable TX/RX bandwidth and center frequency for transmission or reception includes semi-static or dynamic setting of the TX RF filter to a set of pre-defined values (e.g. 5, 10, 15, 20, 25, 30, 40, 50, 60, 80, 90, 100 MHz for FR1; 50, 100, 200, 400 MHz for FR2). In some aspects, the transceiver applies baseband digital filtering of transmitting and/or receive signals (possibly with up/downsampling) according to the reconfigurable signal transmission bandwidth. In some aspects, the transceiver applies windowing across transmit and/or receive OFDMA signals to reduce spectrum leakage due to discontinuity at symbol transition boundaries.

Techniques disclosed herein can include uplink control information on PUSCH with very short duration.

In NR communications, uplink control information (UCI) can be carried by the physical uplink control channel (PUCCH) or physical uplink shared channel (PUSCH). In particular, UCI may include scheduling request (SR), hybrid automatic repeat request-acknowledgment (HARQ-ACK) feedback, channel state information (CSI) report, e.g., channel quality indicator (CQI), precoding matrix indicator (PMI), CSI resource indicator (CRI), and rank indicator (RI) and/or beam related information (e.g., L1-RSRP (layer 1-reference signal received power)).

In some aspects, when a single-slot physical uplink control channel (PUCCH) overlaps with a single-slot PUCCH or single-slot physical uplink shared channel (PUSCH) in slot n for a PUCCH group, the UE may multiplex all UCIs on either one PUCCH or one PUSCH, using the existing UCI multiplexing rule, if both following conditions are satisfied:

(1) If the first symbol of the earliest PUCCH(s)/PUSCH(s) among all the overlapping channels starts no earlier than the symbol $N_1+d_{1,1}+d_{1,2}+1$ after the last symbol of PDSCH(s); and (2) If the first symbol of the earliest PUCCH(s)/PUSCH(s) among all the overlapping channels starts no earlier than $N_2+d_{2,1}+1$ after the last symbol of PDCCHs scheduling UL transmissions including HARQ-ACK and PUSCH (if applicable) for slot n.

If at least one pair of overlapping channels does not meet the above timeline requirements, the UE may consider it is an error case for all UL channels in the group of overlapping channels. In this case, UE behavior is not specified. In some aspects, $N_1$, $N_2$, $d_{1,1}$, $d_{1,2}$, $d_{2,1}$ are processing time related parameters, which may be defined in 3GPP TS38.214.

Figure 27:
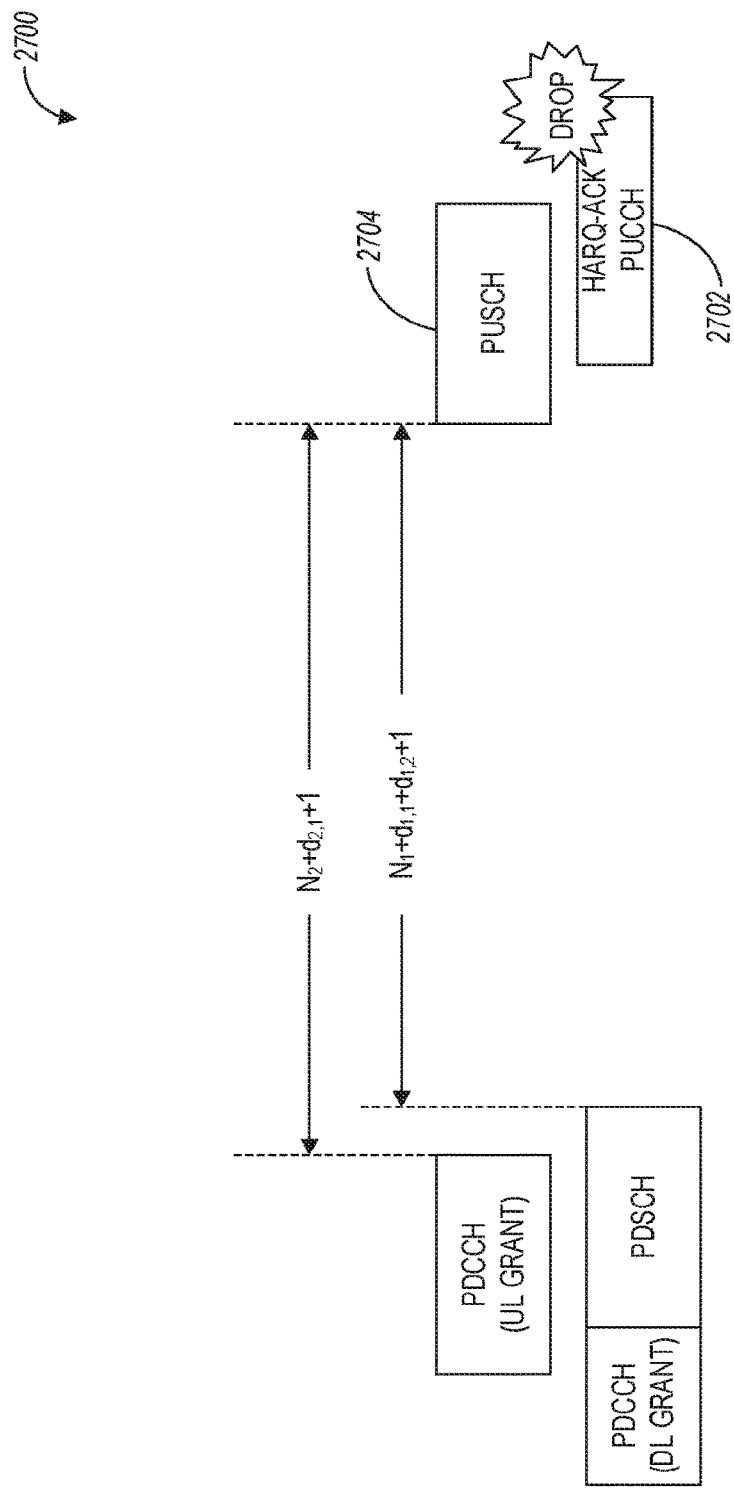
FIG. 27 illustrates a timeline check for multiplexing of PUCCH and PUSCH, in accordance with some aspects.

FIG. 27 illustrates a timeline check 2700 for multiplexing of PUCCH and PUSCH, in accordance with some aspects. In some aspects, a timeline requirement is satisfied. Hence, PUCCH 2702 carrying HARQ-ACK feedback is dropped and HARQ-ACK feedback is piggybacked on PUSCH 2704.

Figure 28:
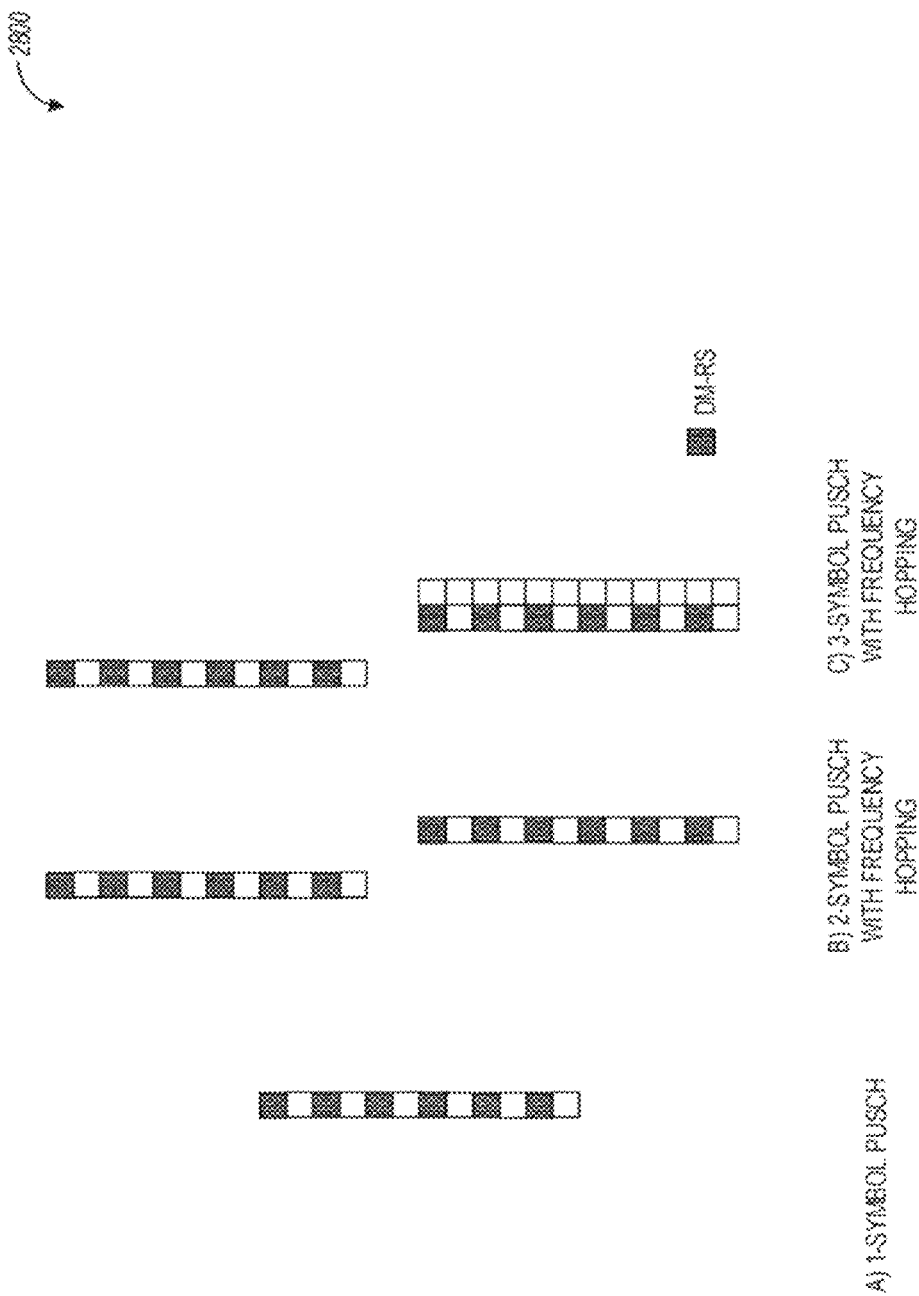
FIG. 28 illustrates UCI multiplexing of 1-symbol PUSCH, 2/3-symbol PUSCH with frequency hopping, in accordance with some aspects.

FIG. 28 illustrates UCI multiplexing 2800 of 1-symbol PUSCH, 2/3-symbol PUSCH with frequency hopping, in accordance with some aspects. In some aspects, when UCI is multiplexed on PUSCH, UCI may not be mapped on the demodulation reference signal (DM-RS) symbol associated with PUSCH. As illustrated in FIG. 28, PUSCH may span one symbol, or two, or three symbols with frequency hopping, and UCI cannot be multiplexed on PUSCH. Therefore, certain techniques disclosed herein for UCI multiplexing on PUSCH with very short duration may be used to handle this issue.

UCI Multiplexing on PUSCH with Very Short Duration.

As mentioned above, when UCI is multiplexed on PUSCH, UCI may not be mapped on the DM-RS symbol associated with PUSCH transmission. However, for 1-symbol PUSCH, 2/3-symbol PUSCH with frequency hopping, certain mechanisms may need to be defined to multiplex UCI on PUSCH.

Aspects of multiplexing UCI on 1-symbol PUSCH, 2/3-symbol PUSCH with frequency hopping are provided as follows:

In some aspects, for 1-symbol PUSCH, or 2/3-symbol PUSCH with frequency hopping, UCI can be transmitted on the DM-RS symbol associated with PUSCH. The mapping rule is the same as the case when UCI is multiplexed on the non-DM-RS symbols and when assuming the available REs for UCI and UL-SCH are the REs excluding DM-RS REs.

Figure 29:
FIG. 29 illustrates UCI mapping on DM-RS symbol for 1-symbol PUSCH, in accordance with some aspects.

FIG. 29 illustrates UCI mapping 2900 on the DM-RS symbol for 1-symbol PUSCH, in accordance with some aspects. As illustrated in FIG. 29, available REs for UCI and UL-SCH mapping are the REs excluding DM-RS REs.

In some aspects, the 3GPP specification TS 38.212 Section 6.2.7 can be updated as follows.

Start of text proposal for 38.212, Subclause 6.2.7:

Denote $\Phi_i^{UCI}$ as the set of resource elements, in ascending order of indices k, available for transmission of UCI in OFDM symbol l, for l=0, 1, 2, ..., $N_{symb,all}^{PUSCH}-1$. Denote $M_{sc}^{UCI}(l)=|\Phi_i^{UCI}|$ as the number of elements in the set $\Phi_i^{UCI}$. Denote $\Phi_i^{UCI}(j)$ as the j-th element in $\Phi_i^{UCI}$.

When PUSCH transmission duration is 1 symbol or PUSCH duration is 2 or 3 symbols with frequency hopping, for any ODFM symbols carries DMRS of the PUSCH, $\Phi_i^{UCI}=\Phi_i^{UL-SCH}$, otherwise $\Phi_i^{UCI}=\emptyset$. For any OFDM symbol that does not carry DMRS of the PUSCH, $\Phi_i^{UCI}=\Phi_i^{UL-SCH}$.

If frequency hopping is configured for the PUSCH, and if PUSCH transmission duration is 2 or 3 symbols,
  denote $l^{(1)}$ as the OFDM symbol index of the first OFDM symbol carrying DMRS in the first hop;
  denote $l^{(2)}$ as the OFDM symbol index of the first OFDM symbol carrying DMRS in the second hop.
  let $l_{CSI}^{(1)}=l^{(1)}$ and $l_{CSI}^{(2)}=l^{(2)}$ If frequency hopping is configured for the PUSCH, and if PUSCH transmission duration is larger than 3 symbols,
  denote $l^{(1)}$ as the OFDM symbol index of the first OFDM symbol after the first set of consecutive OFDM symbol(s) carrying DMRS in the first hop;
  denote $l^{(2)}$ as the OFDM symbol index of the first OFDM symbol after the first set of consecutive OFDM symbol(s) carrying DMRS in the second hop.
  denote $l_{CSI}^{(1)}$ as the OFDM symbol index of the first OFDM symbol that does not carry DMRS in the first hop;
  denote $l_{CSI}^{(2)}$ as the OFDM symbol index of the first OFDM symbol that does not carry DMRS in the second hop;

If frequency hopping is not configured for the PUSCH, and if PUSCH transmission duration is 1 symbol,
  denote $l^{(1)}$ as the OFDM symbol index of the first OFDM symbol carrying DMRS;
  let $l_{CSI}^{(1)}=l^{(1)}$ If frequency hopping is not configured for the PUSCH, and if PUSCH transmission duration is larger than 1 symbol,
  denote $l^{(1)}$ as the OFDM symbol index of the first OFDM symbol after the first set of consecutive OFDM symbol(s) carrying DMRS;
  denote $l_{CSI}^{(1)}$ as the OFDM symbol index of the first OFDM symbol that does not carry DMRS;

End of text proposal for 38.212 Subclause 6.2.7.

In some aspects, for 3 symbol PUSCH with frequency hopping, UCI is transmitted on the hop with 2-symbol duration. Further, UCT is mapped on the non-DM-RS symbol in the second hop. The mapping rule is the same as the UCI on PUSCH without frequency hopping.

In some aspects, when Discrete Fourier Transform-spread-OFDM (DFT-s-OFDM) is applied for the transmission of PUSCH and when PUSCH spans 1 symbol or 2/3 symbols with frequency hopping, UE considers this is an error case. In other words, UE is not expected the 1-symbol or 2/3 symbol PUSCH with frequency hopping when DFT-s-OFDM waveform is applied.

In some aspects, when cyclic prefix—orthogonal frequency-division multiplexing (CP-OFDM) is applied for the transmission of PUSCH and when PUSCH spans 1 symbol or 2/3 symbols with frequency hopping, when PUCCH carrying HARQ-ACK and/or CSI overlaps with PUSCH, and when timeline requirement is satisfied, UE drops PUCCH carrying HARQ-ACK/or CSI report, and only transmits PUSCH. Alternatively, for PUCCH spanning M symbols, the PUCCH in symbols overlapped with 1 symbol PUSCH or 2/3 symbols with frequency hopping will be punctured or rate matched.

Figure 30:
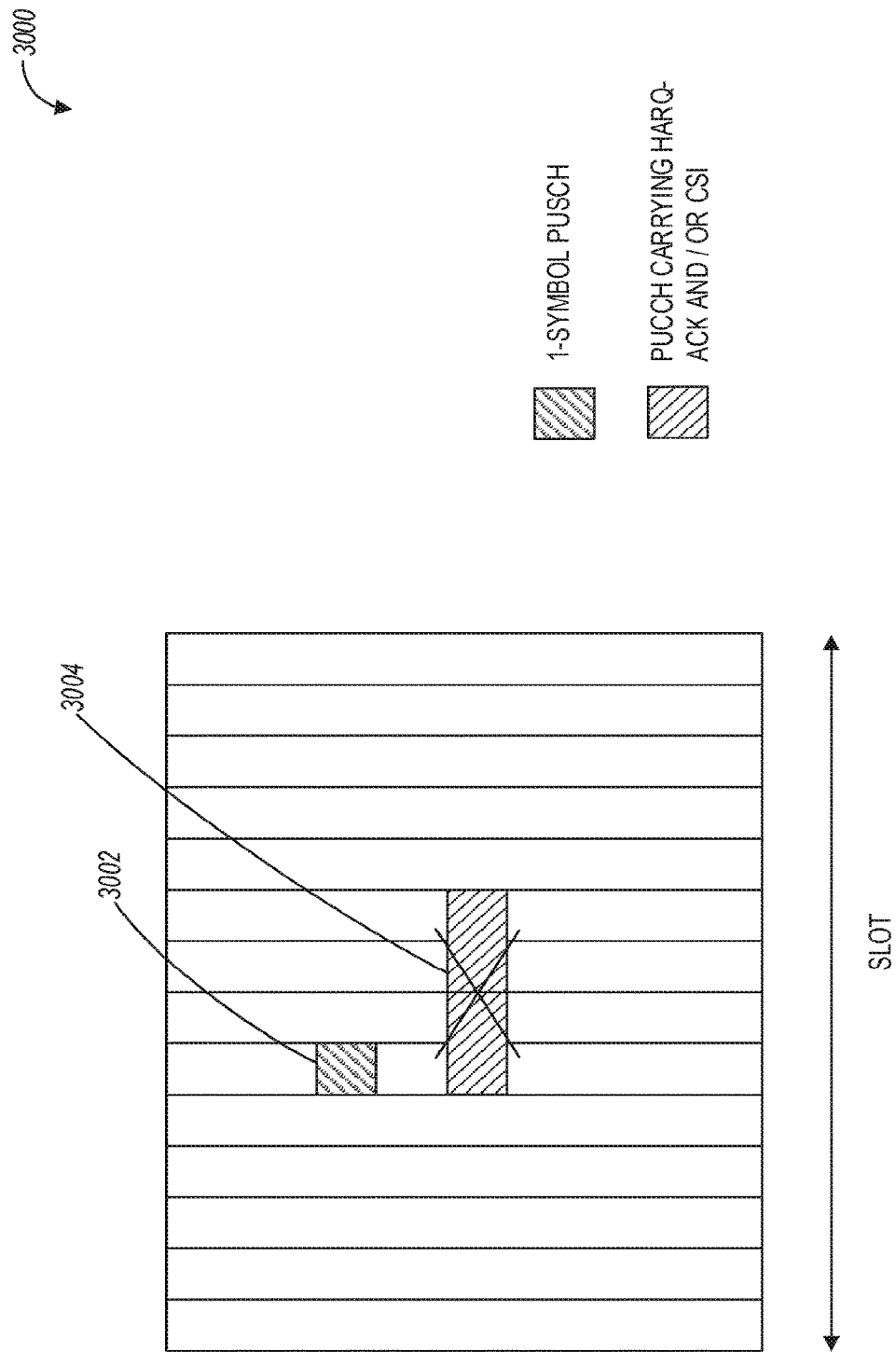
FIG. 30 illustrates the dropping of PUCCH when PUCCH overlaps with 1-symbol PUSCH or 2/3-symbol PUSCH with frequency hopping, in accordance with some aspects.

FIG. 30 illustrates a diagram 3000 of dropping of PUCCH 3004 when PUCCH overlaps with 1-symbol PUSCH 3002 (or 2/3-symbol PUSCH) with frequency hopping, in accordance with some aspects.

In some aspects, when CP-OFDM is applied for the transmission of PUSCH and when PUSCH spans 1-symbol or 2/3-symbols with frequency hopping, when PUCCH carrying HARQ-ACK and/or CSI overlaps with PUSCH, and when timeline requirement is satisfied, the UE may drop the PUSCH and only transmits the PUCCH carrying HARQ-ACK/or CSI report.

Figure 31:
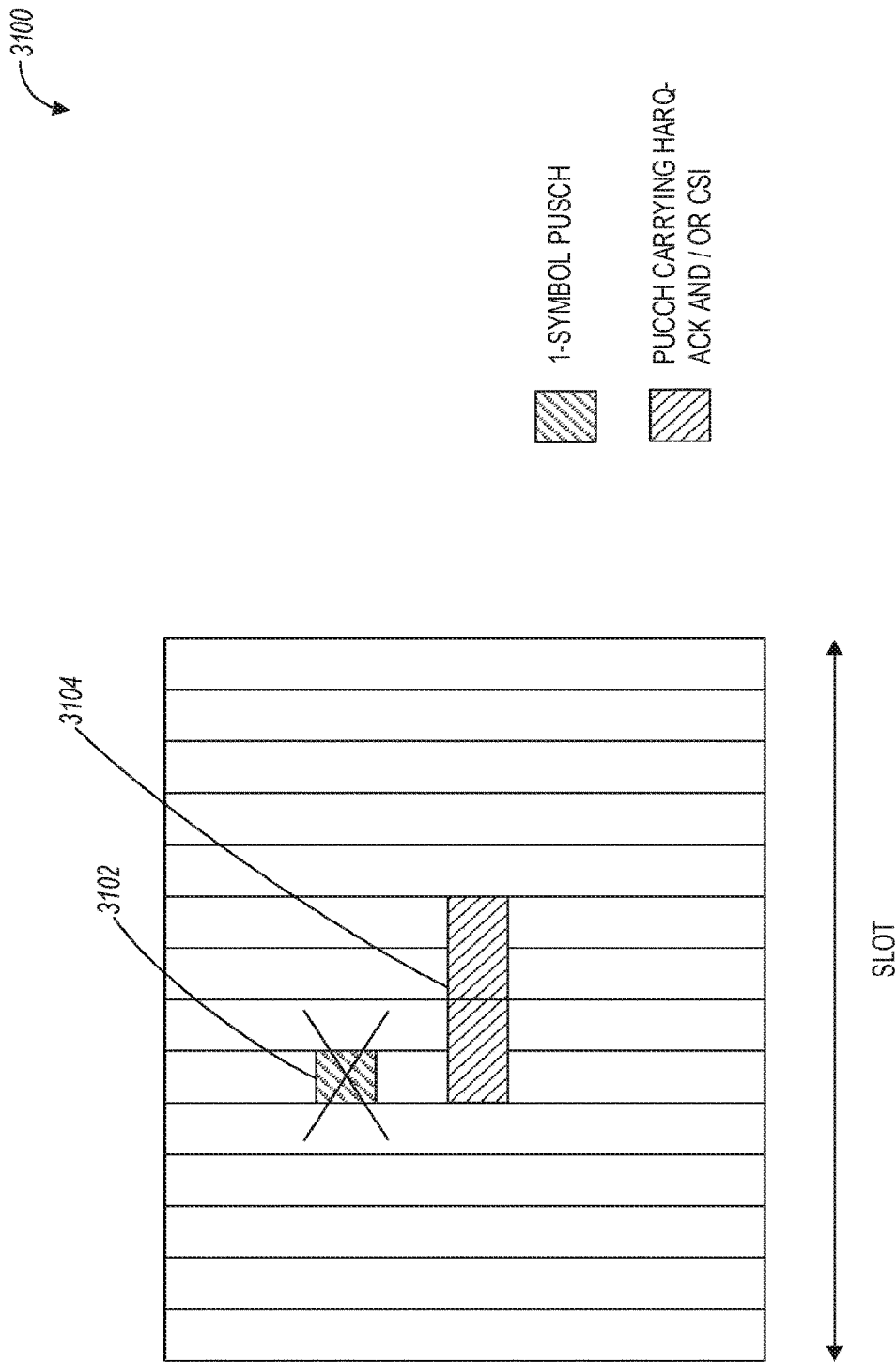
FIG. 31 illustrates the dropping of PUSCH when PUCCH overlaps with 1-symbol PUSCH or 2/3-symbol PUSCH with frequency hopping, in accordance with some aspects.

FIG. 31 illustrates a diagram 3100 dropping of PUSCH 3102 when PUCCH 3104 overlaps with 1-symbol PUSCH or 2/3-symbol PUSCH with frequency hopping, in accordance with some aspects.

In some aspects, when CP-OFDM is applied for the transmission of PUSCH and when PUSCH spans 1-symbol or 2/3-symbols with frequency hopping, when PUCCH carrying HARQ-ACK and/or CSI overlaps with PUSCH, and when timeline requirement is satisfied, whether to drop PUCCH carrying HARQ-ACK and/or CSI or PUSCH can be configured by higher layers via NR minimum system information (MSI), NR remaining minimum system information (RMSI), NR other system information (OSI) or radio resource control (RRC) signaling, or dynamically indicated in the DCI for scheduling of PUSCH/PUCCH transmission.

In some aspects, a priority indicator can be configured for each PUCCH resource, where the first state may indicate the PUCCH resource is with a higher priority than PUSCH and the second state may indicate the PUCCH resource is with a lower priority than PUSCH.

In some aspects, whether to drop PUCCH carrying HARQ-ACK and/or CSI or PUSCH may also depend on whether PUCCH or PUSCH is targeted for URLLC or eMBB service. In case when one of PUCCH and PUSCH is for URLLC and another is for eMBB, the one for eMBB is dropped and UE transmits the physical channel for URLLC. For instance, if PUCCH carrying HARQ-ACK or CSI report is targeted for URLLC while PUSCH is targeted for eMBB, the UE would transmit the PUCCH carrying HARQ-ACK and/or CSI report and drop PUSCH.

In some aspects, whether to drop PUCCH carrying HARQ-ACK and/or CSI or PUSCH may also depend on whether PUSCH is grant based or grant free transmission. For instance, for grant-based PUSCH transmission, PUCCH carrying HARQ-ACK is transmitted and PUSCH is dropped. For Type 1 grant-free PUSCH transmission, the PUSCH may be dropped and the UE may only transmit the PUCCH carrying HARQ-ACK and/or CSI report.

In some aspects, for aperiodic CSI (A-CSI) on PUSCH, 1-bit indicator in the DCI may be used to trigger A-CSI on PUSCH with and without uplink shared channel (UL-SCH). In one aspect, when the UE is scheduled A-CSI on PUSCH and when the scheduled PUSCH only spans 1-symbol or 2/3-symbols with frequency hopping, the UE considers this is an error case and the UE may skip the PUSCH transmission.

In some aspects, when the UE is scheduled A-CSI on PUSCH and when the scheduled PUSCH only spans 1-symbol or 2/3-symbols with frequency hopping, A-CSI may be transmitted on the DM-RS symbols associated with PUSCH transmission in the case when CP-OFDM waveform is applied for PUSCH transmission.

In some aspects, when the UE is scheduled A-CST on PUSCH and when the scheduled PUSCH only spans 1-symbol or 2/3-symbols with frequency hopping and when DFT-s-OFDM waveform is applied for PUSCH transmission, the UE considers this is an error case and the UE may skip the PUSCH transmission.

A system and method of wireless communication for a 5G or NR communication system is configured for mapping, by the UE, of UCI on DM-RS symbol when PUSCH spans 1-symbol, or 2-, or 3-symbols with frequency hopping. The UE may transmit the UCI on PUSCH. In some aspects, for 1-symbol PUSCH, or 2/3-symbol PUSCH with frequency hopping, the UCI can be transmitted on the DM-RS symbol associated with PUSCH. In some aspects, the mapping rule is same as the case when UCI is multiplexed on the non-DM-RS symbols and when assuming the available resource elements (RE) for UCI and uplink shared channel (UL-SCH) are the REs excluding DM-RS REs. In some aspects, for 3-symbol PUSCH with frequency hopping, the UCI is transmitted on the hop with 2-symbol duration, where the UCI is mapped on the non-DM-RS symbol in the second hop. In some aspects, when DFT-s-OFDM is applied for the transmission of PUSCH and when PUSCH spans 1-symbol or 2/3-symbols with frequency hopping, the UE may consider this as an error case. In some aspects, when CP-OFDM is applied for the transmission of PUSCH and when PUSCH spans 1-symbol or 2/3-symbols with frequency hopping, when PUCCIH carrying hybrid automatic repeat request-acknowledgment (HARQ-ACK) and/or channel state information (CSI) overlaps with PUSCH, and when timeline requirement is satisfied, the UE drops PUCCH carrying HARQ-ACK/or CSI report, and only transmits PUSCH. In some aspects, when CP-OFDM is applied for the transmission of PUSCH and when PUSCH spans 1-symbol or 2/3-symbols with frequency hopping, when PUCCH carrying HARQ-ACK, and/or CSI overlaps with PUSCH, and when timeline requirement is satisfied, the UE drops PUSCH and only transmits PUCCH carrying HARQ-ACK/or CSI report. In some aspects, when CP-OFDM is applied for the transmission of PUSCH and when PUSCH spans 1-symbol or 2/3-symbols with frequency hopping, when PUCCH carrying HARQ-ACK and/or CSI overlaps with PUSCH, and when timeline requirement is satisfied, whether to drop PUCCH carrying HARQ-ACK and/or CSI or PUSCH can be configured by higher layers via NR minimum system information (MSI), NR remaining minimum system information (RMSI), NR other system information (OSI) or radio resource control (RRC) signaling, or dynamically indicated in the DCI for scheduling of PUSCH/PUCCH transmission. In some aspects, a priority indicator can be configured for each PUCCH resource, the first state may indicate the PUCCH resource is with a higher priority than PUSCH and the second state may indicate the PUCCH resource is with a lower priority than PUSCH. In some aspects, when the UE is scheduled aperiodic CSI (A-CSI) on PUSCH and when the scheduled PUSCH only spans 1-symbol or 2/3-symbols with frequency hopping, the UE considers this is an error case and UE may skip the PUSCH transmission. In some aspects, when the UE is scheduled A-CSI on PUSCH and when the scheduled PUSCH only spans 1-symbol or 2/3-symbols with frequency hopping, A-CSI may be transmitted on the DM-RS symbols associated with PUSCH transmission in the case when CP-OFDM waveform is applied for PUSCH transmission. In some aspects, when the UE is scheduled A-CSI on PUSCH and when the scheduled PUSCH only spans 1-symbol or 2/-symbols with frequency hopping and when DFT-s-OFDM waveform is applied for PUSCH transmission, the UE considers this is an error case and the UE may skip the PUSCH transmission.

Techniques Disclosed Herein Include Channel Access Mechanisms for Sidelink NR V2X Communications.

Emerging V2X applications are characterized by various key performance indicators (KPIs) in terms of latency, data rate, and reliability. It is expected that various V2X services will share the same spectrum resources and have various traffic patterns starting from the periodic one where packets arrive periodically (with predictable packet arrival time) or aperiodic one where packet arrival time is randomized and cannot be reliably/accurately predicted. Besides packet arrival time, the packet size in bits may be fixed, correlated in time or random variable bounded within some range. In addition, V2X packets/traffic can be characterized by the higher layer attributes such as latency and priority (e.g., ProSe Per Packet Priority—PPPP), reliability (e.g., ProSe Per Packet Reliability), and/or QoS. Therefore, proper channel access procedures and UE behavior may be defined, including sensing and resource selection procedures for efficient sidelink NR V2X Communication to optimize performance in various scenarios discussed herein. Techniques discussed herein include a novel channel access scheme that optimally handles periodic and aperiodic traffic types.

Previously in LTE V2V, the design was based on an assumption of periodic or quasi-periodic traffic that led to the decision to use the design employing resource reservation with channel sensing. UEs used results of long term mediums sensing to exclude most congested sub-channels from their selection window under the assumption of periodic traffic. The conventional LTE V2V communication design, however, is not optimized for aperiodic traffic and may lead to persistent collisions between UEs due to long term resource reservation approach without any listen-before-talk mechanisms.

In some aspects, different components of the generalized channel access scheme that support both periodic and aperiodic traffic types are presented. First, terminology related to the discussed aspects is introduced, followed by details of large scale channel access and small scale channel access as well as resources structure based on disclosed techniques.

Terminology:

As used herein, the term "Sidelink Resource Pool" indicates sidelink resources allocated for transmission/reception of physical sidelink control (PSCCH) and physical sidelink shared channels (PSSCH).

As used herein, the term "Sidelink Sensing" indicates a procedure based on sidelink channel measurements (e.g. sidelink reference signal received power (SL-RSRP), sidelink received signal strength indicator (SL-RSSI), sidelink reference signal received quality (SL-RSRQ), sidelink channel busy ratio (SL-CBR), sidelink channel occupancy ratio (SL-CO), etc.), and processing of sidelink control signaling to facilitate sidelink channel access and resource selection for sidelink transmissions including at least physical sidelink control (PSCCH) and/or shared (PSSCH) channel. The overall sidelink sensing procedure can be divided into Type-A and Type-B sensing procedures, each of which can be configured independently for sidelink operation.

As used herein, the term "Sidelink Sensing Types" indicate sidelink sensing defined to optimally handle the various combination of resource allocation options with and without sidelink resources reservations and various traffic types. As used herein, the term "Type-A Sidelink Sensing" indicates Large Scale Sidelink Sensing Procedure (LS-SSP) based on the processing of sidelink transmissions within Large Scale Sensing Window (LS-SW) targeting the formation of Large Scale Candidate Resources Sets (LS-CRS) within Large Scale Sidelink Resource Selection Window (LS-SRSW). As used herein, the term "Type-B Sidelink Sensing" indicates a Small Scale Sidelink Sensing Procedure (SS-SSP) based on instantaneous processing of sidelink transmissions within small scale sidelink resource selection window (SS-RSW).

As used herein, the term "Sidelink Reference Resources" indicate resources that represent minimum sidelink resources granularity for sidelink channel access and sidelink measurement (sensing units). The actual transmission may span/occupy multiple reference resources in time and frequency dimensions. As used herein, the term "Type-A Sidelink Reference Resource" indicates a Large Scale Sidelink Reference Resource defined in terms of frequency sub-channels and sidelink time transmission intervals. Each sub-channel is composed of multiple physical resources blocks and each sidelink time transmission interval is composed of one or multiple symbols/slots/subframes (e.g. Long-TTI, slot, subframe). It starts at large scale channel access occasions (e.g. every slot and ends at the end of time-slot). As used herein, the term "Type-B Sidelink Reference Resource" indicates a Small Scale Sidelink Reference Resource defined in terms of PRBs and symbols with finer granularity in frequency and time respectively (e.g. Short-TTI, mini-slot) and is more flexible in terms of transmission start time and duration. It can start at small scale channel access occasions occurring within Type-A sidelink reference resources and end at slot boundary or has arbitrary/flexible duration from a predefined set.

As used herein, the term "Sidelink Channel Access Occasions" indicates time instances for sidelink channel access (i.e. where sidelink transmission can start). In addition, depending on system configuration setting can serve as sidelink control channel monitoring occasions and derived based on these occasions. As used herein, the term "Type-A Large Scale Channel Access Occasions" indicates periodic sidelink channel access occasions starting at the beginning of slots or large scale sidelink reference resource within the sidelink resource pool. As used herein, the term "Type-B Small Scale Channel Access Occasions" indicates additional channel access occasions within Type-A sidelink reference resources that provide finer time granularity of access to sidelink spectrum resources.

Sidelink Resource Grid (Pool Structure).

In some aspects, sidelink resources within sidelink resource pool(s) or sidelink bandwidth partition(s) are divided into Type-A sidelink reference resources that provide basic resource units for sidelink V2X communication.

In some aspects, Type-A sidelink reference resources have coarse granularity in time and frequency and can be considered as a basic/primary resource unit for sidelink V2X communication/transmission. An example includes a sidelink resource unit with a fixed amount of time (e.g., NT-LS symbols) and frequency resources (e.g., NF-LS PRBs/sub-channels). For instance, slot/sub-frame in time domain/sub-channel in the frequency domain are good candidates to dimension Type-A Sidelink Reference Resource.

In some aspects, Type-B sidelink reference resources have finer channel access granularity in time and/or frequency. In some aspects, a Large Scale Reference Resource (Type-A) contains multiple starting points of Small Scale Reference Resources (Type-B) with finer granularity in time and possibly frequency (time only is preferred). In some aspects, a Small Scale Reference Resource (Type-B) includes a sidelink resource unit with the finer granularity at least in terms of time/frequency comparing to large scale reference resource. Includes subset of symbols (NT-SS)/PRBs (NF-SS) within large scale reference resources.

Figure 32:
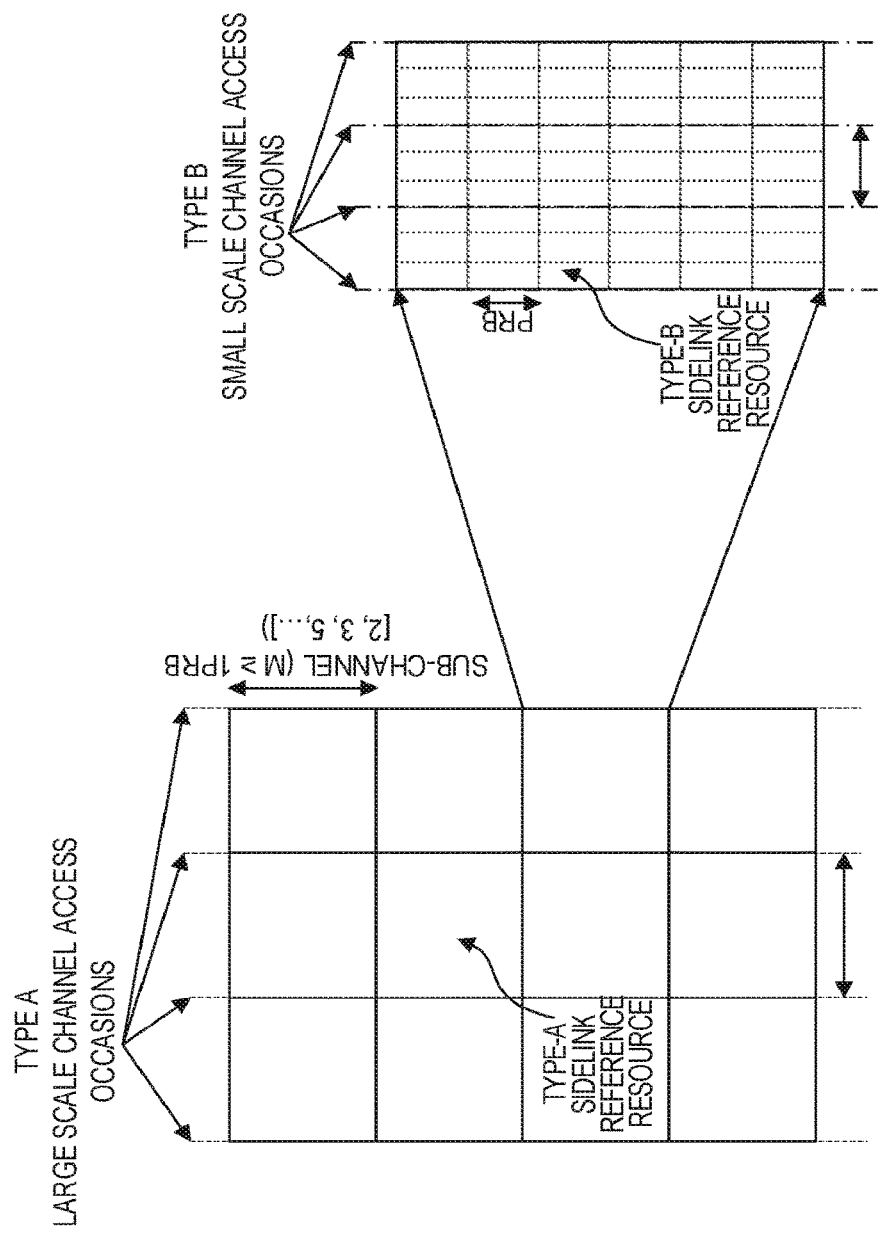
FIG. 32 illustrates sidelink resources for NR-V2X communications, in accordance with some aspects.

In some aspects, the actual sidelink transmission of a transport block can span multiple small or large scale reference resources and eventually cross boundaries of small and large scale reference resources. Possible large scale and small scale reference resource structure (e.g. time/frequency dimension) is configured/pre-configured by gNB/eNB/network entity and are illustrated in FIG. 32. More specifically, FIG. 32 illustrates sidelink resources 3200 for NR-V2X communications, in accordance with some aspects.

Sensing Procedure.

In some aspects, Sidelink Sensing Procedure is defined to improve the reliability of NR V2X communication. Two compatible types of sidelink sensing procedure Type-A (Large Scale Sensing) and Type-B (Small Scale Sensing) can be used in connection with disclosed techniques. In general, only one type of sensing can be enabled/configured or both types can operate together to optimally handle various traffic types (periodic—w/predictable packet arrival time and aperiodic—with non-predictable packet arrival time). In some aspects, resource reservation principles introduced in LTE-V2X system for periodic transmissions can be partially reused for NR-V2X communication with several enhancements outlined below and additionally extended towards handling of large packet sizes including aperiodic traffic.

Figure 33:
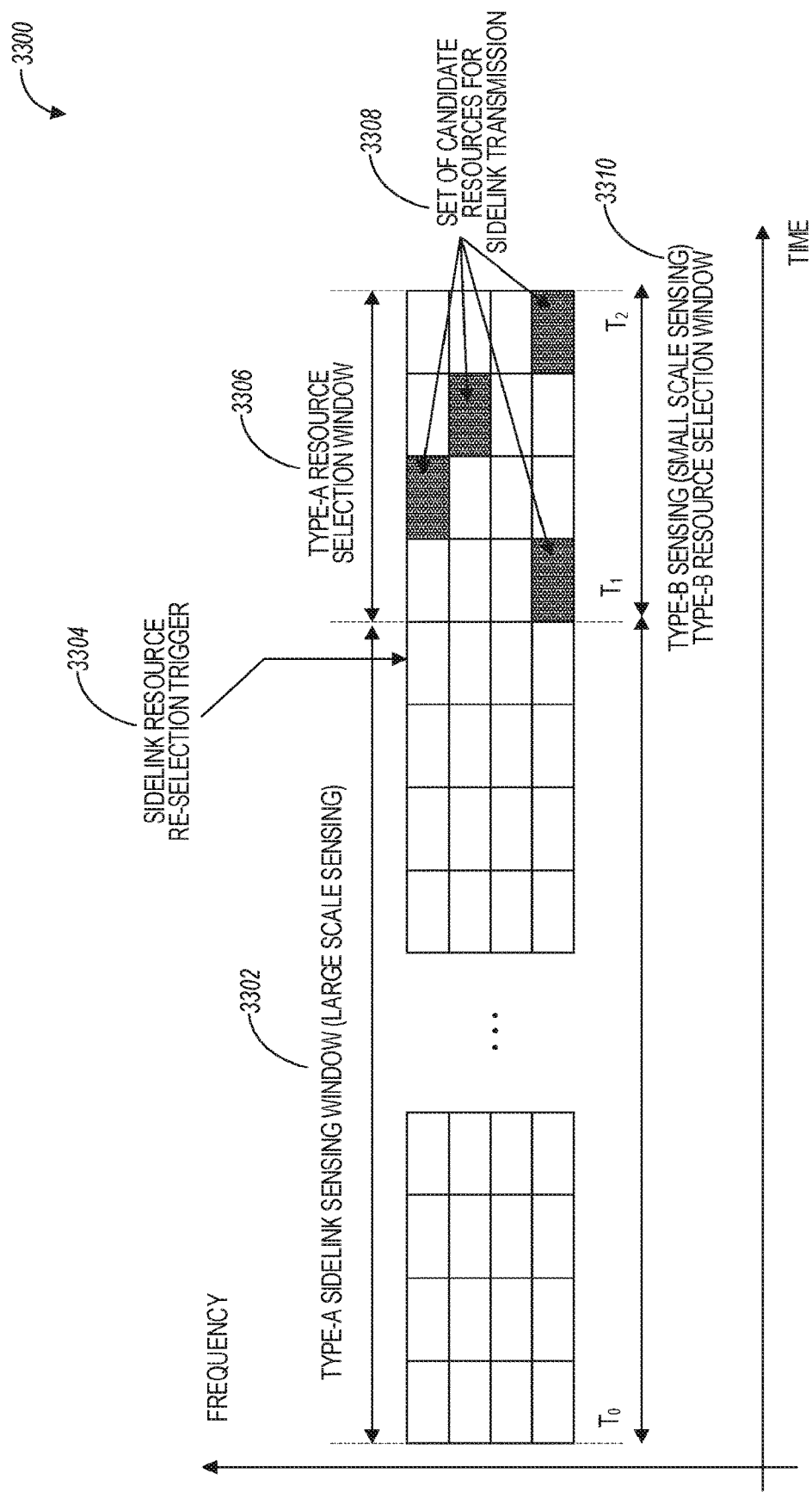
FIG. 33 illustrates sidelink sensing and resource selection windows for NR-V2X communications, in accordance with some aspects.

FIG. 33 illustrates a diagram 3300 of sidelink sensing and resource selection windows for NR-V2X communications, in accordance with some aspects. In some aspects, Type-A Sidelink Sensing (Long-Term/Large Scale Sensing) is defined. The main purpose of this sensing procedure is to determine a set of candidate sidelink resources (e.g. large scale reference resources) within a sidelink resource selection window (from $T_1$ to $T_2$ as illustrated in FIG. 33) that can be used for sidelink transmission by avoiding resources that are occupied/reserved by other UEs based on sensing results in a sensing window from $T_0$ to $T_1$ as illustrated in FIG. 33.

In some aspects, Type-B Sidelink Sensing (Short-Term/Small Scale Sensing) is defined. This procedure can be designed for instantaneous channel access and actual sidelink resource selection. The actual resource selection can be done either: (1) within a set of candidate large scale reference resources determined by the Type-A sensing procedure as an outcome of resource selection, if Type-A sensing is configured; or (2) whole set of sidelink resources within resources selection window are considered as a set of candidate resources, if Type-A sensing procedure is disabled or set of candidate resources is not available for selection.

Figure 34:
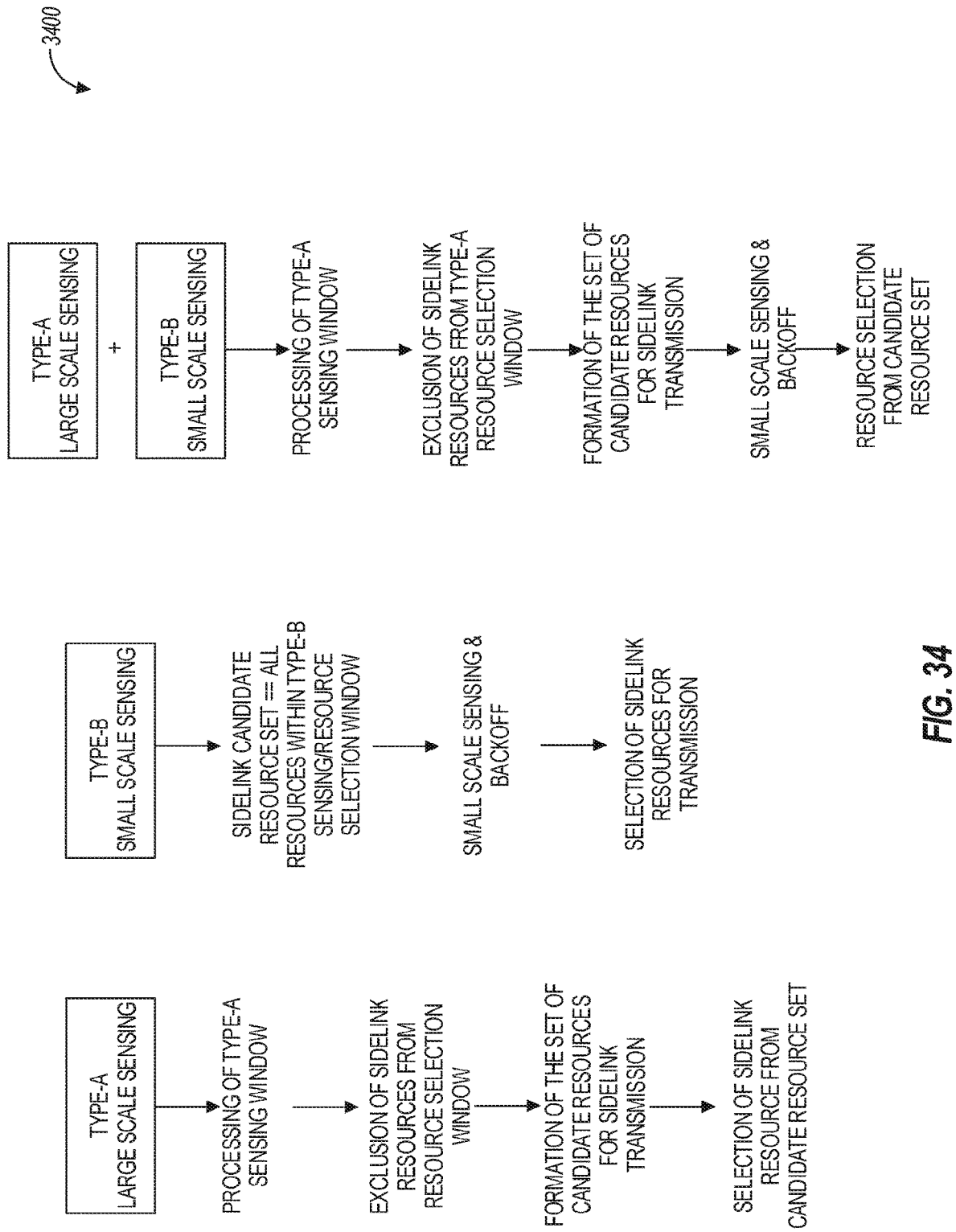
FIG. 34 illustrates configuration options for sidelink sensing and resource selection, in accordance with some aspects.

FIG. 34 illustrates configuration options 3400 for sidelink sensing and resource selection, in accordance with some aspects. In some aspects, the gNB/eNB/Network can configure whether Type-A, Type-B, or a combination of Type-A and Type-B sensing procedures are activated at the UE for the autonomous mode of operation, as illustrated in FIG. 34.

Large Scale Sensing Procedure (Type-A).

In some aspects, a large scale sensing procedure can be used to exclude reserved resources indicated by transmissions within the sensing window (Type-A large scale sensing window). In this case, through the processing of a sidelink control channel and sidelink measurements, a UE can detect and properly handle resources reserved by other UEs (e.g. periodic transmissions).

Sidelink PSCCH/SCI transmissions within a sensing window can be used to indicate reserved sidelink resources so that a UE can identify which resources are in potential conflict collision and exclude those. For instance, the transmission interval (period) and the pattern of reserved sidelink resources can be signaled by a transmitting (TX) UE.

In some aspects, the basic steps and principles of a Type-A large scale sensing procedure include:

(1) The UE excludes sidelink resources following pre-defined resource exclusion procedure and forms candidate set of large scale sidelink resources within large scale sidelink resource selection window based on the processing of signals received within the sidelink sensing window. The procedure similar to LTE-V2V sidelink communication can be used for that purpose. The following UE behavior can be proposed in one embodiment: (a) a UE is configured with large scale sidelink sensing window, which parameters can be a function of the packet latency budget (L), transmission priority (P) and reliability (R) levels (e.g., sidelink sensing window duration, configuration of control channel resources and their monitoring occasions); (b) within Large Scale Sidelink Sensing Window, the UE detects PSCCH/SCI transmissions-sidelink control signaling transmissions from other UEs sharing the same resources and excludes resources that collide or can have potential conflict with sidelink resources occupied by other TXs applying pre-defined resource exclusion criteria, such as SL-RSRP measured over sidelink control or shared channel transmissions (PSCCH and PSSCH) exceeds the predefined threshold which is defined for combination of given sidelink transmission priority and priority level indication discovered from PSCCH/SCI reception; and the UE can exclude the actually occupied sidelink resources or sidelink resources that overlap with any large scale sidelink reference resource.

(c) the UE forms the set of candidate reference resources of predefined size X % that are considered suitable for transmission; (d) the UE applies iterative process to ensure that size of candidate reference resource set is at least X % of the resource selection window size; and (e) the UE reserves resources for predefined amount of time or transmissions of TBs and then reselects sidelink resources for transmission, when timer or TB counter reaches zero state. Resource reselection condition triggers the process of resource (re)-selection and initializes timer or TB counter with a random value from the predefined range.

(2) If Type-B sensing is configured UE continues with Type-B sensing for resource selection, otherwise UE selects resources for sidelink transmission from the candidate sidelink resource set. The actual resource from candidate resource set can be selected randomly or based on a predefined resource selection procedure.

Small Scale Sensing Procedure (Type-B).

In some aspects, small scale sensing may be used to avoid collisions in sidelink channel access for aperiodic traffic (with random packet arrival and/or unpredictable packet size when resources cannot be reserved in an efficient manner), as well as reduce collisions in case of simultaneous resource reselection by several UEs, so that their potential conflict can be resolved. In some aspects, the basic principle behind small scale sensing includes: the UE selects resources from a candidate set of sidelink reference resources based on additional short-term/small-scale energy sensing (or RSRP measurements) and back-off mechanism. In order to perform small scale sensing, the following configuration of small scale reference resources may be applied (as illustrated in FIG. 35).

Figure 35:
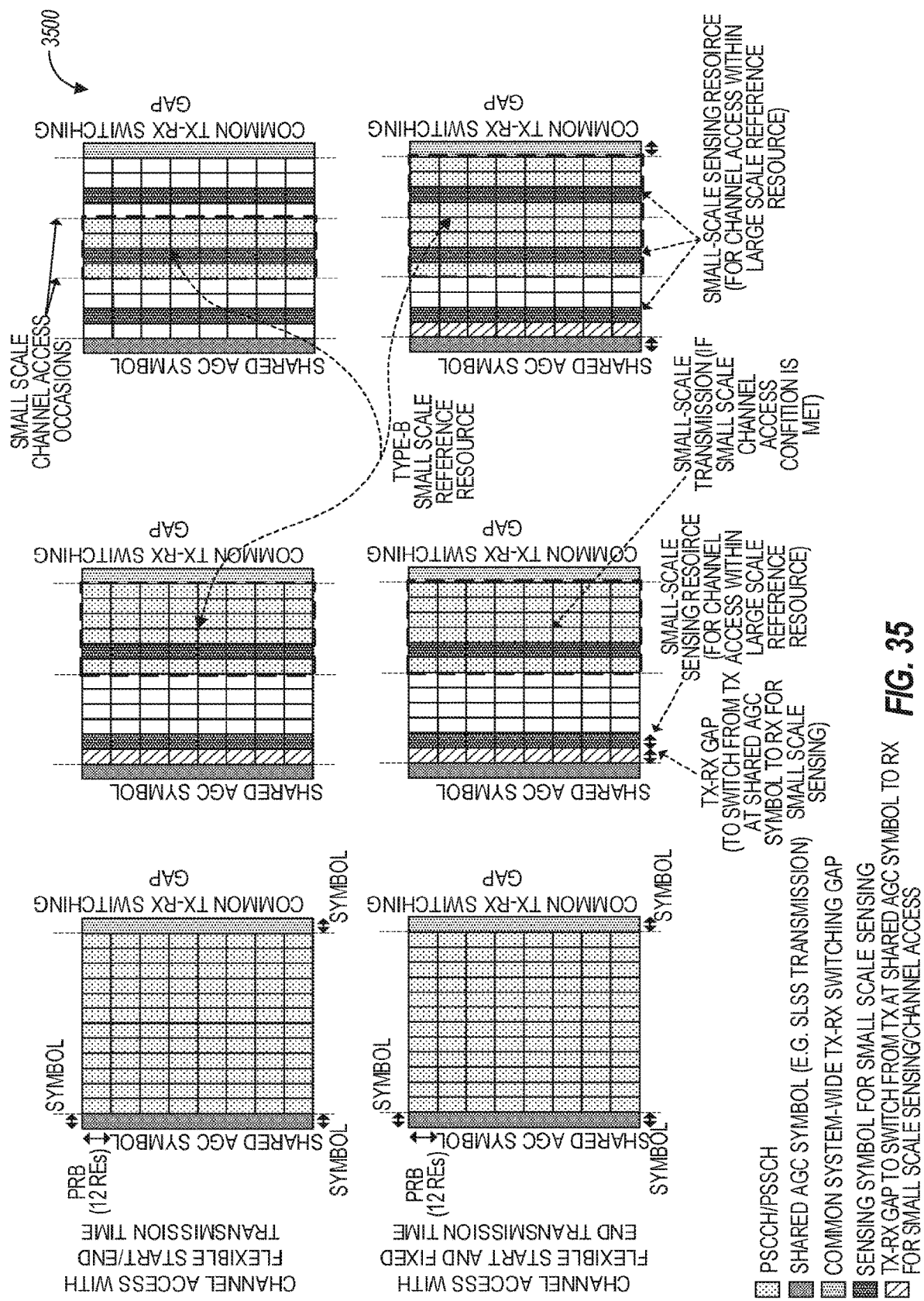
FIG. 35 illustrates the physical structure of large-scale reference resource and configuration of small-scale sidelink reference resources, in accordance with some aspects.
Figure 36:
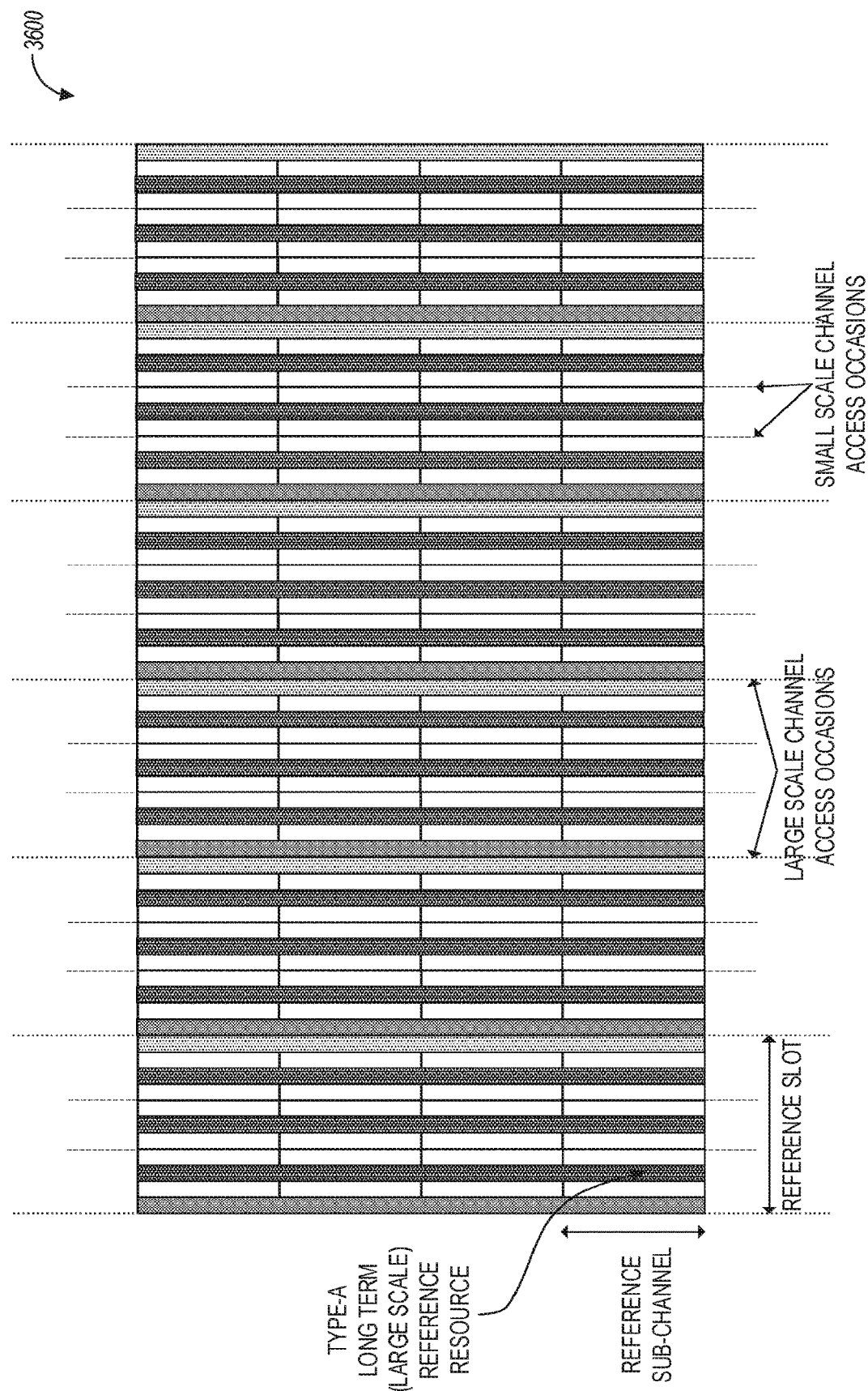
FIG. 36 illustrates sidelink resource grid with shared AGC symbol for sidelink channel access with a large-scale reference resource, in accordance with some aspects.
Figure 37:
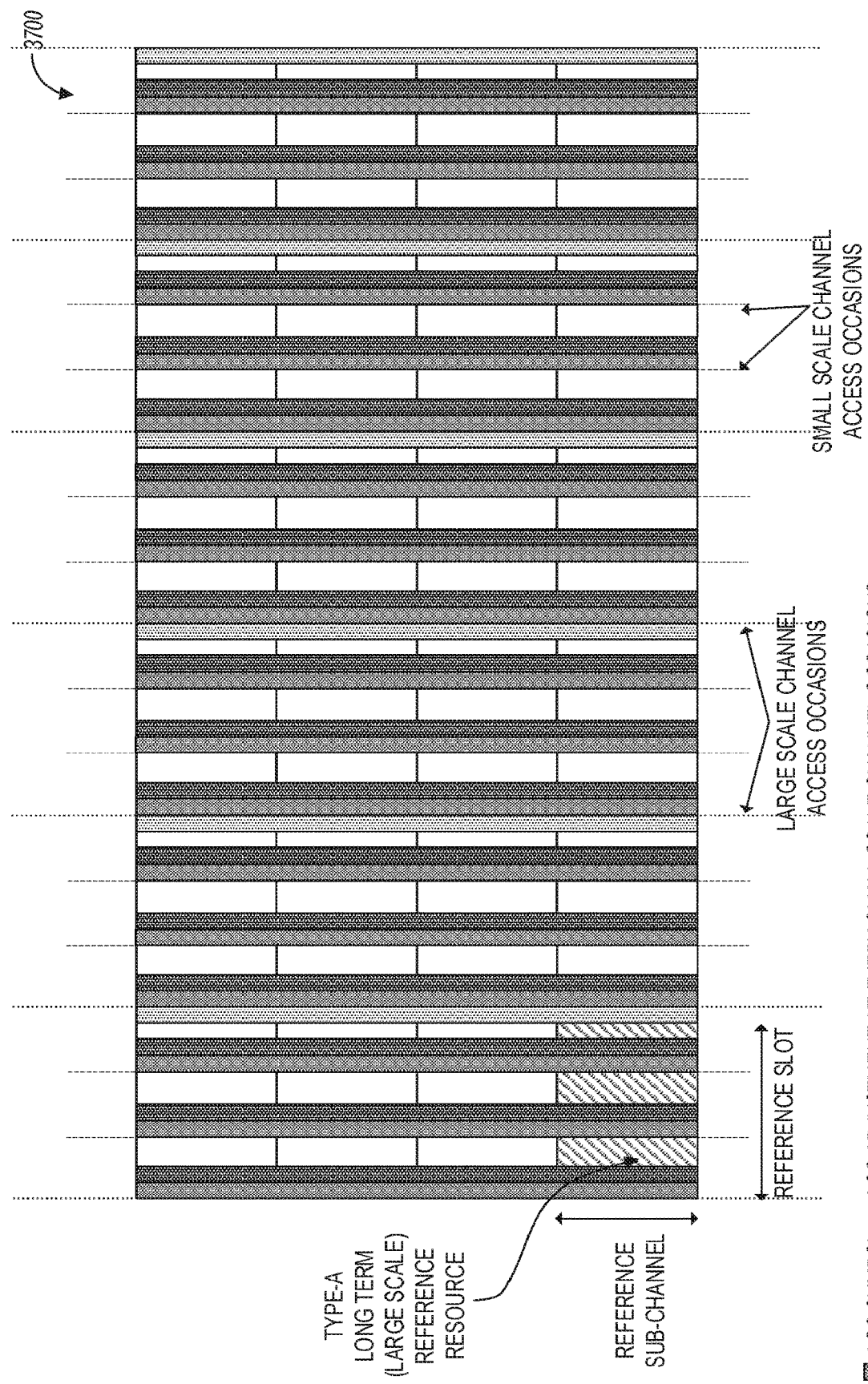
FIG. 37 illustrates sidelink resource grid with AGC adjustment within a large-scale reference resource, in accordance with some aspects.

FIG. 35 illustrates a diagram 3500 of a physical structure of a large-scale reference resource and configuration of small-scale sidelink reference resources, in accordance with some aspects. FIG. 36 illustrates a diagram 3600 of a sidelink resource grid with shared AGC symbol for sidelink channel access with a large-scale reference resource, in accordance with some aspects. FIG. 37 illustrates a diagram 3700 of a sidelink resource grid with AGC adjustment within a large-scale reference resource, in accordance with some aspects.

In some aspects, the UE behavior and physical resource structure in case of small scale sensing is dependent on whether the concept of shared AGC symbol is applied (see diagram 3500 in FIG. 35 and diagram 3600 in FIG. 36) or not applied (see diagram 3700 in FIG. 37). According to the shared symbol AGC concept, if the UE aims to access the sidelink channel at a given large scale reference resource it is mandated to transmit at the $1^{st}$ symbol of the large scale reference resource for AGC settling at RX side. In general, the signal transmitted for the sake of AGC convergence can be of any type (e.g., DM-RS, a symbol of control or shared channel, or SLSS). In some aspects, it may be beneficial to transmit SLSS in the $1^{st}$ symbol of large scale reference resource to simplify synchronization procedure.

In some aspects, an alternative approach may be to assume that the UE can dynamically adjust AGC at small scale channel occasions within large scale reference resource. In this case, there is no need to transmit at the 1st symbol, however, the AGC implementation overhead may increase. On the other hand, the UE that attempts to access the channel may not need to do TX-RX switching and can access channel at the pre-configured/pre-defined small scale channel access occasions.

In some aspects, the basic steps and principles of Type-B small scale sensing procedure are as follows:
(1) The UE processes the candidate set of resources to select an actual resource(s) for sidelink transmission. The UE considers the outcome/results of Type-A sensing as a candidate resource set if Type-A sensing procedure is configured. If Type-A sensing is disabled or results of sensing are not yet available, UE considers as a candidate resources all resources within a resource selection window which is a function of transmission priority and latency.
(2) If the UE considers the specific large scale reference resource as a candidate for transmission it is expected to either: Alternative 1: transmit using actual TX power at the 1st symbol of candidate large scale reference resource. This transmission is needed to properly settle AGC at the receiver side of other UEs to avoid a near-far problem and de-sensitivity issues. Alternative 2: be able to perform AGC adjustment within LS Reference Resources if no shared AGC symbol concept is applied. In this case, the UE is expected to access sidelink channel at small scale channel occasions and therefore should be able to adjust AGC every small scale channel occasion. In this case, there is no need to transmit at the beginning of large scale reference resource.
(3) The following UE behavior can be expected depending on AGC handling considerations, i.e., Alternative 1 or Alternative 2. In case of Alternative 1, after transmission on shared AGC symbol, the UE either continues sidelink transmission or switches from TX to RX state and performs energy sensing (based on RSSI or RSRP measurements) on pre-configured small scale sensing symbols within given candidate large scale reference resource to select an actual resource for transmission. The UE continues transmission if sidelink resources are already reserved and switches to small scale sensing if it aims to initially access channel for transmission on non-reserved resources or aims to reserve sidelink resources. Other potential conditions here are priority level, latency budget, and reliability level. In some aspects, small scale sensing is done at the predefined sensing symbols configured within large/small scale reference resources.

In the case of Alternative 2, the UE is expected to perform energy (RSSI/RSRP) sensing on pre-configured small scale sensing symbols within a given candidate large scale reference resource to select an actual resource for transmission.
(4) If channel access criteria on sensing symbol occasion are satisfied, the UE selects the next/nearest transmission opportunity within selected candidate reference resource for sidelink transmission. If multiple sidelink resources pass channel access criteria, the UE can transmit on adjacent in frequency reference resources or pick single resource for transmission. If multiple sidelink resources pass channel access criteria, the UE can select an actual resource for transmission according to energy metric or randomly. Optionally, if the UE accesses sidelink channel inside of the large scale sidelink reference resource it may be expected to transmit till the end of a given large scale reference resource.
(5) If the channel access criteria are not satisfied: UE performs random back-off and continues sensing at the next applicable small scale sensing occasions of a given or another large scale candidate resource and checks channel access criteria. Sensing across candidate resources continues till the time instance when the remaining amount of resources in candidate resource set approaches the minimum number of required resources for transmission. At this stage, the UE can decide either to drop transmission if congestion criteria are met, or transmit on remaining candidate resources w/o validating small scale channel access criteria.

Additional SLSS Transmission.

In some aspects, the UE can also use the 1st symbol for the purpose of sidelink synchronization. In this case, instead of PSCCH/PSSCH transmission, UE can send sidelink synchronization signal (SLSS). For instance, primary (PSSS) or secondary (SSSS) sidelink synchronization signals can be transmitted without physical sidelink broadcast channel. It can make the overall SLSS synchronization procedure more robust and reduce UE initial acquisition time when sidelink SLSS is used. There can be multiple resource sets defined for transmission of SLSS that can be associated with a synchronization reference (reference synchronization source, e.g. gNB/eNB/GNSS/UE). Depending on the configuration the sidelink synchronization signal resources associated with different synchronization references can be allocated in a TDM or FDM manner. For example, a UE having gNB as a sync source may be configured to transmit SLSS only on odd large scale reference resources, while UEs using GNSS as a sync source can transmit SLSS on even large scale reference resources (e.g., at the beginning of each large scale sidelink reference resource, i.e., the 1st symbol). Other configuration options for the allocation of resources for SLSS transmission can be also configured.

Channel Access Criteria for Small Scale Sensing.

In some aspects, for small scale channel access, the UE may employ clear channel assessment (CCA) procedure to determine whether the sub-channel is busy or not and either do back-off or start transmitting control and data in the large scale resources. A general rule to consider that particular sub-channel is clear is that measured energy metric during a given assessment time T is less than a given energy metric threshold: $E(T)<E_{th}$. In some aspects, energy measurement may be either physical structure unaware (e.g. RSSI or energy in a sub-channel or average power in a sub-channel) or physical structure aware (e.g. RSRP in a sub-channel). Both energy measurement threshold and CCA time T may be a function of priority and number of back-off attempts. More details on the back-off procedure for small scale channel access are described herein.

In some aspects, small scale sensing and channel access procedure are based on frequency selective listen before talk procedure for sidelink channel access (i.e. LBT is applied to multiple sub-channels—sidelink reference resources). Given that the majority of V2X applications are mission-critical, i.e., have limited latency budget for transmission, the channel access duration may be a function of service latency (packet latency). In addition, it needs to be pointed out that there is a certain system tradeoff in terms of the number of LBT attempts to access the channel, given that each attempt may create a half-duplex problem for a reception at the given reference resource. The more times UE is forced to listen the medium and switch from TX-to-RX state (i.e. from transmission at shared AGC symbol to RX small scale sensing) the higher probability that it will suffer from the half-duplex problem for a reception at given candidate resource. Therefore, the amount of TX-to-RX state transitions may be minimized. In general, this may be in conflict with shared AGC principle. Instead of shared AGC symbol, the UE may need to perform fast AGC at predefined sensing symbol locations (e.g. small scale channel access occasions).

Consideration on Congestion Control.

In case if congestion control loop indicates that SL-CBR exceeds a predefined CBR threshold for a given level of priority, the UE may drop the sidelink packet transmission.

Considerations on Usage of Sensing Procedures.

In some aspects, the small scale channel access occasions can be configured to be used only for initial access of resource allocation with periodic resource reservation and aperiodic transmissions.

In some aspects, Type-A (Large Scale) and Type-B (Small Scale) sidelink sensing procedures can be unified and described as a single procedure for sidelink sensing and resource selection without loss of generality. The notation of Type-A and Type-B as well as naming (large scale and small scale) were introduced mainly to simplify the description and to enable independent configuration of sensing procedures that need to be performed by UE. In addition, Type-A and Type-B procedures rely on different sensing mechanisms. For instance, Type-A procedure exploits knowledge of sidelink physical structure (e.g. PSCCH/SCI control signaling decoding—i.e., aware about sidelink physical structure) and Type-B procedure just performs sidelink measurements (i.e. unaware of sidelink physical structure) that are generally agnostic to radio-access technology and thus can be used in case of various coexistence scenarios.

A potentially attractive special case of the above combination of Type-A and Type-B channel access procedures is when small scale channel access granularity equals to one slot wherein large scale resource may be more than one slot. In this case, all the processing procedures including AGC settling may be unchanged comparing to slot level operation.

Small Scale Channel Access Mechanism.

In some aspects, a small scale channel access is assumed to follow a predefined distributed mechanism with sub-channel sensing and back-off. The following conditions are evaluated during small scale sensing before transmission:

Condition 1. If C number of continuous small scale resources within a slot are not busy according to the CCA procedure (energy measurements), then the UE may start transmitting in the next small-scale resource Type-B of this candidate large scale resource Type-A. In some aspects, the UE may not need to perform small scale sensing in other large scale resources selected for transmission after it announces that by sidelink control information.

Condition 2. If the channel turns out to be busy in the small-scale resource within the window, then the UE updates C and continues to sense the channel.

Condition 3. If the number of busy/backed-off small-scale resources in a large scale resource becomes larger than Cm, then the UE skips this candidate large-scale resource and goes to the next one.

One of the key aspects of small scale channel access is the calculation of back-off window C. Usually, in distributed communication systems such as Wi-Fi, the back-off value is assumed to be generated from a uniform distribution $[C_0, C_1]$, where $C_1$ may also be updated depending on sensing procedures. For example, the value $C_1$ may be a sum of constant value d and a product of basic sensing duration c and a multiplier of power of two minus one value. The multiplier may be exponentially increased every time before generation of the back-off window C, e.g. 7, 15, 31, 63, . . . $C_1 = d + c \cdot (2^k - 1)$.

The basic sensing duration c may be designed also depending on channel access procedures related to AGC settling alternatives 1 and 2. In general, it may be any value, but three reasonable alternatives are the following:

(1) A value smaller than OFDM symbol duration which at least accommodates typical propagation time between possible interferers. This value may be 9 microseconds or other value, e.g. ⅛ of OFDM symbol with 15 kHz and normal CP. In this case, a UE may gain channel access on time instance not aligned with neither OFDM symbol boundary nor small scale channel access boundary. In order to preserve reasonable receiving complexity, the transmitting UE may start transmission with a reservation signal which does not carry any control/data information. It continues transmission of the reservation signal until the next small-scale channel access occasion where it switches to the transmission of useful signals such as AGC, control, data. This option may not be friendly to FDM of multiple sub-channels when the channel access granularity is smaller than one OFDM symbols that may lead to inter-carrier and inter-symbol interference.

(2) Single OFDM symbol duration which is a function of subcarrier spacing and CP type. In this case, similar to the previous alternative, the access granularity may be controlled by transmitting reservation signal before actual channel access in the next small scale transmission opportunity. This option follows the principles of OFDM multiple access where inter-carrier and inter-symbol interference is not raised due to CP insertion.

(3) Small scale channel access granularity value (which is assumed larger than OFDM symbol duration).

In some aspects, $[C_0, C_1]$ may also depend on transmission priority, where smaller values may correspond to higher priority and larger values may correspond to lower priority. The mapping between $[C_0, C_1]$ and priority levels may be provided by semi-static signaling using RRC or pre-configuration. It may also be fixed in a technical specification.

In some aspects, if a UE does not access current large scale resource due to the busy channel(s), the procedures to access next candidate large scale resource may be adjusted to increase the chance of access since the UE may exhaust its latency budget if channel access fails again. For that purpose, the value range $[C_0, C_1]$ may be decreased in order to provide more preference for this UE in later candidate resources. The decreasing factor may be also a function of associated priority of the transmission.

In some aspects, the size of the contention window may also be a function of the number of sub-channels. It may be motivated by the fact that the more sub-channels in a given system bandwidth the less concurrency may be observed per each sub-channel.

In some aspects, if a UE has multiple candidate resources in the same time slot, it may run the CCA procedure for each candidate resource in parallel. The random back-off may be either generated commonly for all sub-channels or be independent for all sub-channels. The latter variant may not be suitable if the UE is going to use multiple sub-channels, adjacent or non-adjacent. Once CCA is successful on one or more sub-channels, the UE may select one or more sub-channels for transmission.

Channel Access Types.

For NR-V2X, the following types of channel access may be used: Type-1 with resource reservation, Type-2 without resource reservation, and Type-3 where resource for channel access is granted/recommended by the receiver.

In some aspects, Type-1 channel access with resource reservation is mainly designed to optimize system performance for periodic transmissions. It can be also used to improve the reliability of transmission.

In some aspects, Type-2 channel access without resource reservation (dynamic) is mainly designed to optimize performance for aperiodic transmissions and can be also used for low latency access with high-reliability requirements.

In some aspects, Type-3 channel access with a sidelink grant from an intended receiver.

Type-1 channel access with resource reservation may use Type-A and Type-B sensing (i.e. large and small scale sensing) and apply it after each resource re-selection procedure. A UE with Type-1 channel access can occupy large scale reference resource and access the channel w/o additional sensing when resources are already reserved.

Reserved resources, which may be indicated by SCI can be configured as follows. When reserving resources UE needs to consider processing delay. Receiver processing delay may be taken into account to decide if a given resource (e.g. in the nearest transmission occasion) is considered as reserved or not (there may be some uncertainty during a short period of time). In particular, if TX needs to ensure that certain sidelink resources are reserved it needs to take into account RX processing delay for sidelink processing (e.g. control channel processing and possible other sensing processing) and schedule sidelink shared channel transmissions properly. Note that it does not preserve the possibility of collision however it can reduce its probability. Assuming the same order of processing time value as PUSCH preparation time N2 defined in [e.g., Tables 6.4-1 and 6.4-2 of 3GPP TS 38.214], the following Table 5 can be used for PSSCH/PSCCH preparation time depending on the utilized numerology for sidelink communication:

TABLE 5

| PSCCH/PSSCH preparation time | |
|---|---|
| μ | PSCCH/PSSCH preparation time N [symbols] |
| 0 | 10 + Δ0 |
| 1 | 12 + Δ1 |
| 2 | 23 + Δ2 |
| 3 | 36 + Δ3 | where, Δ0, Δ1, Δ2, Δ3 can be any integer values including 0. Note that the delta part may even be negative since PSCCH/PSSCH preparation time may not have a component of control channel decoding, unlike PUSCH preparation time which takes into account UL grant detection.

In some aspects, two types of sidelink resource reservation can be considered—small scale and large scale sidelink resource reservation. In some aspects, large scale (e.g., at time intervals>10 ms, 50, 100 ms and above) can be indicated by transmission period/resource reservation interval (or pattern). In some aspects, small scale (e.g. <10 ms) can be indicated by sidelink resource pattern within the resource selection window. In general, a UE can do both small and large scale reservation to periodically reserve multiple resources. In some aspects, SCI may need to indicate a pattern of resources and pattern period, e.g., to periodically transmit a large packet size.

In some aspects, Type-2 channel access can follow the same Type-A and Type-B sensing procedures (i.e. large and small scale sensing procedures) for resource selection. Alternatively, it can be configurable which sensing procedure should be applied for Type-2 channel access.

In some aspects, Type-3 channel access with a sidelink grant from RX can follow Type-A and Type-B and taking into account sidelink grant from RX or simply follow grant from RX. In this case, both TX and RX UEs may perform the Type-A/B channel access procedures for transmitting scheduling request, scheduling grant, scheduling assignment, or data.

In some aspects, a system and method of distributed channel access for vehicle-to-vehicle (V2V) communication in a 5G or NR communication system is disclosed and includes one or more of: configuring, by a network, sidelink resource pool structure; configuring, by a network, to a UE to operate in one or a combination of large scale and small scale sensing procedures within the configured sidelink resources; performing, by the UE, channel sensing procedures related to large scale channel access; performing, by the UE, channel sensing procedures related to small scale channel access; transmitting, by the UE, sidelink control and shared channel in sidelink resources identified based on channel access procedures. In some aspects, the sidelink resource pool structure may be one or combination of Type-A (large scale) sidelink reference resources with coarse granularity in time and frequency where the granularity may be a slot or multiple slots in time domain and a PRB or multiple PRBs in frequency domain; and Type-B (small scale) sidelink reference resources with fine granularity in time and frequency wherein the granularity may be a group of symbols or a slot in time domain and a PRB or multiple PRBs in frequency domain. In some aspects, a large scale reference resource may contain one or multiple small scale reference resources characterize at least by different starting symbols. In some aspects, the actual sidelink transmission of a transport block may span multiple small or large scale reference resources. In some aspects, the large scale sensing procedure (Type-A) may be based on the determination of a set of candidate sidelink resources within a sidelink resource selection window by avoiding resources that are occupied by other UEs based on sensing in a sensing window. In some aspects, the small scale sensing procedure (Type-B) may be based on instantaneous channel access within the large scale reference resource by means of listen-before-talk procedures. In some aspects, either small scale or large scale or both procedures may be performed by a UE depending on the configured mode of operation and/or availability of sensing results.

In some aspects, the following steps may be performed during the large scale channel access procedure: a UE may be configured with a large scale sidelink sensing window where the window size may be a function of latency budget, transmission priority, and reliability; the UE may detect sidelink control channel transmissions within the sensing window and exclude resources that may have potential conflict with the detected scheduled transmissions where the decision may be made based on pre-defined exclusion criteria using sidelink measurements such as SL-RSRP; the UE may form a candidate resource set and include there a pre-defined or configured fraction X % of the number of resources in a resources selectin window; and the UE may reserve resource for pre-defined or configured amount of time until resource re-selection trigger happens.

In some aspects, the small scale channel access procedure may be performed by a UE to select particular sidelink resources from the candidate resource set based on additional short-term energy sensing and back-off mechanisms. In some aspects, the small scale channel sensing with relatively slow AGC settling approach 1 at UEs may employ transmission by a UE of AGC symbol at the beginning of a slot to be attempted for channel access. In some aspects, the small scale channel sensing with relatively fast AGC settling approach 2 at UEs may employ transmission by a UE of AGC symbol at the beginning of actual transmission after successful channel access. In some aspects, the AGC symbol may be a sidelink synchronization signal (SL-SS).

In some aspects, the following steps may be performed within small scale channel access procedure: a UE may select particular large scale reference resource as a candidate for transmission; the UE may transmit in the first symbol with actual TX power in case of AGC approach 1; the UE performs AGC settling every symbol or small scale channel access occasion in case of AGC approach 2; the UE performs clear channel assessment within the large scale reference resource; if clear channel assessment is successful, the UE starts transmitting control and/or data in the next small scale reference resource within current large scale resource; and the UE indicates reservation of other larger scale resources selected for transmission and stops performing small scale channel access procedures until a trigger for resource re-selection.

In some aspects, the clear channel assessment procedure may be based on sensing during a random number C of time units where the random number is drawn from a uniform distribution from $C_0$ to $C_1$. In some aspects, if the channel is not busy during the random number of time units C, the UE considers the clear channel assessment is successful and may start transmission. In some aspects, if the channel turns to be busy during the random number of time units C, the UE may consider the clear channel assessment is not successful and may go to another large scale reference resource. In some aspects, the minimum and maximum bounds $C_0$ and $C_1$ of the random uniform distribution may be a function of priority, a number of channel access attempts, remaining latency budget, feedback. In some aspects, the time unit for clear channel assessment may be less than a symbol (e.g., 9 us, ⅛ OFDM symbol) or exactly one symbols of a given numerology and CP type, or one small scale reference resource duration. In some aspects, $C_1$ may be updated each back-off attempt as $C_1 = d + c \cdot (2^k - 1)$. In some aspects, after performing large scale and small scale channel access procedures a UE may send a sidelink control information in PSCCH with an indication of reserved resources respecting a pre-defined gap between reservation signal transmission and other transmissions in the reserved resources. In some aspects, the gap duration may be derived from the processing time N2 which is the PUSCH preparation time. In some aspects, the following values for gap may be used: 15 kHz=>10 symbols+$\Delta 0$; 30 kHz=>12 symbols+$\Delta 1$; 60 kHz=>23 symbols+$\Delta 2$; 120 kHz=>36 symbols+$\Delta 3$, where, $\Delta 0, \Delta 1, \Delta 2, \Delta 3$ can be any integer values including 0.

Techniques disclosed herein include systems and methods of UCI piggybacking for grant-free and grant-based NOMA uplink transmission.

Grant-free or configured grant UL transmissions based on non-orthogonal multiple access (NOMA) is one of New Radio (NR) study items in 3GPP, targeting various use cases including massive connectivity for machine type communication (MTC), support of low overhead UL transmission schemes towards minimizing device power consumption for transmission of small data packets, low latency application such as ultra-reliable and low latency communication (URLLC).

In NR, uplink control information (UCI) can be carried by PUCCH or PUSCH. In particular, UCI may include scheduling request (SR), hybrid automatic repeat request-acknowledgement (HARQ-ACK) feedback, channel state information (CSI) report, e.g., channel quality indicator (CQT), precoding matrix indicator (PMI), CSI resource indicator (CRI) and rank indicator (RI) and/or beam related information (e.g., L1-RSRP (layer 1-reference signal received power)).

Further, it was agreed in NR that when a single-slot PUCCH overlaps with single-slot PUCCH or single-slot physical uplink shared channel (PUSCH) in slot n for a PUCCH group, the UE may multiplex all UCIs on either one PUCCH or one PUSCH, using the existing UCI multiplexing rule, if both following conditions are satisfied: (1) if the first symbol of the earliest PUCCH(s)/PUSCH(s) among all the overlapping channels starts no earlier than symbol $N_1 + d_{1,1} + d_{1,2} + 1$ after the last symbol of PDSCH(s); and (2) if the first symbol of the earliest PUCCH(s)/PUSCH(s) among all the overlapping channels starts no earlier than $N_2 + d_{2,1} + 1$ after the last symbol of PDCCHs scheduling UL transmissions including HARQ-ACK and PUSCH (if applicable) for slot n.

In some aspects, if at least one pair of overlapping channels does not meet the above timeline requirements, UE considers it is an error case for all UL channels in the group of overlapping channels. In this case, UE behavior is not specified. Note that $N_1, N_2, d_{1,1}, d_{1,2}, d_{2,1}$ are processing time related parameters, which may be defined in 3GPP TS 38.214.

In some aspects, in case of grant-free or configured grant NOMA transmission, especially when supporting mMTC application and services, it is expected a massive number of devices attempt to transmit the data in a shared physical time and frequency resource simultaneously. In this case, if some UEs piggyback UCI on grant free PUSCH while other UEs only transmit grant free PUSCH, performance degradation is expected given the fact that different levels of inter-user interference in different resources are experienced at the receiver. This may also complicate the decoding implementation and structure at the receiver side.

FIG. 38 illustrates a diagram 3800 of a grant free PUSCH transmission with and without UCI piggybacking, in accordance with some aspects. In case when the two UEs transmit the PUSCH in the same resource, it is expected advanced decoding algorithm is needed to decode the UCI on PUSCH for UE #1. To handle this issue, a certain mechanism may need to be defined to multiplex UCI on grant-free and grant-based NOMA transmission.

In some aspects, techniques disclosed herein include mechanisms on UCI piggybacking for grant-free and grant-based NOMA transmission.

UCI piggybacking for grant-free and grant-based NOMA transmission.

When multiple UEs transmit the data packet in a shared physical resource, if some UEs piggyback UCI on grant free PUSCH while other UEs only transmit grant free PUSCH, performance degradation is expected given the fact that different levels of inter-user interference in different resources are experienced at the receiver. This may also complicate the decoding implementation and structure at the receiver side. Hence, a certain mechanism is defined herein to multiplex UCI on grant-free and grant-based NOMA transmission. As used herein, the terminology "grant free", "configured grant", and "uplink transmission without dynamic grant" are interchangeable.

Techniques for multiplexing UCI on grant-free and grant-based NOMA transmission are provided as follows.

In some aspects, whether UCI can be multiplexed with grant-free NOMA or PUSCH transmission can be configured in a resource specific manner. In particular, one field in the resource configuration along with time and frequency resource allocation can be used to indicate whether UCI can be multiplexed on PUSCH transmission. For instance, a 1-bit indicator can be included in the resource configuration, wherein bit "1" is used to indicate that UCI can be multiplexed on PUSCH transmission while bit "0" is used to indicate that UCI cannot be multiplexed on PUSCH transmission.

In some aspects, whether UCI can be multiplexed with grant-free NOMA or PUSCH transmission can be configured in a UE specific or a group specific or a cell-specific manner. More specifically, it can be configured by higher layers via NR minimum system information (MSI), NR remaining minimum system information (RMSI), NR other system information (OSI) or UE-specific radio resource control (RRC) signaling.

In some aspects, in the "resource-specific" configuration, the signaling of such configuration may be cell-specific (using NR MSI, RMSI, or OSI) or UE-specific (using UE-specific RRC signaling).

In some aspects, when the indicator indicates that UCI can be multiplexed on PUSCH, and if PUCCH carrying UCI overlaps with PUSCH for NOMA transmission, and if the timeline requirement is satisfied, the UE would multiplex UCI on PUSCH and drop PUCCH, otherwise it is considered as an error case. However, when the indicator indicates that UCI cannot be multiplexed on PUSCH, and if PUCCH carrying UCI overlaps with PUSCH for NOMA transmission, and if the timeline requirement is satisfied, the UE would drop one of PUCCH and PUSCH, and UCI is not multiplexed on PUSCH. Further, whether to drop PUSCH or PUCCH, when the indicator indicates that UCI cannot be multiplexed on PUSCH, can be configured to the UE using UE-specific RRC or cell-specific RRC (i.e., system information block (SB)) signaling.

Figure 39:
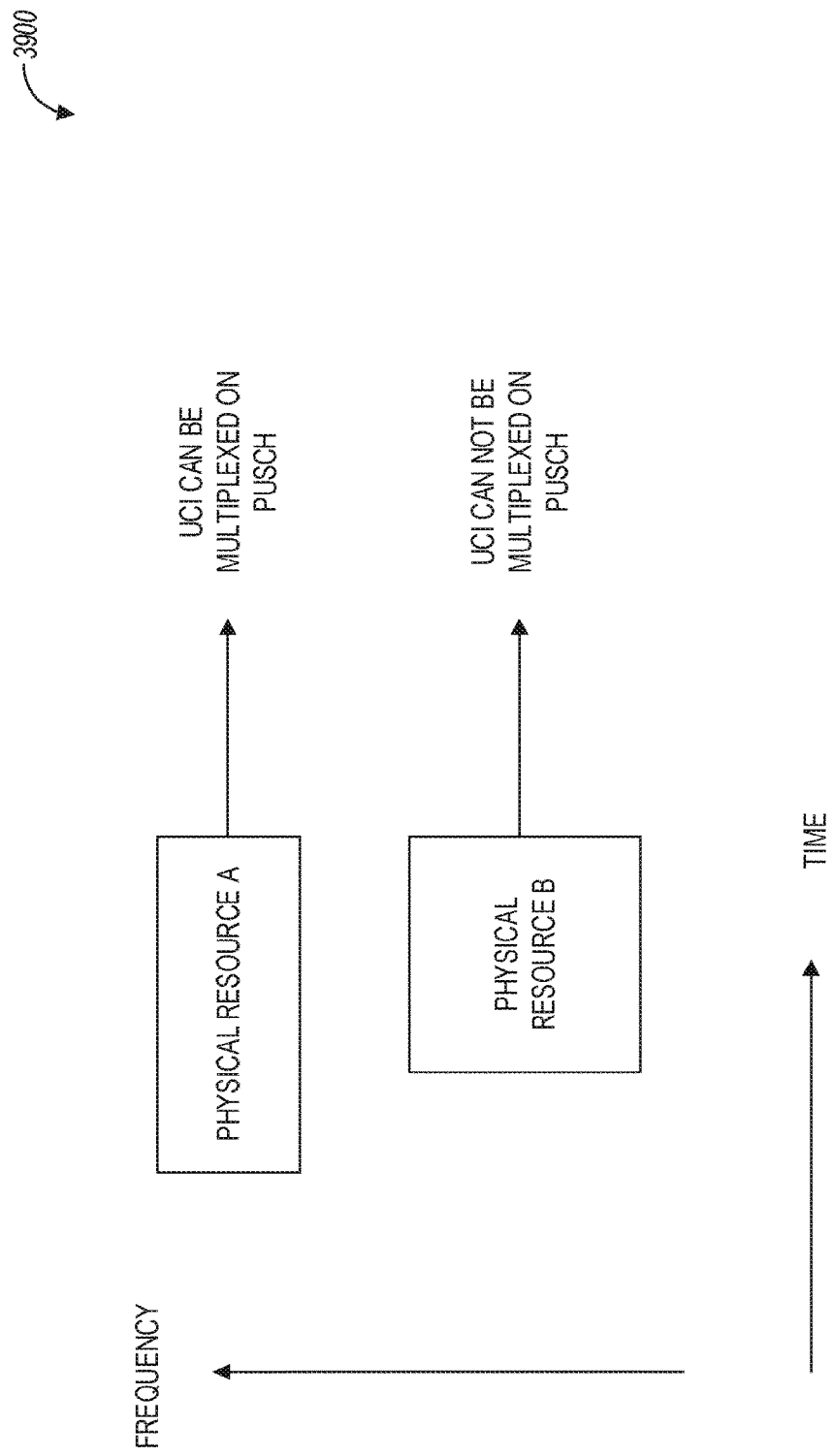
FIG. 39 illustrates resource configuration including an indicator to indicate whether UCI can be multiplexed on PUSCH, in accordance with some aspects.

FIG. 39 illustrates resource configuration 3900 including an indicator to indicate whether UCI can be multiplexed on PUSCH, in accordance with some aspects. For instance, for resource A, the UCI can be multiplexed on PUSCH while for resource B, the UCI cannot be multiplexed on PUSCH.

In some aspects, when PUCCH carrying UCI overlaps with grant-free NOMA PUSCH transmission in time, if the timeline requirement is satisfied, one of the physical channels, PUCCH carrying UCI or PUSCH for NOMA transmission is dropped. The dropping rule or priority rule may be configured by higher layers via MSI, RMSI, OSI, or RRC signaling or dynamically indicated in the DCI triggering NOMA PUSCH transmission and/or PUCCH transmission, e.g., for HARQ-ACK feedback.

Alternatively, the priority rule may depend on different service or application. This may employ explicit association/identification of service types or may realize such functionality without explicit association to particular service types. Towards this, the following three example cases can be considered.

Case 1:

In some aspects, when PUCCH carrying UCI for URLLC application overlaps NOMA-based PUSCH transmission for eMBB services, and if the timeline requirement is satisfied, PUCCH carrying UCI for URLLC application is transmitted and NOMA-based PUSCH transmission for eMBB service is dropped.

Figure 40:
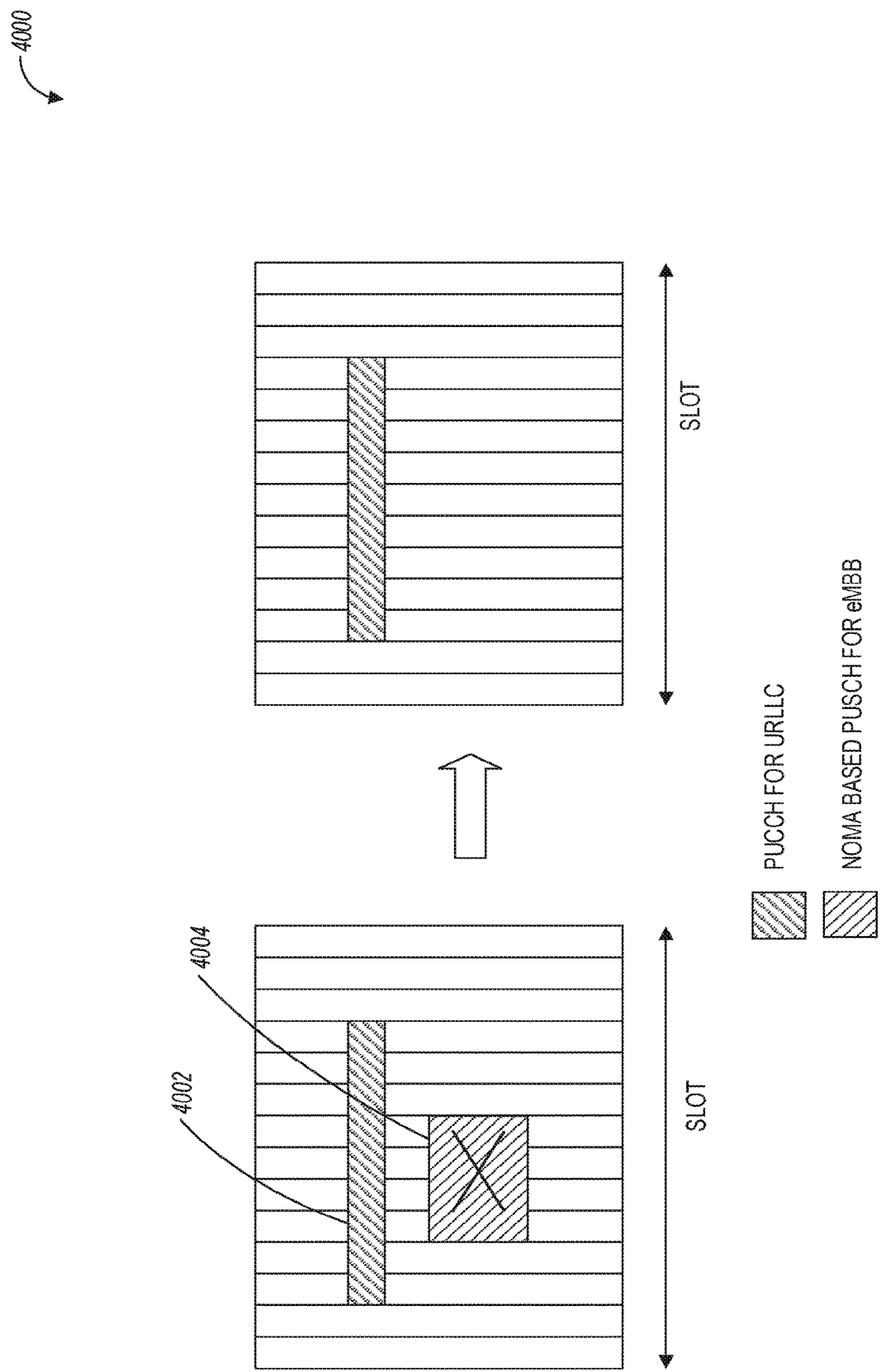
FIG. 40 illustrates a dropping rule when PUCCH for ultra-reliable low-latency communication (URLLC) overlaps with NOMA-based PUSCH for enhanced mobile broadband (eMBB), in accordance with some aspects.

FIG. 40 illustrates an example 4000 of a dropping rule when PUCCH for URLLC overlaps with NOMA-based PUSCH for eMBB, in accordance with some aspects. In the example 4000, NOMA-based PUSCH transmission 4004 for eMBB service is dropped and UE only transmits the PUCCH 4002 carrying UCI for URLLC application.

Figure 41:
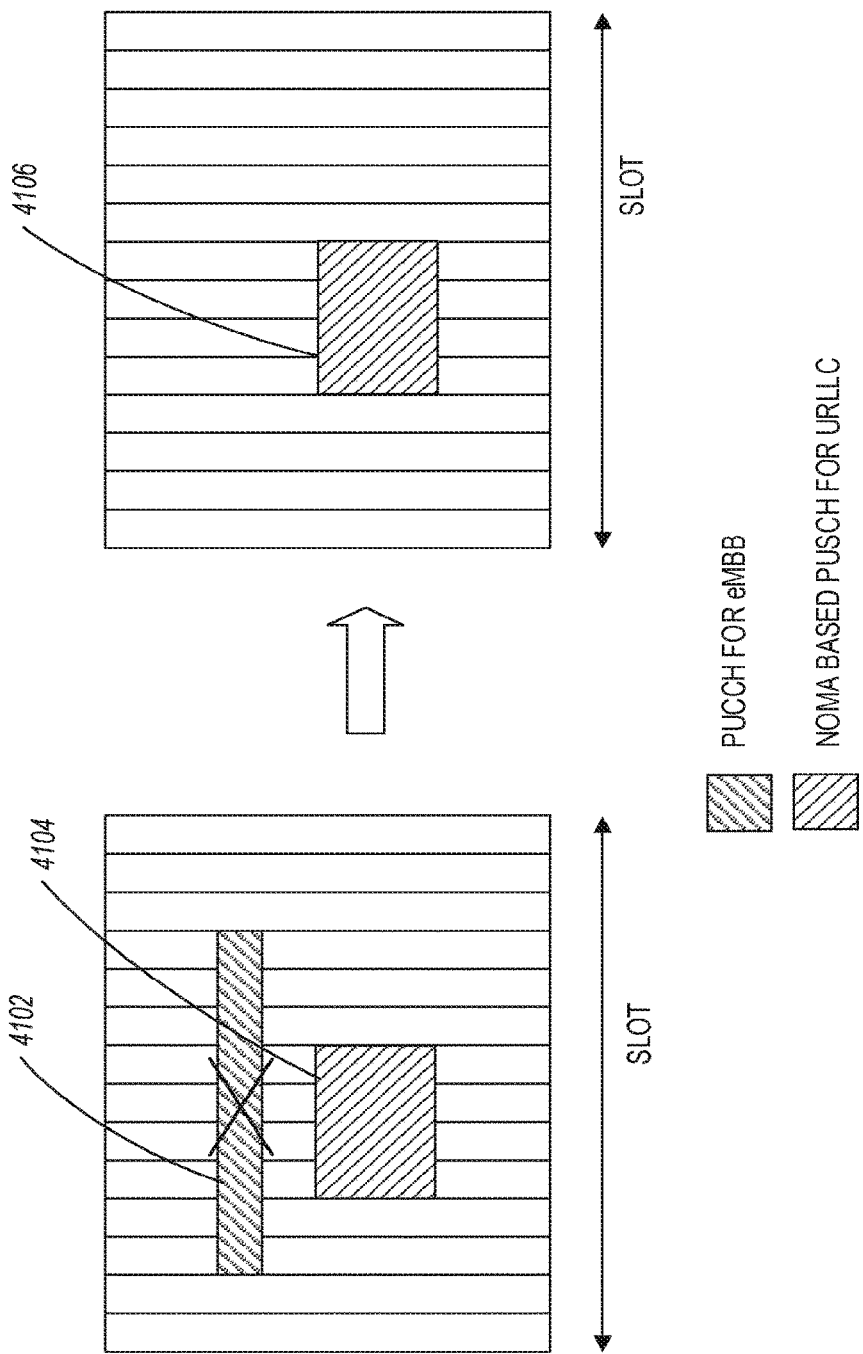
FIG. 41 illustrates a dropping rule when PUCCH for eMBB overlaps with NOMA-based PUSCH for URLLC, in accordance with some aspects.

Case 2:

FIG. 41 illustrates a diagram 4100 of a dropping rule when PUCCH for eMBB overlaps with NOMA-based PUSCH for URLLC, in accordance with some aspects. In some aspects, when PUCCH carrying UCI for eMBB application overlaps NOMA-based PUSCH transmission for URLLC services, and if the timeline requirement is satisfied, PUCCH 4102 carrying UCI for eMBB service is dropped and NOMA-based PUSCH 4104 transmission for URLLC application is transmitted, as shown in FIG. 41.

Case 3:

In some aspects, when PUCCH carrying UCI for eMBB application overlaps NOMA based PUSCH transmission for eMBB services, or when PUCCH carrying UCI for URLLC application overlaps NOMA based PUSCH transmission for URLLC services and if the timeline requirement is satisfied, whether UCI can be multiplexed on PUSCH may be configured in a UE specific, group specific, resource-specific or cell-specific manner as mentioned above. Further, this option could be used without an explicit association of a service type to either of PUCCH or UL NOMA resources as in Cases 1 and 2 above.

Specifically, the resource configuration for a set of UL NOMA resources may indicate one of: (1) UCI can be multiplexed on NOMA-based PUSCH resources, or (2) UCI cannot be multiplexed on NOMA-based PUSCH resources and the UCI transmission is canceled ("dropped"), or (3) UCI cannot be multiplexed on NOMA-based PUSCH resources and the UCI transmission is prioritized by dropping of potential NOMA-based PUSCH transmission.

The above may be realized using a single 2-bit parameter or multiple parameters, etc.

Alternatively, in some aspects, the above indications can be signaled using other combinations with the indication of whether a dynamically scheduled PUSCH is to be prioritized or not over a potential NOMA-based PUSCH transmission in case of time-domain overlap between the two. In such a case, the following can be one example: two parameters (Param_A and Param_B respectively) in the resource configuration may be used to indicate the following combinations.

Param_A may indicate one of: (1) UCI can be multiplexed on NOMA-based PUSCH resources, or (2) UCI cannot be multiplexed on NOMA-based PUSCH resources and the UCI transmission is canceled ("dropped"); while to address any cases of time-domain overlap between NOMA-based UL transmission resource(s) and any scheduled PUSCH or PUCCH transmissions, Param_B may indicate one of: (1) NOMA-based UL (PUSCH) transmission is prioritized and the scheduled PUSCH or PUCCH transmissions, or (2) the scheduled PUSCH or PUCCH transmissions are prioritized and the potential NOMA-based UL (PUSCH)) transmission is dropped.

In the above, "scheduled PUSCH or PUCCH transmissions" may include one or more of PUSCH scheduled by dynamic grants, "grant-based PUSCH", or triggered by aperiodic CSI request; PUSCH transmission opportunity based on any configured grant transmissions (types 1 or 2, etc.); PUSCH transmission opportunity based on any other resource configuration, e.g., another overlapping NOMA-based transmission resource configuration (in case of NOMA-based transmission resources are identifiable at the UE, see related embodiments later in this disclosure); PUCCH transmission based on higher layer configuration, e.g., for Scheduling Request (SR), periodic CSI reporting; and PUCCH transmission in response to PDSCH scheduled by DCI formats 1_0 or 1_1 or configured as part of DL SPS, e.g., carrying HARQ-ACK feedback or aperiodic.

Alternatively, in some aspects, the priority rule may depend on whether PUSCH is transmitted using resource configured for UL NOMA transmission regardless of the actual use case. For example, if PUSCH is transmitted using resource configured for UL NOMA transmission, PUCCH is prioritized, and if PUSCH is transmitted using resource not configured for UL NOMA transmission, PUSCH is prioritized.

In some aspects, as mentioned herein, the UE can behave such that the UCI is not be multiplexed on NOMA-based PUSCH transmission, but the UCI can be multiplexed on normal PUSCH transmission. In this case, certain mechanisms may need to be defined to differentiate the normal PUSCH transmission and NOMA-based PUSCH transmission.

In some aspects, for Type 2 grant-free PUSCH transmission, in the activation of grant free PUSCH transmission, one field in the DCI may be used to indicate whether this is NOMA based PUSCH transmission or normal PUSCH transmission. Note that this can apply for both initial and subsequent transmission opportunities.

Alternatively, in some aspects, different Radio Network Temporary Identifier (RNTI) can be used to differentiate whether this is NOMA based PUSCH transmission or normal PUSCH transmission. For instance, when cyclic redundancy check (CRC) is masked with RNTI-A, this indicates that this is NOMA based PUSCH transmission. In case when CRC is masked with RNTI-B, e.g., the C-RNTI, this indicates that this is normal PUSCH transmission. Note that RNTI-A and RNTI-B may be predefined in the specification or configured by higher layers via MSI, RMSI, OSI, or RRC signaling.

In some aspects, the above options can also apply for the grant-based PUSCH transmission. In particular, one field in the DCI or use of different RNTI can be used to indicate whether this is NOMA-based PUSCH transmission or normal PUSCH transmission for grant-based transmission.

For Type 1 grant-free PUSCH transmission, whether this is NOMA based PUSCH transmission or normal PUSCH transmission can be configured by higher layers via MSI, RMSI, OSI, or RRC signaling. It can be configured in a resource specific manner. For instance, for physical resource A for grant free PUSCH transmission, it can be configured for NOMA-based PUSCH transmission, while for physical resource A for grant free PUSCH transmission, it can be configured for normal PUSCH transmission.

In some aspects, whether it is NOMA-based PUSCH transmission or normal PUSCH transmission can be implicitly derived from the configuration of PUSCH transmission. For instance, for spreading-based NOMA transmission, if indicated/configured spreading factor is greater than 1, this indicates that it is NOMA-based PUSCH transmission. In some aspects, this spreading factor may be indicated in the activation of grant free PUSCH transmission in Type 2 grant free PUSCH transmission or configured by RRC signaling for Type 1 grant free PUSCH transmission. Other possible transmission configuration factors that may be used to implicitly identify NOMA-based transmission opportunity include one or combinations of: use of different PUSCH DMRS configuration compared to PUSCH scheduled via dynamic grants (DCI) or configured grants; use of different interleaving or scrambling functions compared to PUSCH scheduled via dynamic grants (DCI) or configured grants; and use of different timing advance value compared to PUSCH scheduled via dynamic grants (DCI) or configured grants. As discussed herein, the term "grant-free PUSCH transmission" may be referred to as "PUSCH with configured grant" as well.

A system and method of wireless communication for a 5G or NR communication system includes configuring, by a gNB, an indicator whether uplink control information (UCI) can be multiplexed with grant-based or grant-free non-orthogonal multiple access (NOMA) based physical uplink shared channel (PUSCH) transmission. In some aspects, grant-based or grant-free NOMA-based PUSCH is transmitted by the UE in accordance with the configured indicator. In some aspects, whether UCI can be multiplexed with grant-free NOMA or PUSCH transmission can be configured in a resource specific manner. In some aspects, one field in the resource configuration along with time and frequency resource allocation can be used to indicate whether UCI can be multiplexed on PUSCH transmission. In some aspects, whether UCI can be multiplexed with grant-free NOMA or PUSCH transmission can be configured in a UE specific or a group specific or a cell-specific manner. In some aspects, it can be configured by higher layers via NR minimum system information (MSI), NR remaining minimum system information (RMSI), NR other system information (OSI), or UE-specific radio resource control (RRC) signaling. In some aspects, when PUCCH carrying UCI overlaps with grant-free NOMA PUSCH transmission in time, if the timeline requirement is satisfied, one of the physical channels, PUCCH carrying UCI or PUSCH for NOMA transmission is dropped. In some aspects, the dropping rule or priority rule may be configured by higher layers via MSI, RMSI, OSI, or RRC signaling or dynamically indicated in the DCI triggering NOMA PUSCH transmission and/or PUCCH transmission, e.g., for HARQ-ACK feedback.

In some aspects, the priority rule may depend on different service or application; wherein this may employ explicit association/identification of service types or may realize such functionality without explicit association to particular service types. In some aspects, when PUCCH carrying UCI for URLLC application overlaps NOMA based PUSCH transmission for eMBB services, and if the timeline requirement is satisfied, PUCCH carrying UCI for URLLC application is transmitted and NOMA based PUSCH transmission for eMBB service is dropped. In some aspects, when PUCCH carrying UCI for eMBB application overlaps NOMA based PUSCH transmission for URLLC services, and if the timeline requirement is satisfied, PUCCH carrying UCI for eMBB service is dropped and NOMA based PUSCH transmission for URLLC application is transmitted. In some aspects, when PUCCH carrying UCI for eMBB application overlaps NOMA-based PUSCH transmission for eMBB services, or when PUCCH carrying UCI for URLLC application overlaps NOMA based PUSCH transmission for URLLC services and if the timeline requirement is satisfied, whether UCI can be multiplexed on PUSCH may be configured in a UE specific, group specific, resource-specific or cell-specific manner. In some aspects, resource configuration for a set of UL NOMA resources may indicate one of 1) UCI can be multiplexed on NOMA-based PUSCH resources, 2) UCI cannot be multiplexed on NOMA-based PUSCH resources and the UCI transmission is canceled ("dropped"), and 3) UCI cannot be multiplexed on NOMA-based PUSCH resources and the UCI transmission is prioritized by dropping of potential NOMA-based PUSCH transmission. In some aspects, the priority rule may depend on whether PUSCH is transmitted using resource configured for UL NOMA transmission regardless of the actual use case. In some aspects, for Type 2 grant-free PUSCH transmission, in the activation of grant free PUSCH transmission, one field in the DCI may be used to indicate whether this is NOMA based PUSCH transmission or normal PUSCH transmission. In some aspects, different Radio Network Temporary Identifier (RNTI) can be used to differentiate whether this is NOMA based PUSCH transmission or normal PUSCH transmission. In some aspects, NOMA-based PUSCH transmission or normal PUSCH transmission can be implicitly derived from the configuration of PUSCH transmission. In some aspects, transmission configuration factors that may be used to implicitly identify NOMA-based transmission opportunity include one or combinations of 1) spreading factor; 2) use of different PUSCH DMRS configuration compared to PUSCH scheduled via dynamic grants (DCI) or configured grants; 3) use of different interleaving or scrambling functions compared to PUSCH scheduled via dynamic grants (DCI) or configured grants; and 4) use of different timing advance value compared to PUSCH scheduled via dynamic grants (DCI) or configured grants.

Techniques disclosed herein include design and apparatus to mitigate inter-cell blocking and interference in NR systems operating on unlicensed spectrum.

Each year, the number of mobile devices connected to wireless networks significantly increases. In order to keep up with the demand in mobile data traffic, necessary changes have to be made to system requirements to be able to meet these demands. Three critical areas that need to be enhanced in order to deliver this increase in traffic are larger bandwidth, lower latency, and higher data rates.

One of the limiting factors in wireless innovation is the availability in the spectrum. To mitigate this, the unlicensed spectrum has been an area of interest to expand the availability of LTE. In this context, one of the major enhancement for LTE in 3GPP Release 13 has been to enable its operation in the unlicensed spectrum via Licensed-Assisted Access (LAA), which expands the system bandwidth by utilizing the flexible carrier aggregation (CA) framework introduced by the LTE-Advanced system.

Now that the main building blocks for the framework of NR have been established, a natural enhancement is to allow this to also operate on unlicensed spectrum. The work to introduce shared/unlicensed spectrum in 5G NR has already been kicked off, and a new study item on "NR-Based Access to Unlicensed Spectrum" was approved in TSG RAN Meeting #77. The objective of this new SI is to study NR-based operation in unlicensed spectrum including:

(1) Physical channels inheriting the choices of duplex mode, waveform, carrier bandwidth, subcarrier spacing, frame structure, and physical layer design made as part of the NR study and avoiding unnecessary divergence with decisions made in the NR WI. Consider unlicensed bands both below and above 6 GHz, up to 52.6 GHz. Consider unlicensed bands above 52.6 GHz to the extent that waveform design principles remain unchanged with respect to below 52.6 GHz bands. Consider similar forward compatibility principles made in the NR WI.

(2) Initial access, channel access, scheduling/HARQ, and mobility including connected/inactive/idle mode operation and radio-link monitoring/failure.

(3) Coexistence methods within NR-based and between NR-based operation in unlicensed and LTE-based LAA and with other incumbent RATs in accordance with regulatory requirements in e.g., 5 GHz, 37 GHz, 60 GHz bands. Coexistence methods already defined for the 5 GHz band in LTE-based LAA context should be assumed as the baseline for 5 GHz operation. Enhancements in 5 GHz over these methods should not be precluded. NR-based operation in unlicensed spectrum should not impact deployed Wi-Fi services (data, video and voice services) more than an additional Wi-Fi network on the same carrier.

While this SI is at an initial stage, it is important to identify aspects of the design that can be enhanced for NR when operating in unlicensed spectrum. One of the challenges, in this case, is that this system must maintain fair coexistence with other incumbent technologies, and in order to do so depending on the particular band in which it might operate some restriction is might be taken into account when designing this system. For instance, if operating in the 5 GHz band, a listen-before-talk (LBT) procedure needs to be performed to acquire the medium before a transmission can occur. In this case, it can be observed, as it was done for further enhanced LAA (FeLAA), that the scheduled UL performances are greatly degraded due to the "quadruple" contention for UEs to access the UL. That is 1) UE to send scheduling request (SR), 2) LBT performed at the gNB before sending UL grant (especially in the case of self-carrier scheduling), 3) UE scheduling (internal contention amongst UEs associated with the same gNB), and 4) LBT performed only by the scheduled UE. Furthermore, the four subframes necessary for processing delay between UL grant and PUSCH transmission represent an additional performance constraint.

In some aspects, in order to overcome these issues, grant-free transmission for NR operating in the unlicensed spectrum has been agreed to be studied. However, while in NR the starting symbol of a UL transmission can be quite flexible within a slot, for grant-free UEs configured to occupy full bandwidth mode (operate in a TDD mode), there could be still a high likelihood (proportional to the number of active UEs within a secondary cell) that multiple of these UEs start simultaneously their transmissions, which will incur reciprocal blocking due to transmission collisions with each other. In order to reduce intra-cell collisions, UEs can be configured with random grant-free specific start offsets, which allow associating different priorities to access the channel to those UEs that happen to attempt transmission at the same OFDM boundary. When grant-free UEs are instead configured to occupy partial bandwidth (operate in an FDD mode), in order to better utilize the frequency/time resources available, an exact start offset is more appropriate: introducing a random offset can induce unintended blocking between UEs. For instance, a UE starting transmission earlier can make the LBT fail for the UEs who have chosen a relatively longer random offset. Techniques disclosed herein can be used to mitigate inter-cell interference and reciprocal blocking among grant-free and scheduled UE transmissions.

In order to overcome the issues related to the quadruple contention for UEs access to the UL, the grant-free transmission is a suitable solution for NR systems operating on unlicensed spectrum. However, while in NR the starting of a UL transmission can be quite flexible within a slot, for grant-free UEs there is a high that some UEs start might reciprocal block and their transmission collide each other. In order to further mitigate this issue, this invention proposed some techniques and their related details.

An advantage of the disclosed technique is that if one or more embodiments disclosed in this invention are adopted by 3GPP NR standard, it is likely that most of the vendors will implement it in their products for compliance.

When operating on unlicensed spectrum that requires contention-based protocols to access the channel, a scheduled UL transmission is greatly degraded due to the "quadruple" contention for UEs to access the UL. In fact, before the UE can perform a UL transmission, the system is subject to the following steps: 1) UE sends scheduling request (SR), 2) LBT performed at the gNB before sending UL grant (especially in the case of self-carrier scheduling), 3) UE scheduling (internal contention amongst UEs associated with the same gNB) and 4) LBT performed only by the scheduled UE. Furthermore, the four subframes necessary for processing delay between UL grant and PUSCH transmission represent an additional performance constraint. In order to overcome these issues, a grant-free transmission can be included as an enhancement of NR when operating on unlicensed spectrum. However, while in NR the starting of a UL transmission can be quite flexible within a slot, for grant-free UEs configured to occupy full bandwidth mode (operate in a TDD mode), there could be still a high likelihood (proportional to the number of active UEs within a secondary cell) that multiple of these UEs start simultaneously the transmission, which will incur reciprocal blocking due to transmission collisions with each other. Furthermore, while for grant-free UEs the time domain resources that can be used for this type of transmission can be configured via higher layer signaling or can be indicated in a specific DCI allowing the gNB to have some level of controllability to coordinate the scheduled and the grant-free transmissions, the gNB can transmit DL or scheduled UL transmissions in a time window that is also configured for grant-free transmission as well, incurring collisions between scheduled transmissions (DL and UL) and grant-free transmissions. For this reason, some techniques to mitigate collisions and mutual blocking among devices should be established.

As used herein, the terminology "grant free", "configured grant", and "uplink transmission without dynamic grant" are interchangeable.

Time-Division Multiplexed Access.

In some aspects, grant-free UL transmissions can be allowed to operate in a TDM manner. In another aspect, for a grant-free UL transmission operating in full bandwidth mode, the UE can be configured with a grant-free specific PUSCH start offset value for grant-free transmission, which is used to defer randomly the grant-free transmission, and provide to the UEs a different priority to access the channel mitigating the chance of colliding with and blocking each other.

In some aspects, PUSCH transmission or a presence detection may start X symbols later than the start of the grant-free transmission. In some aspects, for Type 1 configured grant uplink transmission, the start of grant free transmission is configured by RRC signaling. For Type 2 configured grant uplink transmission, the start of grant free transmission is indicated by time domain resource allocation in the DCI for activation of grant free uplink transmission. In another embodiment, the value of X may depend on the numerology and can be defined in the spec. As an example, the value of X can be like that provided in Table 6:

TABLE 6

Example of the value of X

| Numerology | 0 | 1 | 2 | 3 | 4 |
|---|---|---|---|---|---|
| Subcarrier Spacing (KHz) | 15 | 30 | 60 | 120 | 240 |
| OFDM Symbol Duration (μs) | 66.67 | 33.33 | 16.67 | 8.33 | 4.17 |
| Cyclic Prefix Duration (μs) | 4.69 | 2.34 | 1.17 | 0.57 | 0.29 |
| OFDM Symbol including CP (μs) | 71.35 | 35.68 | 17.84 | 8.92 | 4.46 |
| Value of X | 1 | 2 | 4 | 8 | 16 |

In some aspects, the value of X can be fixed independently from the numerology adopted. In one aspect, the random offset can be only applied to certain numerologies, for example for 15, 30, and 60 KHz. In another aspect, the value of X for each numerology can be configured by higher layers via NR minimum system information (MSI), NR remaining minimum system information (RMSI), NR other system information (OSI), or radio resource control (RRC) signaling. In another aspect, CP extension of the first OFDM symbol carrying UL-SCH or presence detection signal can be applied between the initial starting symbol of grant-free transmission and the beginning of actual grant-free transmission (either PUSCH or a presence signal), as illustrated in FIG. 42.

Figure 42:
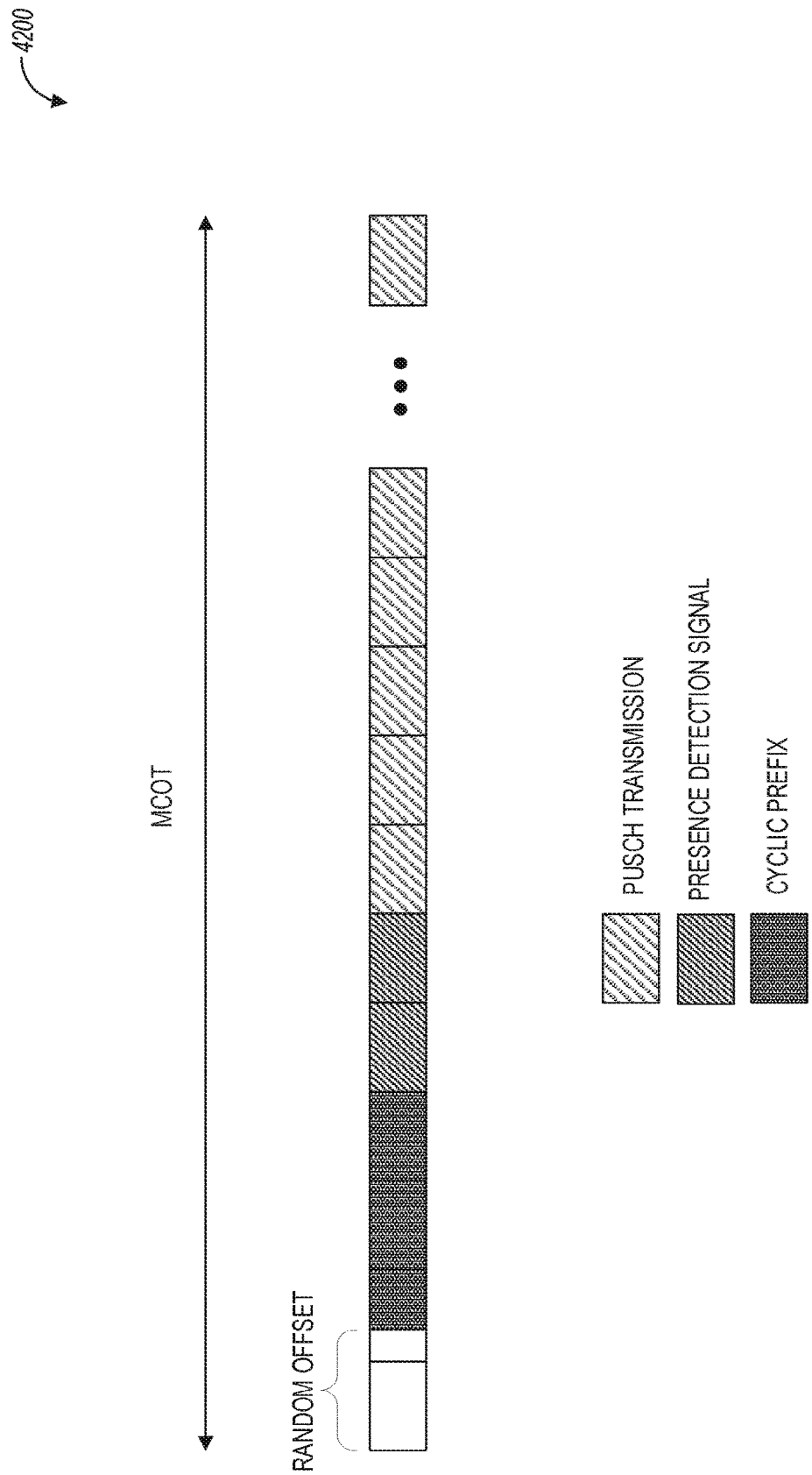
FIG. 42 illustrates AUL specific offset to defer AUL transmissions, in accordance with some aspects.

FIG. 42 illustrates a diagram 4200 of AUL specific offset to defer AUL transmissions, in accordance with some aspects. In one aspect, if X>1, first partial OFDM symbol between the initial starting symbol of grant-free transmission and the beginning of actual grant-free transmission (either PUSCH or a presence signal) is filled with CP while the remaining full symbols may be either filled with CP or PUSCH or a presence signal. In FIG. 42, the illustration provides an example of the case when X>1, and the gap between the initial starting symbol of grant-free transmission and the beginning of actual grant-free transmission (either PUSCH or a presence signal) is fully filled with CP.

FIG. 43 illustrates a diagram 4300 of granularity for offset values, in accordance with some aspects. In some aspects, a set of offset values that define the start of the presence detection or PUSCH transmission from the start of the grant-less transmission, which as mentioned above is filled with the cyclic prefix of the first symbol of the presence detection or PUSCH, can be defined. In another aspect, the granularity of the offset values can be, for example, 9 µs (slot time for Wi-Fi), or 5 or 10 µs or some other value(s), as illustrated in FIG. 43. In another aspect, regardless of the numerology, a gap of maximum 16 µs needs to be left between the start of AUL transmission, and the PUSCH or presence detection transmission.

In some aspect, a combination of a set of offset values (as described in the previous embodiment) and X symbols can be used to defer the beginning of grant-free transmission. In one aspect, only one set of offset values is defined and for instance, the set of offset values defined in Rel.15 FeLAA (i.e., {16, 25, 34, 43, 52, 61 and 67.7} µs) can be reused, and based on the numerology adopted, only a subset of it is used. For example: for 15 KHz if X=1, the set is {16, 25, 34, 43, 52, 61 and 67.7} µs; for 30 KHz if X=2, the set is {16, 25, 34, 43, 52, 61 and 67.7} µs; for 30 KHz if X=1, the set is {16, 25, 33.33} µs; for 60 KHz if X=4, the set is {16, 25, 34, 43, 52, 61 and 67.7} µs; for 60 KHz if X=2, the set is {16, 25, 33.33} µs; for 120 KHz if X=8, the set is {16, 25, 34, 43, 52, 61 and 67.7} µs; for 120 KHz if X=4, the set is {16, 25, 33.3} µs; for 240 KHz if X=16, the set is {16, 25, 34, 43, 52, 61 and 67.7} µs; for 240 KHz if X=8, the set is {16, 25, 33.3} µs.

Other values in the aforementioned examples can be straightforwardly extended and not limited to the above exemplary values.

In some aspects, the set of offset values can be configured by higher layers via MSI, RMSI, OSI, or RRC signaling. In some aspects, the UEs can be categorized based on the priority to access the channel. In this matter, different UEs can have a different set of offset values, with different granularity and values of X.

In some aspects, the set of offset values that are used when the grant-free transmission is performed in the MCOT acquired by gNB can be different than those used to perform grant-free UL transmission outside of the MCOT acquired by gNB. In one aspect, the offset values used for grant-free UL transmissions inside of the gNB acquired MCOT may be a subset of those that can be used for grant-free UL transmission outside of the MCOT: for example, for grant-free UL transmissions performed in the MCOT acquired by gNB, the starting position of the grant-free UL transmission can be selected from the set {34, 43, 52, 61 µs and start of OS #1}, while for grant-free UL transmissions performed outside the MCOT acquired by gNB, the starting position can be selected from the set {16, 25, 34, 43, 52, 61 µs and start of OS #1}. For grant-free UL transmissions performed within the acquired MCOT, LBT type-2 can be performed (25 µs LBT), and in order to ensure that the scheduled UL transmissions have higher priority than grant-free UL transmissions, the grant-free UL transmission can be deferred by more than 25 µs.

In some aspects, a grant-free UE can be configured through RRC signaling or through the activation/deactivation DCI to use a different value range, or one or a subset of offset values for AUL transmission within the MCOT acquired by gNB, and for grant-free transmissions outside the MCOT acquired by gNB. In another aspect, the set of values can be fixed for either grant-free transmissions outside the MCOT acquired by gNB or grant-free transmissions inside the MCOT acquired by gNB or both. In another aspect, for one case the set of values can be fixed while for the other it can be RRC configured: for example, for grant-free transmissions outside the MCOT acquired by gNB, the set of values is fixed, while for AUL transmissions inside the MCOT acquired by gNB, the set of values is RRC configured.

In some aspects, the AUL UEs can be configured with different set of values, and the selection can be done such that the adjacent UEs are not allowed to select the same offset value: for example given UE #1-3, the grant-free UE #1 is configured to use {16, 25} µs, the grant-free UE #2 is configured to use {34, 43} µs, and the grant-free UE #3 is configured to use {52, 61} µs. In one aspect, given a certain set of offset values that a grant-free UE can select, the AUL UE performs the selection randomly, such that each value has the same probability to be extracted and used. In one aspect, the grant-free UE can inform the gNB about the value that has been selected by signaling this value through the G-UCI. In one aspect, the grant-free UE does not inform the gNB about the offset value that has selected. In another aspect, given a set of offset values, the gNB selects the offset value for each UE and configures each UE with a particular value to start grant-free transmission.

In one aspect, if multiple BWPs may be configured within 20 MHz, the grant-free UEs with different numerologies may use the same set of offset values (i.e {16, 25, 34, 43, 52, 61 and 67.7} µs), and the value of X can be scaled accordingly. As an example, X=1@15 KHz SCS, X=2@30 KHz SCS, X=4@60 KHz SCS, X=8@120 KHz SCS, and X=16@240 KHz SCS. This ensures fairness among UEs that use different numerology.

Frequency Division Multiplexed (FDM'Ed) Access.

In some aspects, grant-free UL transmissions can also be allowed to operate in an FDM manner, since it offers higher benefits than the TDM mode in transmitting small packets, and allows to minimize latency. However, if grant-free UL transmissions are performed in FDM manner, the UEs can block each other if they have different starting positions. For instance, a UE starting transmission earlier can make the LBT fail for the UEs who have chosen a relatively longer random offset. Therefore, in the case of FDM'ed grant-free UL transmissions, a common offset may be more favorable.

In some aspects, for grant-free UL transmission operating in partial bandwidth mode, the UE may be configured with a common grant-free UL transmission-specific PUSCH start offset value for grant-free UL transmission. In one aspect, similarly as for the TDM'ed case, the PUSCH transmission or the presence detection signal transmission, which may precede the PUSCH transmission, may always start X symbols later than the start of the grant-free transmission. In another aspect, similar to the TDM'ed case, the value of X may depend on the numerology and can be defined in the spec. In another aspect, the value of X can be fixed independently from the numerology adopted. In one aspect, the offset may be only applied for certain numerologies, for example for 15, 30 and 60 KHz. In another aspect, CP extension of the first OFDM symbol carrying UL-SCH or presence detection signal can be applied between the start of the grant-free transmission, and the beginning of grant-free transmission or a presence signal, which precede the grant-free transmission. In one aspect, if multiple BWPs may be configured within 20 MHz, the grant-free UEs with different numerologies can be configured with the same offset value to ensure fair use of the channel across UES with different numerologies. In one aspect, if X>1, first partial OFDM symbol between the initial starting symbol of grant-free transmission and the beginning of actual grant-free transmission (either PUSCH or a presence signal) is filled with CP while the remaining full symbols may be either filled with CP or PUSCH or a presence signal.

In some aspects, the common grant-free UL transmission-specific PUSCH start offset value can be selected from a set of offset values. In one aspect, the defined set of values may be the same as that defined for TDM'ed mode. In another aspect, the set of offset values among which the grant-free starting position can be chosen when the grant-free transmission is performed in the MCOT acquired by gNB can be different than those used to perform grant-free transmission outside of the MCOT acquired by gNB. In one aspect, the offset values used for grant-free transmissions inside of the gNB acquired MCOT can be a subset of those that can be used for grant-free transmission outside of the MCOT: for example, for grant-free transmissions performed in the MCOT acquired by eNB, the common starting position of the grant-free transmission can be selected from the set {34, 43, 52, 61, 66.67} µs, while for grant-free transmissions performed outside the MCOT acquired by gNB the common starting position can be selected from the set {16, 25, 34, 43, 52, 61 µs and start of OS #1}.

In one aspect, UEs can be categorized based on the priority to access the channel. In this matter, different UEs can have a different set of offset values, with different granularity and values of X. In some aspects, the common AUL-specific offset can be configured by the gNB through RRC signaling or through the activation/deactivation DCI. More specifically, for Type 1 configured grant uplink transmission, the common offset value can be configured by RRC signaling. For Type 2 configured grant uplink transmission, the common offset value can be either configured by RRC signaling or dynamically indicated in the DCI for the activation of configured grant uplink transmission or a combination thereof. In the latter case, a set of offset values can be configured by RRC signaling and one value from the set of offset values can be indicated in the DCI for the activation of configured grant uplink transmission.

In some aspects, different options on how to mitigate inter-cell interference and reciprocal blocking among grant-free and scheduled UE transmissions are described in details herein. In some aspects, grant-free UL transmissions can be allowed to operate in a TDM manner. In some aspects, for a grant-free UL transmission operating in full bandwidth mode, the UE can be configured with a grant-free specific PUSCH start offset value for grant-free transmission, which is used to defer randomly the grant-free transmission, and provide to the UEs a different priority to access the channel mitigating the chance of colliding with and blocking each other. In some aspects, the PUSCH transmission or a presence detection may start X symbols later than the start of the grant-free transmission. In some aspects, the value of X may depend on the numerology and can be defined in a technical specification. In some aspects, the value of X can be fixed independently from the numerology adopted.

In some aspects, the value of X for each numerology can be configured by higher layers via NR minimum system information (MSI), NR remaining minimum system information (RMSI), NR other system information (OSI), or radio resource control (RRC) signaling. In some aspects, CP extension of the first OFDM symbol carrying UL-SCH or presence detection signal can be applied between the initial starting symbol of grant-free transmission and the beginning of actual grant-free transmission (either PUSCH or a presence signal). In some aspects, if X>1, a first partial OFDM symbol between the initial starting symbol of grant-free transmission and the beginning of actual grant-free transmission (either PUSCH or a presence signal) is filled with CP while the remaining full symbols may be either filled with CP or PUSCH or a presence signal. In some aspects, a set of offset values that define the start of the presence detection or PUSCH transmission from the start of the grant-less transmission, which as mentioned above is filled with the cyclic prefix of the first symbol of the presence detection or PUSCH, can be defined.

In some aspects, the granularity of the offset values can be, for example, 9 µs (slot time for Wi-Fi), or 5 or 10 µs or some other value(s). In some aspects, regardless of the numerology, a gap of maximum 16 µs needs to be left between the start of AUL transmission, and the PUSCH or presence detection transmission. In some aspects, a combination of a set of offset values and X symbols can be used to defer the beginning of grant-free transmission. In some aspects, only one set of offset values is defined and for instance, the set of offset values defined in Rel.15 FeLAA (i.e., {16, 25, 34, 43, 52, 61 and 67.7} µs) can be reused, and based on the numerology adopted, only a subset of it is used. In some aspects, the set of offset values can be configured by higher layers via MSI, RMSI, OSI, or RRC signaling. In some aspects, UEs can be categorized based on the priority to access the channel. In this matter, different UEs can have a different set of offset values, with different granularity and values of X. In some aspects, the set of offset values that are used when the grant-free transmission is performed in the MCOT acquired by gNB can be different than those used to perform grant-free UL transmission outside of the MCOT acquired by gNB. In some aspects, the offset values used for grant-free UL transmissions inside of the gNB acquired MCOT may be a subset of those that can be used for grant-free UL transmission outside of the MCOT. In some aspects, for grant-free UL transmissions performed within the acquired MCOT, LBT type-2 can be performed (25 µs LBT), and in order to ensure that the scheduled UL transmissions have higher priority than grant-free UL transmissions, the grant-free UL transmission can be deferred by more than 25 µs.

In some aspects, a grant-free UE can be configured through RRC signaling or through the activation/deactivation DCI to use a different value range, or one or a subset of offset values for AUL transmission within the MCOT acquired by gNB, and for grant-free transmissions outside the MCOT acquired by gNB. In some aspects, the set of values can be fixed for either grant-free transmissions outside the MCOT acquired by gNB or grant-free transmissions inside the MCOT acquired by gNB or both. In some aspects, for one case the set of values can be fixed while for the other it can be RRC configured: for example, for grant-free transmissions outside the MCOT acquired by gNB, the set of values is fixed, while for AUL transmissions inside the MCOT acquired by gNB, the set of values is RRC configured. In some aspects, the AUL UEs can be configured with a different set of values, and the selection can be done such that the adjacent UEs are not allowed to select the same offset value. In some aspects, given a certain set of offset values that a grant-free UE can select, the AUL UE performs the selection randomly, such that each value has the same probability to be extracted and used. In some aspects, the grant-free UE can inform the gNB about the value that has been selected by signaling this value through the G-UCI. In some aspects, the grant-free UE does not inform the gNB about the offset value that has been selected. In some aspects, given a set of offset values, the gNB selects the offset value for each UE and configures each UE with a particular value to start grant-free transmission. In some aspects, if multiple BWPs may be configured within 20 MHz, the grant-free UEs with different numerologies may use the same set of offset values (i.e {16, 25, 34, 43, 52, 61 and 67.7} μs), and the value of X can be scaled accordingly. In some aspects, grant-free UL transmissions can also be allowed to operate in an FDM manner. In some aspects, for grant-free UL transmission operating in partial bandwidth mode, the UE may be configured with a common grant-free UL transmission-specific PUSCH start offset value for grant-free UL transmission. In some aspects, similarly as for the TDM'ed case, the PUSCH transmission or the presence detection signal transmission, which may precede the PUSCH transmission, may always start X symbols later than the start of the grant-free transmission.

In some aspects, similar to the TDM'ed case, the value of X may depend on the numerology and can be defined in the spec. In another embodiment, the value of X can be fixed independently from the numerology adopted. In some aspects, the offset may be only applied for certain numerologies, for example for 15, 30 and 60 KHz. In another embodiment, CP extension of the first OFDM symbol carrying UL-SCH or presence detection signal can be applied between the start of the grant-free transmission, and the beginning of grant-free transmission or a presence signal, which precede the grant-free transmission. In some aspects, if multiple BWPs may be configured within 20 MHz, the grant-free UEs with different numerologies can be configured with the same offset value to ensure fair use of the channel across UES with different numerologies. In some aspects, if X>1, first partial OFDM symbol between the initial starting symbol of grant-free transmission and the beginning of actual grant-free transmission (either PUSCH or a presence signal) is filled with CP while the remaining full symbols may be either filled with CP or PUSCH or a presence signal. In some aspects, the common grant-free UL transmission-specific PUSCH start offset value can be selected from a set of offset values. In some aspects, the defined set of values may be the same as that defined for TDM'ed mode. In some aspects, the set of offset values among which the grant-free starting position can be chosen when the grant-free transmission is performed in the MCOT acquired by gNB can be different than those used to perform grant-free transmission outside of the MCOT acquired by gNB. In some aspects, the offset values used for grant-free transmissions inside of the gNB acquired MCOT can be a subset of those that can be used for grant-free transmission outside of the MCOT. In some aspects, the UEs can be categorized based on the priority to access the channel. In this matter, different UEs can have a different set of offset values, with different granularity and values of X. In some aspects, the common AUL-specific offset can be configured by the gNB through RRC signaling or through the activation/deactivation DCI.

Techniques disclosed herein include reliability enhancement of resource allocation for a physical uplink control channel in NR-unlicensed.

Mobile communication has advanced remarkably in the past two decades: emerging from early voice systems and transforming into today's highly sophisticated integrated communication platforms. The next generation wireless communication system, 5G (or NR) is going to provide ubiquitous connectivity and access to information, as well as the ability to share data, around the globe. NR is expected to be a unified framework that will target to meet versatile and sometimes, conflicting performance criteria and provide services to vastly heterogeneous application domains ranging from Enhanced Mobile Broadband (eMBB) to massive Machine-Type Communications (mMTC) and Ultra-Reliable Low-Latency Communications (URLLC), to name a few. In general, NR will evolve based on third generation partnership project (3GPP) long term evolution (LTE)-Advanced technology with additional enhanced radio access technologies (RATs) to enable seamless and faster wireless connectivity solutions.

One major enhancement for LTE in Rel-13 had been to enable the operation of cellular networks in the unlicensed spectrum, via Licensed-Assisted-Access (LAA). Ever since exploiting the access of unlicensed spectrum has been considered by 3GPP as one of the promising solutions to cope with the ever-increasing growth of wireless data traffic. One of the important considerations for LTE to operate in unlicensed spectrum is to ensure fair co-existence with incumbent systems like wireless local area networks (WLANs), which has been the primary focus of LAA standardization effort since Rel. 13.

Following the trend of LTE enhancements, a study on NR based access to unlicensed spectrum (NR-unlicensed) has been started in 3GPP Rel-15. In 3GPP Radio Access Network (RAN) meeting #77, a new study item (SI) on "NR-Based Access to Unlicensed Spectrum" was approved. Within the scope of this SI, one of the primary objectives is to identify additional functionalities that are needed for a physical (PHY) layer design of NR to operate in unlicensed spectrum. In particular, it is desirable to minimize the design efforts by identifying the essential enhancements needed for Rel-15 NR design to enable unlicensed operation, while avoiding unnecessary divergence from Rel-15 NR licensed framework. Coexistence methods already defined for LTE-based LAA context should be assumed as the baseline for the operation of NR-unlicensed systems, while enhancements over these existing methods are not precluded. NR-based operation in unlicensed spectrum should not impact deployed Wi-Fi services (data, video and voice services) more than an additional Wi-Fi network on the same carrier.

NR-unlicensed technologies can be categorized into different modes, viz. Carrier Aggregation (CA), Dual Connectivity (DC), and Standalone (SA) modes of network operation. The channel access mechanism aspect is one of the fundamental building blocks for NR-unlicensed that is essential for any deployment options. The adoption of Listen-Before-Talk (LBT) in LTE based LAA system was crucial in achieving fair coexistence with the neighboring systems sharing the unlicensed spectrum in addition to fulfilling the regulatory requirements. The LBT based channel access mechanism fundamentally resembles the WLAN's Carrier Sense Multiple Access with Collision Avoidance (CSMA/CA) principles. Any node that intends to transmit in unlicensed spectrum first performs a channel sensing operation before initiating any transmission. An additional random back-off mechanism is adopted to avoid collisions when more than one nodes sense the channel as idle and transmit simultaneously.

To fulfill regulatory requirements and provide a global solution of the unified framework, NR-based unlicensed access will also use LBT based channel access mechanisms. Due to LBT, the performance of uplink (UL) transmission, especially physical uplink control channel (PUCCH) can be impacted, while operating in the unlicensed spectrum. LBT needs to be performed at the User Equipment (UE) side before the Uplink Control Information (UCI) can be transmitted on PUCCH. For scheduled UL transmission, in fact, multiple rounds of contentions will be imposed, since LBT needs to be performed at the base station side as well before sending the UL grant for PUCCH transmission. Resource allocation scheme for PUCCH transmission in NR-licensed system, which does not need to cope with such channel access related contention, therefore, may not be sufficient for UL control channel transmission in the unlicensed spectrum.

In the above context, disclosed techniques include reliability enhancements of NR-PUCCH resource allocation to cope with LBT in unlicensed spectrum. More specifically, disclosed techniques include time/frequency domain PUCCH resource allocation scheme for reliability enhancement to cope with LBT in NR-unlicensed (NR-U) and details of signaling aspect related to PUCCH resource allocation for NR-U. Advantages of the disclosed techniques include enhances the reliability of NR PUCCH resource allocation scheme to enable its operation over unlicensed spectrum, and defining new signaling mechanism for the enhancement of NR PUCCH resource allocation, to be used over unlicensed spectrum.

Frequency Domain Resource Allocation for PUCCH Over NR-Unlicensed Spectrum.

In 3GPP RAN1 aspects, the following can be configured:
(1) If the absence of Wi-Fi cannot be guaranteed (e.g., by regulation) in the band (sub-7 GHz), where NR-U is operating, the NR-U operating bandwidth is an integer multiple of 20 MHz; and
(2) At least for the band where the absence of Wi-Fi cannot be guaranteed, LBT can be performed in units of 20 MHz.

In this context, the frequency domain resource allocation scheme of NR-U PUCCH is described in details as follows.

In some aspects, multiple starting physical resource block (PRB) indices can be configured for PUCCH transmission. As one example, for a UL transmission in NR-LU scheduled over a BW of B MHz (B≥20 MHz), up to floor (B/20) different ranges of starting PRB indices can be configured corresponding to different 20 MHz unit bandwidth parts (BWPs) within the UL BW of B MHz.

In one option, a pool of PUCCH resources can be signaled by higher layer via Downlink Control Information (DCI) or by Radio Resource Control (RRC) signaling or by a combination thereof to the UE, where each configured starting PRB index within this resource pool may have different allowed range of values and each of these PUCCH resources within the pool of resources are configured for the same numerology (i.e. for the same sub-carrier spacing/bandwidth (SCS/BW) configuration). As an example, if N starting PRB indices are configured in the pool of resources, the value ranges for each of these PRB indices in an ascending order can be $\{0 \cdot X1\}$; $\{(X1,max)\sim(X1,max+X1)\}$; $((2*X1,max)\sim(2*X1,max+X1))$; ... ; $(([N-1]*X1,max)\sim([N-1]*X1,max+X1)\}$, where $X1<X1,max$, $X1,max$ is the maximum number PRBs available for a BW of 20 MHz and sub-carrier spacing SCS1 and $1\leq N\leq Nmax$. In one example, Nmax can take any integer value between 2 and floor(B/20) for a UL transmission BW of B MHz.

In some aspects, a pool of PUCCH resources can be signaled by a higher layer via Downlink Control Information (DCI) or by Radio Resource Control (RRC) signaling or by a combination thereof to the UE, where each configured starting PRB index within this resource pool may have different allowed range of values and each of these PUCCH resources within the pool of resources may be configured for the same or different numerologies. As an example, if N starting PRB indices are configured in the pool of resources, the value ranges for each of these PRB indices can be $\{0\sim X1\}$; $\{(X1,max)\sim(X1,max+X2))$; $((X2,max+X1,max)\sim(X2,max+X1,max+X3))$; ... ; $((XN-1,max+ ... +X1,max)\sim(XN-1,max+ ... +X1,max+XN)\}$, where $Xi<Xi,max$, $Xi,max$ is the maximum number PRBs available for a BW of 20 MHz and sub-carrier spacing SCSI and $1\leq N\leq Nmax$. In one example, Nmax can take any integer value between 2 and floor(B/20) for a UL transmission BW of B MHz. Note that, X1, X2, ..., XN may all be same or different or a combination thereof (as one example, few of the Xi's may the same and the rest may be different) depending on the configured SCS on each of these units of 20 MHz BW chunks over which PUCCH resources are configured.

In some aspects, a UE can perform LBT over units of 20 MHz across the UL BW (>20 MHz) available for PUCCH transmission (i.e. separate LBTs over each 20 MHz chunks within UL BW of B MHz) and upon the LBT success may choose one resource from the pool of resources configured to the UE, as mentioned in the above embodiment.

In some aspects, a UE may dynamically switch the BW for UL transmission as per the aggregated LBT outcome.

Figure 44:
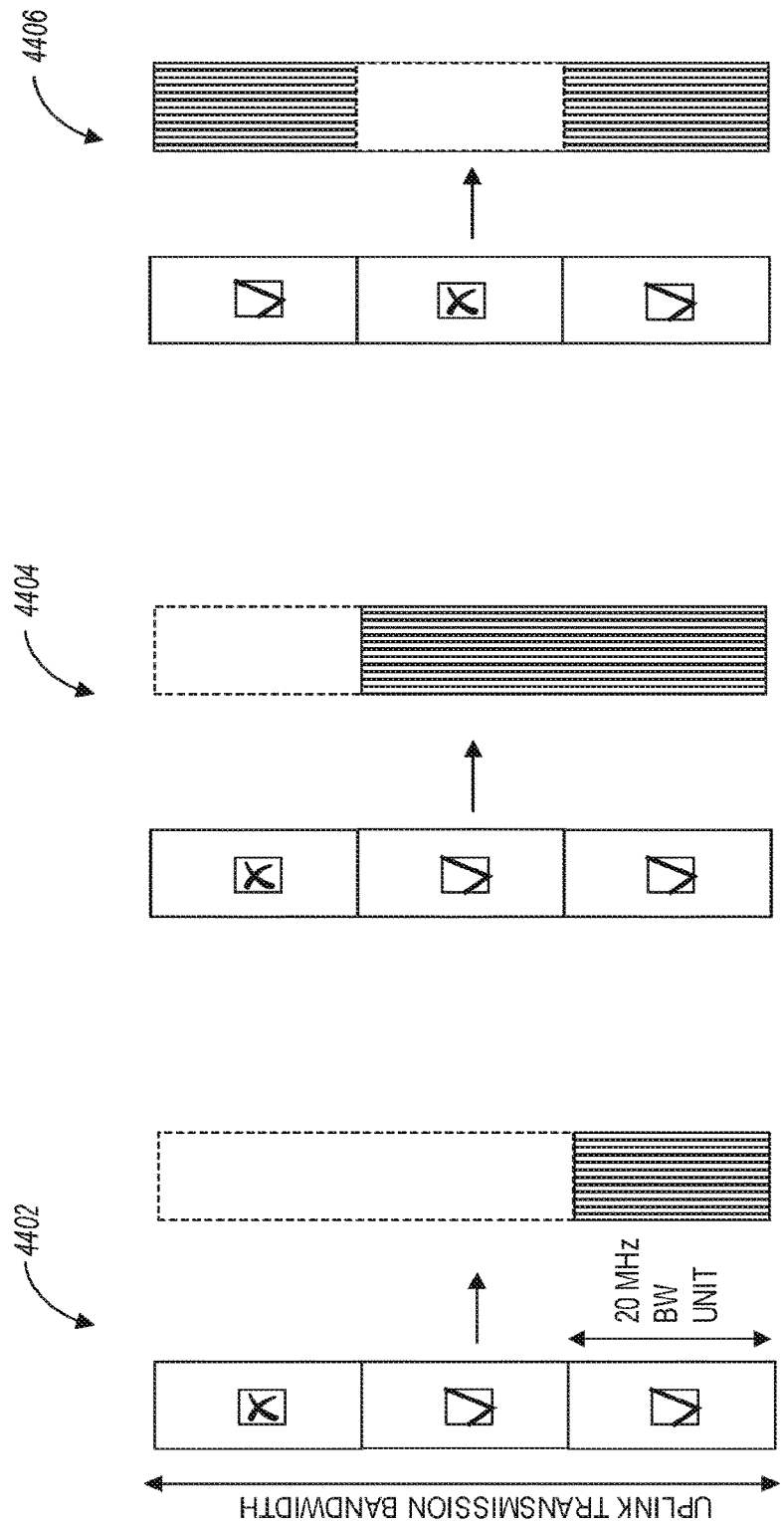
FIG. 44 illustrates the dynamic switching of uplink transmission bandwidth as per aggregated LBT outcome, in accordance with some aspects.

FIG. 44 illustrates diagrams 4402, 4404, and 4406 of dynamic switching of uplink transmission bandwidth as per aggregated LBT outcome, in accordance with some aspects.

In some aspects, a UE may have successful LBT outcomes over more than one 20 MHz chunks (say, over M chunks where M>1) and the chunks may be contiguous. In such case, UE may choose the PUCCH resource from the configured pool of resources such that the starting PRB index is within the first 20 MHz chunks of the contiguous M chunks. As one example, M=2 and the corresponding starting PRBs configured for the two 20 MHz chunks have value ranges $\{0\sim X1\}$ and $\{(X1,max)\sim(X1,max+X1)\}$, where X1 and X1, max are defined in the above aspect. Then the starting PRB index may be chosen from the 20 MHz chunks with starting PRB index range $\{0\sim X1\}$, as illustrated in diagram 4402 in FIG. 44.

As a further extension, when more than one chunks (e.g., K chunks) are idle based on the outcome of LBT, UE may randomly select one chunk among the K chunks for PUCCH transmission, wherein the starting PRBs and number of PRBs within the select chunk are determined in accordance with the configured PUCCH resource. Note that K chunks may be contiguous or non-contiguous.

In another aspect, if a UE has successful LBT outcome over more than one 20 MHz BW chunks, which are contiguous in frequency, the UE may dynamically switch the UL transmission BW to M*20 MHz and choose a starting PRB index as per the above embodiment, as illustrated in diagram 4404 of FIG. 44.

In another option, if a UE has successful LBT outcome over more than one 20 MHz BW chunks, which are non-contiguous in frequency, the UE may dynamically switch the UL transmission BW to M*20 MHz and transmit multichunk PUCCH over the aggregated BW of M*20 MHz, as illustrated in diagram 4406 of FIG. 44.

Time Domain Resource Allocation for PUCCH Over NR-Unlicensed Spectrum.

In some aspects, multiple starting symbol locations (in terms of symbol index within a slot) can be configured for PUCCH transmission, so that LBT can be performed more than once within a slot by UE at the configured starting symbol locations if the LBT fails in the first attempt. If LBT succeeds at any one of the starting symbol locations in time, the UE can transmit PUCCH in the same slot.

In one option, a pool of PUCCH resources can be signaled by higher layer via Downlink Control Information (DCI) or by Radio Resource Control (RRC) signaling or by a combination thereof to the UE, where each resource within the pool is configured with a starting symbol index that is different from the other resources within the pool. As one example, the starting symbol index within a slot may be 0 or 4 or 7 and/or any other integer less than 14.

In another option, a pool of PUCCH resources can be signaled by a higher layer via Downlink Control Information (DCI) or by Radio Resource Control (RRC) signaling or by a combination thereof to the UE, where a group of resources within the pool may be configured with the same starting symbol index but different starting PRB indices, whereas another group of resources may be configured with different starting symbol indices and same/different starting PRB indices, where the starting PRB indices can be configured as the aforementioned embodiments.

In some aspects, given a starting symbol, the PUCCH can actually start at the symbol boundary and LBT is performed right before, such that the LBT procedure ends right at the beginning of the starting symbol.

In some aspects, PUCCH may start later, for example, after 25 μs from the starting symbol and LBT is performed at the symbol boundary.

In one option, time advance may be taken into account, and the PUCCH may start after 25 μs+TA from the starting symbol.

In another option, the starting symbol may be entirely used for LBT procedure and filled with the cyclic prefix of the PUCCH transmission which follows it. In this case, PUCCH transmission may start from the next OFDM symbol adjacent to the starting symbol indicated in PUCCCH resource allocation.

In some aspects, multiple ending symbol locations (in terms of symbol index within a slot) can be configured for PUCCH transmission, so as to hinder a UE from monopolizing the channel and allow fair coexistence with other incumbent technologies. The signaling of the ending position location can be implicitly indicated by configuring dynamically the number of OFDM symbols, or it can be RRC signaled or indicated in the DCI, or a combination thereof.

In some aspects, the last Y symbol(s) of a slot may not be used for PUCCH transmission, where Y, as an example, can be Y=2 (i.e. symbol #12 and #13 for a slot with 14 symbols with starting symbol index #0), since they might be punctured to introduce a gap to allow other devices to access the channel.

In some aspects, a UE may perform puncturing on PUCCH transmission based on LBT outcome. As one example, if the LBT fails in the first configured starting symbol and UE chooses a later starting symbol, it may be difficult for UE to re-encode UCI in response to delayed PUCCH transmission.

In one option, a UE may choose a delayed starting symbol based on the LBT outcome, but keeps the ending symbol unchanged (i.e., the same ending symbol corresponding to an earlier starting symbol where the LBT failed) and apply puncturing of UCI to fit the PUCCH transmission within the PUCCH duration decided by the finally chosen starting and ending symbols. Furthermore, the number of PRBs for the UCI on PUCCH can be determined in accordance with the selected duration for PUCCH transmission.

In another option, the UE may choose a different ending symbol depending on the LBT outcome and whether the starting symbol is delayed or not and then based on the new PUCCH duration apply puncturing on the UCI, if required. Note that, in this case, the UE may not need to apply puncturing if the PUCCH duration remains the same with the new starting symbol-ending symbol set chosen based on LBT outcome as it was with the initial PUCCH resource configuration based on which UE prepared the UCI, prior to performing LBT. As a further extension, this delayed PUCCH transmission may not be across slot boundary.

In some aspects, the UE may perform rate matching on PUCCH transmission based on LBT outcome. As one example, if the LBT fails in the first configured starting symbol and/or in the first unit of 20 MH*z BWP available for UL transmission, and UE chooses a different starting symbol and/or different ending symbol and/or different starting PRB index and/or a different number of PRBs for PUCCH transmission, the number of REs available for PUCCH transmission may not be the same as that of the initial configured PUCCH resource for which the UCI was prepared. Then the UE may apply rate matching on the encoded UCI bits using the coding rate configured in the newly chosen PUCCH resource after LBT. In another aspect, the UE may perform a combination of puncturing and rate matching on PUCCH transmission based on LBT outcome. Each of the disclosed methods (i.e. puncturing and rate matching) can be performed as per the embodiments mentioned above.

In some aspects, PUCCH resource indicator in the last downlink control information (DCI) and/or the starting control channel element (CCE) index for the physical downlink control channel (PDCCH) carrying the last DCI are jointly employed to determine the PUCCH resource carrying HARQ-ACK feedback.

In some aspects, a pool of PUCCH resources in time and frequency domain (in the same or different bandwidth parts, in different starting symbols, or same symbol but different slots) can be configured by higher layers via RRC signaling, which may point to a single PUCCH resource as defined in NR specification. Further, for HARQ-ACK feedback, the PUCCH resource indicator in the last DCI and/or the starting CCE index for the PDCCH carrying the last DCI can be jointly pointed to the pool of PUCCH resources. Depending on the LBT outcome, UE may select one PUCCH resource from the indicated PUCCH resource pool for PUCCH transmission carrying HARQ-ACK feedback. Alternatively, UE may select one PUCCH resource with the earliest symbol after LBT from the indicated PUCCH resource pool. If the indicated PUCCH resource pool does not include a PUCCH resource, which is later than the LBT, UE may not transmit the PUCCH carrying HARQ-ACK feedback.

Note that it may be possible that UE may defer the PUCCH transmission in the next slot if the PUCCH resource includes the next slot as an available slot for PUCCH transmission.

In some aspects, if PUCCH carrying HARQ-ACK feedback and PUCCH carrying CSI report overlap in a slot and the timeline requirement is satisfied, the aforementioned mechanism can be applied. More specifically, the PUCCH resource indicator in the last DCI can be used to determine the PUCCH resource pool. Furthermore, depending on the LBT outcome, the UE may select one PUCCH resource from the indicated PUCCH resource pool for PUCCH transmission carrying a combined HARQ-ACK feedback and CSI report. Alternatively, a UE may select one PUCCH resource with the earliest symbol after LBT from the indicated PUCCH resource pool.

Similarly, for CSI reporting, the UE may be configured with a PUCCH resource pool. If the channel is idle after UE performs LBT, the UE may select one PUCCH with the earliest starting symbol for CSI report transmission.

In some aspects, in the DCI scheduling PDSCH, a field may be used to indicate which one or more of PUCCH resources within the configured PUCCH resource pool can be selected for PUCCH transmission. More specifically, a bitmap may be included in the DCI for PUCCH resource selection. For instance, assuming 3 resources are configured within each PUCCH resource pool, the field "101" in the DCI may indicate that the first and third PUCCH resources within the PUCCH resource pools can be selected by the UE.

In some aspects, for systems operating in the unlicensed spectrum, the parameter for starting symbol for PUCCH transmission may not be included in the PUCCH resource allocation configuration. After LBT and if the channel is idle, UE may immediately transmit the PUCCH. Alternatively, the UE may be configured with a subset of the starting symbols for PUCCH transmission. After LBT and if the channel is idle, the UE may transmit the PUCCH with the earliest starting symbol in the configured subset of the starting symbols in a slot. Note that UE may be configured with the next slot or next K slots for PUCCH transmission. Furthermore, it may require that the PUCCH resource does not span across a slot boundary. In case when PUCCH resource is across a slot boundary due to the late starting symbol, UE may drop the PUCCH transmission.

A system and method of wireless communication for a 5G (NR) communication system operating in the unlicensed spectrum (NR-unlicensed). In some aspects, a UE may determine a rule of resource allocation for physical uplink control channels (PUCCHs) in time and frequency domain. In some aspects, the UE may transmit one or more uplink (UL) signals using the resource allocation scheme in time and frequency domains. In some aspects, multiple starting physical resource block (PRB) indices are configured to UE for PUCCH transmission. For a UL transmission in NR-U scheduled over a bandwidth (BW) of B MHz (B≥20 MHz), up to floor (B/20) different ranges of starting PRB indices are configured corresponding to different 20 MHz unit bandwidth parts (BWPs) within the UL BW of B MHz and UE uses one of these configured starting PRB indices to transmit PUCCH in frequency domain. In some aspects, a pool of PUCCH resources is signaled by higher layer via Downlink Control Information (DCI) or by Radio Resource Control (RRC) signaling or by a combination thereof to the UE, where each configured starting PRB index within this resource pool has different allowed range of values and each of these PUCCH resources within the pool of resources are configured for the same numerology (i.e. for the same sub-carrier spacing/bandwidth (SCS/BW) configuration). As an example, N starting PRB indices are configured in the pool of resources and the value ranges for each of these PRB indices in an ascending order are $\{0\sim X1\}$; $\{(X1,\max)\sim(X1,\max+X1)\}$; $\{(2^*X1,\max)\sim(2^*X1,\max+X1)\}$; . . . ; $\{([N-1]^*X1,\max)\sim([N-I]^*X1,\max+X1)\}$, where $X1<X1$, max, X1,max is the maximum number PRBs available for a BW of 20 MHz and sub-carrier spacing SCS1 and $1\leq N\leq 5$ Nmax. In one example, Nmax can take any integer value between 2 and floor(B/20) for a UL transmission BW of B MHz. UE chooses to start the PRB index from one of these N different configured ranges of PRB indices to transmit PUCCH in the frequency domain.

In some aspects, a pool of PUCCH resources is signaled by higher layer via Downlink Control Information (DCI) or by Radio Resource Control (RRC) signaling or by a combination thereof to the UE, where each configured starting PRB index within this resource pool has different allowed range of values and each of these PUCCH resources within the pool of resources can be configured for the same or different numerologies. As an example, N starting PRB indices are configured in the pool of resources and the value ranges for each of these PRB indices are $\{0\sim X1\}$; $\{(X1,\max)\sim(X1,\max+X2)\}$; $\{(X2,\max+X1,\max)\sim(X2,\max+X1,\max+X3)\}$; . . . ; $\{(XN-1,\max+ \ldots +X1,\max)\sim(XN-1,\max+ \ldots +X1,\max+XN)\}$, where $Xi<Xi,\max$, Xi,max is the maximum number PRBs available for a BW of 20 MHz and sub-carrier spacing SCS1 and $1\leq N\leq Nmax$. In one example, Nmax can take any integer value between 2 and floor(B/20) for a UL transmission BW of B MHz. X1, X2, . . . , XN can all be same or different or a combination thereof (as one example, few of the Xi's are the same and the rest are different) depending on the configured SCS on each of these units of 20 MHz BW chunks over which PUCCH resources are configured. UE chooses a starting PRB index from one of these N different configured ranges of PRB indices, corresponding to same or different numerologies, to transmit PUCCH in the frequency domain.

In some aspects, the UE performs LBT over units of 20 MHz across the UL BW (≥20 MHz) available for PUCCH transmission (i.e. separate LBTs over each 20 MHz chunks within UL BW of B MHz) and upon the LBT success, chooses one resource from the pool of resources configured to the UE for PUCCH transmission. In some aspects, the UE dynamically switches the BW for UL transmission as per the aggregated LBT outcome. In some aspects, the UE with successful LBT outcomes over more than one, contiguous 20 MHz chunks (say, over M chunks where M>1) chooses the PUCCH resource from the configured pool of resources such that the starting PRB index is within the first 20 MHz chunk of the contiguous M chunks. As one example, M=2 and the corresponding starting PRBs configured for the two 20 MHz chunks have value ranges $\{0\sim X1\}$ and $\{(X1,\max)\sim(X1,\max+X1)\}$, where X1 and X1, max are defined herein. Then the UE chooses the starting PRB index from the 20 MHz chunk with starting PRB index range $\{0\sim X1\}$. Alternatively, when more than one chunks (e.g., K chunks) are idle based on the outcome of LBT, UE randomly selects one chunk among the K chunks for PUCCH transmission, wherein the starting PRBs and number of PRBs within the select chunk are determined in accordance with the configured PUCCH resource. K chunks can be contiguous or non-contiguous.

In some aspects, the UE with successful LBT outcome over more than one, contiguous 20 MHz BW chunks, dynamically switches the UL transmission BW to M*20 MHz (i.e. over M chunks over which LBT is successful) and chooses a starting PRB index as per above techniques. In some aspects, the UE with successful LBT outcome over more than one 20 MHz BW chunks, which are non-contiguous in frequency, dynamically switches the UL transmission BW to M*20 MHz (i.e. over M chunks over which LBT is successful) and transmits multi-chunk PUCCH over the aggregated BW of M*20 MHz. In some aspects, multiple starting symbol locations (in terms of symbol index within a slot) are configured for PUCCH transmission to the UE, so that LBT can be performed more than once within a slot by UE at the configured starting symbol locations if the LBT fails in the first attempt. If LBT succeeds at any one of the starting symbol locations in time, UE transmits PUCCH in the same slot.

In some aspects, a pool of PUCCH resources are signaled by higher layer via Downlink Control Information (DCI) or by Radio Resource Control (RRC) signaling or by a combination thereof to the UE, where each resource within the pool is configured with a starting symbol index that is different from the other resources within the pool. As one example, the starting symbol index within a slot is 0 or 4 or 7 and/or any other integer less than 14. Upon successful LBT, the UE uses one of these configured stating symbol indices to transmit PUCCH in the time domain.

In some aspects, a pool of PUCCH resources are signaled by higher layer via Downlink Control Information (DCI) or by Radio Resource Control (RRC) signaling or by a combination thereof to the UE, where a group of resources within the pool is configured with the same starting symbol index but different starting PRB indices, whereas another group of resources is configured with different starting symbol indices and same/different starting PRB indices, where the starting PRB indices are configured as mentioned herein. Upon successful LBT, UE uses one of these configured stating symbol indices and starting PRB indices as physical domain resources to transmit PUCCH.

In some aspects, given a starting symbol chosen by UE from the configured set of starting symbol indices, UE starts the actual PUCCH transmission at the symbol boundary and LBT is performed right before, such that the LBT procedure ends right at the beginning of the starting symbol.

In some aspects, the UE starts the actual PUCCH transmission later than the configured starting symbol index chosen from the pool of resources, for example, after 25 μs from the starting symbol and LBT is performed at the symbol boundary. In some aspects, the UE takes into account timing advancement (TA) and starts the transmission of PUCCH after 25 μs+TA from the starting symbol. In some aspects, the UE uses the entire starting symbol (chosen from the pool of resources) for LBT procedure and fills the rest of the symbol duration not used by LBT with a cyclic prefix of PUCCH transmission that follows in the next symbol.

In some aspects, multiple ending symbol locations (in terms of symbol index within a slot) are configured for PUCCH transmission to the UE, so as to hinder a UE from monopolizing the channel and allow fair coexistence with other incumbent technologies. The signaling of the ending position location is implicitly indicated by configuring dynamically the number of OFDM symbols or is RRC signaled or indicated in the DCI, or a combination thereof. Upon the outcome of LBT, UE chooses one of these ending symbols to decide the duration of PUCCH transmission along with choosing a starting symbol index based on LBT success.

In some aspects, the UE does not use the last Y symbol(s) of a slot for PUCCH transmission, where Y, as an example, can be Y=2 (i.e. symbol #12 and #13 for a slot with 14 symbols with starting symbol index #0), since they can be punctured, if necessary, to introduce a gap to allow other devices to access the channel. In some aspects, the UE performs puncturing on PUCCH transmission based on LBT outcome. In some aspects, the UE chooses a delayed starting symbol based on the LBT outcome, but keeps the ending symbol unchanged (i.e. the same ending symbol corresponding to an earlier starting symbol where the LBT failed) and apply puncturing of UCI to fit the PUCCH transmission within the PUCCH duration decided by the finally chosen starting and ending symbols. Further, UE determines the number of PRBs for the UCI transmission in accordance with the selected duration for PUCCH transmission.

In some aspects, the UE chooses a different ending symbol depending on the LBT outcome and whether the starting symbol is delayed or not and then based on the new PUCCH duration applies puncturing on UCI, if required. Note that, in this case, UE may not need to apply puncturing if the PUCCH duration remains the same with the new starting symbol-ending symbol set chosen based on the LBT outcome as it was with the initial PUCCH resource configuration based on which UE prepared the UCI, prior to performing LBT. As a further extension, this delayed PUCCH transmission cannot be across a slot boundary.

In some aspects, the UE performs rate matching on PUCCH transmission based on LBT outcome. As one example, if the LBT fails in the first configured starting symbol and/or in the first unit of 20 MHz BWP available for UL transmission, and UE chooses a different starting symbol and/or different ending symbol and/or different starting PRB index and/or a different number of PRBs for PUCCH transmission, the number of resource elements (REs) available for PUCCH transmission may not be the same as that of the initial configured PUCCH resource for which the UCI was prepared. Then UE applies rate matching on the encoded UCI bits using the coding rate configured in the newly chosen PUCCH resource after LBT.

In some aspects, the UE performs a combination of puncturing and rate matching on PUCCH transmission based on LBT outcome. Each of the above techniques (e.g., puncturing and rate matching) are performed as discussed herein. In some aspects, a pool of PUCCH resources in time and frequency domain (in the same or different bandwidth parts, in different starting symbols, or same symbol but different slots) are configured by higher layers via RRC signaling to the UE, which can point to a single PUCCH resource as defined in NR specification. Further, for HARQ-ACK feedback, the PUCCH resource indicator in the last DCI and/or the starting CCE index for the PDCCH carrying the last DCI can be jointly pointed to the pool of PUCCH resources. Depending on the LBT outcome, the UE selects one PUCCH resource from the indicated PUCCH resource pool for PUCCH transmission carrying HARQ-ACK feedback.

In some aspects, the UE selects one PUCCH resource with the earliest symbol after LBT from the indicated PUCCH resource pool. If the indicated PUCCH resource pool does not include a PUCCH resource, which is later than the LBT, UE does not transmit the PUCCH carrying HARQ-ACK feedback. It is possible that UE defers the PUCCH transmission in the next slot if the PUCCH resource includes the next slot as an available slot for PUCCH transmission.

In some aspects, if PUCCH carrying HARQ-ACK feedback and PUCCH carrying CSI report overlap in a slot and the timeline requirement is satisfied, UE uses the PUCCH resource indicator in the last DCI to determine the PUCCH resource pool. Furthermore, depending on the LBT outcome, the UE selects one PUCCH resource from the indicated PUCCH resource pool for PUCCH transmission carrying a combined HARQ-ACK feedback and CSI report.

In some aspects, the UE selects one PUCCH resource with the earliest symbol after LBT from the indicated PUCCH resource pool. Similarly, for the CSI report, UE is configured with a PUCCH resource pool. If the channel is idle after UE performs LBT, UE selects one PUCCH with the earliest starting symbol for CSI report transmission. In some aspects, in the DCI scheduling PDSCH, a field is used to indicate which one or more of PUCCH resources within the configured PUCCH resource pool UE selects for PUCCH transmission. More specifically, a bitmap is included in the DCI for PUCCH resource selection. For instance, assuming 3 resources are configured within each PUCCH resource pool, the field "101" in the DCI indicates that UE selects the first and third PUCCH resources within the PUCCH resource pools.

In some aspects, for systems operating in the unlicensed spectrum, the parameter for starting symbol for PUCCH transmission is be included in the PUCCH resource allocation configuration to the UE. After LBT and if the channel is idle, the UE may immediately transmit the PUCCH. In some aspects, the UE is configured with a subset of the starting symbols for PUCCH transmission. After LBT and if the channel is idle, the UE transmits the PUCCH with the earliest starting symbol in the configured subset of the starting symbols in a slot. In some aspects, the UE is configured with the next slot or next K slots for PUCCH transmission. Furthermore, the PUCCH resource may not span across a slot boundary. In case when PUCCH resource is across a slot boundary due to the late starting symbol, the UE may drop the PUCCH transmission.

Techniques Disclosed Herein Include Systems and Methods for Triggering Multiple HARQ-ACK Transmission in a Slot for NR Communications.

In NR, for semi-static and dynamic hybrid automatic repeat request-acknowledgment (HARQ-ACK) codebook, only one HARQ-ACK feedback is transmitted in one slot. In some aspects, this HARQ-ACK feedback can be carried by either the physical uplink control channel (PUCCH) or physical uplink shared channel (PUSCH). In some aspects, for semi-static and dynamic HARQ-ACK codebook in a single component carrier (CC) scenario, PUCCH resource allocation is determined in accordance with the last downlink control information (DCI) scheduling the physical downlink shared channel (PDSCH). In particular, PUCCH resource indicator in the last DCI and/or the starting control channel element (CCE) index for the physical downlink control channel (PDCCH) carrying the last DCI are jointly employed to determine the PUCCH resource carrying HARQ-ACK feedback.

Figure 45:
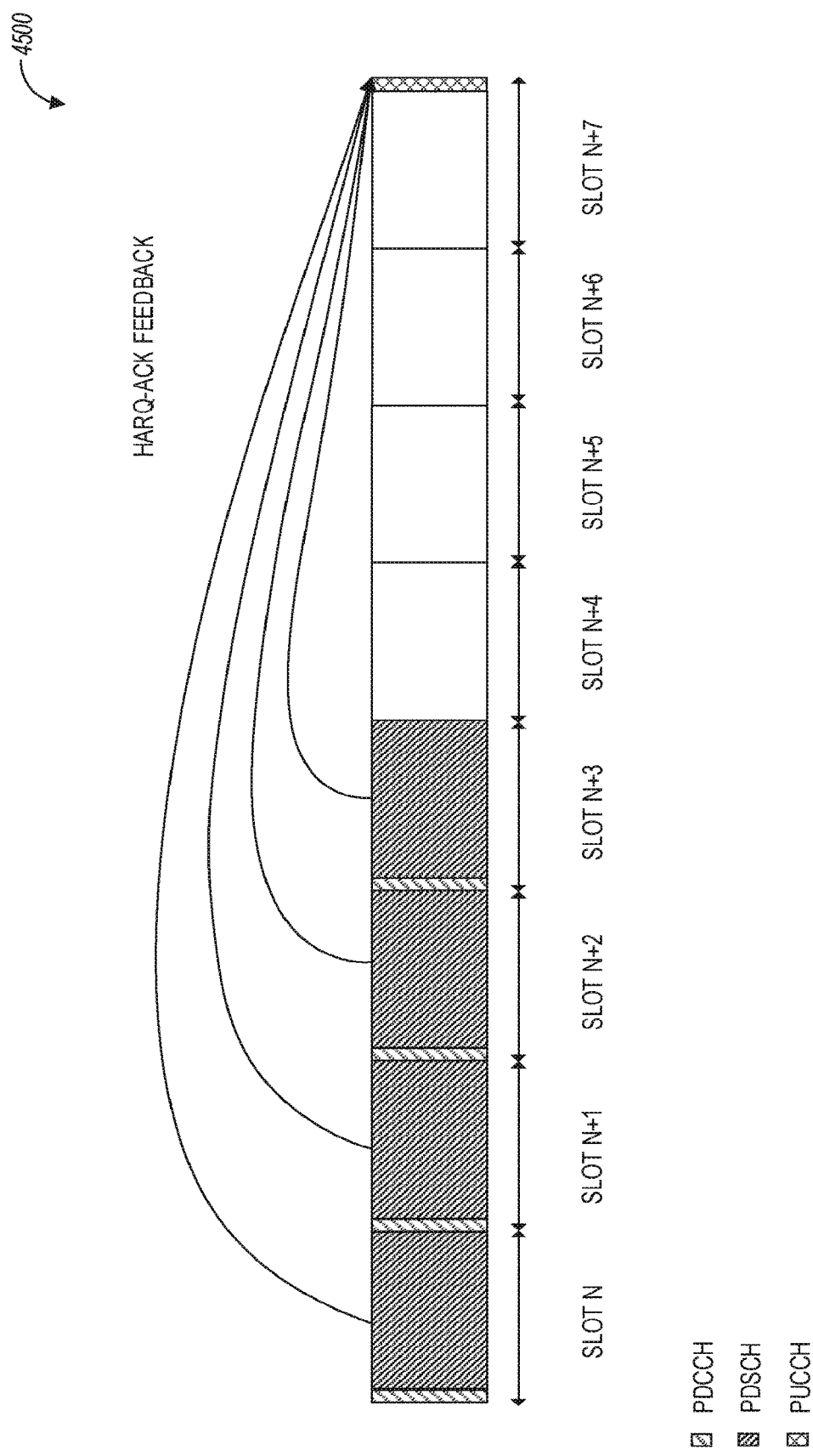
FIG. 45 illustrates HARQ-ACK feedback for multiple PDSCHs, in accordance with some aspects.

FIG. 45 illustrates a diagram 4500 of HARQ-ACK feedback for multiple PDSCHs, in accordance with some aspects. In the illustrated example, the PUCCH resource for carrying HARQ-ACK feedback is determined by the last DCI in slot n+3 and/or the starting CCE index of the corresponding PDCCH. In some aspects, in NR, only one HARQ-ACK feedback or PUCCH resource may be transmitted in one slot, which is slot n+7, as shown in FIG. 45.

In some aspects, when HARQ-ACK feedback for semi-persistent scheduling (SPS) based physical downlink shared channel (PDSCH) transmission and dynamically scheduling based PDSCH transmission are scheduled in the same slot, the UE first determines a PUCCH resource set based on a combined payload size of SPS and dynamic HARQ-ACK feedback and subsequently selects the PUCCH resource from the PUCCH resource set in accordance with the PUCCH resource indicator of the last DCI and/or the starting CCE index of the corresponding PDCCH.

In some aspects, in NR, short PUCCH (PUCCH format 0 and 2) can span 1 or 2 symbols and long PUCCH (PUCCH format 1, 3 and 4) can span from 4 to 14 symbols within a slot. Furthermore, long PUCCH may span multiple slots to further enhance the coverage. In addition, for a given UE, two short PUCCHs, as well as short PUCCH and long PUCCH, can be multiplexed in a time division multiplexing (TDM) manner in the same slot.

In some aspects, only one HARQ-ACK feedback or PUCCH/PUSCH transmission carrying HARQ-ACK feedback is allowed in a slot. In case when the PUCCH carrying HARQ-ACK feedback is scheduled in the last part of the slot, the HARQ-ACK feedback delay can be expected, especially when considering the smaller subcarrier spacing, e.g., 15 kHz and 1ms slot duration. To support URLLC type of application, it is envisioned that additional PUCCH resource carrying HARQ-ACK feedback in a slot is needed. For instance, the additional PUCCH resource carrying HARQ-ACK feedback may be transmitted in the earlier part of the slot so as to reduce the latency.

Techniques disclosed herein include methods of triggering multiple HARQ-ACK feedback in a slot, including mechanisms to trigger multiple HARQ-ACK feedback in a slot and mechanisms to multiplex HARQ-ACK feedback in a slot.

In some aspects, triggering multiple HARQ-ACK feedback in a slot can apply for frequency division duplexing (FDD), time division duplexing (TDD), or full duplex system.

Mechanisms to Trigger Multiple HARQ-ACK Feedback in a Slot.

In some aspects, to support URLLC type of applications, multiple HARQ-ACK feedback in different PUCCH or PUSCHs may be scheduled in a slot. The additional HARQ-ACK feedback can be transmitted in the earlier part of the slot, which can help to reduce the latency for URLLC application.

Aspects of the mechanism to trigger multiple HARQ-ACK feedback in a slot are provided as follows:

In one aspect, for semi-static and dynamic HARQ-ACK codebook, when UE supports the reception of multiple PDSCHs in a slot, the UE may derive the PUCCH resource based on the PUCCH resource indicator indicated in the DCI in each detected PDCCH and starting CCE index of the detected PDCCH in each PDCCH monitoring occasion. In other words, the UE may not follow the last DCI to derive the PUCCH resource for HARQ-ACK feedback.

Such behavior of following the PUCCH resource based on the scheduling DCI instead of the last DCI could be configured to the UE for all PDSCH scheduled by DCI formats 1_0 or 1_1, or in response to DL SPS release indication. Alternatively, it could be limited to certain PDSCHs that could be identified using one or more of: partitioning of HARQ process ID space; based on different RNTIs used to scramble the CRC of the scheduling DCI; when configured, the behavior of following the PUCCH resource indication in the scheduling DCI may be limited to PDSCH mapping type B; when configured, the behavior of following the PUCCH resource indication in the scheduling DCI may be limited to when the UE reports capability #2 values for UE minimum processing time for the corresponding SCS; when configured, the behavior of following the PUCCH resource indication in the scheduling DCI may be limited to PDSCH without configuration of additional PDSCH DMRS symbols; and explicit indication in the scheduling DCI format.

Figure 46:
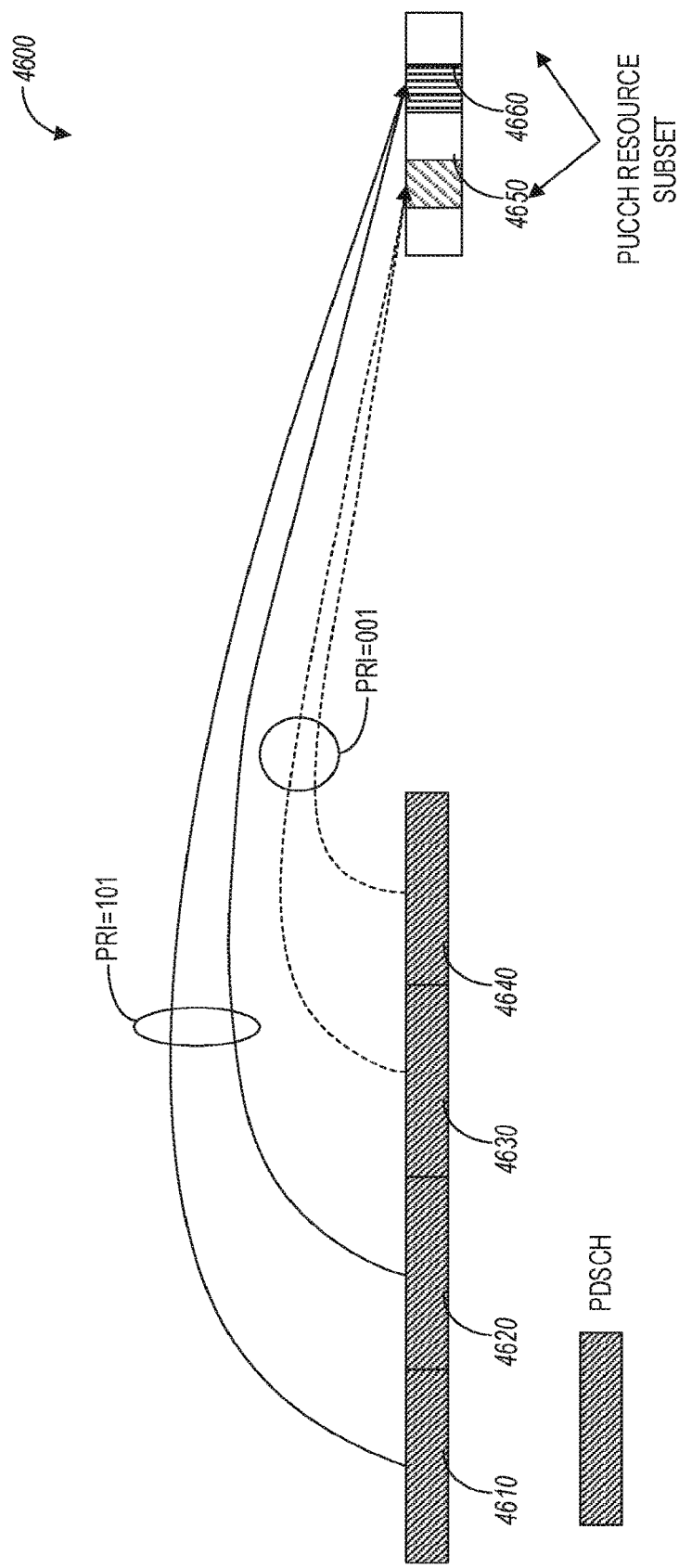
FIG. 46 illustrates an exemplified HARQ-ACK feedback for PDSCHs with different service types, in accordance with some aspects.

In some aspects, a UE determines the corresponding PUCCH resource in slot n for a PDCCH reception at least based on the value of the PUCCH resource indicator field in the DCI format 1_0 or DCI format 1_1 on the said PDCCH and different PUCCH resource indicator (PRI) values may be encoded in different DCI formats even they are associated with the same UL slot for HARQ-ACK feedback as demonstrated in FIG. 46.

FIG. 46 illustrates a diagram 4600 of an exemplified HARQ-ACK feedback for PDSCHs with different service types, in accordance with some aspects. Referring to FIG. 46, the UE may provide HARQ-ACK information over different non-overlapped PUCCH channels in a single slot n in response to detecting multiple DCI formats in a set of DL slots 4610-4640. As shown in FIG. 4b below, assuming 2 PUCCH resource subsets 450 and 460 are configured by higher layers in different symbols of a slot, as follows:

PUCCH resource subset 4650: includes PUCCH resources with a list of IDs: <0, 1, 2>; and PUCCH resource subset 4660: includes PUCCH resources with a list of IDs: <3, 4, 5, 6, 7>.

In some aspects, it may be technically desirable for the design to allow an unequal split of PUCCH resources across different subsets within a slot so as to better adapt to the traffic burden and hence improve the UL resource efficiency. As one example, subset 4650 may be typically reserved for latency-sensitive traffic e.g. URLLC and therefore includes a relatively small number of PUCCH resources for HARQ-ACK feedback.

In some aspects, two different latency-sensitive traffic types may be used (e.g. eMBB vs. URLLC) for scheduling. Then, a UE can even be indicated to use subset 4650 PUCCH resource in earlier symbols for later arrival URLLC traffic of 4630 and 4640 and PUCCH subset 4660 for less sensitive traffic by properly setting PRI values in DCI formats to be 001 and 101 respectively.

In some aspects, a subset of search space set (e.g., a subset of configured aggregation level or a subset of candidates per aggregation level) or one or more search space sets for PDCCH monitoring can be configured by higher layers to indicate whether the PUCCH carrying HARQ-ACK feedback is transmitted in a different resource.

In some aspects, one field in the downlink control information (DCI) can be used to trigger multiple HARQ-ACK feedback in a slot. More specifically, it can be used to indicate whether a subset of HARQ-ACK feedback for the scheduled PDSCH(s) is carried by an additional physical channel(s), e.g., PUCCH or PUSCH in a slot. Furthermore, this field may be configured by higher layers via NR minimum system information (MSI), NR remaining minimum system information (RMSI), NR other system information (OSI), or UE-specific radio resource control (RRC) signaling. In case when the UE does not support the transmission of multiple HARQ-ACK in a slot or not configured with the feature of transmission of multiple HARQ-ACK in a slot, this field may not be present in the corresponding DCI.

In the following sections, it may be assumed that two subsets of HARQ-ACK feedbacks carried by PUCCH or PUSCH are scheduled in a slot. However, more than two HARQ-ACK feedbacks can be straightforwardly extended and supported by following the same principles.

In some aspects, within each subset of HARQ-ACK feedback, PUCCH resource carrying HARQ-ACK feedback can be determined by the last DCI and corresponding PDCCH for scheduling PDSCH within the same subset. More specifically, the PUCCH resource indicator in the DCI and starting CCE index of scheduling PDCCH are used to determine the PUCCH resource carrying HARQ-ACK in the same subset.

In some aspects, the scheduled PDSCH transmissions can be slot based or non-slot (mini-slot) based. Furthermore, they may be scheduled in the same or different bandwidth parts (BWP) or component carriers (CC) in case of carrier aggregation (CA). When they are scheduled in different BWPs, the numerology used for the transmission of PDSCHs may be the same or different depending on the numerology associated with the configured BWPs.

As a further extension, for services with different latency and/or reliability requirements (e.g., URLLC and eMBB services), different PUCCH resource sets may be configured. When the explicit or implicit indication is used to differentiate such services, the UE can use corresponding PUCCH resource from the configured PUCCH resource sets for different services.

Figure 47:
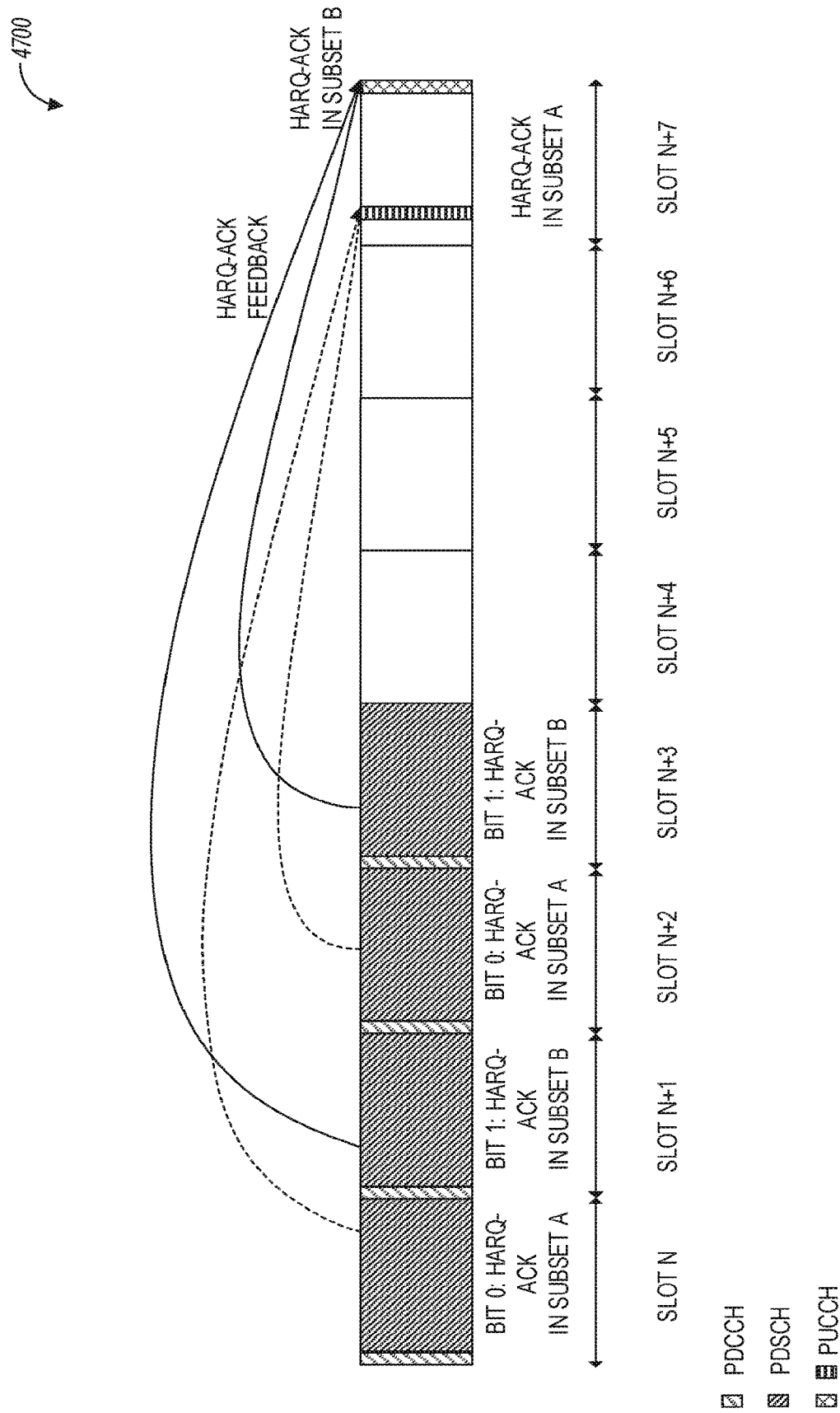
FIG. 47 illustrates an explicit indication in DCI to trigger multiple HARQ-ACK feedback in a slot, in accordance with some aspects.

FIG. 47 illustrates a diagram 4700 of an explicit indication in DCI to trigger multiple HARQ-ACK feedback in a slot, in accordance with some aspects. In the illustrated example, bit "0" in the DCI for scheduling PDSCH in slot n and n+2 is used to indicate that PDSCH in slot n and n+2 and corresponding HARQ-ACK feedback belong to subset A. In addition, bit "1" in the DCI for scheduling PDSCH in slot n+1 and n+3 is used to indicate that PDSCH in slot n+1 and n+3 and corresponding HARQ-ACK feedback belong to subset B. Furthermore, HARQ-ACK feedbacks in subset A and subset B are transmitted in different PUCCH resources, which are TDM'ed in a slot. In some aspects, PUCCH resource for subset A is determined in accordance with the DCI and corresponding PDCCH in slot n+2 while PUCCH resource for subset B is determined in accordance with the DCI and corresponding PDCCH in slot n+3.

Figure 48:
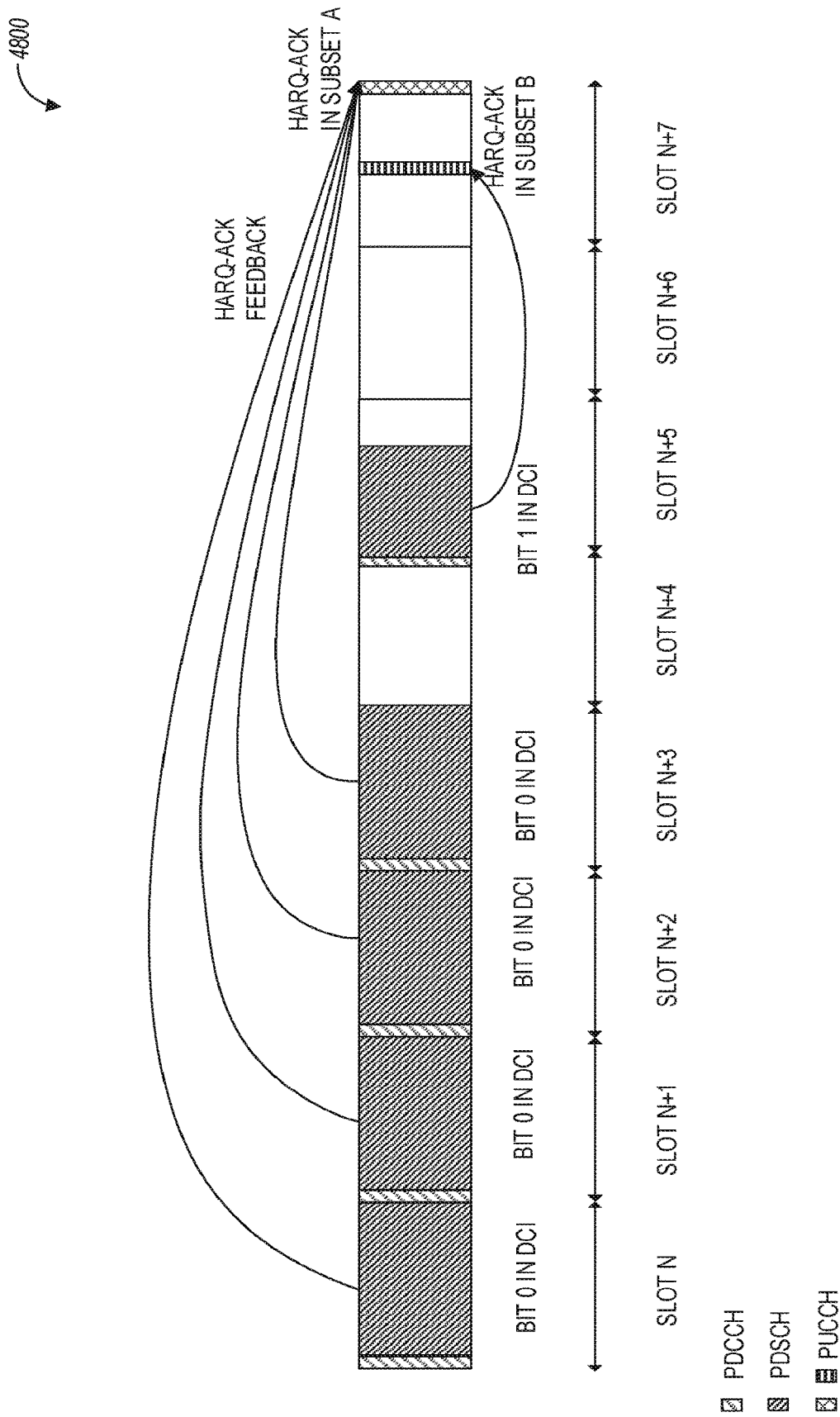
FIG. 48 illustrates another explicit indication in DCI to trigger multiple HARQ-ACK feedback in a slot, in accordance with some aspects.

FIG. 48 illustrates a diagram 4800 of another explicit indication in DCI to trigger multiple HARQ-ACK feedback in a slot, in accordance with some aspects. In the example in FIG. 48, a bit "1" in the DCI for scheduling the PDSCH transmission in slot n+5 can be used to trigger HARQ-ACK transmission in slot n+7 using PUCCH resource in subset B. In this example, this PDSCH transmission can be targeted for URLLC application which requires fast HARQ-ACK for low latency.

In some aspects, different Radio Network Temporary Identifiers (RNTI) in the DCI for scheduling PDSCH transmissions can be used to trigger multiple HARQ-ACKs in a slot. In particular, when cyclic redundancy check (CRC) is masked with RNTI-A, this indicates that scheduled PDSCH and corresponding HARQ-ACK feedback belong to subset A. In case when CRC is masked with RNTI-B, this indicates that scheduled PDSCH and corresponding HARQ-ACK feedback belong to subset B. In some aspects, one or more of RNTI-A and RNTI-B may be predefined in the specification or configured by higher layers via NR minimum system information (MSI), NR remaining minimum system information (RMSI), NR other system information (OSI), or UE-specific radio resource control (RRC) signaling. In some aspects, if physical tracking reference signal (PT-RS) is enabled, PT-RS can be dynamically present when any of the RNTI is used, or PT-RS cannot be dynamically present when any of the RNTI is used.

Figure 49:
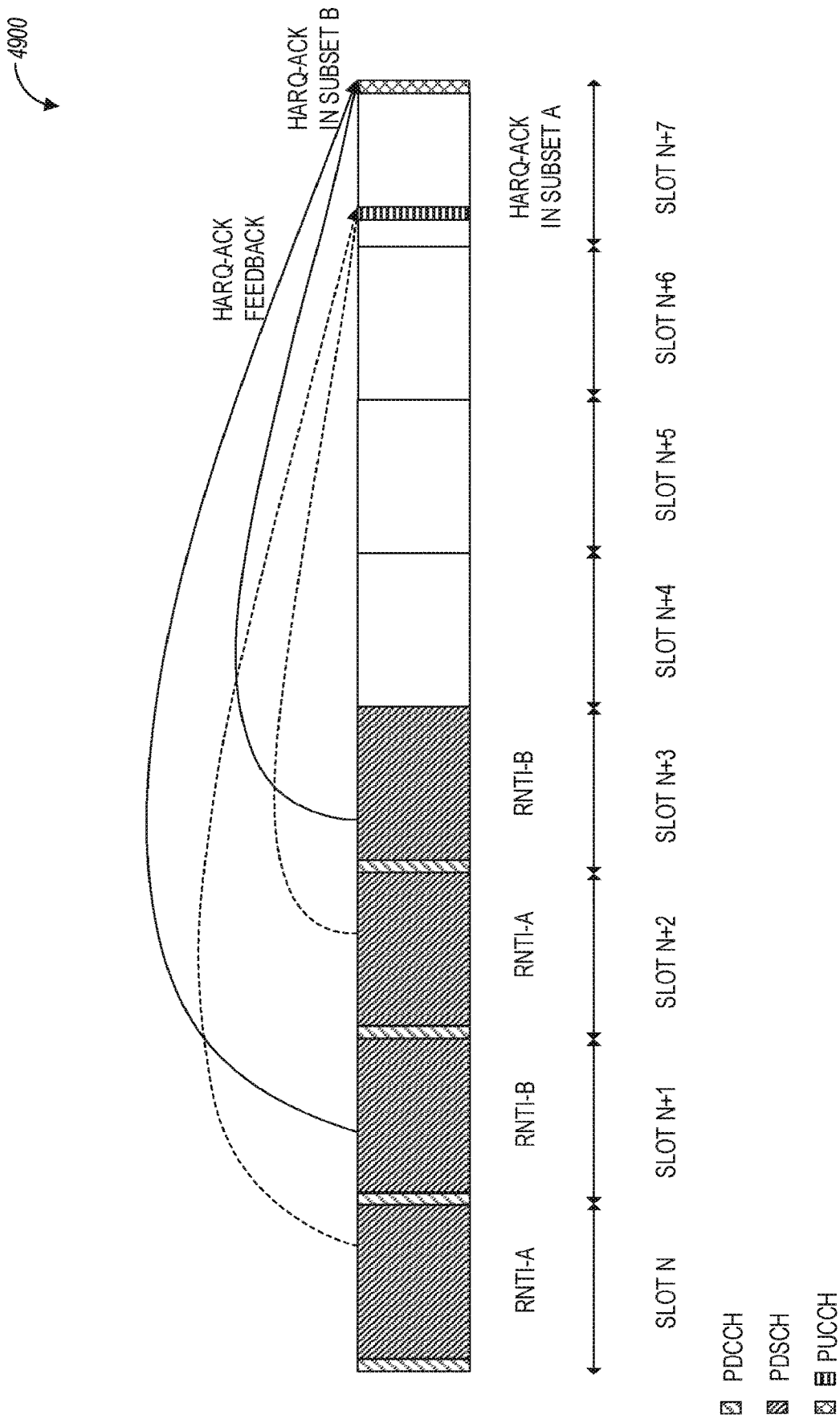
FIG. 49 illustrates different RNTIs to trigger multiple HARQ-ACK feedback in a slot, in accordance with some aspects.

FIG. 49 illustrates a diagram 4900 of different RNTIs to trigger multiple HARQ-ACK feedback in a slot, in accordance with some aspects. In the example in FIG. 49, RNTI-A masked with CRC in the DCI for scheduling PDSCH in slot n and n+2 is used to indicate that PDSCH in slot n and n+2 and corresponding HARQ-ACK feedback belong to subset A. In addition, RNTI-B masked with CRC in the DCI for scheduling PDSCH in slot n+1 andn+3 is used to indicate that PDSCH in slot n+1 and n+3 and corresponding HARQ-ACK feedback belong to subset B.

In some aspects, different DCI formats can be used to trigger multiple HARQ-ACKs in a slot. For instance, a new DCI format can be defined to trigger HARQ-ACK feedback in a slot, wherein the HARQ-ACK feedback is carried by (an) additional physical channel(s), e.g., PUCCH or PUSCH in a slot. To reduce the number of blind decoding attempts, the size of this new DCI format can be matched with that of the existing DCI formats, e.g., DCI format 1-0 and 1-1. Furthermore, a DCI format differentiation field may be defined to differentiate the new DCI format and the existing DCI formats. Alternatively, this new DCI format with different size compared to legacy DCI format may be limited to UE-specific search space only so as to avoid the increased blind decoding attempts. Further in this embodiment, the different DCI formats to trigger multiple HARQ-ACK feedbacks in a slot may be the existing DCI formats 1_0 and 1_1 monitored in CSS or USS, wherein each of the formats may be associated with particular PLCCH resource set by semi-static UE specific signaling. If no association is provided, then legacy behavior may be applied.

In some aspects, a subset of HARQ process IDs can be configured by higher layers via RRC signaling to indicate whether the HARQ-ACK feedback is carried by an additional physical channel(s), e.g., PUCCH or PUSCH in a slot. For instance, assuming 16 HARQ processes are configured by higher layers, HARQ ID #0 and #1 can be configured and reserved. In case when PDSCH is scheduled with HARQ ID #0 and #1, HARQ-ACK feedback is carried by additional physical channels, which can be different from the physical channel carrying HARQ-ACK for the corresponding PDSCHs with HARQ ID #2-#15.

In some aspects, a subset of PUCCH resources can be configured and used to indicate whether the PUCCH carrying HARQ-ACK feedback is transmitted in a different resource. For instance, assuming 16 PUCCH resources are configured by RRC signaling, PUCCH resource #0-3 may be used to indicate that the carried HARQ-ACK belongs to subset A while PUCCH resource #4-15 may be used to indicate that the carried HARQ-ACK belongs to subset B. In this case, it may be further constrained that the different subsets of PUCCH resources (e.g., #0-3 and #4-15) correspond to non-overlapping physical resources in time-domain.

In some aspects, the transmission timing of PDCCH, PDSCH and/or PUCCH may be used to determine whether the corresponding PUCCH carrying HARQ-ACK feedback can be transmitted in a different resource. In one option, a UE may be configured semi-statically by higher layers, subject to its capability, to transmit HARQ-ACK in response to a scheduled PDSCH in a resource indicated by ARI different from other resources in this slot indicated by ARI for previously received PDSCH. The condition to transmit HARQ-ACK in different PUCCH resource may be evaluated based on one or more of the factors: (i) the starting symbols, (ii) the ending symbols of the PUCCH resource for the previously triggered HARQ-ACK and currently triggered HARQ-ACK wherein the later received PDSCH triggering earlier starting and/or ending PUCCH may create transmission of multiple HARQ-ACK feedbacks in a slot instead of following the last received DCI.

In some aspects, for semi-static and/or dynamic HARQ-ACK codebook, the partition of scheduled PDSCH transmission and corresponding HARQ-ACK feedbacks into different subsets may depend on the transmission timing of PDSCHs or can be configured by higher layers. In one option, the transmission of PDSCHs in even slot may fall into subset A while the transmission of PDSCHs in odd slot may fall into subset B. Alternatively, the partition of scheduled PDSCHs and corresponding HARQ-ACK feedbacks can be configured by higher layers per BWP or CC via MSI, RMSI, OSI or RRC signaling.

In some aspects, the aforementioned aspects can be straightforwardly extended to the carrier aggregation (CA) scenario. More specifically, for a PUCCH group, multiple HARQ-ACK feedbacks can be triggered and transmitted in a slot according to the aforementioned embodiments.

Mechanisms to Multiplex HARQ-ACK Feedback in a Slot.

In some aspects, in NR, two short PUCCHs, and one short and one long PUCCH can be multiplexed in a time division multiplexing (TDM) manner in a slot. When more than two PUCCHs or long PUCCH and long PUCCH carrying HARQ-ACK feedback are scheduled in a slot, certain dropping rule or priority rule may need to be defined to ensure that when two non-overlapping PUCCH resources carrying HARQ-ACK feedback are scheduled, they include at least one with short PUCCH format.

Aspects of multiplexing multiple HARQ-ACK feedback in a slot are provided as follows.

In some aspects, the UE may first report its capability on the support of the number (NHARQACK) of HARQ-ACK feedback carried by PUCCH in a slot. The default value of NHARQACK can be 2 and when two non-overlapping PUCCH resources carrying HARQ-ACK feedback are scheduled, they include at least one with short PUCCH format.

In some aspects, a maximum number of PUCCH/PUSCH carrying HARQ-ACK transmissions within a slot duration may be specified considering the impact on UE complexity. As an example, the maximum number of PUCCH transmissions carrying HARQ-ACK within a slot may be limited to six. As another alternative, the maximum could be defined as a function of the subcarrier spacing (SCS) value for the PUCCH transmission.

In some aspects, after reporting the capability on the support of the number of HARQ-ACK feedback carried by PUCCH in a slot, the UE may expect that the scheduled HARQ-ACK in a slot should be less than or equal to the supported number of HARQ-ACK feedback carried by PUCCH.

In some aspects, for a UE with multiple panels, the UE can report its capability on the support of the number of HARQ-ACK feedback by PUCCH per panel in a slot, where a UE panel indicates a UE antenna port(s) group. Then the UE may expect that the number of HARQ-ACK feedback carried by the same UE antenna port by PUCCH may not exceed this UE capability and the number of HARQ-ACK feedback carried by all UE antenna ports should not exceed the UE capability multiplied by a number of UE panels.

In some aspects, when the scheduled HARQ-ACK in a slot is greater than the supported number of HARQ-ACK feedback carried by PUCCH in a slot, a dropping rule or priority rule is defined to allow UE to drop one or more HARQ-ACK feedback in a slot.

In some aspects, the dropping rule is predefined in the specification or configured by NR minimum system information (MSI), NR remaining minimum system information (RMSI), NR other system information (OSI), or UE-specific radio resource control (RRC) signaling.

In some aspects, the dropping of one or more HARQ-ACK feedbacks depends on the transmission timing of HARQ-ACK feedback. In an aspect, the earlier transmission of HARQ-ACK feedback has higher priority than the later transmission of HARQ-ACK feedback. In case when at most two non-overlapping PUCCHs with at least one short PUCCH can be transmitted in a slot, the UE selects two earliest non-overlapping PUCCH resources for carrying HARQ-ACK feedback, and at least one of PUCCH resources include short PUCCH format. Alternatively, the later transmission of HARQ-ACK feedback has higher priority than the earlier transmission of HARQ-ACK on PUCCH.

Figure 50:
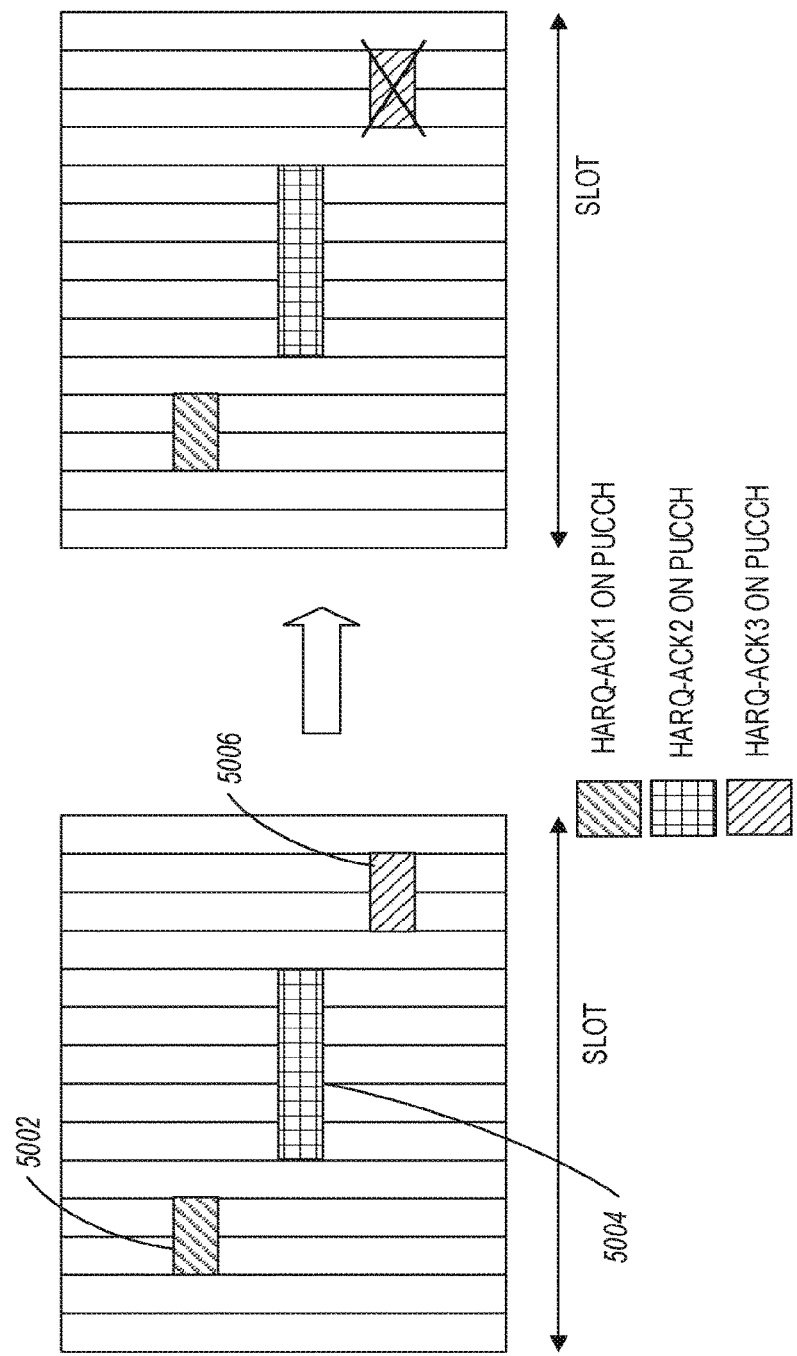
FIG. 50 illustrates multiplexing multiple HARQ-ACK in a slot, in accordance with some aspects.

FIG. 50 illustrates a diagram 5000 of multiplexing multiple HARQ-ACK feedbacks in a slot, in accordance with some aspects. In the example in FIG. 50, based on the aforementioned multiplexing rule, the first two HARQ-ACK feedbacks (5002 and 5004) on PUCCHs are selected, and the last PUCCH carrying HARQ-ACK (5006) is dropped.

In some aspects, the dropping of one or more HARQ-ACK feedbacks depends on the priority of service types. In particular, HARQ-ACK feedback for URLLC service has higher priority than that for eMBB service. In case when at most NHARQACK (or the number of HARQ-ACK feedbacks) non-overlapping PUCCHs with at least one short PUCCH can be transmitted in a slot, the UE selects a maximum of two non-overlapping PUCCH resources with higher priority, which include at least one with short PUCCH format.

A system and method of wireless communication for a 5G (NR) communication system. The system may be configured, by a gNB, via radio resource control (RRC) signaling on whether multiple hybrid automatic repeat request-acknowledgment (HARQ-ACK) feedbacks are transmitted on different physical uplink control channels (PUCCH) and/or physical uplink shared channels (PUSCH). Multiple HARQ-ACK feedbacks may be transmitted, by a UE, on different PUCCHs and/or PUSCHs in accordance with the configuration. In some aspects, for semi-static and dynamic HARQ-ACK codebook, when UE supports the reception of multiple PDSCHs in a slot, UE may derive the PUCCH resource based on the PUCCH resource indicator indicated in the DCI in each detected PDCCH and starting CCE index of the detected PDCCH in each PDCCH monitoring occasion In some aspects, one field in the downlink control information (DCI) can be used to trigger multiple HARQ-ACK feedback in a slot. In some aspects, within each subset of HARQ-ACK feedback, PUCCH resource carrying HARQ-ACK feedback can be determined by the last DCI and corresponding PDCCH for scheduling PDSCH within the same subset. In some aspects, different Radio Network Temporary Identifiers (RNTI) in the DCI for scheduling PDSCH transmissions can be used to trigger multiple HARQ-ACKs in a slot. In some aspects, different DCI formats can be used to trigger multiple HARQ-ACKs in a slot. In some aspects, the new DCI format with different size compared to legacy DCI format may be limited to UE-specific search space only. In some aspects, a subset of HARQ process IDs can be configured by higher layers via RRC signaling to indicate whether the HARQ-ACK feedback is carried by an additional physical channel(s), e.g., PUCCH or PUSCH in a slot. A subset of PUCCH resources can be configured and used to indicate whether the PUCCH carrying HARQ-ACK feedback is transmitted in a different resource. In some aspects, the transmission timing of PDCCH, PDSCH, and/or PUCCH may be used to determine whether the corresponding PUCCH carrying HARQ-ACK feedback can be transmitted in a different resource.

In some aspects, the condition to transmit HARQ-ACK in different PUCCH resource may be evaluated based on one or more of the factors: (i) the starting symbols, (ii) the ending symbols of the PUCCH resource for the previously triggered HARQ-ACK and currently triggered HARQ-ACK wherein the later received PDSCH triggering earlier starting and/or ending PUCCH may create transmission of multiple HARQ-ACK feedbacks in a slot instead of following the last received DCI. In some aspects, for semi-static and/or dynamic HARQ-ACK codebook, the partition of scheduled PDSCH transmission and corresponding HARQ-ACK feedbacks into different subsets may depend on the transmission timing of PDSCHs or can be configured by higher layers. In some aspects, the UE may first report its capability on the support of the number (NHARQACK) of HARQ-ACK feedback carried by PUCCH in a slot. In some aspects, when the scheduled HARQ-ACK in a slot is greater than the supported number of HARQ-ACK feedback carried by PUCCH in a slot, a dropping rule or priority rule is defined to allow the UE to drop one or more HARQ-ACK feedback in a slot.

In some aspects, the dropping rule is predefined in the specification or configured by NR minimum system information (MSI), NR remaining minimum system information (RMSI), NR other system information (OSI), or UE-specific radio resource control (RRC) signaling. In some aspects, the dropping of one or more HARQ-ACK feedbacks depends on the transmission timing of HARQ-ACK feedback. In some aspects, the dropping of one or more HARQ-ACK feedbacks depends on the priority of service types.

Figure 51:
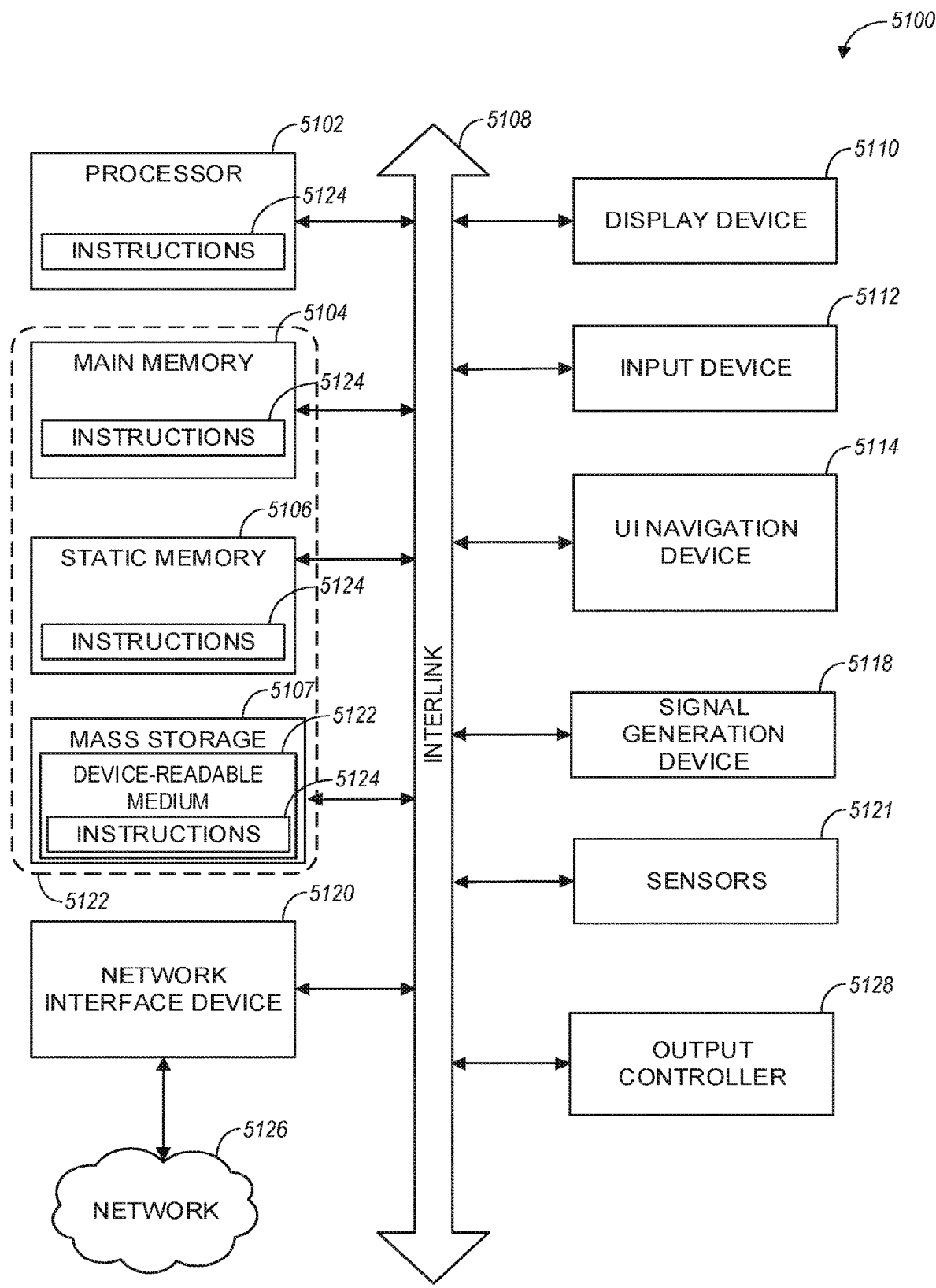
FIG. 51 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 51 illustrates a block diagram of a communication device such as an evolved Node-B (eNB), a next generation Node-B (gNB), an access point (AP), a wireless station (STA), a mobile station (MS), or a user equipment (UE), in accordance with some aspects. In alternative aspects, the communication device 5100 may operate as a standalone device or may be connected (e.g., networked) to other communication devices.

Circuitry (e.g., processing circuitry) is a collection of circuits implemented in tangible entities of the device 5100 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 5100 follow.

In some aspects, the device 5100 may operate as a standalone device or may be connected (e.g., networked) to other devices. In a networked deployment, the communication device 5100 may operate in the capacity of a server communication device, a client communication device, or both in server-client network environments. In an example, the communication device 5100 may act as a peer communication device in peer-to-peer (P2P) (or other distributed) network environment. The communication device 5100 may be a UE, eNB, PC, a tablet PC, a STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. The software may accordingly configure a hardware processor, for example, to constitute a particular module at one instance of time and to constitute a different module at a different instance of time.

Communication device (e.g., UE) 5100 may include a hardware processor 5102 (e.g., a central processing unit (CPU), a graphics processing unit (GPU), a hardware processor core, or any combination thereof), a main memory 5104, a static memory 5106, and mass storage 5107 (e.g., hard drive, tape drive, flash storage, or other block or storage devices), some or all of which may communicate with each other via an interlink (e.g., bus) 5108.

The communication device 5100 may further include a display device 5110, an alphanumeric input device 5112 (e.g., a keyboard), and a user interface (UI) navigation device 5114 (e.g., a mouse). In an example, the display device 5110, input device 5112 and UI navigation device 5114 may be a touch screen display. The communication device 5100 may additionally include a signal generation device 5118 (e.g., a speaker), a network interface device 5120, and one or more sensors 5121, such as a global positioning system (GPS) sensor, compass, accelerometer, or other sensors. The communication device 5100 may include an output controller 5128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 5107 may include a communication device-readable medium 5122, on which is stored one or more sets of data structures or instructions 5124 (e.g., software) embodying or utilized by any one or more of the techniques or functions described herein. In some aspects, registers of the processor 5102, the main memory 5104, the static memory 5106, and/or the mass storage 5107 may be, or include (completely or at least partially), the device-readable medium 5122, on which is stored the one or more sets of data structures or instructions 5124, embodying or utilized by any one or more of the techniques or functions described herein. In an example, one or any combination of the hardware processor 5102, the main memory 5104, the static memory 5106, or the mass storage 5116 may constitute the device-readable medium 5122.

As used herein, the term "device-readable medium" is interchangeable with "computer-readable medium" or "machine-readable medium". While the communication device-readable medium 5122 is illustrated as a single medium, the term "communication device-readable medium" may include a single medium or multiple media (e.g., a centralized or distributed database, and/or associated caches and servers) configured to store the one or more instructions 5124.

The term "communication device-readable medium" may include any medium that is capable of storing, encoding, or carrying instructions (e.g., instructions 5124) for execution by the communication device 5100 and that causes the communication device 5100 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 5124 may further be transmitted or received over a communications network 5126 using a transmission medium via the network interface device 5120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 5120 may include one or more physical jacks (e.g., Ethernet, coaxial, or phone jacks) or one or more antennas to connect to the communications network 5126. In an example, the network interface device 5120 may include a plurality of antennas to wirelessly communicate using at least one of single-input-multiple-output (SIMO), MIMO, or multiple-input-single-output (MISO) techniques. In some examples, the network interface device 5120 may wirelessly communicate using Multiple User MIMO techniques.

The term "transmission medium" shall be taken to include any intangible medium that is capable of storing, encoding or carrying instructions for execution by the communication device 5100, and includes digital or analog communications signals or another intangible medium to facilitate communication of such software. In this regard, a transmission medium in the context of this disclosure is a device-readable medium.

ADDITIONAL NOTES AND EXAMPLES

Example 1 is an apparatus of a user equipment (UE), the apparatus comprising: processing circuitry, wherein to configure the UE for New Radio (NR) communications above 52.6 GHz carrier frequency, the processing circuitry is to: decode radio resource control (RRC) signaling to obtain a cyclic shift value in time domain, the cyclic shift value associated with a demodulation reference signal (DM-RS) antenna port (AP) of a plurality of available DM-RS APs; generate a single carrier based waveform DM-RS sequence corresponding to the DM-RS AP using a base sequence and the cyclic shift value; and encode the single carrier based waveform DM-RS sequence with uplink data for transmission to a base station using a physical uplink shared channel (PUSCH); and memory coupled to the processing circuitry, the memory configured to store the cyclic shift value.

In Example 2, the subject matter of Example 1 includes, wherein the base sequence is one of a Zadoff-Chu sequence or a computer-generated sequence (CGS).

In Example 3, the subject matter of Examples 1-2 includes, wherein the single carrier based waveform DM-RS sequence is a single carrier with frequency domain equalizer (SC-FDE) DM-RS sequence generated according to the following equation: $y(n) = \bar{r}_{u,v}((n+L) \mod N_{ZC})$, $n = 0, 1, \ldots, N$, where $\bar{r}_{u,v}(n)$ is the base sequence, $N_{ZC}$ is the base sequence length, L is the cyclic shift value, N is the base sequence length, u is a group number, and v is a number of the base sequence within the group.

In Example 4, the subject matter of Examples 1-3 includes, wherein the processing circuitry is to: insert a guard interval (GI) sequence before and after the DM-RS sequence within a single carrier with frequency domain equalizer (SC-FDE) block, wherein the GI sequence is independently generated from the DM-RS sequence.

In Example 5, the subject matter of Examples 1-4 includes, wherein the processing circuitry is to: insert a guard interval (GI) sequence before the DM-RS sequence within a single carrier with frequency domain equalizer (SC-FDE) block, wherein a length of the DM-RS sequence equals a Fast Fourier Transform (FFT) size and the GI sequence is a portion of the DM-RS sequence.

In Example 6, the subject matter of Examples 1-5 includes, wherein the processing circuitry is to: apply a hopping pattern to the base sequence, wherein the hopping pattern is initialized using at least one of the following: a slot index, a single carrier with frequency domain equalizer (SC-FDE) block index, or a configurable ID.

In Example 7, the subject matter of Examples 1-6 includes, wherein the processing circuitry is to: apply a block-wised orthogonal cover code (OCC) to the DM-RS sequence in time domain to generate a block-wised spread DM-RS sequence, the block-wised spread DM-RS sequence associated with one of the plurality of available DM-RS APs.

In Example 8, the subject matter of Example 7 includes, wherein the block-wised OCC is applied on a block level or a sub-block level.

In Example 9, the subject matter of Examples 7-8 includes, wherein the processing circuitry is to: decode downlink control information (DCI) indicating an AP for use during the uplink data transmission; generate the block-wised spread DM-RS sequence based on the indicated AP; and encode the block-wised spread DM-RS sequence with the uplink data for transmission to the base station using the PUSCH.

In Example 10, the subject matter of Examples 1-9 includes, transceiver circuitry coupled to the processing circuitry; and, one or more antennas coupled to the transceiver circuitry.

Example 11 is a non-transitory computer-readable storage medium that stores instructions for execution by one or more processors of a base station operating in a 5G network, the instructions to configure the one or more processors for New Radio (NR) communications above 52.6 GHz carrier frequency and to cause the base station to: encode radio resource control (RRC) signaling with a cyclic shift value in time domain for transmission to a user equipment (UE), the cyclic shift value associated with a demodulation reference signal (DM-RS) antenna port (AP) of a plurality of available DM-RS APs; decode a single carrier based waveform DM-RS sequence corresponding to the DM-RS AP and received from the UE with uplink data via a physical uplink shared channel (PUSCH); determine a channel estimate of the PUSCH using the DM-RS sequence; and decode the uplink data based on the channel estimate; wherein the DM-RS sequence is a single carrier based waveform DM-RS sequence generated using a base sequence and the cyclic shift value; and encode the single carrier based waveform DM-RS sequence with uplink data for transmission to a base station using a physical uplink shared channel (PUSCH); and memory coupled to the processing circuitry, the memory configured to store the cyclic shift value.

In Example 12, the subject matter of Example 11 includes, wherein the base sequence is one of a Zadoff-Chu sequence or a computer-generated sequence (CGS).

In Example 13, the subject matter of Examples 11-12 includes, wherein the single carrier based waveform DM-RS sequence is a single carrier with frequency domain equalizer (SC-FDE) DM-RS sequence generated according to the following equation: $y(n) = \bar{r}_{u,v}((n+L) \mod N_{ZC})$, $n = 0, 1, \ldots, N$, where $\bar{r}_{u,v}(n)$ is the base sequence, $N_{ZC}$ is the base sequence length, L is the cyclic shift value, N is the base sequence length, u is a group number, and v is a number of the base sequence within the group.

Example 14 is a non-transitory computer-readable storage medium that stores instructions for execution by one or more processors of a user equipment (UE), the instructions to configure the one or more processors for New Radio (NR) communications above 52.6 GHz carrier frequency and to cause the UE to: decode radio resource control (RRC) signaling to obtain a cyclic shift value in time domain, the cyclic shift value associated with a demodulation reference signal (DM-RS) antenna port (AP) of a plurality of available DM-RS APs; generate a single carrier based waveform DM-RS sequence corresponding to the DM-RS AP using a base sequence and the cyclic shift value; and encode the single carrier based waveform DM-RS sequence with uplink data for transmission to a base station using a physical uplink shared channel (PUSCH).

In Example 15, the subject matter of Example 14 includes, wherein the instructions further configure the one or more processors to cause the UE to insert a guard interval (GI) sequence before and after the DM-RS sequence within a single carrier with frequency domain equalizer (SC-FDE) block, wherein the GI sequence is independently generated from the DM-RS sequence.

In Example 16, the subject matter of Examples 14-15 includes, wherein the instructions further configure the one or more processors to cause the UE to: insert a guard interval (GI) sequence before the DM-RS sequence within a single carrier with frequency domain equalizer (SC-FDE) block, wherein a length of the DM-RS sequence equals a Fast Fourier Transform (FFT) size and the GI sequence is a portion of the DM-RS sequence.

In Example 17, the subject matter of Examples 14-16 includes, wherein the instructions further configure the one or more processors to cause the UE to apply a hopping pattern to the base sequence, wherein the hopping pattern is initialized using at least one of the following: a slot index, a single carrier with frequency domain equalizer (SC-FDE) block index, or a configurable ID.

In Example 18, the subject matter of Examples 14-17 includes, wherein the instructions further configure the one or more processors to cause the UE to apply a block-wised orthogonal cover code (OCC) to the DM-RS sequence in time domain to generate a block-wised spread DM-RS sequence, the block-wised spread DM-RS sequence associated with one of the plurality of available DM-RS APs.

In Example 19, the subject matter of Example 18 includes, the block-wised OCC is applied on a block level or a sub-block level.

In Example 20, the subject matter of Examples 18-19 includes, wherein the instructions further configure the one or more processors to cause the UE to: decode downlink control information (DCI) indicating an AP for use during the uplink data transmission; generate the block-wised spread DM-RS sequence based on the indicated AP; and encode the block-wised spread DM-RS sequence with the uplink data for transmission to the base station using the PUSCH.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

Various aspects discussed herein refer to a UE, a gNB (or base station or eNB) or other network entities without a specific reference to one of the figures. In this case, such reference to a UE, a gNB (or base station or eNB) or other network entities can be associated to an existing (similar) reference in one or more of the figures (e.g., a reference to a function being performed by "a UE", such function can be performed by any of the illustrated UEs, such as UE 101).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, the inventive subject matter lies in less than all features of a single disclosed aspect. Thus the following claims are hereby incorporated into the Detailed Description, with each claim standing on its own as a separate aspect.

What is claimed is:

1. An apparatus, comprising:
   memory, and
   processing circuitry in communication with the memory, wherein the processing circuitry is configured to:
      receive user equipment (UE)-specific radio resource control (RRC) signaling, wherein the UE-specific RRC signaling includes a configuration of a field in a downlink control information (DCI) message;
      receive a plurality of DCI messages scheduling a plurality of physical downlink shared channel (PDSCH) transmissions, wherein the plurality of DCI messages include respective fields indicating a subset to which the respective PDSCH transmissions belong and respective physical uplink control channel (PUCCH) resource indicators, wherein the first subset is associated with a first service type;
      subsequently, transmit, at a first time hybrid automatic request (HARQ)-acknowledgement (ACK) feedback for respective PDSCH transmissions belonging to a first subset in a first uplink resource derived based on a first PUCCH resource indicated in a first DCI message of the plurality of DCI messages; and
      transmit, at a second time, HARQ-ACK feedback for respective PDSCH transmissions belonging to a second subset in a second uplink resource derived based on a second PUCCH resource indicated in a second DCI message of the plurality of DCI messages, wherein the second subset is associated with a second service type different from the first service type.

2. The apparatus of claim 1, wherein the field indicates a subset for hybrid automatic request (HARQ)-acknowledgement (ACK) feedback.

3. The apparatus of claim 1, wherein the first uplink resource is a physical uplink control channel (PUCCH).

4. The apparatus of claim 1, wherein the first uplink resource is a physical uplink shared channel (PUSCH).

5. The apparatus of claim 1, wherein the first uplink resource and the second uplink resource are in the same slot.

6. The apparatus of claim 1, wherein the respective PDSCH transmission are on a plurality of carriers in a carrier aggregation configuration.

7. The apparatus of claim 1, wherein the apparatus is comprised in a UE.

8. A non-transitory computer-readable storage medium that stores instructions for execution by one or more processors of a base station operating in a 5G network, the instructions to configure the one or more processors to cause the base station to:
transmit user equipment (UE)-specific radio resource control (RRC) signaling, wherein the UE-specific RRC signaling includes a configuration of a field in a downlink control information (DCI) message;
transmit a plurality of DCI messages scheduling a plurality of physical downlink shared channel (PDSCH) transmissions, wherein the plurality of DCI messages include respective fields indicating a subset to which the respective PDSCH transmissions belong and respective physical uplink control channel (PUCCH) resource indicators;
subsequently, receive, at a first time hybrid automatic request (HARQ)-acknowledgement (ACK) feedback for respective PDSCH transmissions belonging to a first subset in a first uplink resource derived based on a first PUCCH resource indicated in a first DCI message of the plurality of DCI messages, wherein the first subset is associated with a first service type; and
receive, at a second time, HARQ-ACK feedback for respective PDSCH transmissions belonging to a second subset in a second uplink resource derived based on a second PUCCH resource indicated in a second DCI message of the plurality of DCI messages, wherein the second subset is associated with a second service type different from the first service type.

9. The non-transitory computer-readable storage medium of claim 8, wherein the field indicates a subset for hybrid automatic request (HARQ)-acknowledgement (ACK) feedback.

10. The non-transitory computer-readable storage medium of claim 8, wherein the first uplink resource is a physical uplink control channel (PUCCH).

11. The non-transitory computer-readable storage medium of claim 8, wherein the first uplink resource is a physical uplink shared channel (PUSCH).

12. The non-transitory computer-readable storage medium of claim 8, wherein the first uplink resource and the second uplink resource are in the same slot.

13. The non-transitory computer-readable storage medium of claim 8, wherein the respective PDSCH transmission are on a plurality of carriers in a carrier aggregation configuration.

14. A non-transitory computer-readable storage medium that stores instructions for execution by one or more processors of a user equipment (UE), the instructions to configure the one or more processors to cause the UE to:
receive UE-specific radio resource control (RRC) signaling, wherein the UE-specific RRC signaling includes a configuration of a field in a downlink control information (DCI) message;
receive a plurality of DCI messages scheduling a plurality of physical downlink shared channel (PDSCH) transmissions, wherein the plurality of DCI messages include respective fields indicating a subset to which the respective PDSCH transmissions belong and respective physical uplink control channel (PUCCH) resource indicators;
subsequently, transmit, at a first time hybrid automatic request (HARQ)-acknowledgement (ACK) feedback for respective PDSCH transmissions belonging to a first subset in a first uplink resource derived based on a first PUCCH resource indicated in a first DCI message of the plurality of DCI messages, wherein the first subset is associated with a first service type; and
transmit, at a second time, HARQ-ACK feedback for respective PDSCH transmissions belonging to a second subset in a second uplink resource derived based on a second PUCCH resource indicated in a second DCI message of the plurality of DCI messages, wherein the second subset is associated with a second service type different from the first service type.

15. The non-transitory computer-readable storage medium of claim 14, wherein the field indicates a subset for hybrid automatic request (HARQ)-acknowledgement (ACK) feedback.

16. The non-transitory computer-readable storage medium of claim 14, wherein the first uplink resource is a physical uplink control channel (PUCCH).

17. The non-transitory computer-readable storage medium of claim 14, wherein the first uplink resource is a physical uplink shared channel (PUSCH).

18. The non-transitory computer-readable storage medium of claim 14, wherein the first uplink resource and the second uplink resource are in the same slot.

19. The non-transitory computer-readable storage medium of claim 14, wherein the respective PDSCH transmission are on a plurality of carriers in a carrier aggregation configuration.

20. The non-transitory computer-readable storage medium of claim 14 wherein the UE is configured to operate according to New Radio (NR) communications.

* * * * *